(12) United States Patent
Meyers et al.

(10) Patent No.: US 12,172,076 B2
(45) Date of Patent: *Dec. 24, 2024

(54) FACILITATING GENERATION OF PLAYER TOKEN NFTS AND METHODS FOR USE THEREWITH

(71) Applicant: Galiant Arts, LLC, Austin, TX (US)

(72) Inventors: Mark Meyers, Austin, TX (US); Bruce E. Stuckman, Austin, TX (US); John W. Howard, Cedar Park, TX (US); Brian G. Howard, Austin, TX (US); Gregory Meador, Austin, TX (US)

(73) Assignee: Galiant Arts, LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/390,033

(22) Filed: Dec. 20, 2023

(65) Prior Publication Data

US 2024/0115946 A1   Apr. 11, 2024

Related U.S. Application Data

(63) Continuation of application No. 17/820,935, filed on Aug. 19, 2022, which is a continuation-in-part of (Continued)

(51) Int. Cl.
*A63F 13/00* (2014.01)
*A63F 13/48* (2014.01)
(Continued)

(52) U.S. Cl.
CPC ............ *A63F 13/533* (2014.09); *A63F 13/48* (2014.09); *A63F 13/58* (2014.09); *A63F 13/70* (2014.09);
(Continued)

(58) Field of Classification Search
CPC .. H04L 9/50; A63F 13/69; A63F 13/71; A63F 13/77
See application file for complete search history.

(56) References Cited

U.S. PATENT DOCUMENTS 7,921,302 B2   4/2011   Gatto
11,663,551 B2   5/2023   Stephens
(Continued)

FOREIGN PATENT DOCUMENTS

EP   3857452   4/2021
EP   4136547   2/2023
(Continued)

*Primary Examiner* — David L Lewis
*Assistant Examiner* — Eric M Thomas
(74) *Attorney, Agent, or Firm* — Garlick & Markison; Bruce E. Stuckman

(57) ABSTRACT

A game system operates by: receiving character attribute selection data to be associated with a game character, wherein the character attribute selection data indicates a unique subset of a set of character attributes of a character attribute database; generating, based on the character attribute selection data, display data associated with the game character; facilitating, based on the display data associated with the game character, generation of a player token NFT associated with the game character; and preventing use of the unique subset of character attributes of the character attribute database in generating other game characters. Facilitating play of a game when the player token NFT is validated.

20 Claims, 95 Drawing Sheets

Related U.S. Application Data application No. 17/819,016, filed on Aug. 11, 2022, which is a continuation-in-part of application No. 17/806,766, filed on Jun. 14, 2022, which is a continuation-in-part of application No. 17/661,362, filed on Apr. 29, 2022, now Pat. No. 12,121,820, which is a continuation-in-part of application No. 17/656,084, filed on Mar. 23, 2022, now Pat. No. 11,786,820.

(60) Provisional application No. 63/370,464, filed on Aug. 4, 2022, provisional application No. 63/365,012, filed on May 19, 2022, provisional application No. 63/365,010, filed on May 19, 2022, provisional application No. 63/364,571, filed on May 12, 2022, provisional application No. 63/364,573, filed on May 12, 2022, provisional application No. 63/364,578, filed on May 12, 2022, provisional application No. 63/364,568, filed on May 12, 2022, provisional application No. 63/362,581, filed on Apr. 6, 2022, provisional application No. 63/310,376, filed on Feb. 15, 2022, provisional application No. 63/309,382, filed on Feb. 11, 2022, provisional application No. 63/308,546, filed on Feb. 10, 2022, provisional application No. 63/307,349, filed on Feb. 7, 2022, provisional application No. 63/306,405, filed on Feb. 3, 2022, provisional application No. 63/306,412, filed on Feb. 3, 2022, provisional application No. 63/305,505, filed on Feb. 1, 2022, provisional application No. 63/305,559, filed on Feb. 1, 2022, provisional application No. 63/302,757, filed on Jan. 25, 2022, provisional application No. 63/302,768, filed on Jan. 25, 2022, provisional application No. 63/297,394, filed on Jan. 7, 2022, provisional application No. 63/266,478, filed on Jan. 6, 2022, provisional application No. 63/265,754, filed on Dec. 20, 2021, provisional application No. 63/264,811, filed on Dec. 2, 2021, provisional application No. 63/263,844, filed on Nov. 10, 2021, provisional application No. 63/262,858, filed on Oct. 21, 2021, provisional application No. 63/262,762, filed on Oct. 20, 2021, provisional application No. 63/262,536, filed on Oct. 14, 2021.

(51) Int. Cl.
*A63F 13/533* (2014.01)
*A63F 13/58* (2014.01)
*A63F 13/70* (2014.01)

(52) U.S. Cl.
CPC ..... *A63F 2300/308* (2013.01); *A63F 2300/65* (2013.01)

(56) References Cited

U.S. PATENT DOCUMENTS

| | | |
|---|---|---|
| 11,707,682 B2 | 7/2023 | Benedetto |
| 11,741,426 B2 | 8/2023 | Stephens |
| 11,765,230 B2 | 9/2023 | Sulibhavi |
| 11,819,760 B2 | 11/2023 | Hiatt |
| 11,865,457 B2 | 1/2024 | Benedetto |
| 11,883,748 B2 | 1/2024 | Yang |
| 12,029,984 B2 | 7/2024 | Benedetto |
| 2010/0087251 A1 | 4/2010 | Collar |
| 2021/0082044 A1* | 3/2021 | Sliwka ............... H04L 9/3255 |
| 2023/0079127 A1 | 3/2023 | Benedetto |
| 2023/0316320 A1 | 10/2023 | Yamazaki |
| 2023/0318811 A1 | 10/2023 | Claesen |
| 2023/0385967 A1 | 11/2023 | Rosenberg |
| 2023/0419315 A1 | 12/2023 | Togame |
| 2024/0066402 A1 | 2/2024 | Milne |
| 2024/0082710 A1 | 3/2024 | Hiatt |
| 2024/0091652 A1 | 3/2024 | Benedetto |
| 2024/0123354 A1 | 4/2024 | Benedetto |
| 2024/0202707 A1 | 6/2024 | Sachson |
| 2024/0238679 A1 | 7/2024 | Green |

FOREIGN PATENT DOCUMENTS

| | | | |
|---|---|---|---|
| EP | 4405878 | 7/2024 | |
| WO | WO-2021062160 A1 * | 4/2021 | ......... G06F 16/2365 |
| WO | WO-2022204404 A1 * | 9/2022 | ............ G06F 21/10 |
| WO | WO2022224585 | 10/2022 | |
| WO | WO2022269989 | 12/2022 | |
| WO | WO2022269998 | 12/2022 | |
| WO | WO2023015202 | 2/2023 | |
| WO | WO2023076015 | 5/2023 | |
| WO | WO2023105326 | 6/2023 | |
| WO | WO2023015090 | 9/2023 | |
| WO | WO2023176421 | 9/2023 | |
| WO | WO2023181896 | 9/2023 | |
| WO | WO2023187486 | 10/2023 | |
| WO | WO2023217678 | 11/2023 | |
| WO | WO2023225437 | 11/2023 | |
| WO | WO2023248034 | 12/2023 | |
| WO | WO2024015704 | 1/2024 | |
| WO | WO2024029368 | 2/2024 | |
| WO | WO2024039447 | 2/2024 | |
| WO | WO2024042411 | 2/2024 | |
| WO | WO2024042415 | 2/2024 | |
| WO | WO2024053431 | 3/2024 | |
| WO | WO2024069310 | 4/2024 | |
| WO | WO2024080135 | 4/2024 | |
| WO | WO2024081704 | 4/2024 | |
| WO | WO2024084943 | 4/2024 | |
| WO | WO2024122243 | 6/2024 | |
| WO | WO2024123549 | 6/2024 | |
| WO | WO2024128045 | 6/2024 | |
| WO | WO2024134554 | 6/2024 | |
| WO | WO2024150698 | 7/2024 | |
| WO | WO2024155466 | 7/2024 | |

* cited by examiner

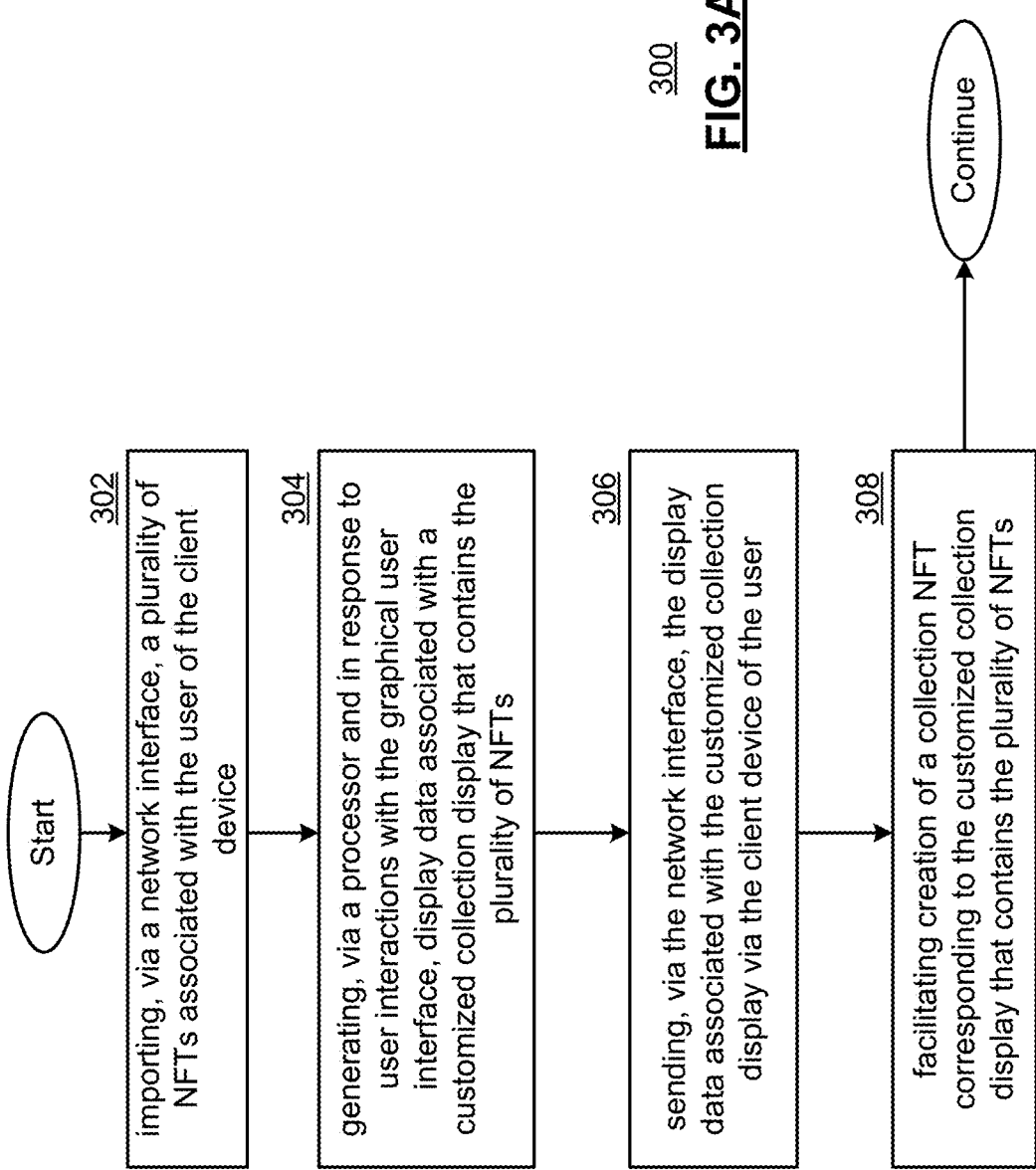

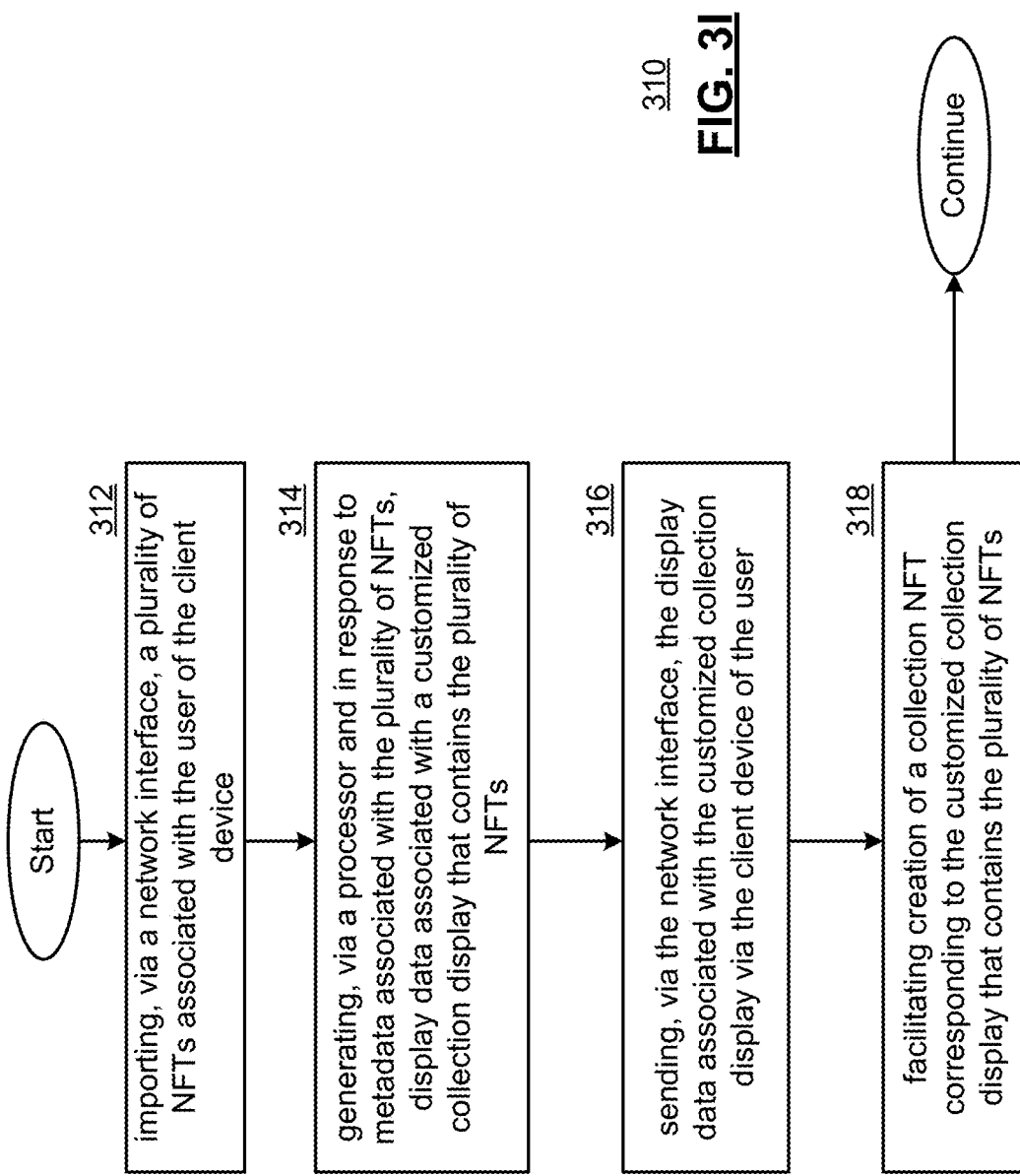

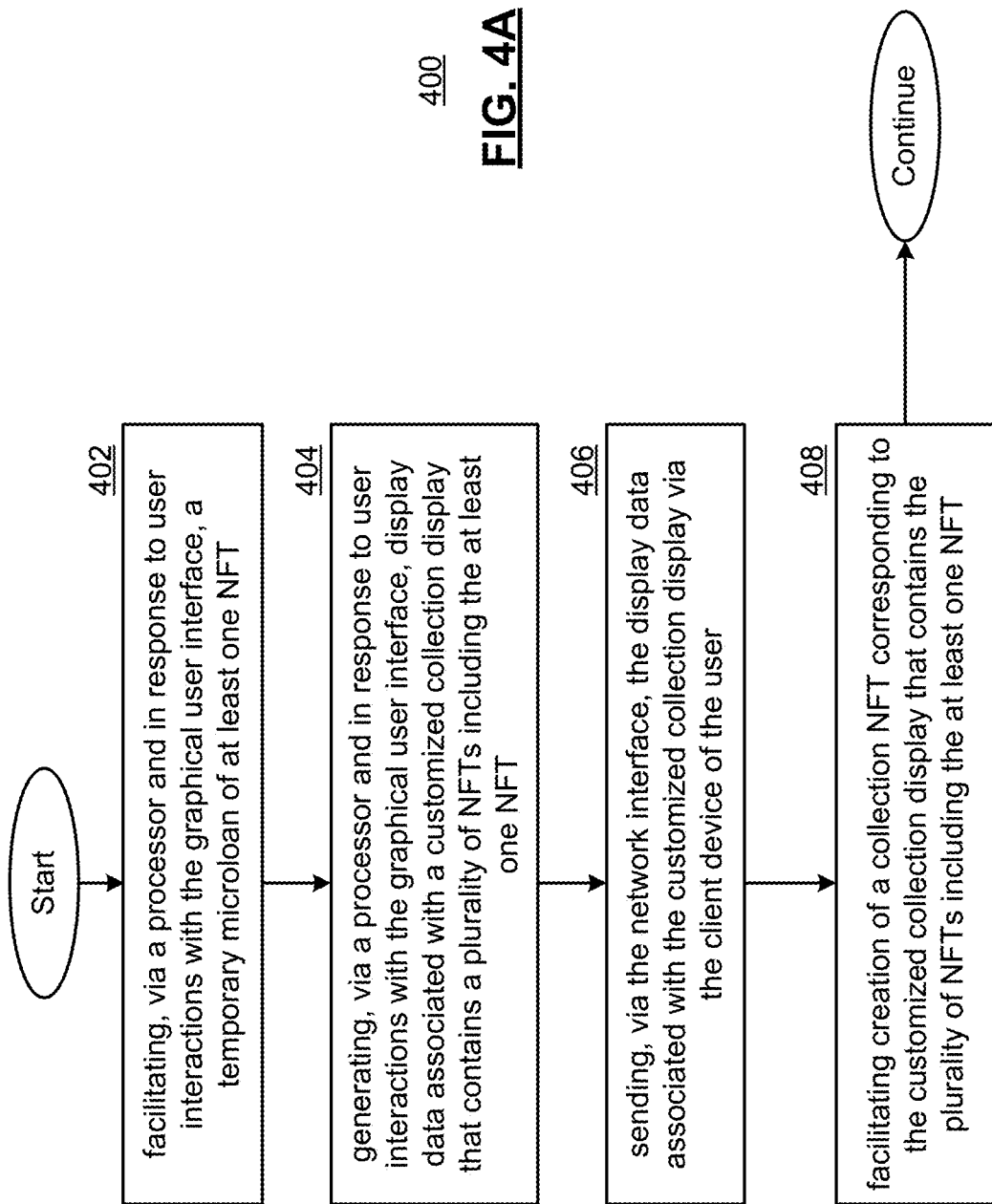

1300

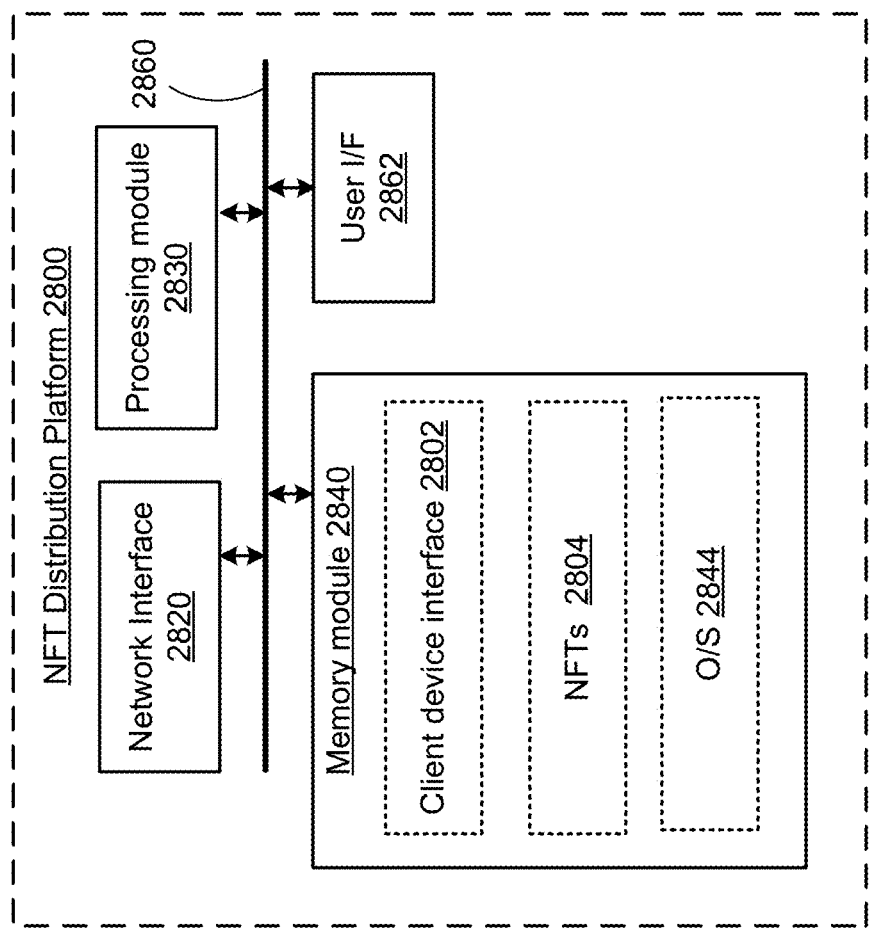
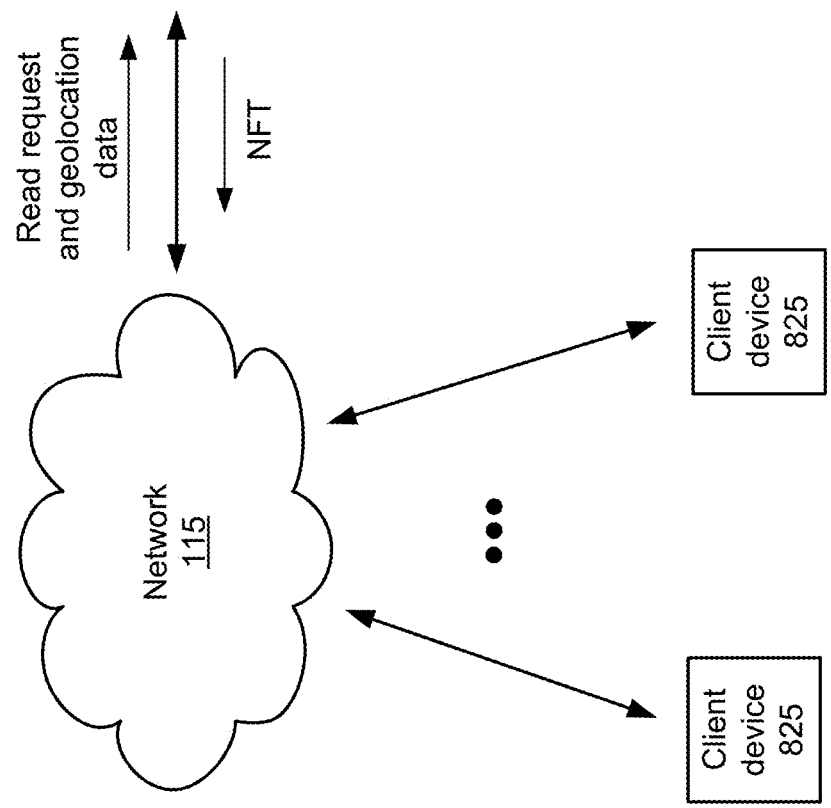
FIG. 7

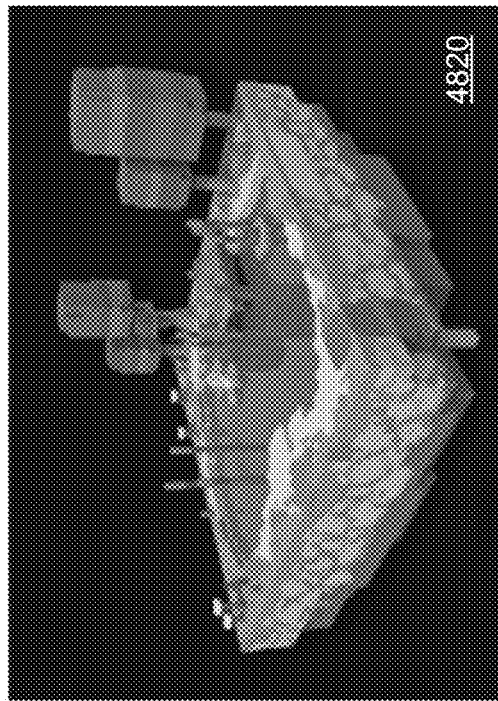
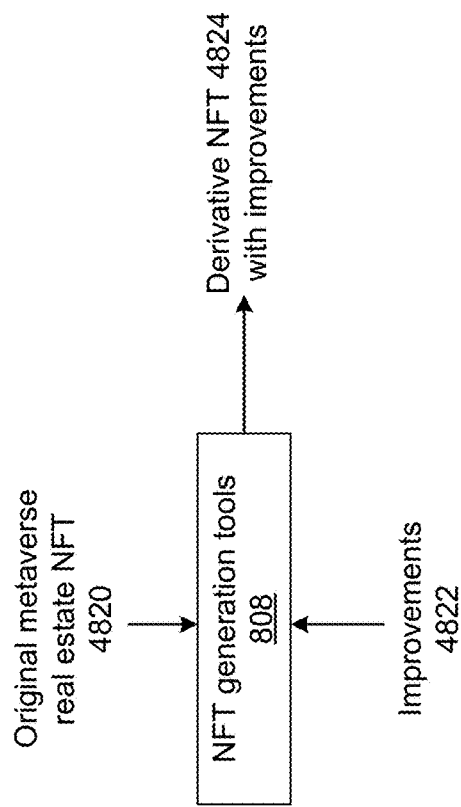
FIG. 9A
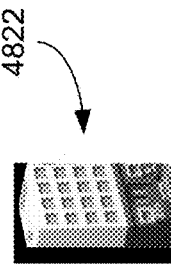
FIG. 9B
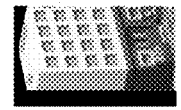
FIG. 9C
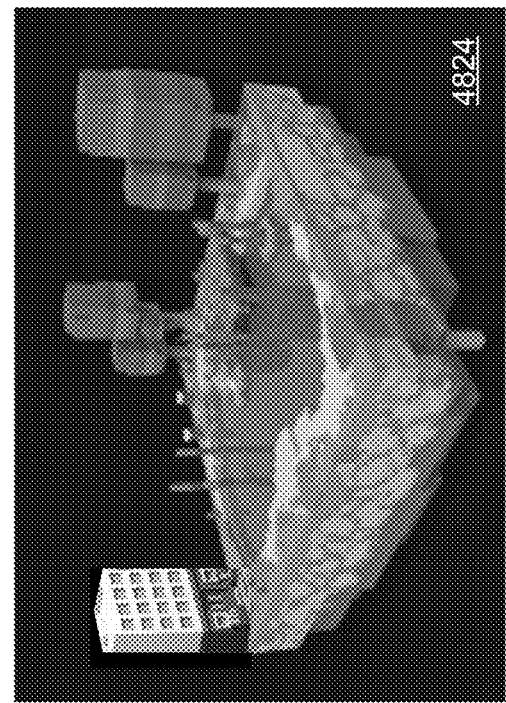
FIG. 9D

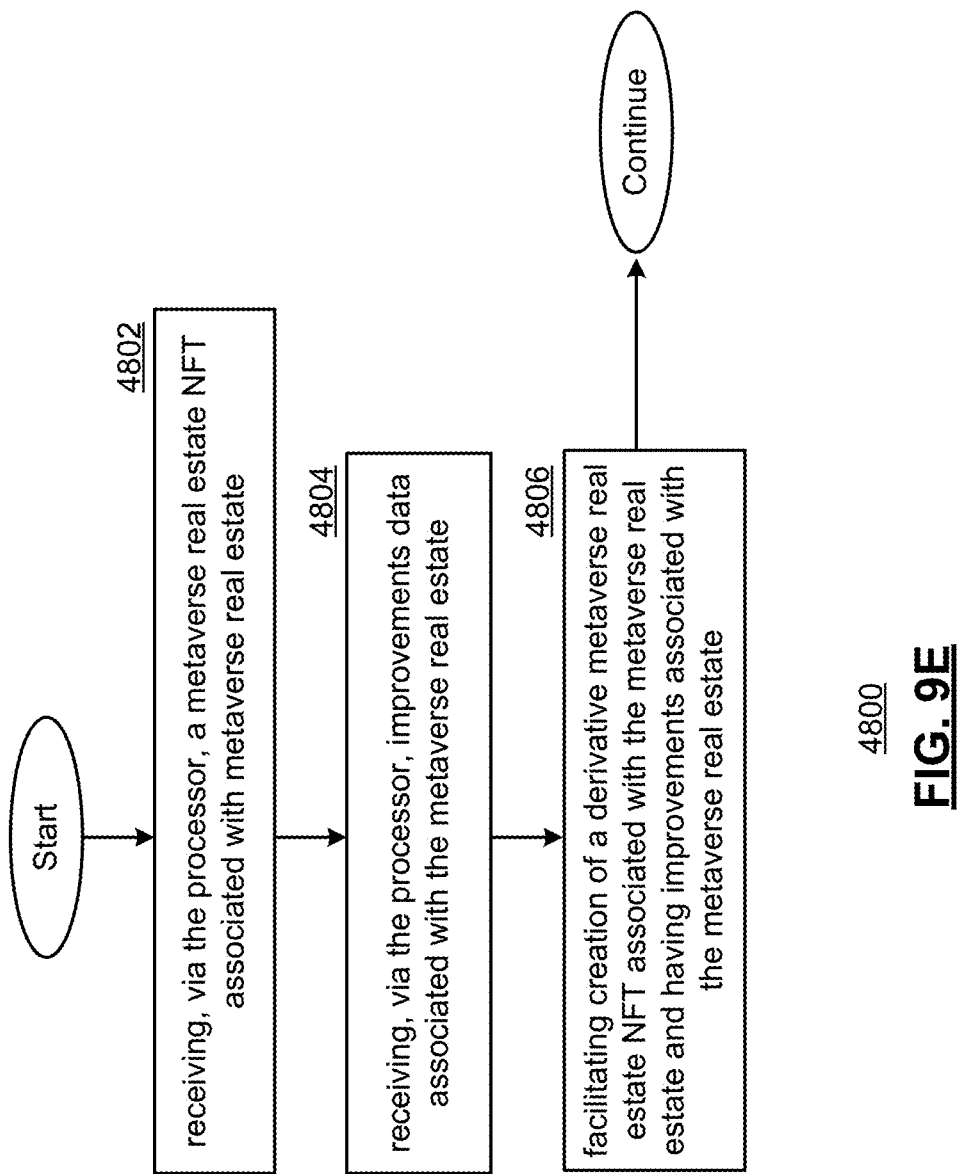

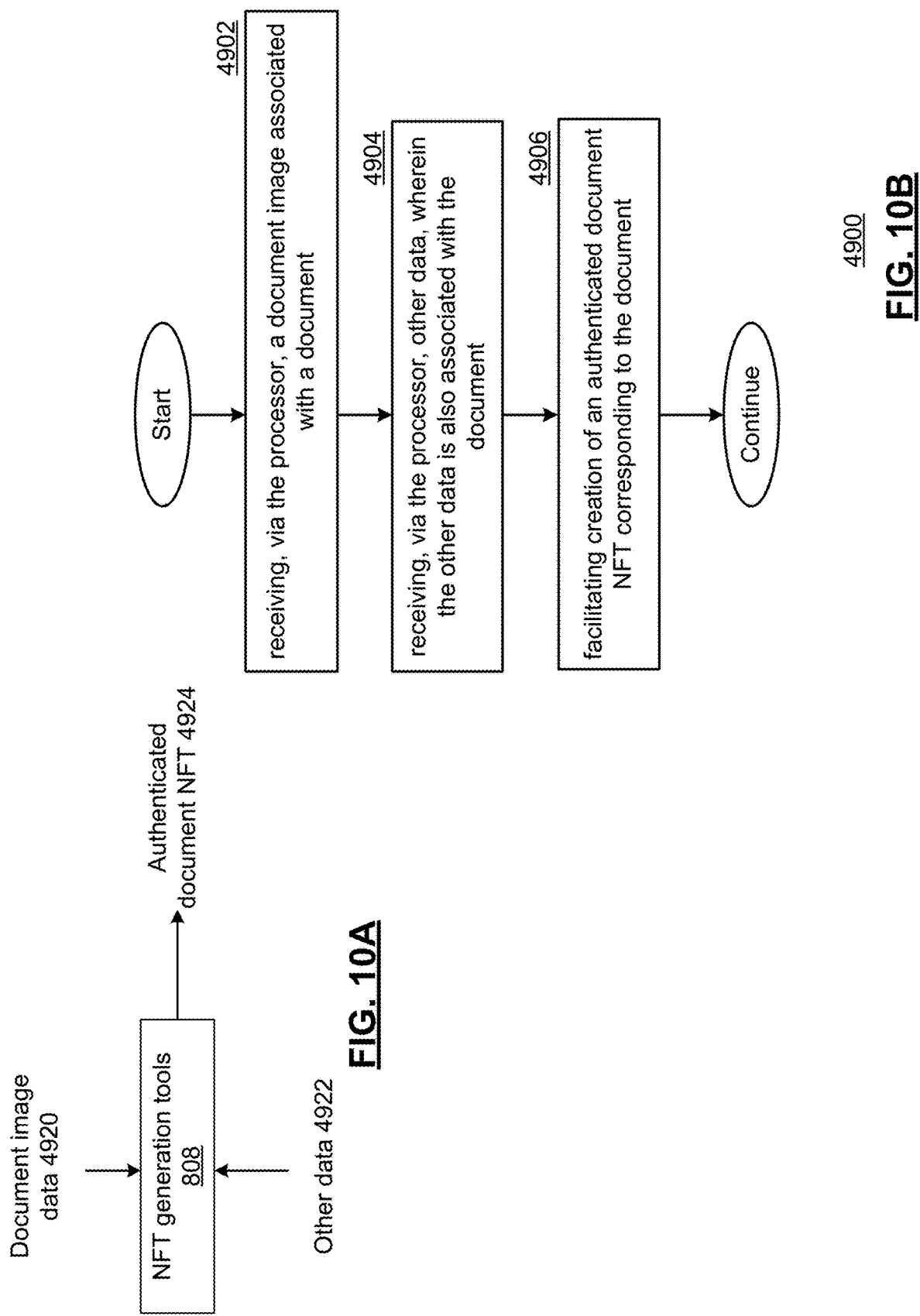

FIG. 11B
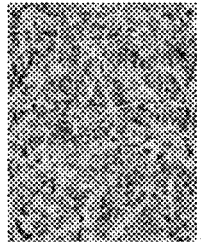
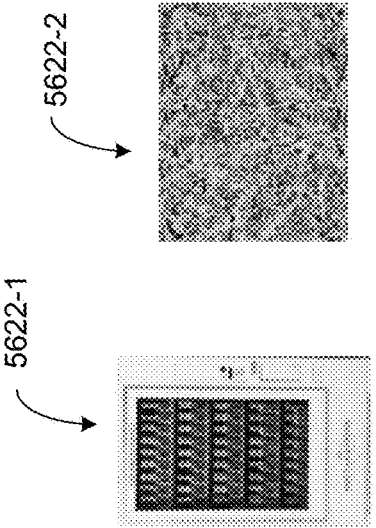
FIG. 11C
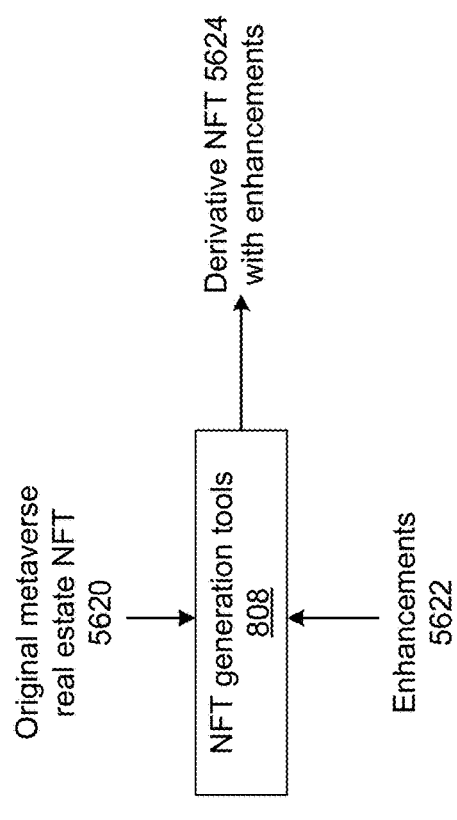
FIG. 11A
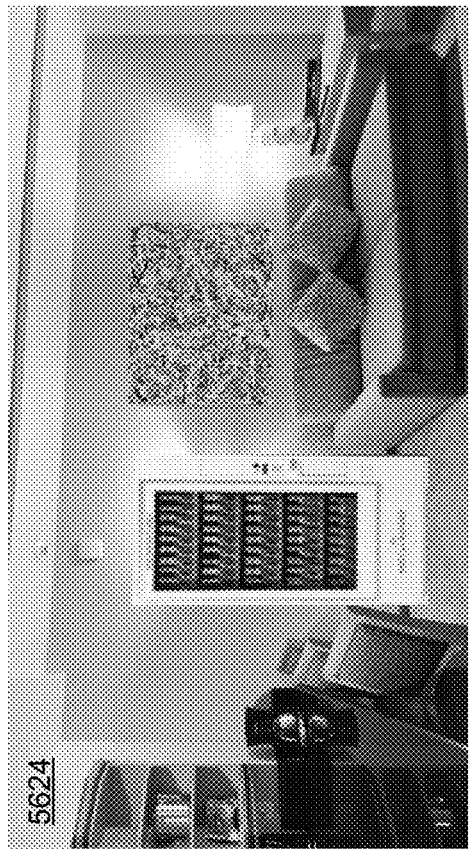
FIG. 11D

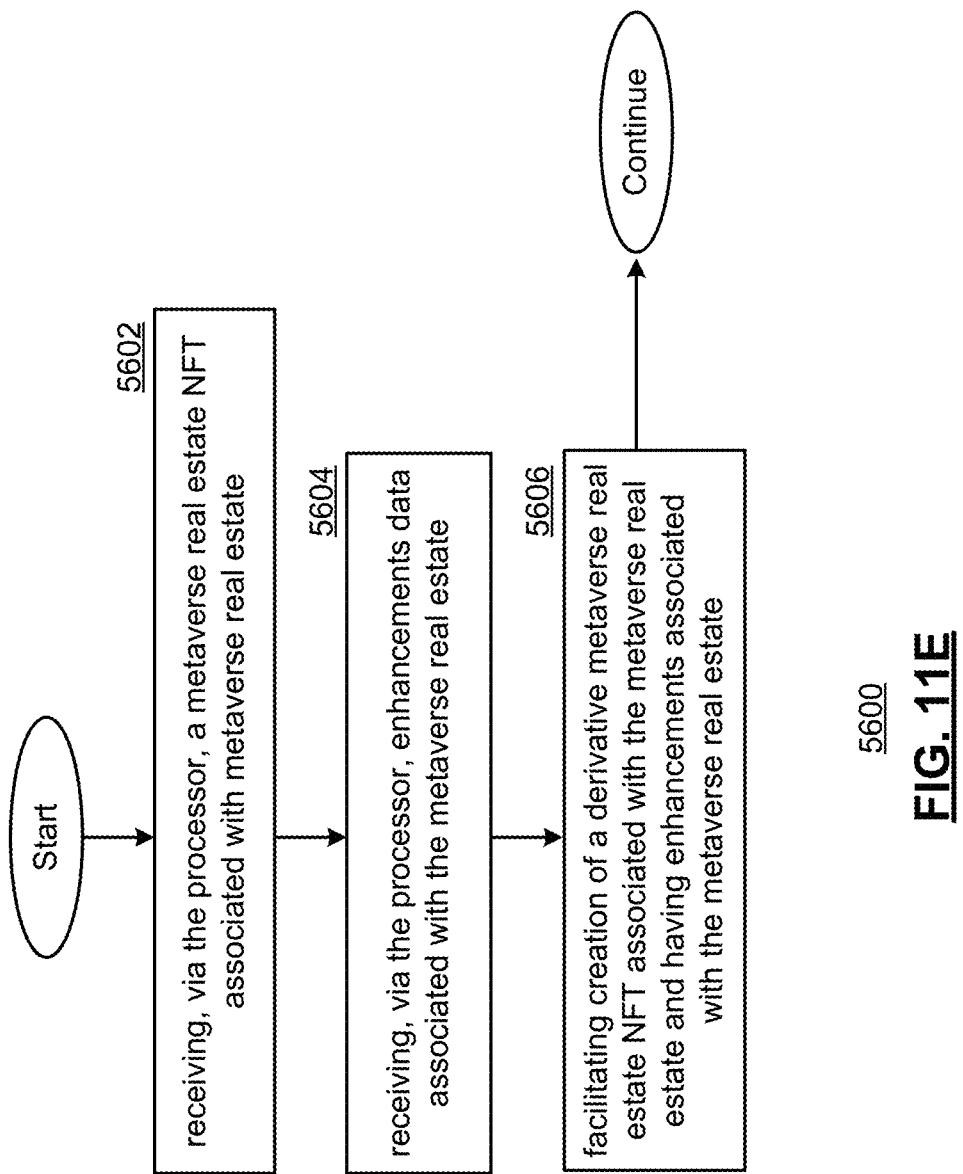

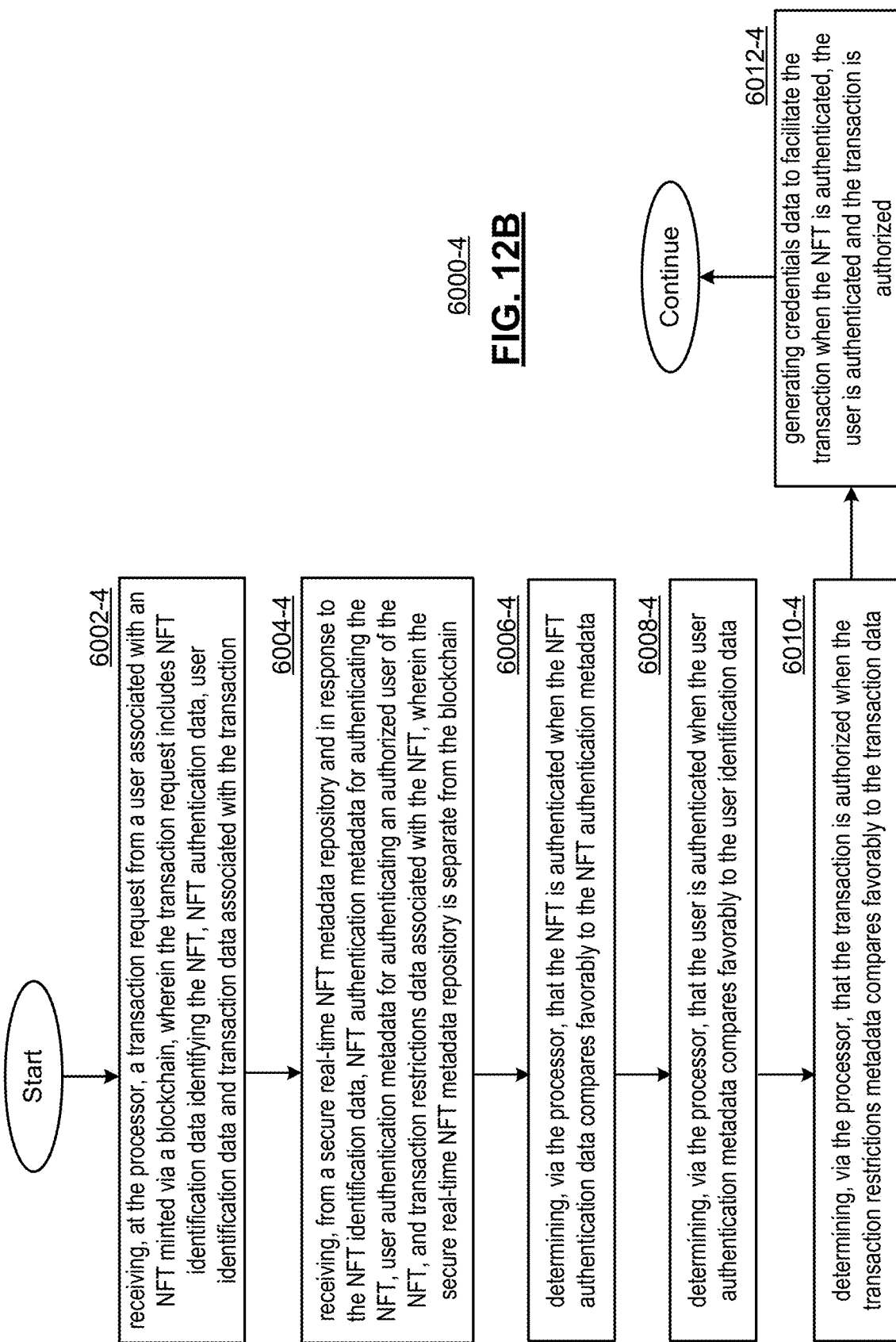

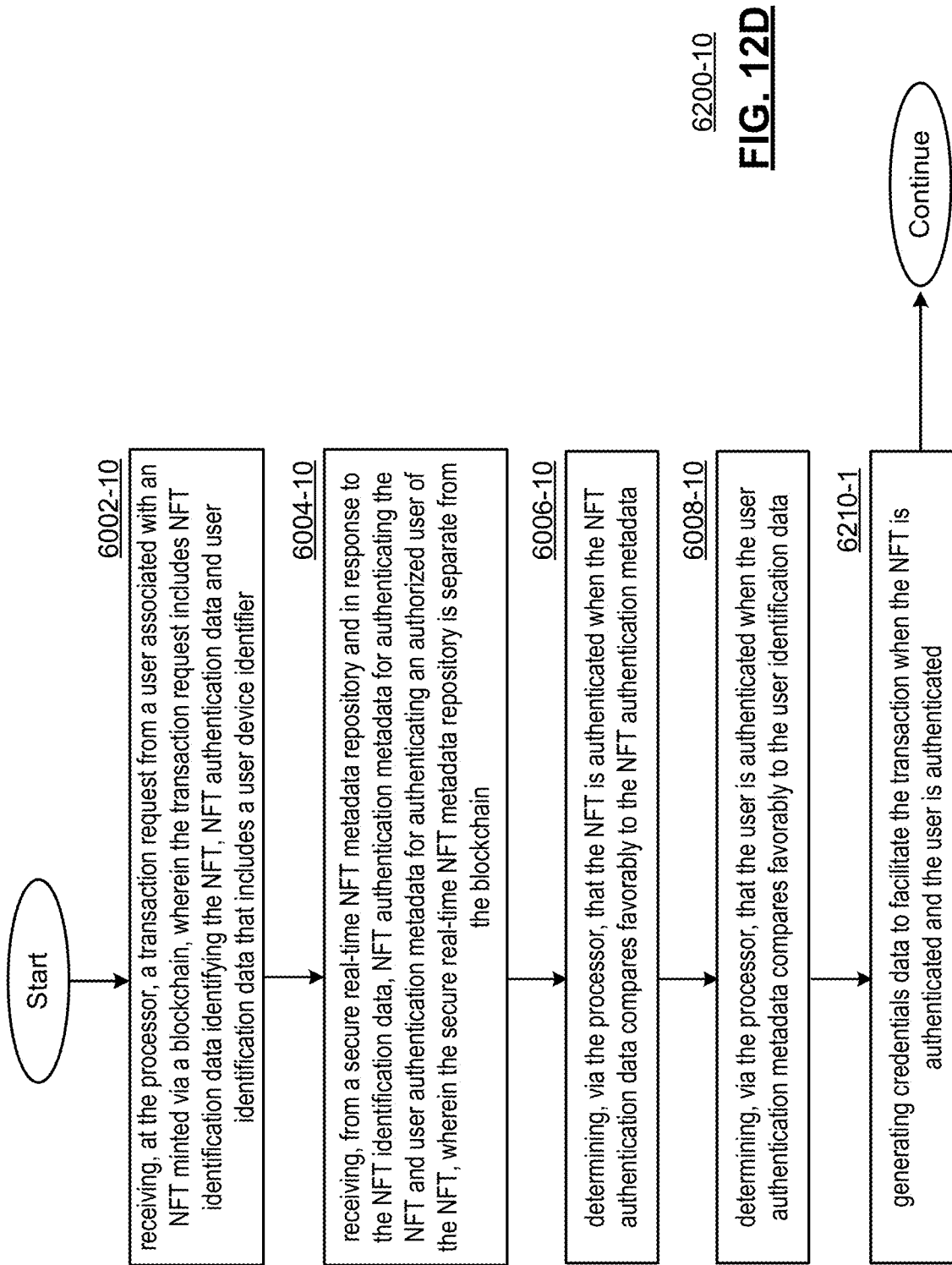

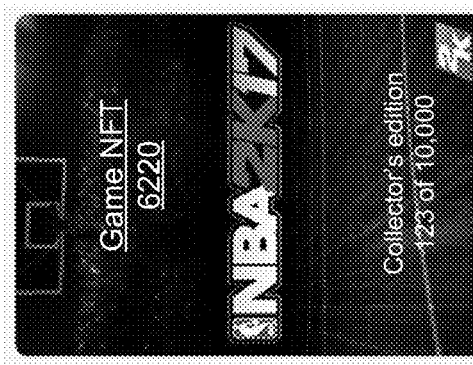
FIG. 13G
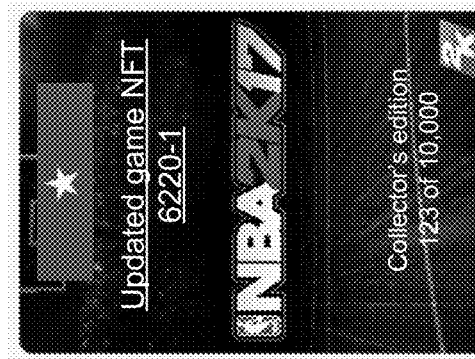
FIG. 13F
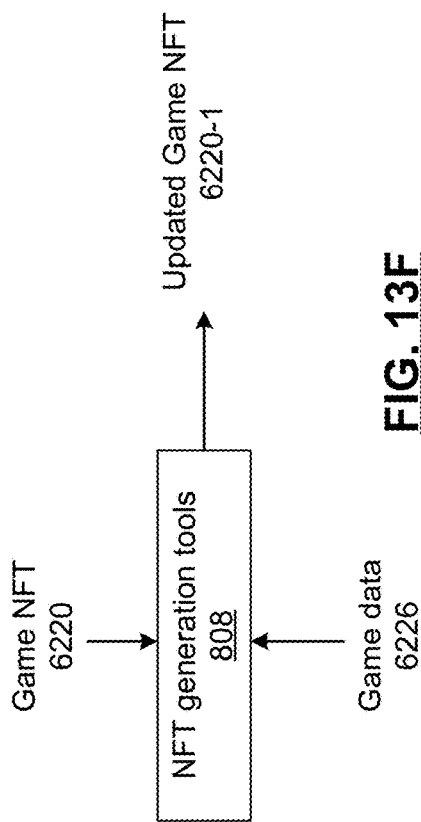
FIG. 13H
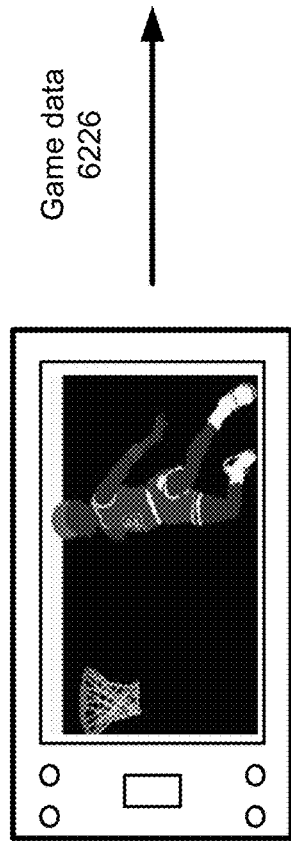

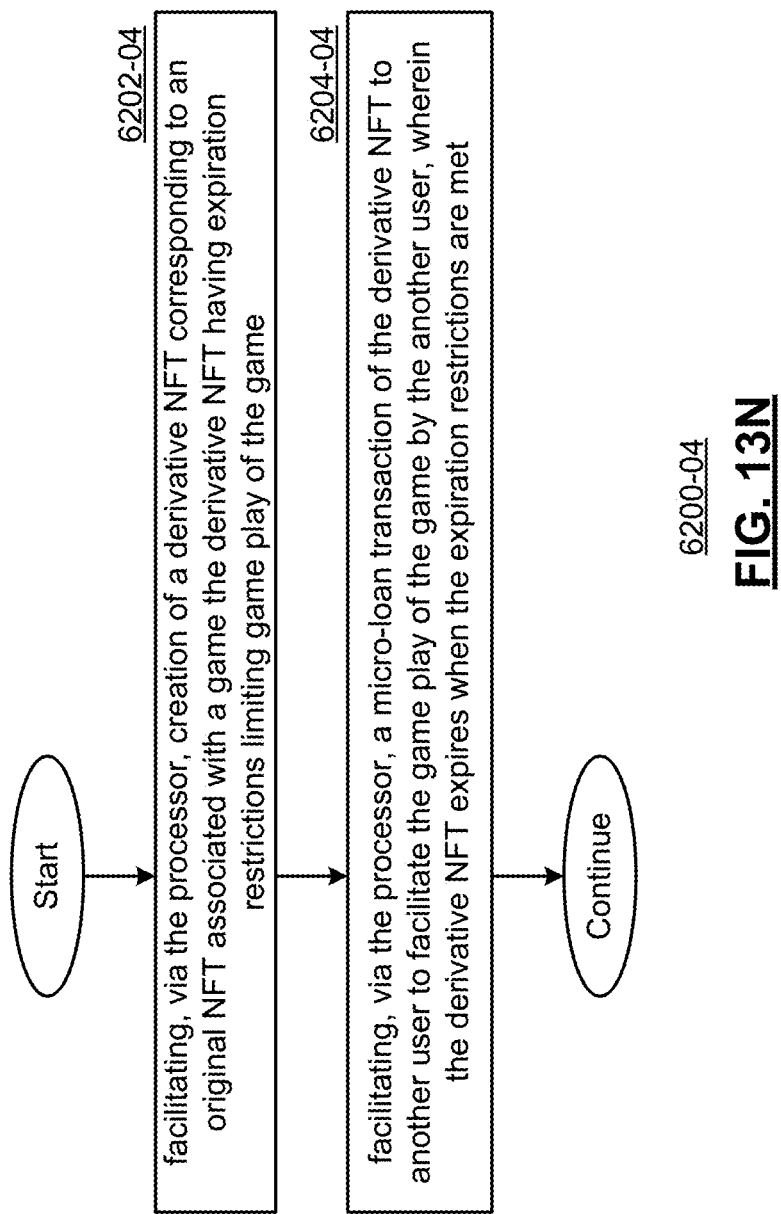

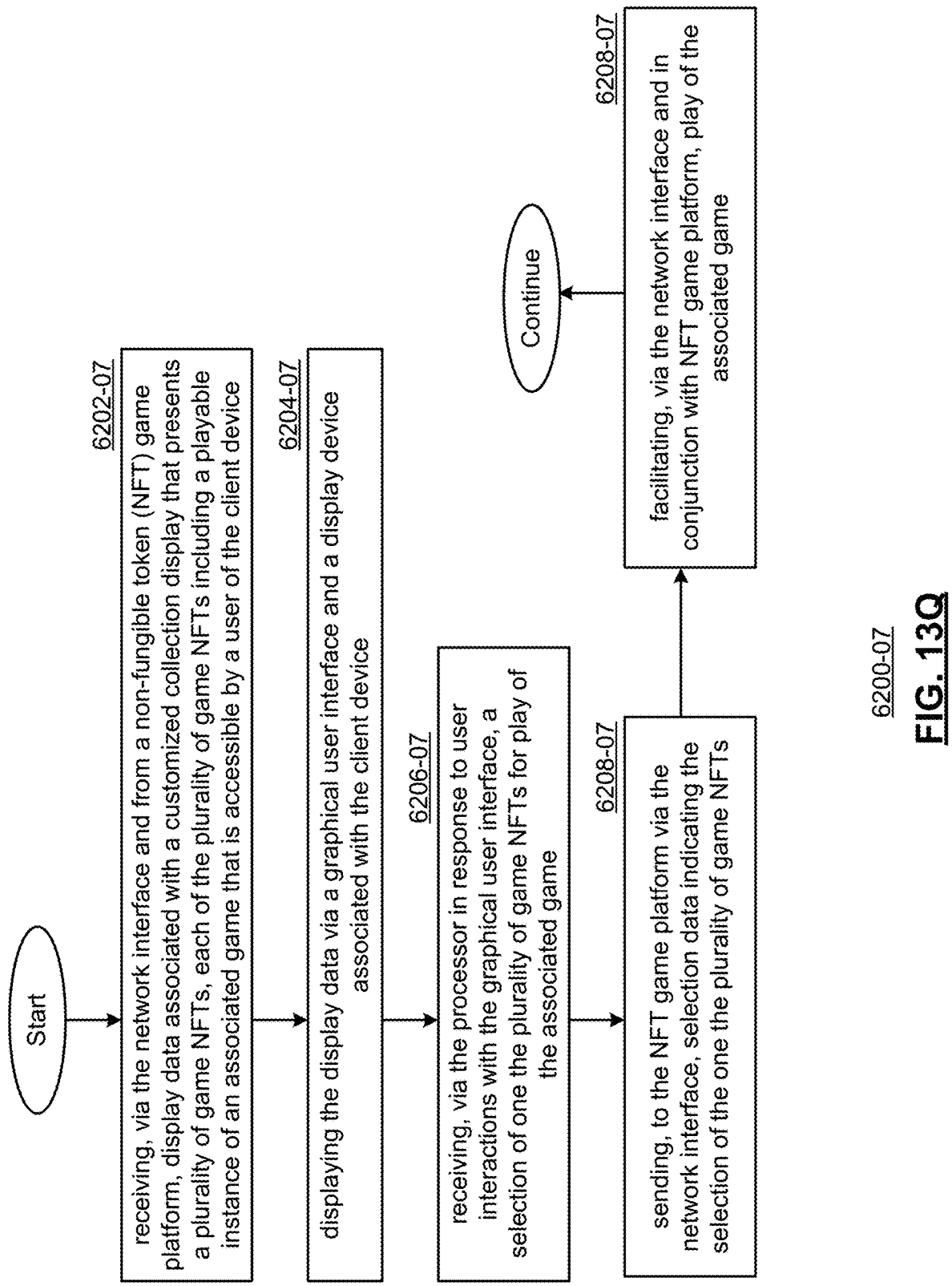

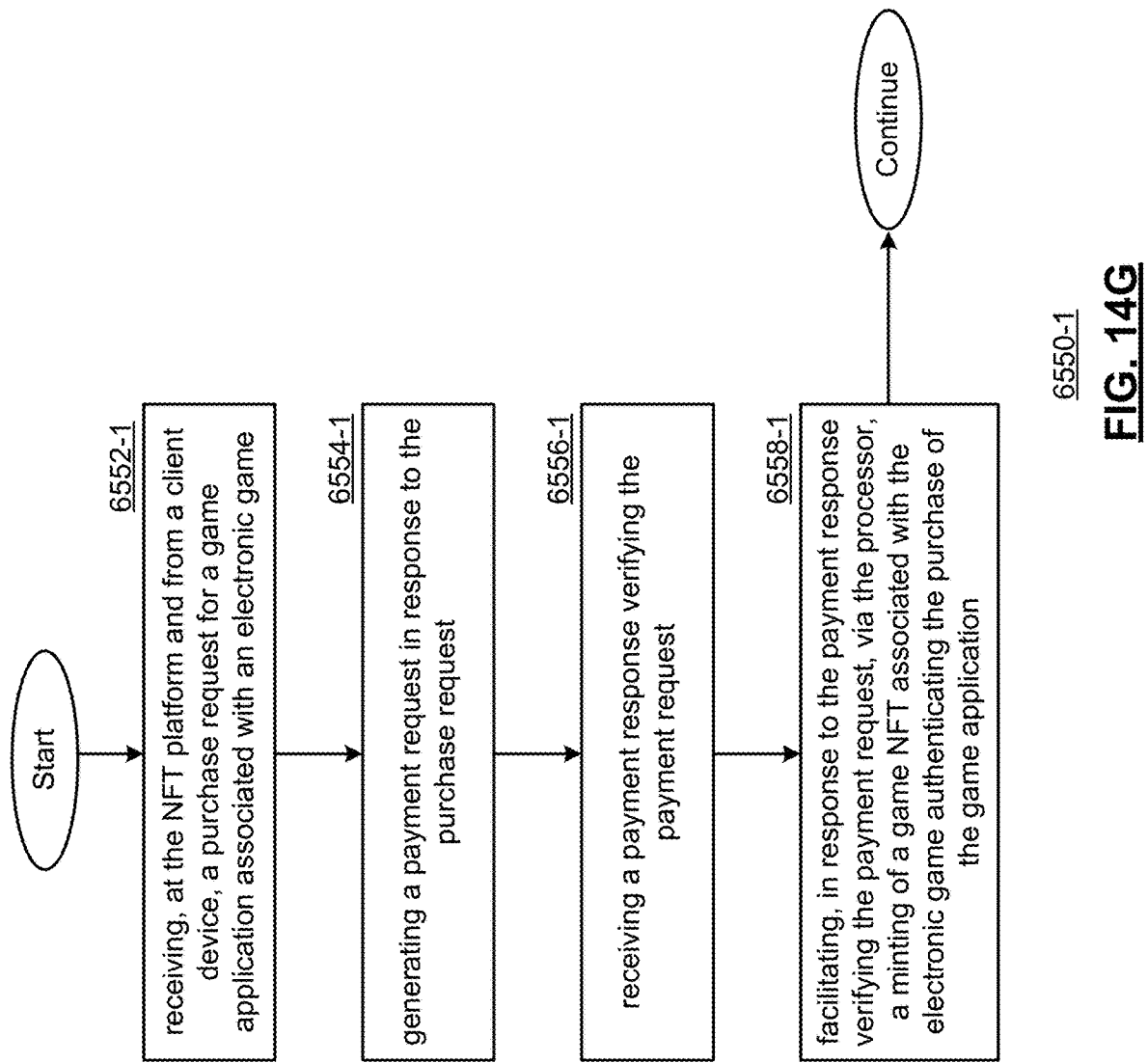

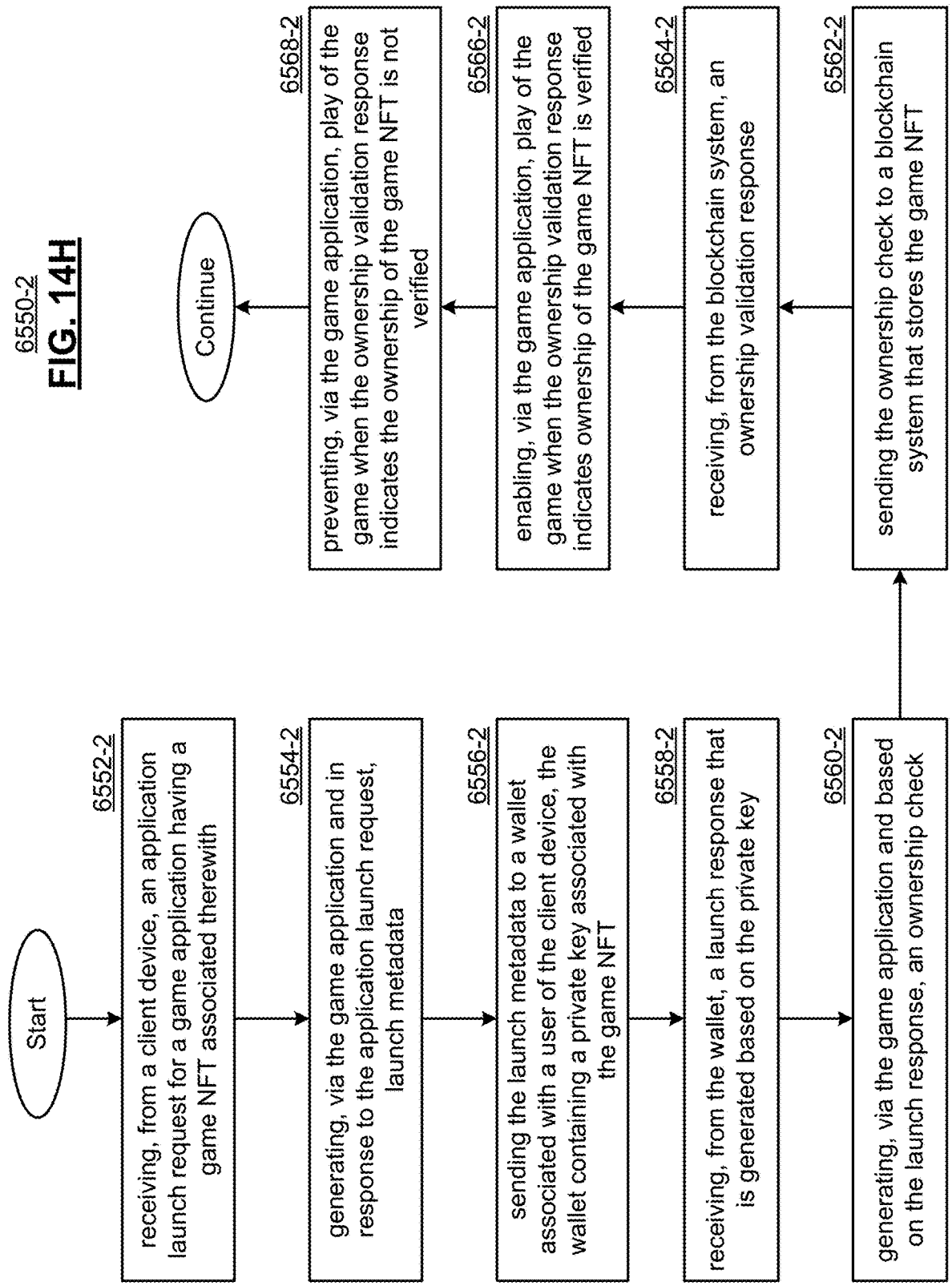

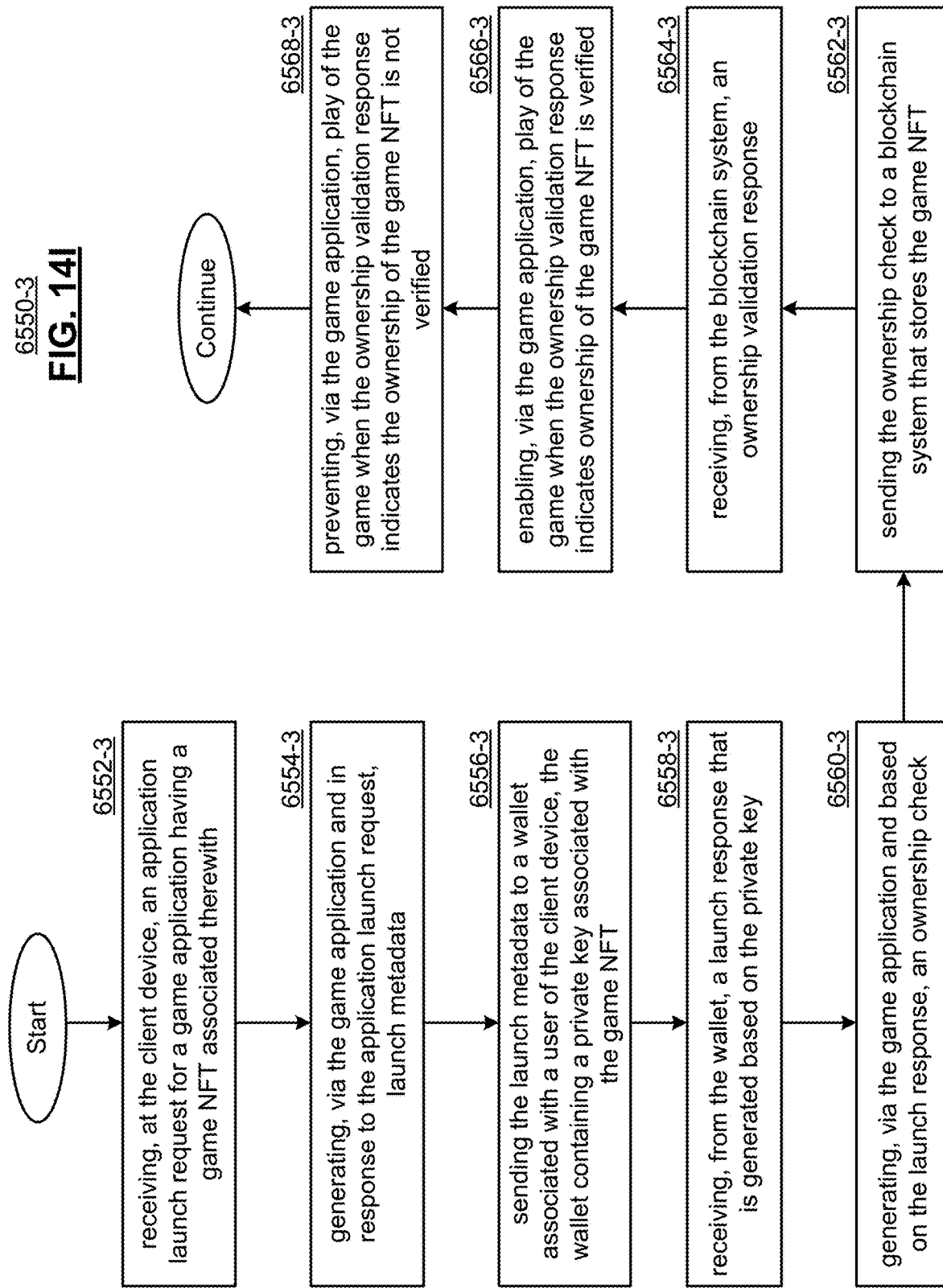

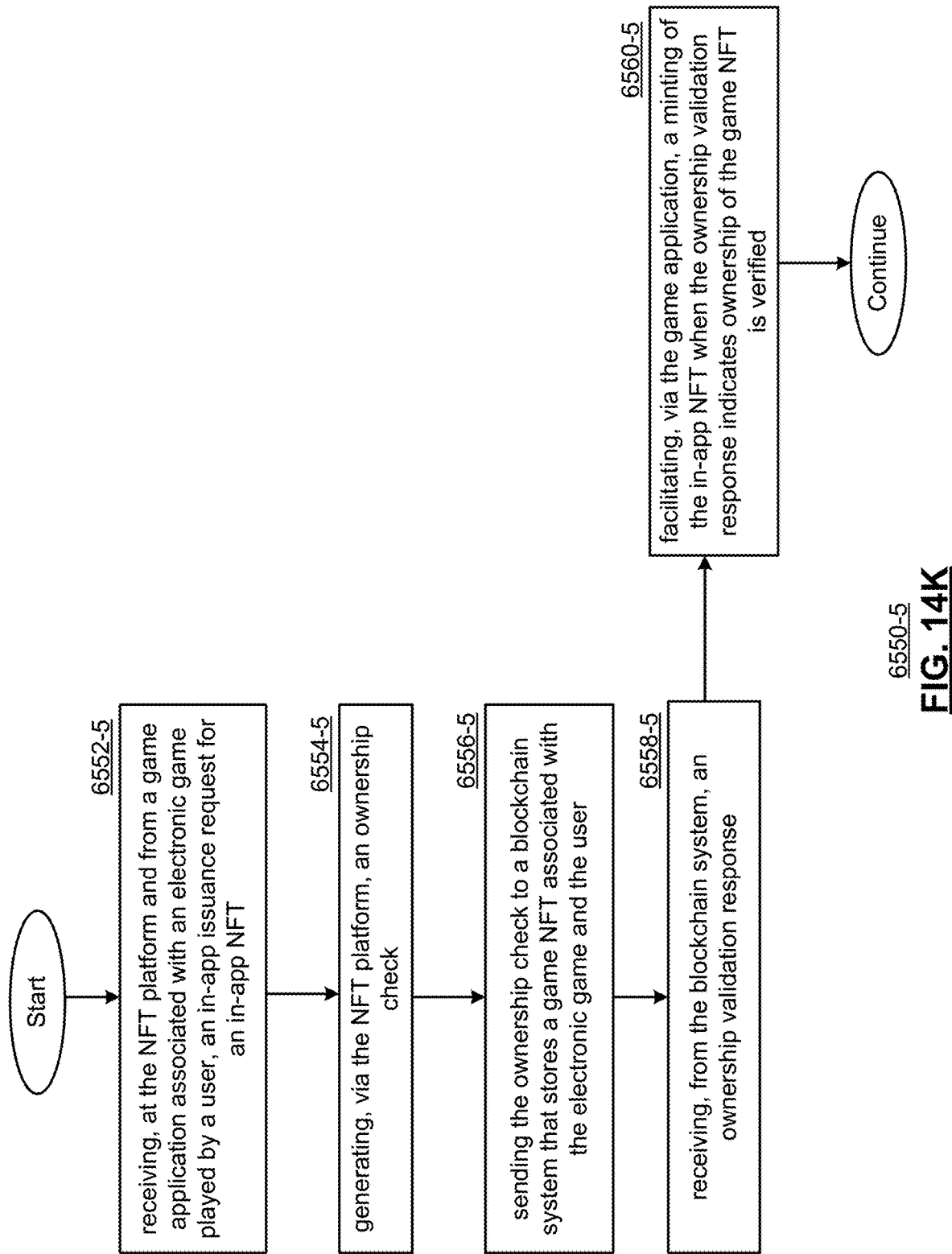

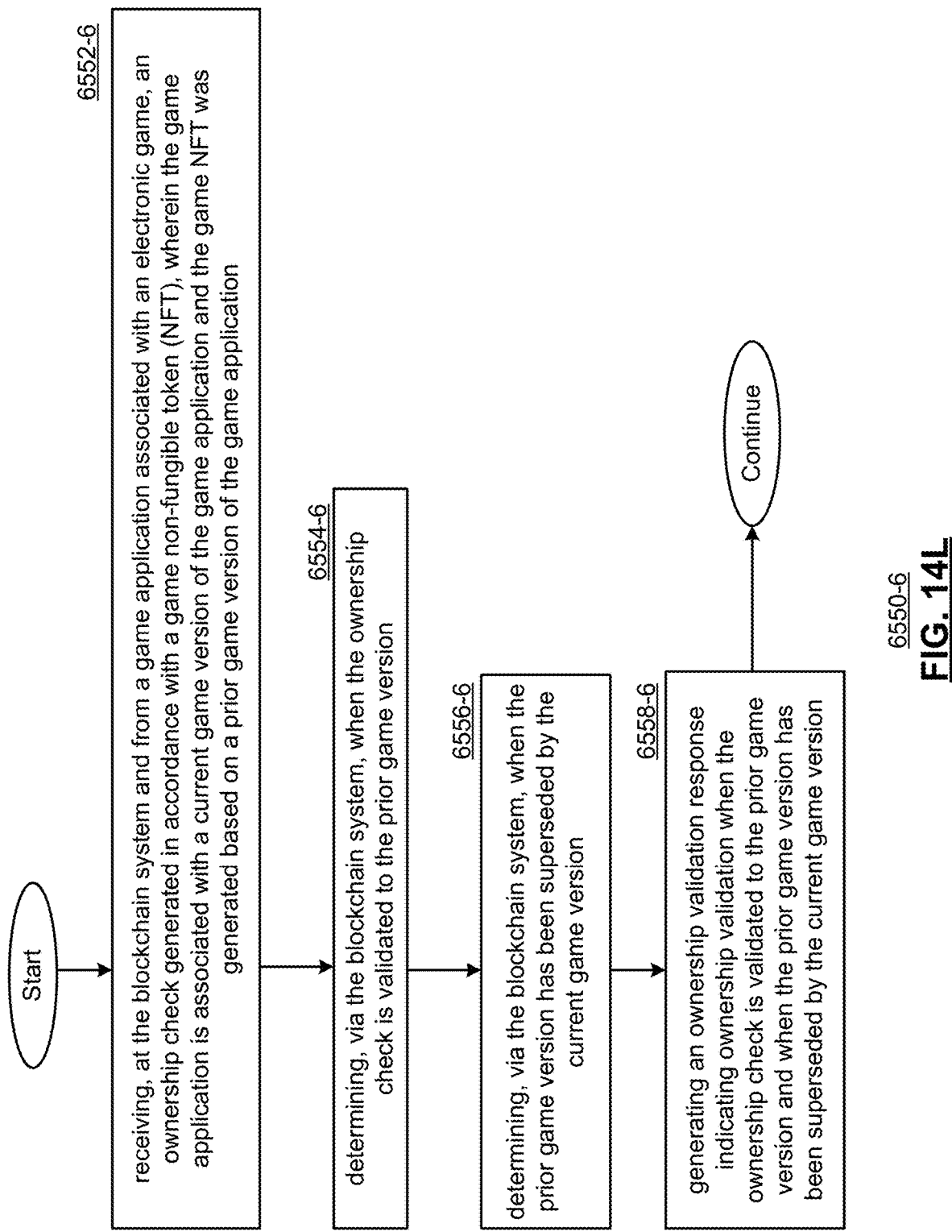

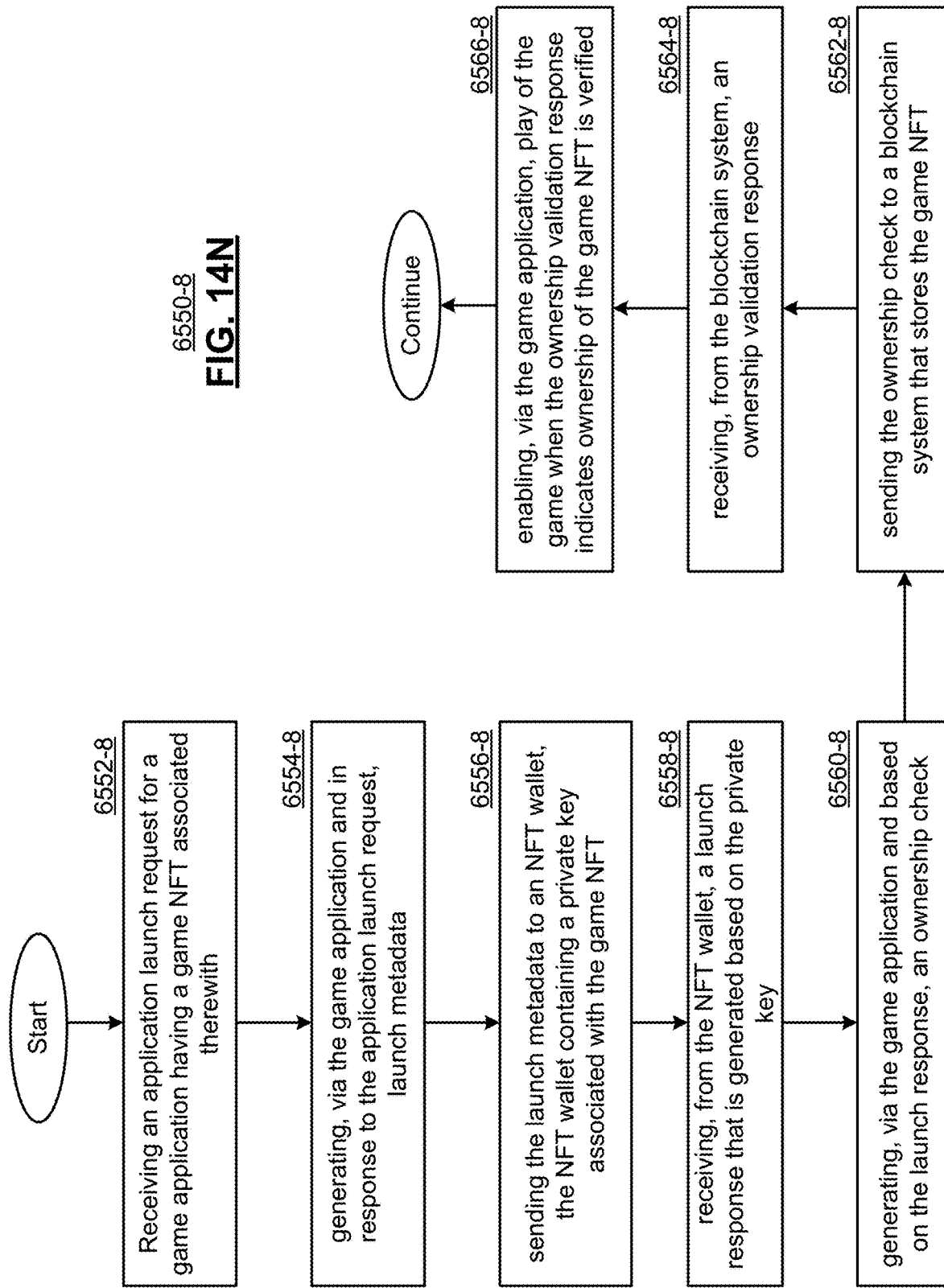

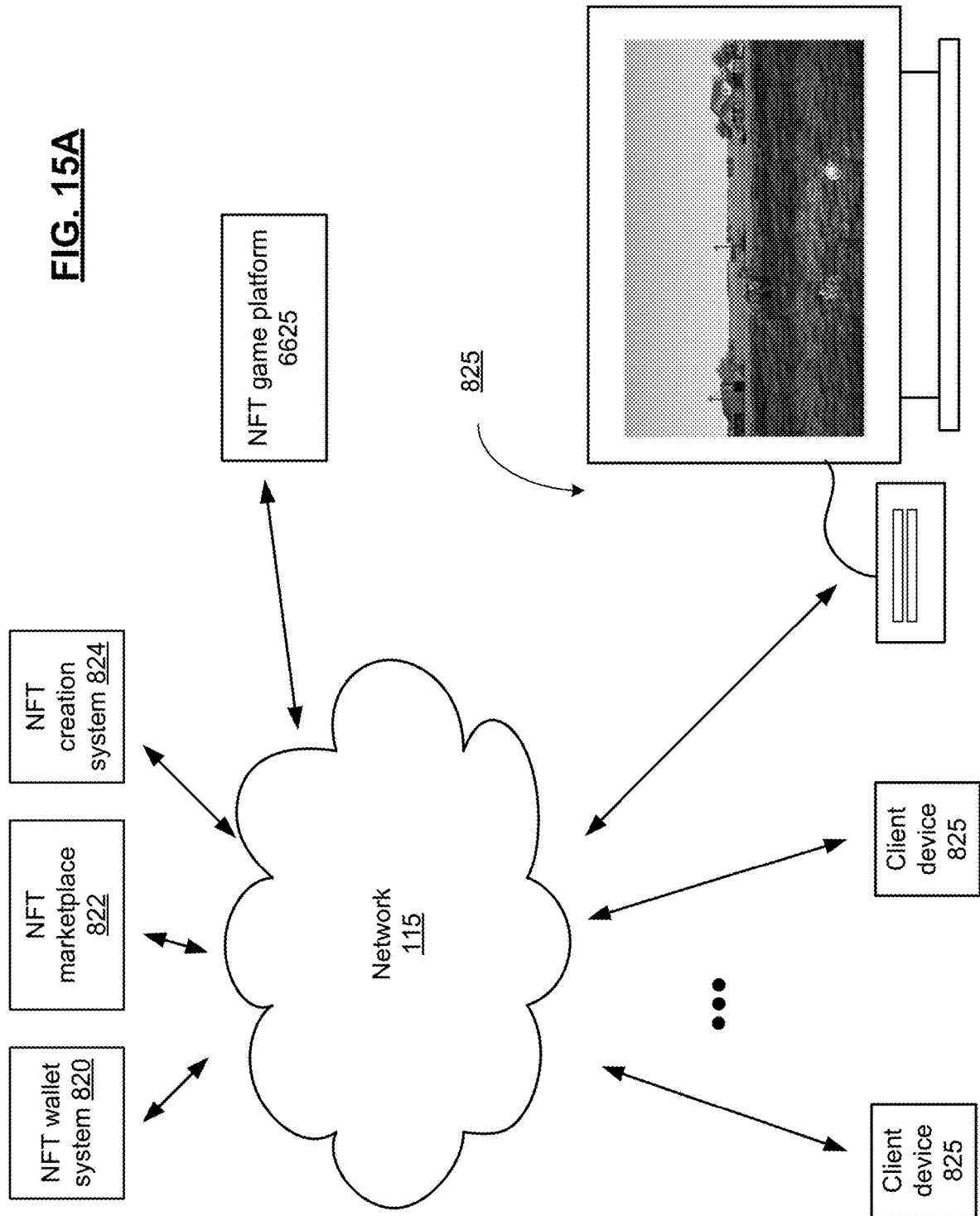

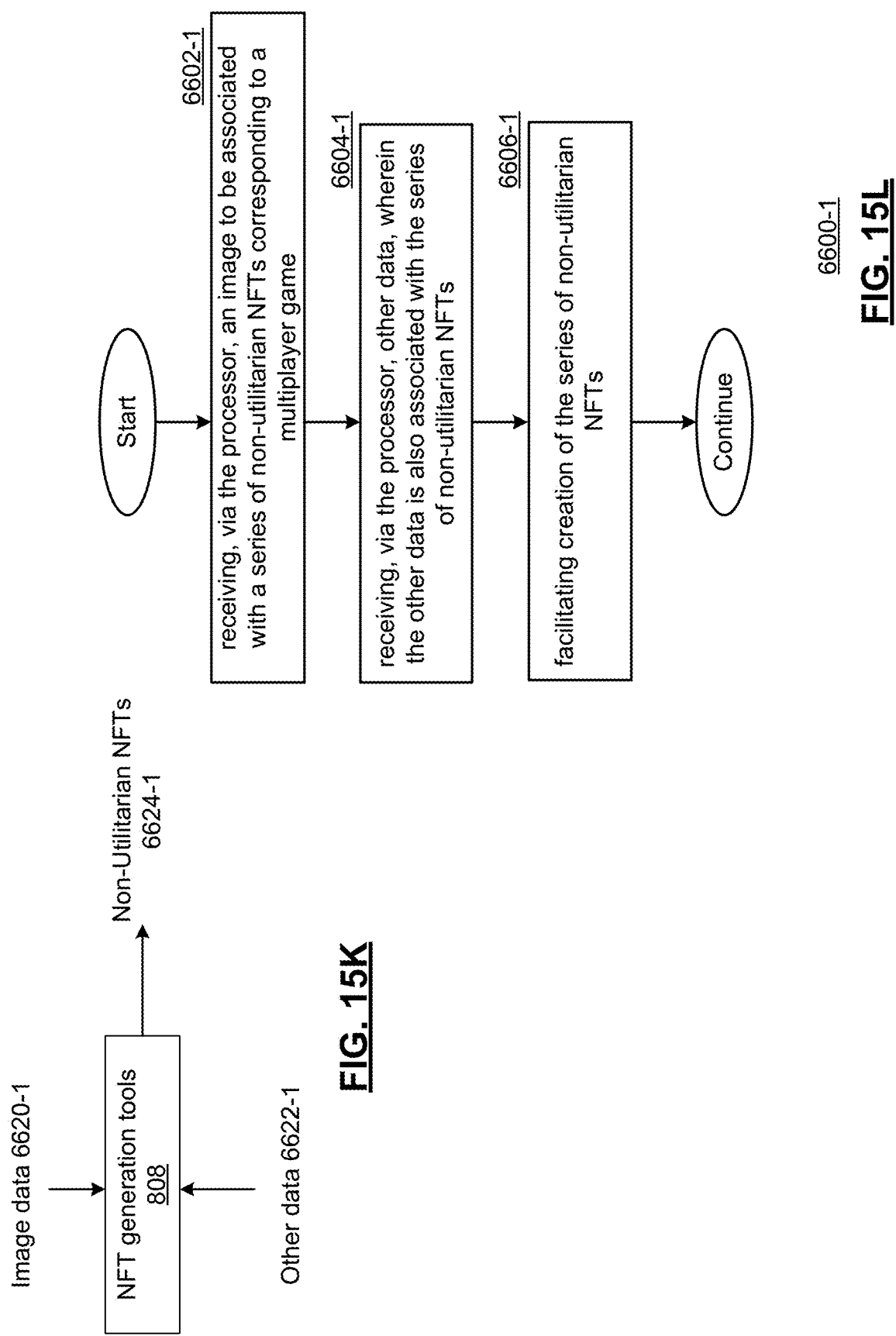

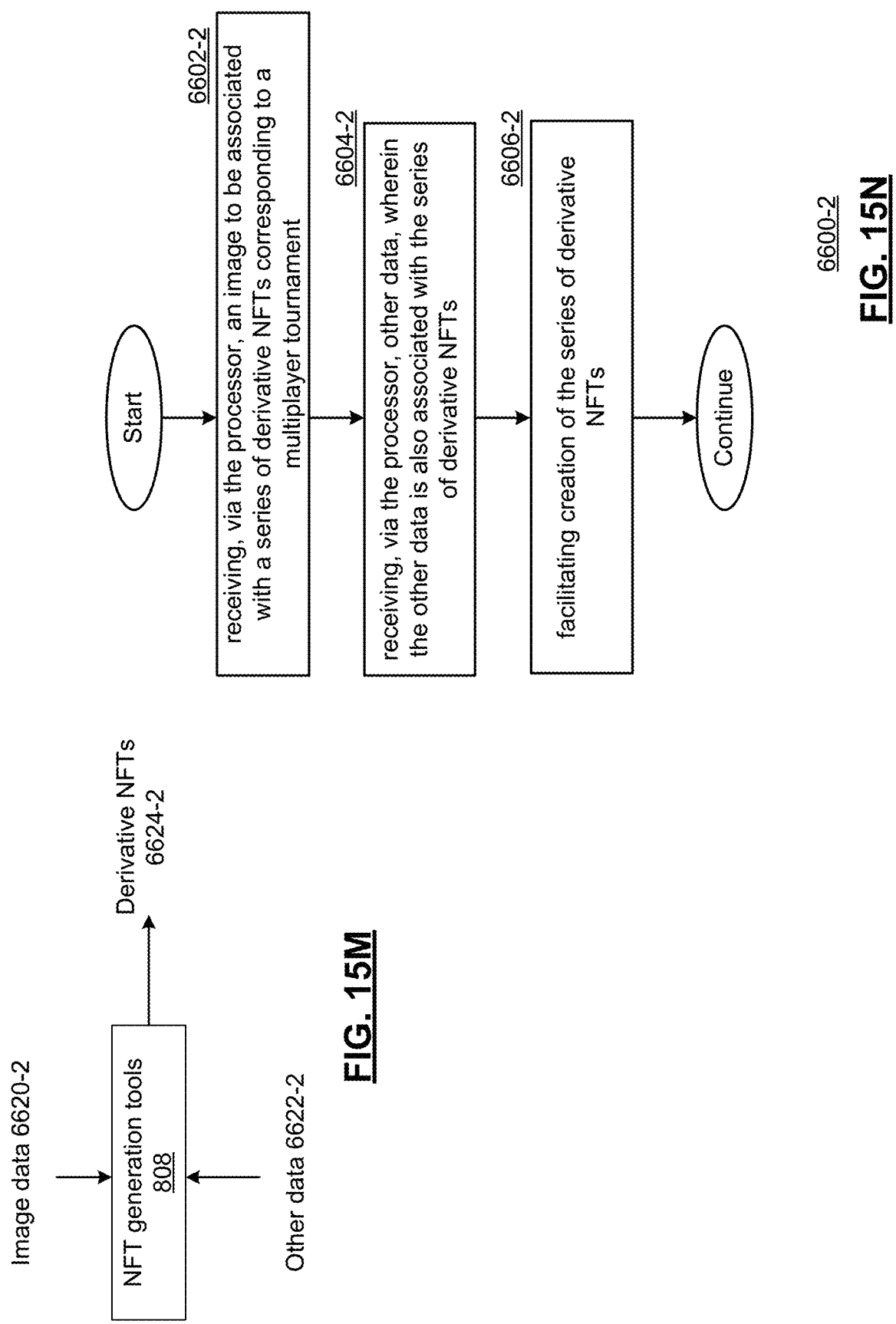

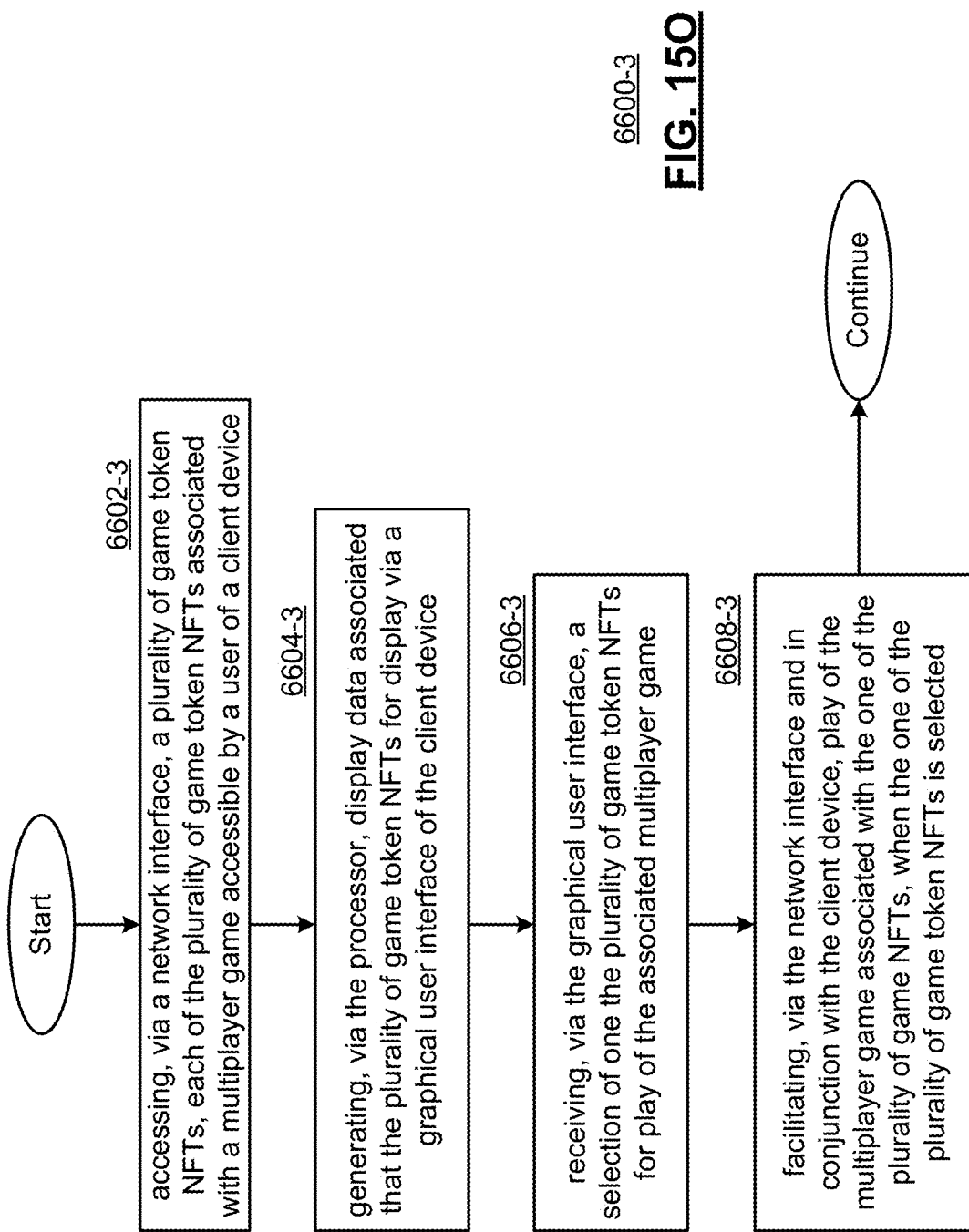

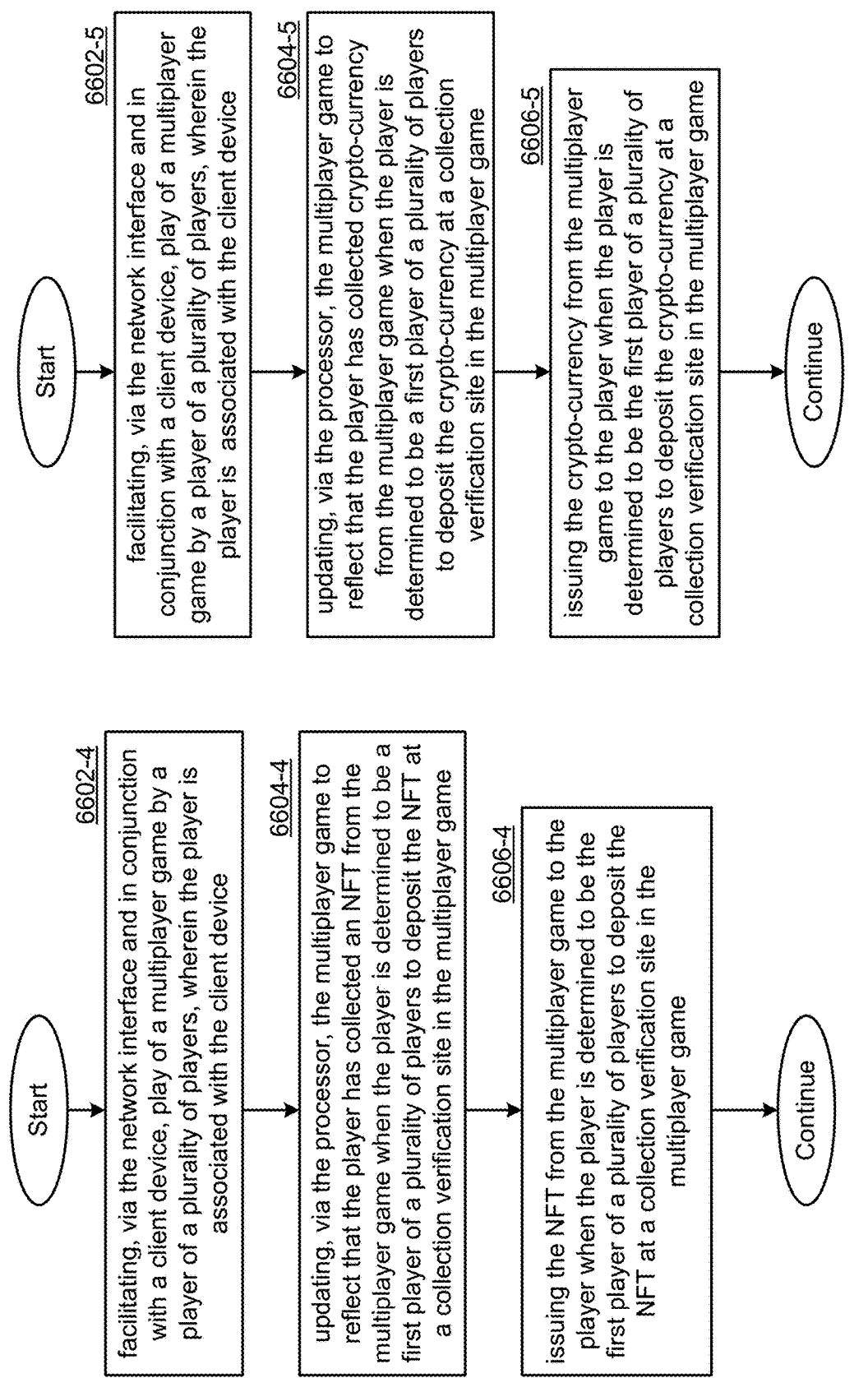

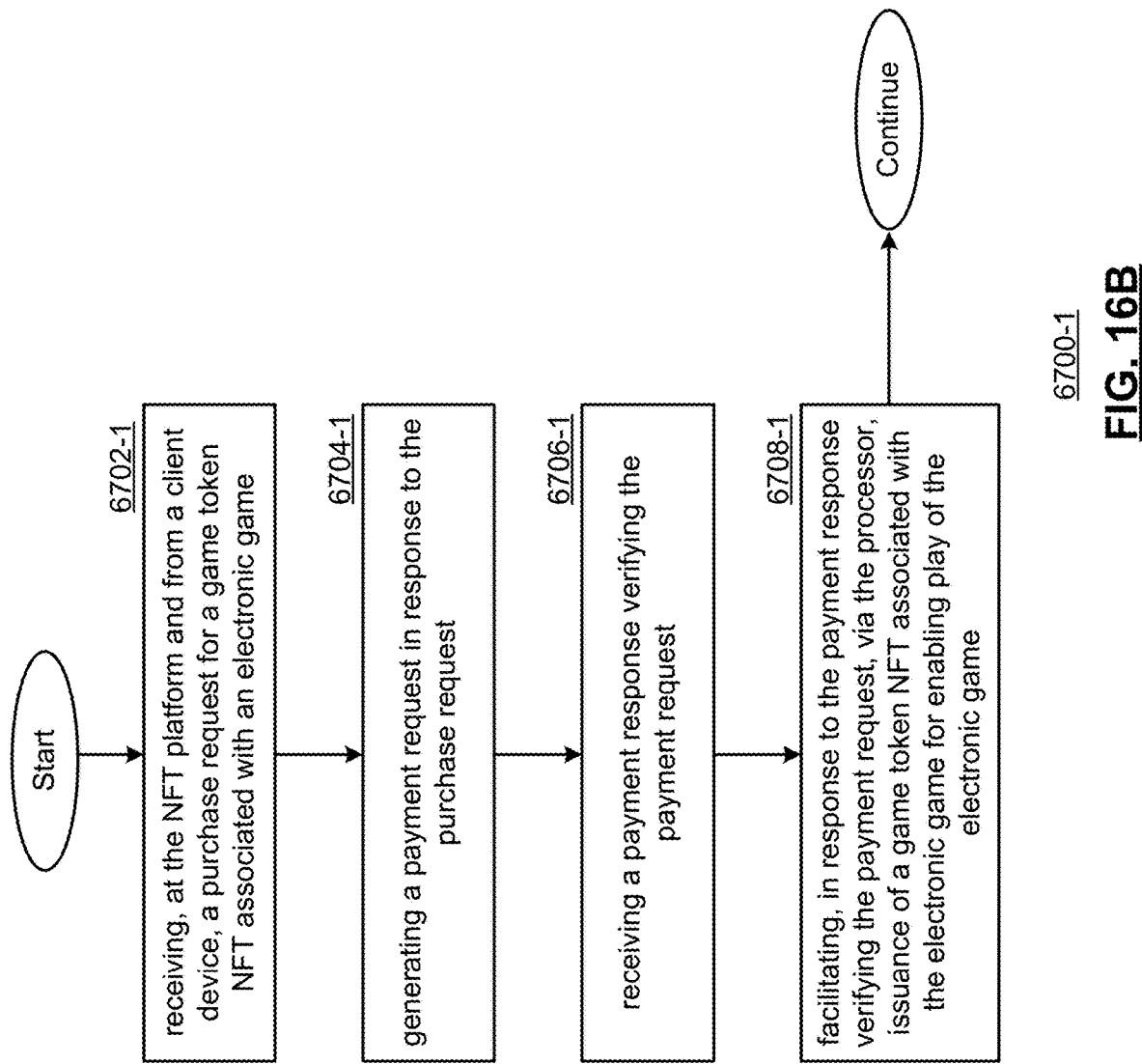

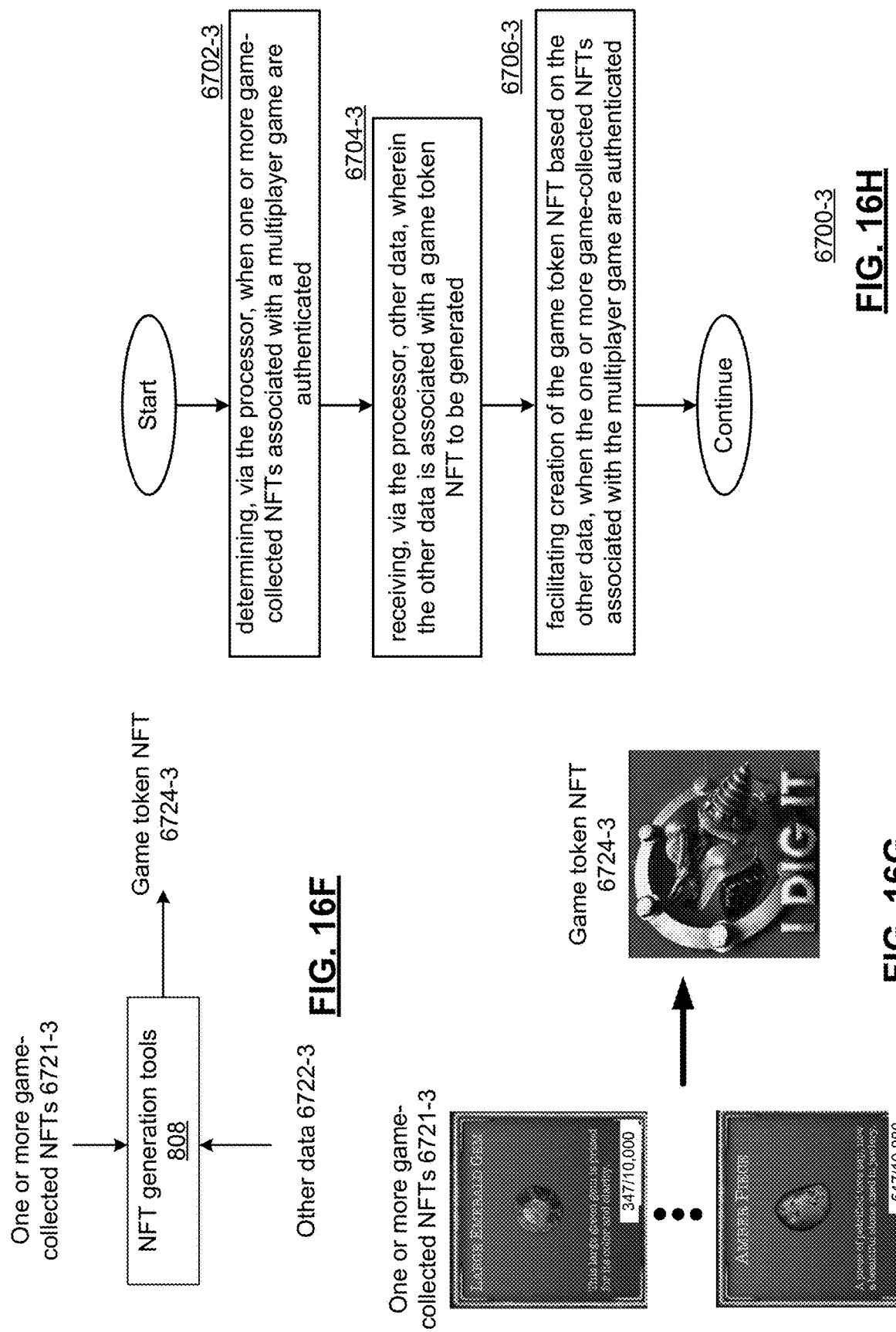

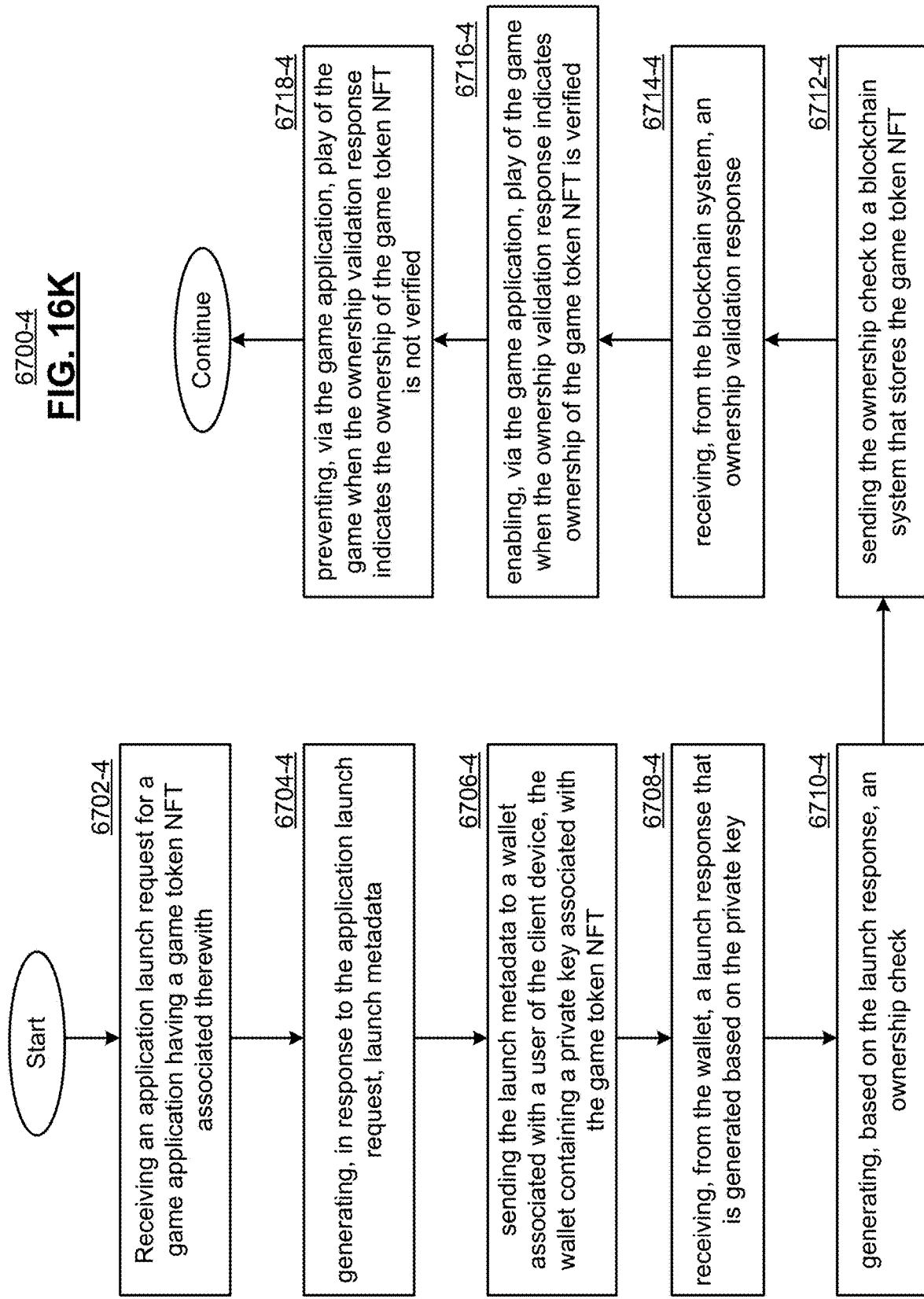

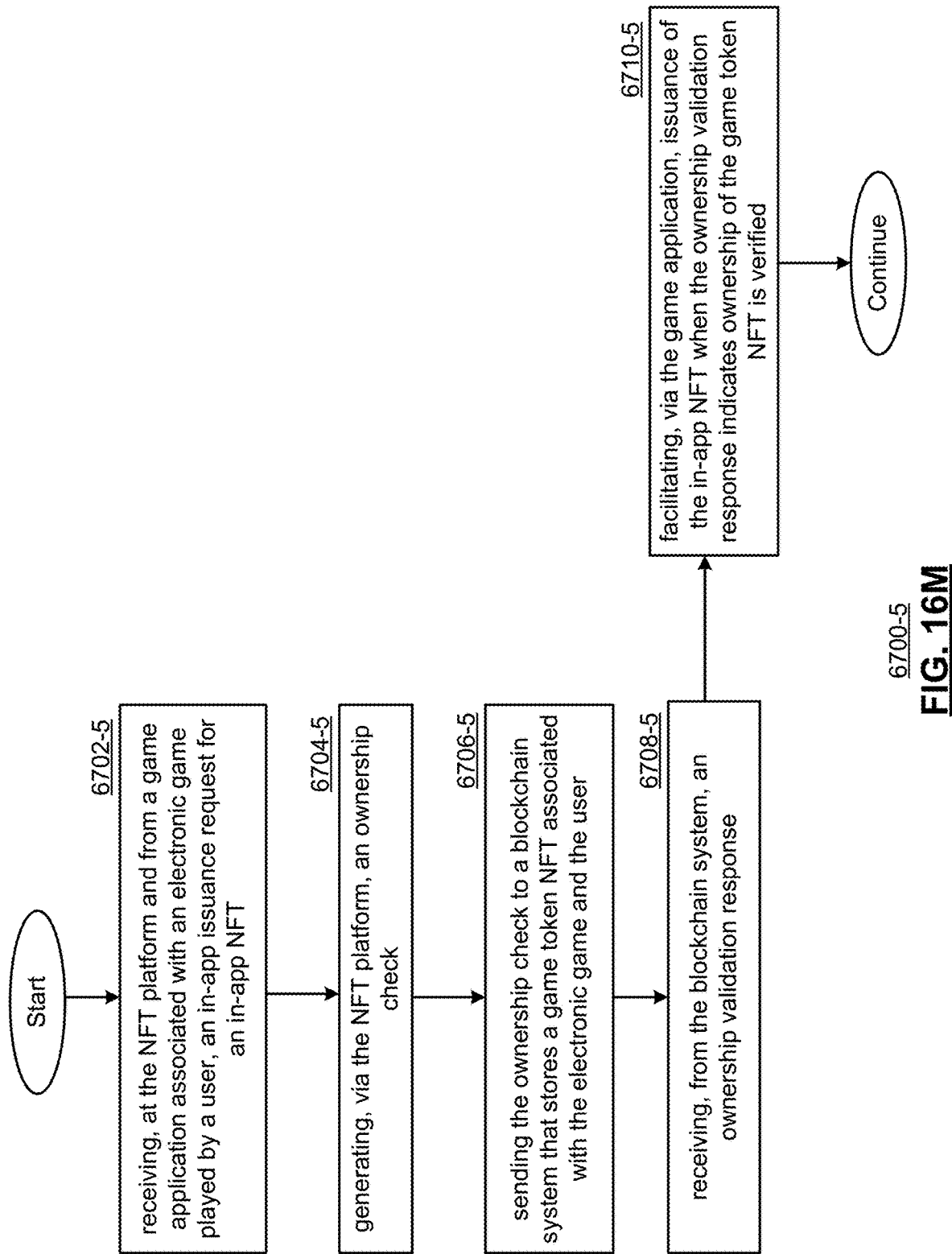

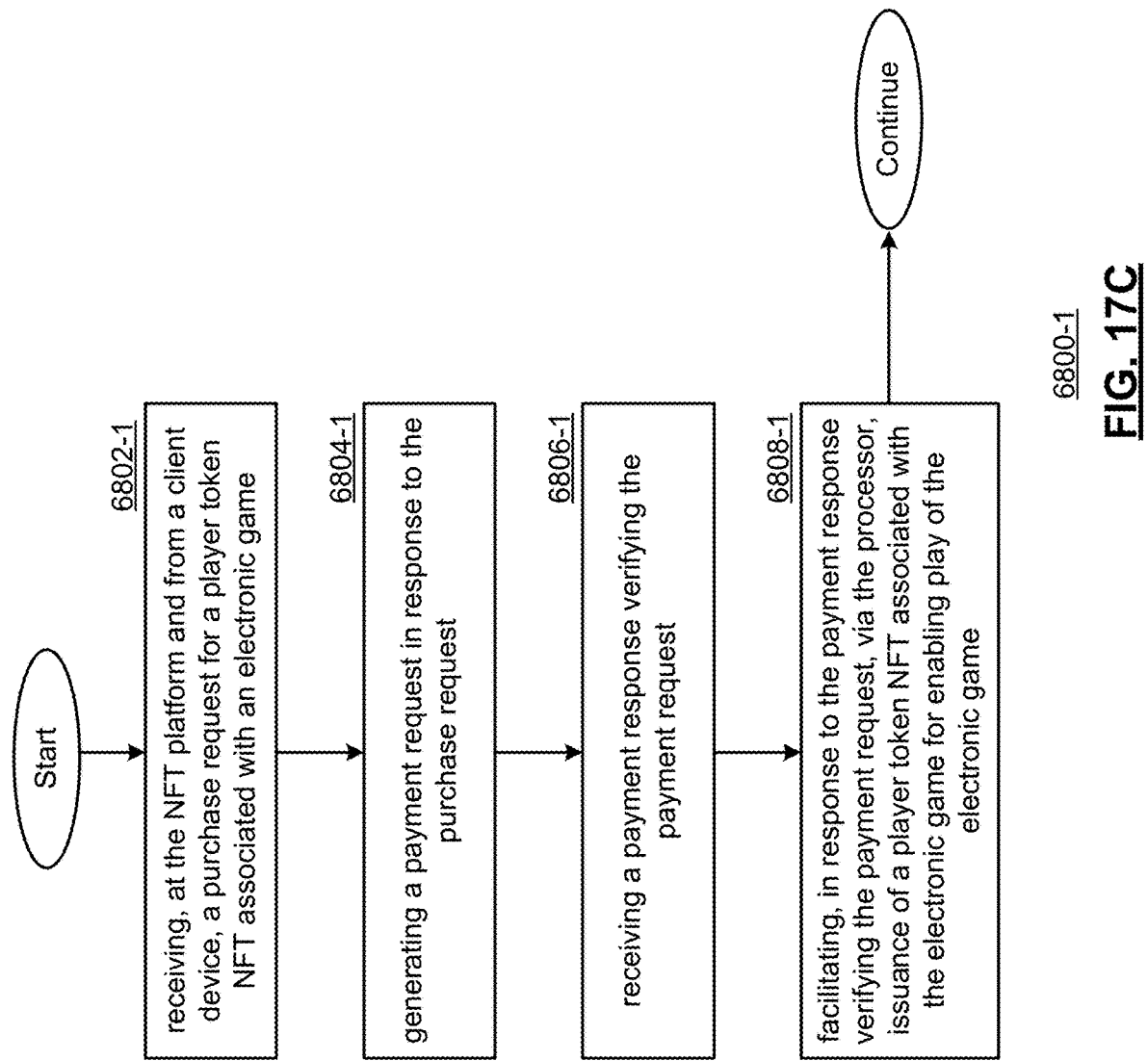

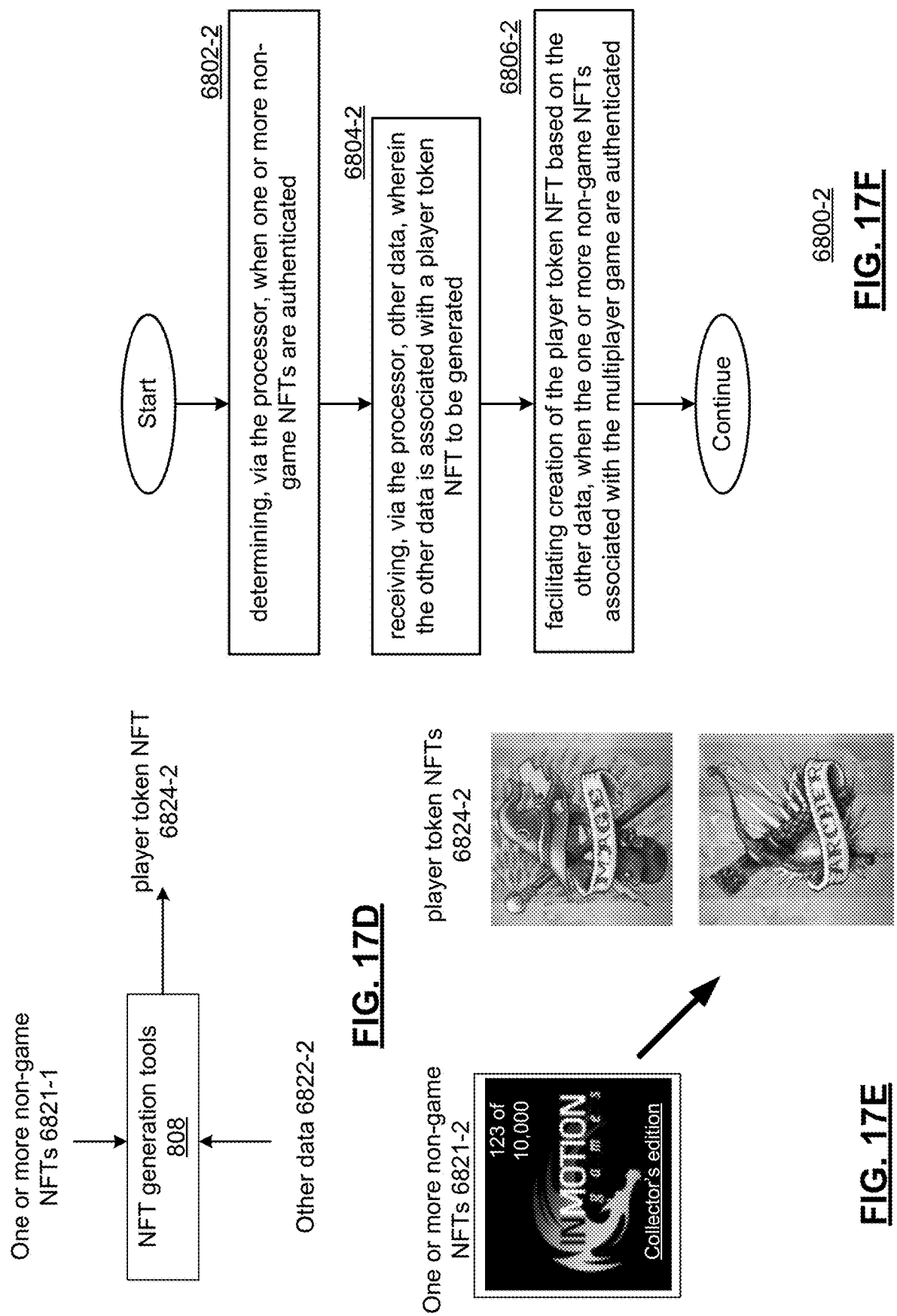

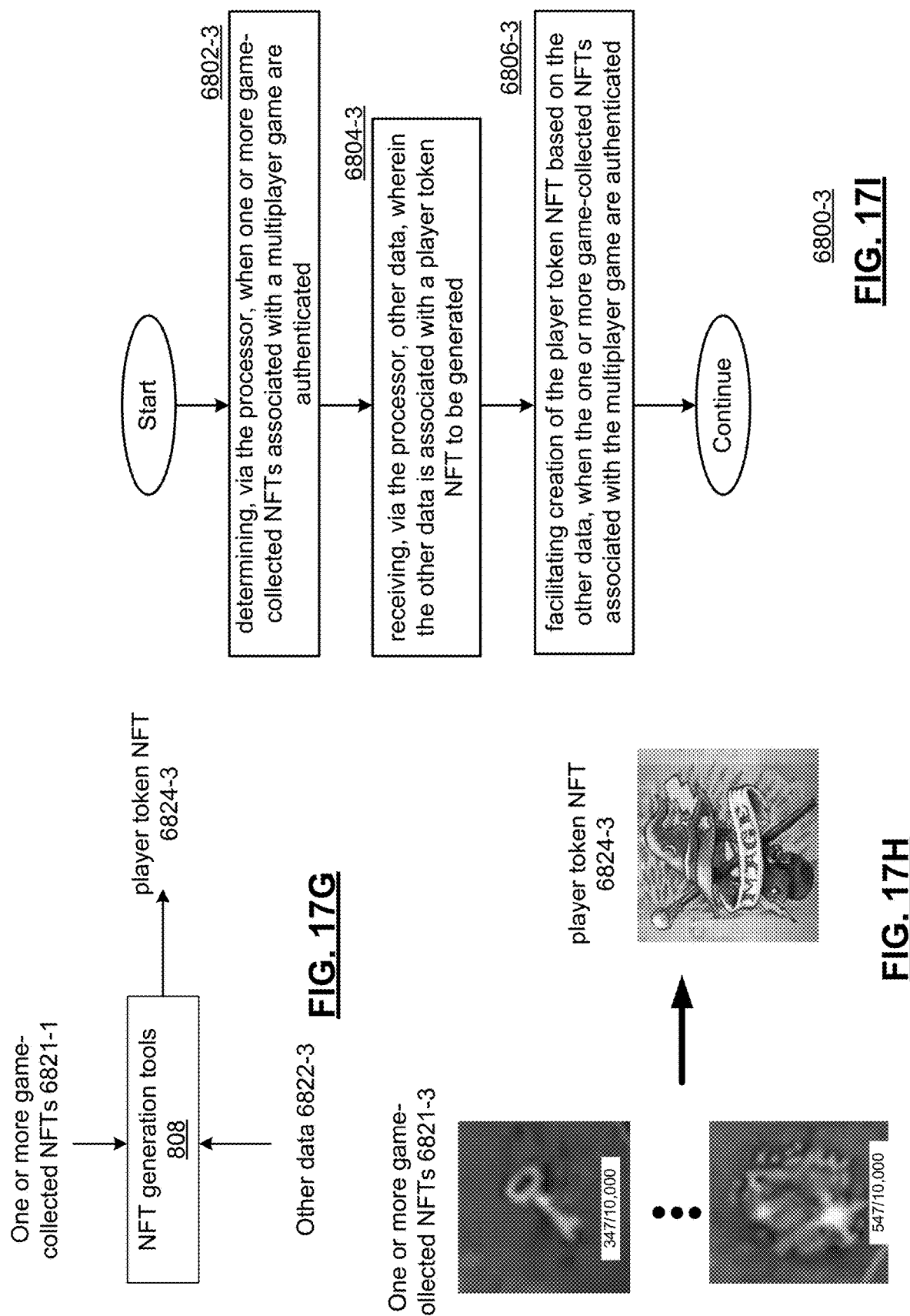

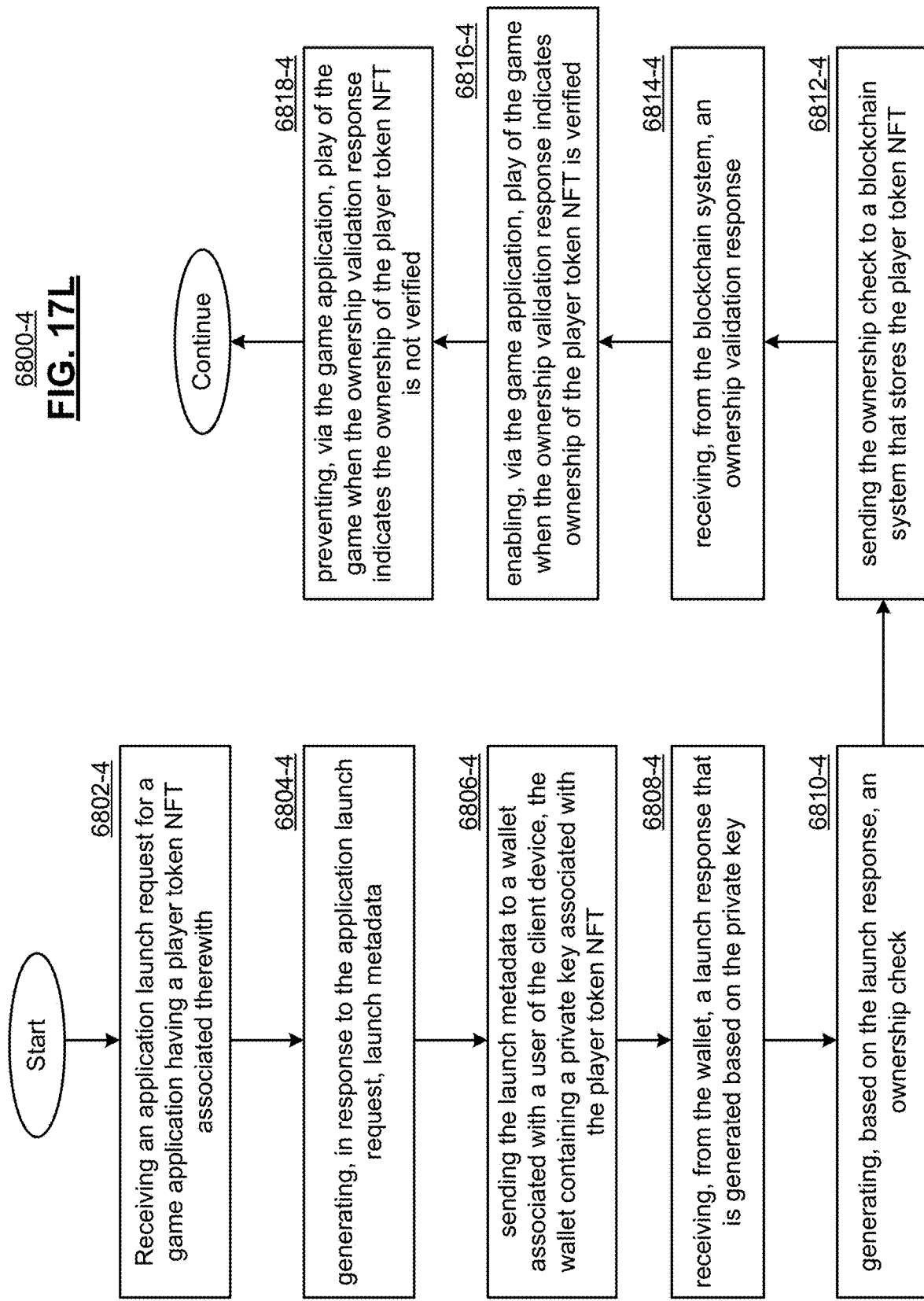

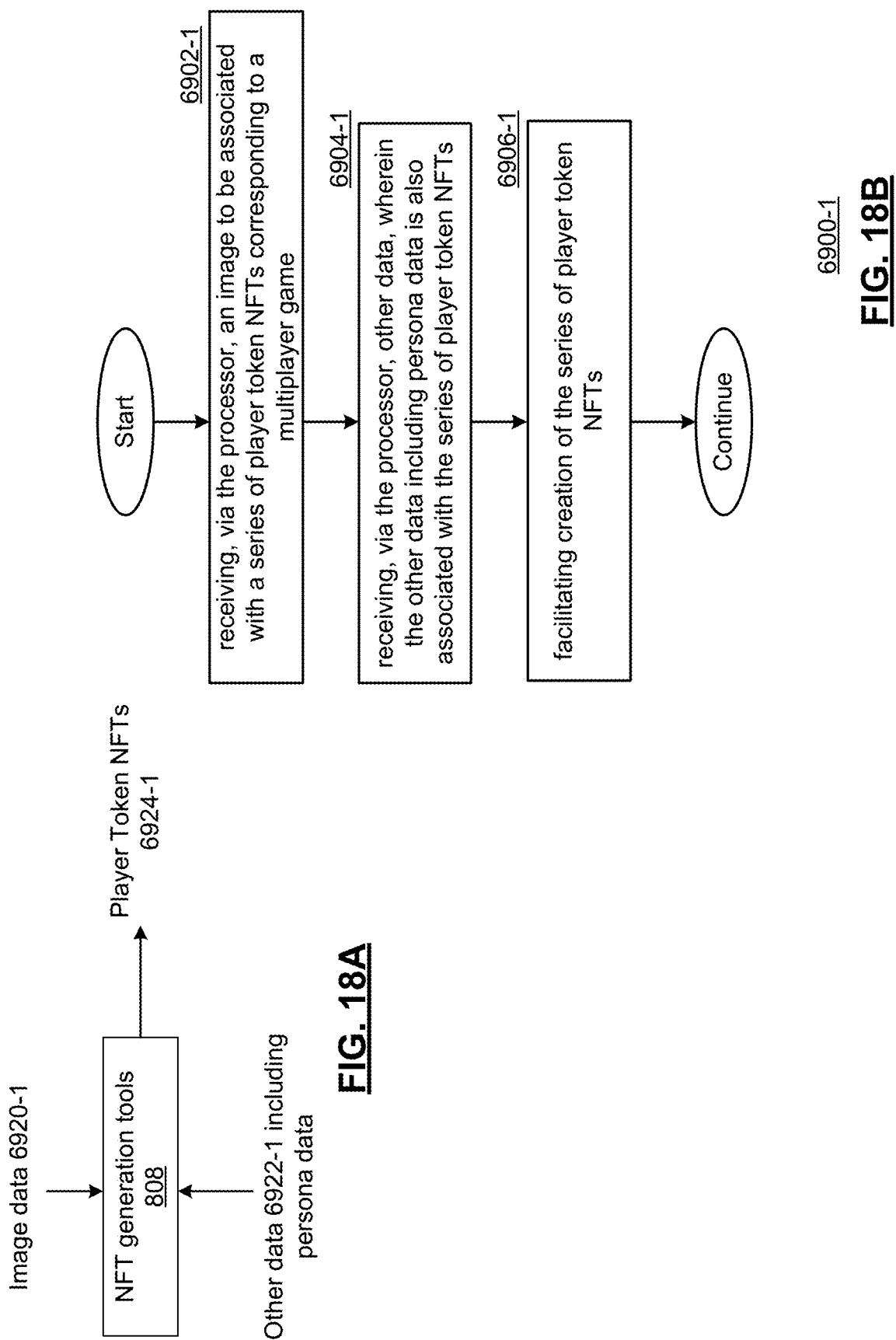

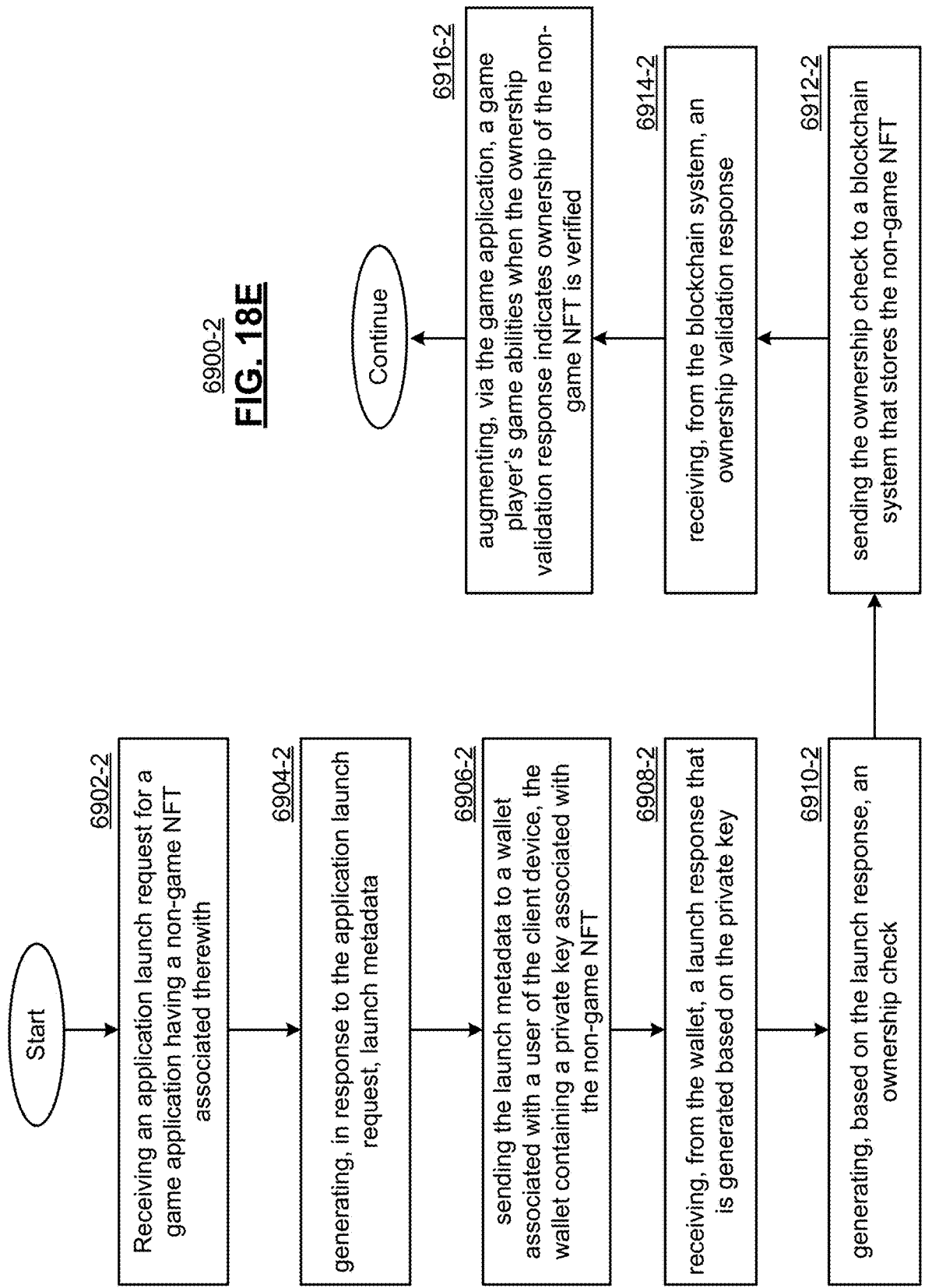

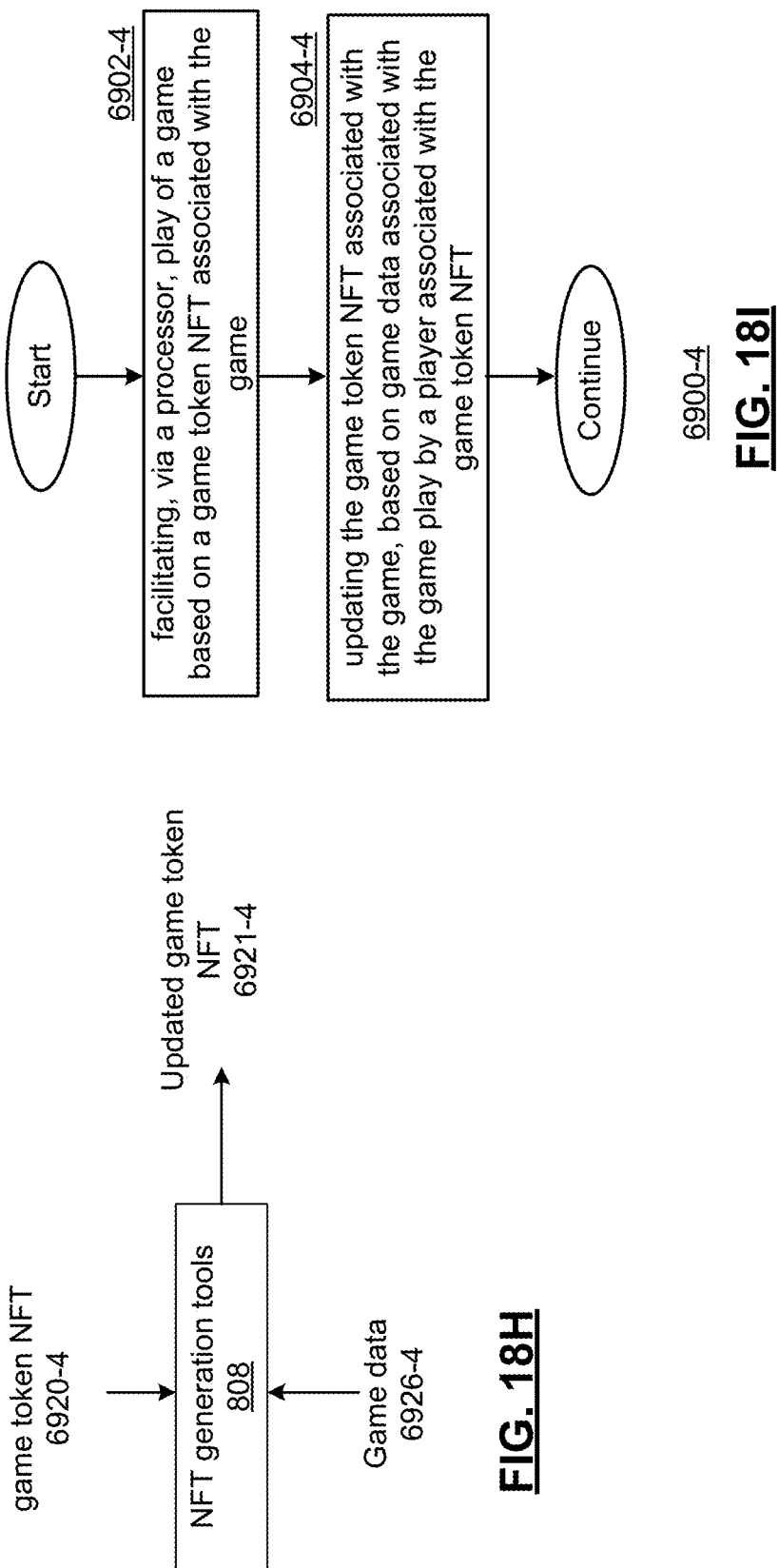

Game character NFT 1572

Other data 1574

Display data associated with a game character 1570

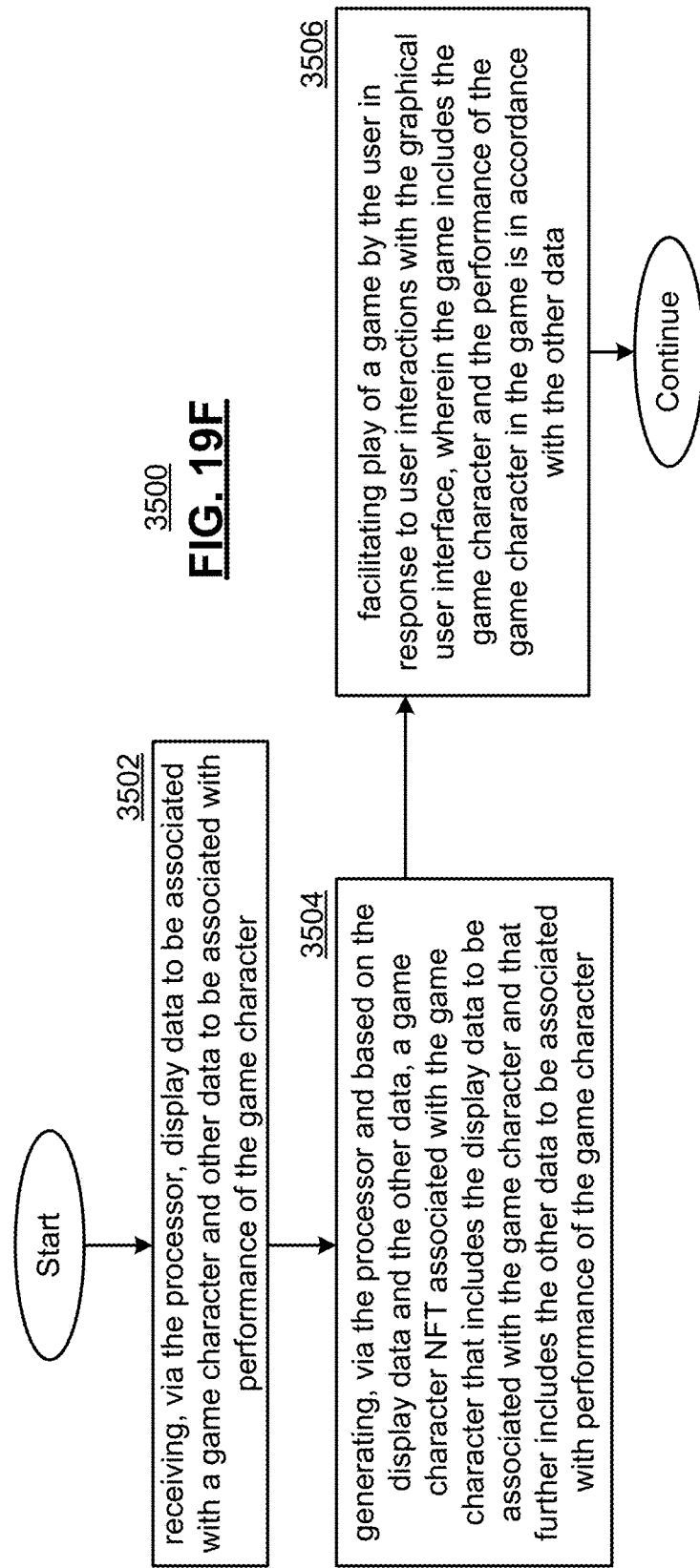

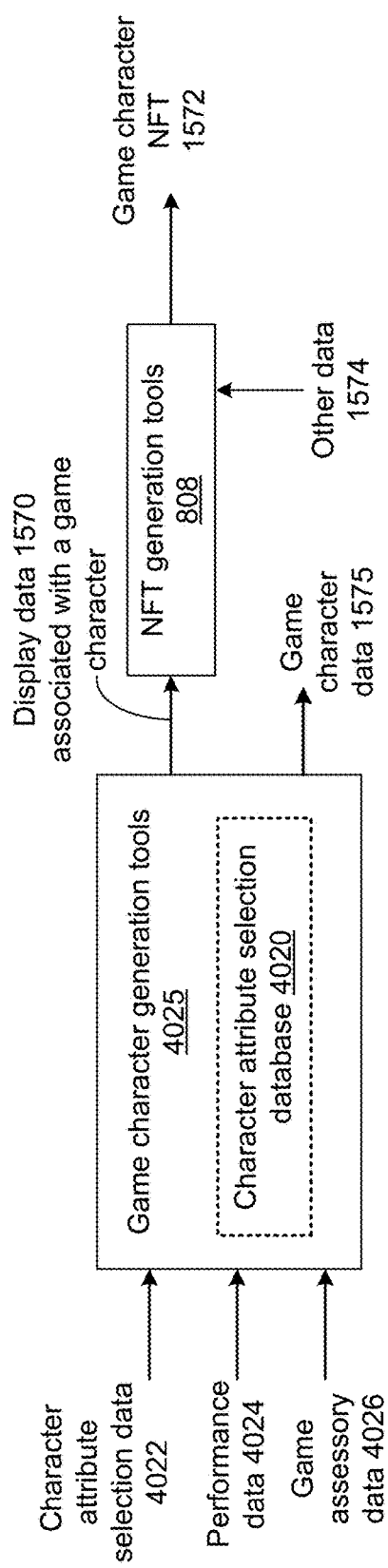
FIG. 20A
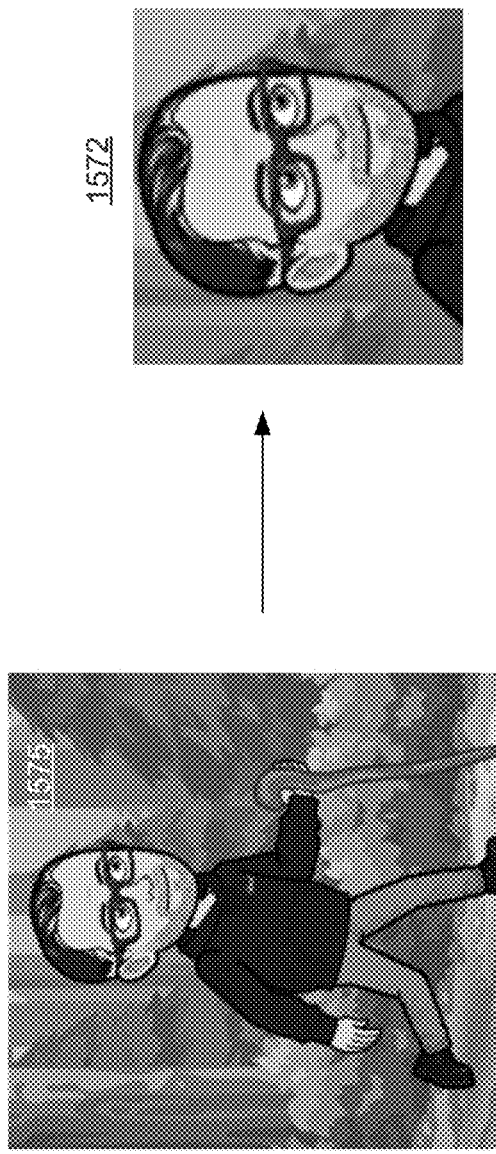
FIG. 20B
FIG. 20C

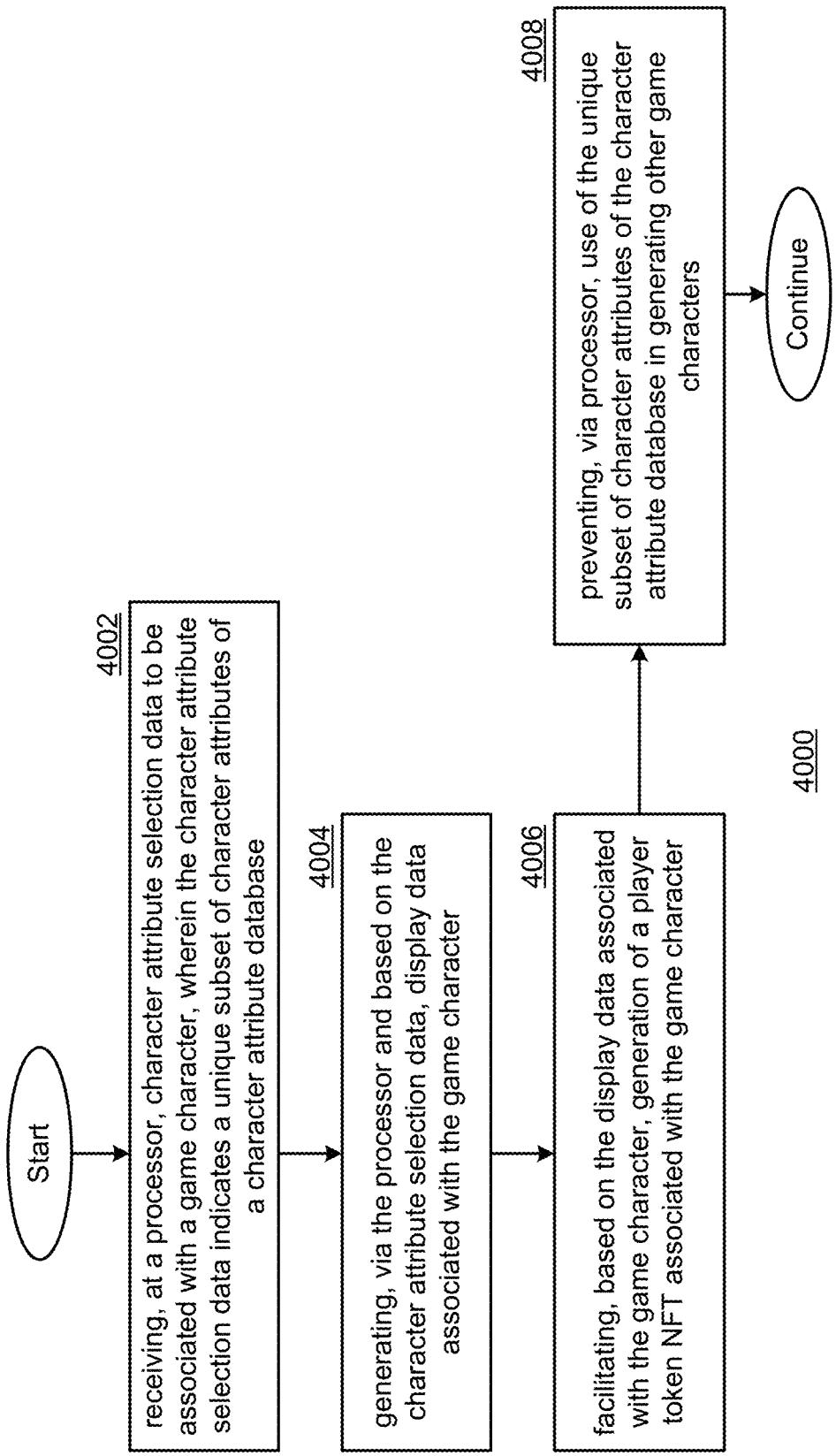

FACILITATING GENERATION OF PLAYER TOKEN NFTS AND METHODS FOR USE THEREWITH

CROSS-REFERENCE TO RELATED APPLICATIONS

The present U.S. Utility patent application claims priority pursuant to 35 U.S.C. § 120 as a continuation of U.S. Utility application Ser. No. 17/820,935, entitled "FACILITATING GENERATION OF PLAYER TOKEN NFTS AND METHODS FOR USE THEREWITH", filed Aug. 19, 2022, which is a continuation-in-part of U.S. Utility application Ser. No. 17/819,016, entitled "GAME PLATFORM USING PLAYER TOKEN NFTS AND METHODS FOR USE THEREWITH", filed Aug. 11, 2022, which claims priority pursuant to 35 U.S.C. § 119(e) to U.S. Provisional Application No. 63/364,568, entitled "NFT GAME PLATFORM WITH MULTIPLAYER SUPPORT AND METHODS FOR USE THEREWITH", filed May 12, 2022; U.S. Provisional Application No. 63/364,571, entitled "NFT GAME PLATFORM USING GAME TOKEN NFTS AND METHODS FOR USE THEREWITH", filed May 12, 2022; U.S. Provisional Application No. 63/364,573, entitled "NFT GAME PLATFORM USING PLAYER TOKEN NFTS AND METHODS FOR USE THEREWITH", filed May 12, 2022; and U.S. Provisional Application No. 63/364,578, entitled "NFT GAME PLATFORM USING PLAYER TOKEN NFTS OR GAME TOKEN NFTS AND METHODS FOR USE THEREWITH", filed May 12, 2022, all of which are hereby incorporated herein by reference in their entirety and made part of the present U.S. Utility patent application for all purposes.

U.S. Utility patent application Ser. No. 17/819,016 also claims priority pursuant to 35 U.S.C. § 120 as a continuation-in-part of U.S. Utility application Ser. No. 17/806,766, entitled "SYSTEM FOR VALIDATING TICKET TRANSACTIONS VIA TICKET NFTS AND METHODS FOR USE THEREWITH", filed Jun. 14, 2022, which is a continuation-in-part of U.S. Utility application Ser. No. 17/661,362, entitled "SYSTEM FOR VALIDATING PLAY OF GAME APPLICATIONS VIA GAME NFTS AND METHODS FOR USE THEREWITH", filed Apr. 29, 2022, which claims priority pursuant to 35 U.S.C. § 119(e) to U.S. Provisional Application No. 63/362,581, entitled "SYSTEM FOR VALIDATING PLAY OF GAME APPLICATIONS VIA GAME NFTS AND METHODS FOR USE THEREWITH", filed Apr. 6, 2022, all of which are hereby incorporated herein by reference in their entirety and made part of the present U.S. Utility patent application for all purposes.

U.S. Utility application Ser. No. 17/661,362 also claims priority pursuant to 35 U.S.C. § 120 as a continuation-in-part of U.S. Utility application Ser. No. 17/656,084, entitled "FACILITATING PLAY OF GAME NFTS VIA A CLIENT DEVICE", filed Mar. 23, 2022, issued as U.S. Pat. No. 11,786,820 on Oct. 17, 2023, which claims priority pursuant to 35 U.S.C. § 119(e) to U.S. Provisional Application No. 63/262,536, entitled "NFT COLLECTION PLATFORM AND METHODS FOR USE THEREWITH", filed Oct. 14, 2021; U.S. Provisional Application No. 63/262,762, entitled "NFT COLLECTION PLATFORM FOR PROCESSING NFTS AND DATA AND METHODS FOR USE THEREWITH", filed Oct. 20, 2021; U.S. Provisional Application No. 63/262,858, entitled "NFT COLLECTION PLATFORM FOR PROCESSING NFTS AND DATA AND METHODS FOR USE THEREWITH", filed Oct. 21, 2021; U.S. Provisional Application No. 63/263,844, entitled "NFT COLLECTION PLATFORM FOR RENDERING NFTS IN AN ENVIRONMENT AND METHODS FOR USE THEREWITH", filed Nov. 10, 2021; U.S. Provisional Application No. 63/264,811, entitled "CLIENT DEVICE FOR NFTS AND METHODS FOR USE THEREWITH", filed Dec. 2, 2021; U.S. Provisional Application No. 63/265,754, entitled "REAL ESTATE NFTS AND METHODS FOR USE THEREWITH", filed Dec. 20, 2021; U.S. Provisional Application No. 63/266,478, entitled "AUTHENTICATED LICENSE NFTS AND METHODS FOR USE THEREWITH", filed Jan. 6, 2022; U.S. Provisional Application No. 63/297,394, entitled "GENERATION OF ENHANCEMENT NFTS AND METHODS FOR USE THEREWITH", filed Jan. 7, 2022; U.S. Provisional Application No. 63/302,757, entitled "GENERATION OF NFT GALLERIES AND METHODS FOR USE THEREWITH", filed Jan. 25, 2022; U.S. Provisional Application No. 63/302,768, entitled "ENHANCEMENT OF REAL ESTATE NFTS VIA NFT GALLERIES", filed Jan. 25, 2022; U.S. Provisional Application No. 63/305,559, entitled "AUTHENTICATING NFT TRANSACTIONS VIA CONDITIONAL NFTS", filed Feb. 1, 2022; U.S. Provisional Application No. 63/305,505, entitled "GENERATING A SECURE REAL-TIME NFT REPOSITORY FOR AUTHENTICATING NFT TRANSACTIONS", filed Feb. 1, 2022; U.S. Provisional Application No. 63/306,405, entitled "GENERATING NFTS WITH FRACTIONAL RIGHTS IN ASSETS", filed Feb. 3, 2022; U.S. Provisional Application No. 63/306,412, entitled "GENERATING NFTS WITH FRACTIONAL RIGHTS IN A COLLECTABLE", filed Feb. 3, 2022; U.S. Provisional Application No. 63/307,349, entitled "STREAMING OF VIDEO NFTS TO A CLIENT DEVICE", filed Feb. 7, 2022; U.S. Provisional Application No. 63/308,546, entitled "NODE NFTS WITH TRANSACTION UPDATES", filed Feb. 10, 2022; U.S. Provisional Application No. 63/309,382, entitled "GENERATING PLAYABLE GAME NFTS", filed Feb. 11, 2022; and U.S. Provisional Application No. 63/310,376, entitled "GENERATING UPDATED TEAM NFTS BASED ON TEAM DATA", filed Feb. 15, 2022, all of which are hereby incorporated herein by reference in their entirety and made part of the present U.S. Utility patent application for all purposes.

U.S. Utility application Ser. No. 17/806,766 claims priority pursuant to 35 U.S.C. § 119(e) to U.S. Provisional Application No. 63/365,010, entitled "SYSTEM FOR VALIDATING TICKET TRANSACTIONS VIA TICKET NFTS AND METHODS FOR USE THEREWITH", filed May 19, 2022; and U.S. Provisional Application No. 63/365,012, entitled "METHOD AND SYSTEM FOR AUTHENTICATING TICKET NFT TRANSACTIONS IN REAL-TIME", filed May 19, 2022, all of which are hereby incorporated herein by reference in their entirety and made part of the present U.S. Utility patent application for all purposes.

U.S. Utility application Ser. No. 17/820,935 also claims priority pursuant to 35 U.S.C. § 119(e) to U.S. Provisional Application No. 63/370,464, entitled "FACILITATING GENERATION OF PLAYER TOKEN NFTS AND METHODS FOR USE THEREWITH", filed Aug. 4, 2022, which is hereby incorporated herein by reference in its entirety and made part of the present U.S. Utility patent application for all purposes.

TECHNICAL FIELD

The present disclosure relates to processing systems and applications used in the collection, generation, display and use of non-fungible tokens (NFTs) or other digital tokens and also to gaming applications and platforms used in network-based multiplayer games.

BRIEF DESCRIPTION OF THE SEVERAL VIEWS OF THE DRAWINGS

FIG. 3A presents a flowchart representation of an example method.

FIG. 3I presents a flowchart representation of an example method.

FIG. 4A presents a flowchart representation of an example method.

FIG. 7 presents a block diagram representation of an example system.

FIG. 9A presents a block diagram/flow representation of an example of NFT generation.

FIG. 9B presents a pictorial representation of an example NFT.

FIG. 9C presents a pictorial representation of an example improvement.

FIG. 9D presents a pictorial representation of an example NFT.

FIG. 9E presents a flowchart representation of an example method.

FIG. 10A presents a block diagram/flow representation of an example of NFT generation.

FIG. 10B presents a flowchart representation of an example method.

FIG. 11A presents a block diagram/flow representation of an example of NFT generation.

FIG. 11B presents a pictorial representation of an example NFT.

FIG. 11C presents a pictorial representation of example enhancements.

FIG. 11D presents a pictorial representation of an example NFT.

FIG. 11E presents a flowchart representation of an example method.

FIG. 12B presents a flowchart representation of an example method.

FIG. 12D presents a flowchart representation of an example method.

FIG. 13F presents a block diagram/flow representation of an example of NFT generation.

FIG. 13G presents a pictorial representation of an example NFT.

FIG. 13H presents a pictorial/flow representation of an example update to an NFT.

FIG. 13N presents a flowchart representation of an example method.

FIG. 13Q presents a flowchart representation of an example method.

FIG. 14G presents a flowchart representation of an example method.

FIG. 14H presents a flowchart representation of an example method.

FIG. 14I presents a flowchart representation of an example method.

FIG. 14K presents a flowchart representation of an example method.

FIG. 14L presents a flowchart representation of an example method.

FIG. 14N presents a flowchart representation of an example method.

FIG. 15A presents a block diagram representation of an example system.

FIG. 15K presents a block/flow diagram representation of an example system.

FIG. 15L presents a flowchart representation of an example method.

FIG. 15M presents a block/flow diagram representation of an example system.

FIG. 15N presents a flowchart representation of an example method.

FIG. 15O presents a flowchart representation of an example method.

FIG. 15P presents a flowchart representation of an example method.

FIG. 15Q presents a flowchart representation of an example method.

FIG. 16B presents a flowchart representation of an example method.

FIG. 16F presents a block/flow diagram representation of an example system.

FIG. 16G presents a pictorial/flow diagram representation of an example process.

FIG. 16H presents a flowchart representation of an example method.

FIG. 16K presents a flowchart representation of an example method.

FIG. 16M presents a flowchart representation of an example method.

FIG. 17C presents a flowchart representation of an example method.

FIG. 17D presents a block/flow diagram representation of an example system.

FIG. 17E presents a pictorial/flow diagram representation of an example process.

FIG. 17F presents a flowchart representation of an example method.

FIG. 17G presents a block/flow diagram representation of an example system.

FIG. 17H presents a pictorial/flow diagram representation of an example process.

FIG. 17I presents a flowchart representation of an example method.

FIG. 17L presents a flowchart representation of an example method.

FIG. 18A presents a block/flow diagram representation of an example system.

FIG. 18B presents a flowchart representation of an example method.

FIG. 18E presents a flowchart representation of an example method.

FIG. 18H presents a block/flow diagram representation of an example system.

FIG. 18I presents a flowchart representation of an example method.

FIG. 19F presents a flowchart representation of an example method.

FIG. 20A presents a block/flow diagram representation of an example system.

FIG. 20B presents a pictorial representation of example display data associated with a game character.

FIG. 20C presents a pictorial representation of an example game character NFT.

FIG. 20D presents a flowchart representation of an example method.

DETAILED DESCRIPTION

Figure 1A:
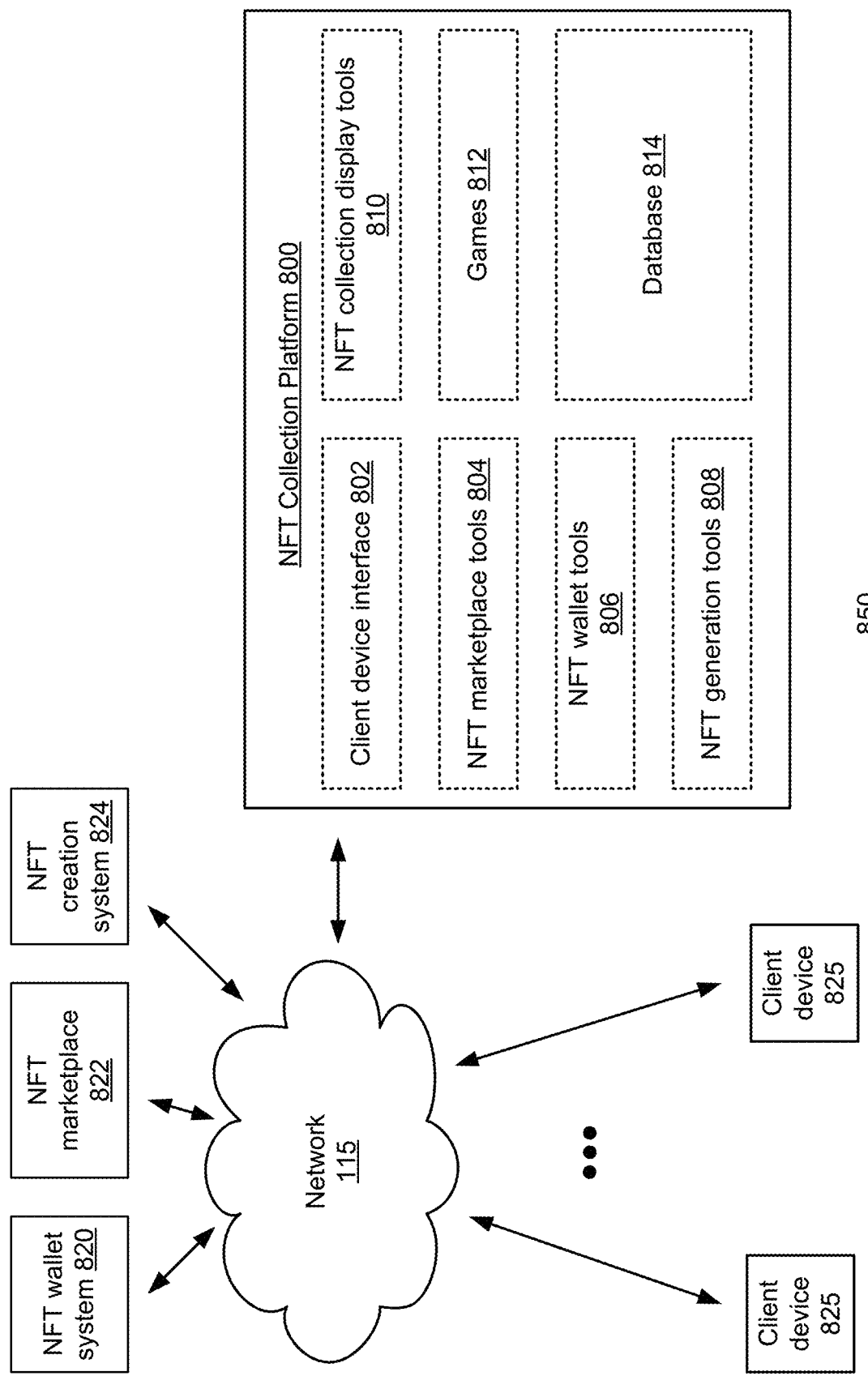
FIG. 1A presents a block diagram representation of an example system.

FIG. 1A presents a block diagram representation of an example system in accordance with various examples. In particular, a system 850 is presented that includes an NFT collection platform 800 that communicates with client devices 825 via a network 115. The network 115 can be the Internet or other wide area or local area network, either public or private. The client devices 825 can be computing devices such as laptops, smartphones, smart watches, tablets, desktops, or other computing devices associated with users, for example, buyers, sellers, collectors and/or users of NFTs.

NFT creation and ownership is growing worldwide. Existing platforms provide tools to create NFTs, marketplaces for buying and selling NFTs and wallets to securely hold them. Many NFT purchasers however, view NFTs similarly to cryptocurrency, purely as financial investments to be collected and later sold. Unlike cryptocurrencies which are fungible tokens, NFTs have a non-fungible (e.g. unique or limited) component that can correspond to photographs, graphics, art, video, games or other media or imagery that can be displayed, used in authentication and/or to provide other support for transactions and/or used in game play and for other utilitarian purposes, etc.

In the example shown, the NFT collection platform 800 includes a client device interface 802 for interacting with the client devices 825, NFT marketplace tools 804, NFT wallet tools 806, NFT generation tools 808, NFT collection display tools 810, one or more games 812 that can be played using NFTs that have been collected including game NFTs that include and/or otherwise associated with, or correspond to, playable game content, and a database 814 for storing user and account information, preferences, display settings and other data associated with users of the NFT collection platform 800. The NFT collection platform 800 can include or be implemented via one or more servers, a cloud computing system, an InterPlanetary File System (IPFS) or other decentralized or distributed computer system of individual computers and/or nodes and/or a centralized computing system.

For example, the client device interface 802 can operate in conjunction with each client device 825 and via network 115 to generate a graphical user interface. This graphical user interface is based on display data generated by the NFT collection platform 800 in a format for display on a display device associated with the client devices 825. This graphical user interface generates input data that is received by the NFT collection platform 800 from the client devices 825 in response to user interaction with the graphical user interface.

In various examples, the NFT collection platform 800 can serve the needs of a collector of NFTs by providing a system that offers new experiences that support various collector and/or use behaviors in the NFT world and metaverse including the collection, display, and use of NFTs and their corresponding content. The NFT collection display tools 810 can include a high-fidelity customizable page builder so each collector can personalize and display their NFTs in an environment. The NFT collection platform 800 can provide and support a collection social media site that, for example, is similar to MySpace, Facebook, or OnlyFans, but specifically directed to the arrangement, posting, sharing and/or display of collections of NFTs.

In the most basic mode of operation, the NFT collection platform 800 improves the technology of NFT systems by allowing the user to collect, arrange and display NFTs they have purchased so that the user, and other users, can enjoy and admire the NFTs they have collected. The NFT collection platform 800 not only allows users to curate, display and use their collections, to play games associated with their NFTs and/or also allows users to create a social/professional profile of their NFT property—enabling users to get creative with how their collections are presented, used and displayed. In addition, when a group of NFTs is collected and/or when a personalized/curated collection page, set and/or collection display is built, the NFT collection platform 800 improves the technology of NFT systems by allowing the user to mint a new "collection NFT" using blockchain-based, distributed computer network, and/or other crypto-based NFT creation techniques, for example and authenticated based on the user's ownership of the underlying NFTs.

Furthermore, the NFT collection platform 800 allows users to buy, sell, loan, borrow and trade NFTs with other users, including their own collection NFTs created based on their own collections. In various examples, the NFT collection platform 800 may not include a NFT creator, marketplace or wallet itself. The NFT generation tools 808, NFT wallet tools 806 and NFT marketplace tools 804 can reside on the NFT collection platform 800 and interface with one or more NFT wallet systems 820, NFT marketplaces 822 and/or NFT creation systems 824 to enable transactions/interactions/abilities at a metaverse level, offering collectors new and unique experiences, pre and post purchase, across all different NFT's and blockchains in one place. The NFT collection platform 800 improves the technology of NFT systems by allowing the user to perform the functions above in a fashion, that can be blockchain, wallet, and marketplace agnostic.

It should be noted that the system 850 can operate via blockchain-based technologies. In blockchain, a growing list of records, called "blocks", are linked together using cryptography and spread over a decentralized computer system/network or other distributed network of participants. Each block contains a cryptographic hash of the previous block, a timestamp, and transaction data (generally represented as a Merkle tree). The timestamp proves that the transaction data existed when the block was published in order to get into its hash. As blocks each contain information about the block previous to it, they form a chain, with each additional block reinforcing the ones before it. Therefore, blockchains are resistant to modification of their data because once recorded, the data in any given block cannot be altered retroactively without altering all subsequent blocks. The distributed nature of this process over different nodes, the contemporaneous nature of geographically distinct calculations, coupled with the extreme computational complexity of the required calculations means that these blockchain-based technologies cannot practically be performed by the human mind.

It should be noted, that while the NFT wallet system 820, NFT marketplace 822 and NFT creation system 824 are shown as separate entities and as being external to the NFT collection platform 800, other configurations are possible where two or more of these entities share a common platform and/or the functions and features of one or more of these entities can be incorporated within the NFT collection platform 800 itself.

It should also be noted that while client device interface 802, NFT marketplace tools 804, NFT wallet tools 806, NFT generation tools 808, NFT collection display tools 810, games 812 and database 814 are shown as being internal to the NFT collection platform 800, in other examples, any subset of the various elements of the NFT collection platform 800 can be implemented external to the NFT collection platform 800 and coupled to the other components via the network 115. Furthermore, the NFT collection platform 800 can be implemented in a cloud computing configuration with any or all of the various elements of the NFT collection platform 800 implemented within the cloud.

The further operation of this system will be described in greater detail in conjunction with the figures that that follow, including many optional functions and features and examples thereof.

Figure 1B:
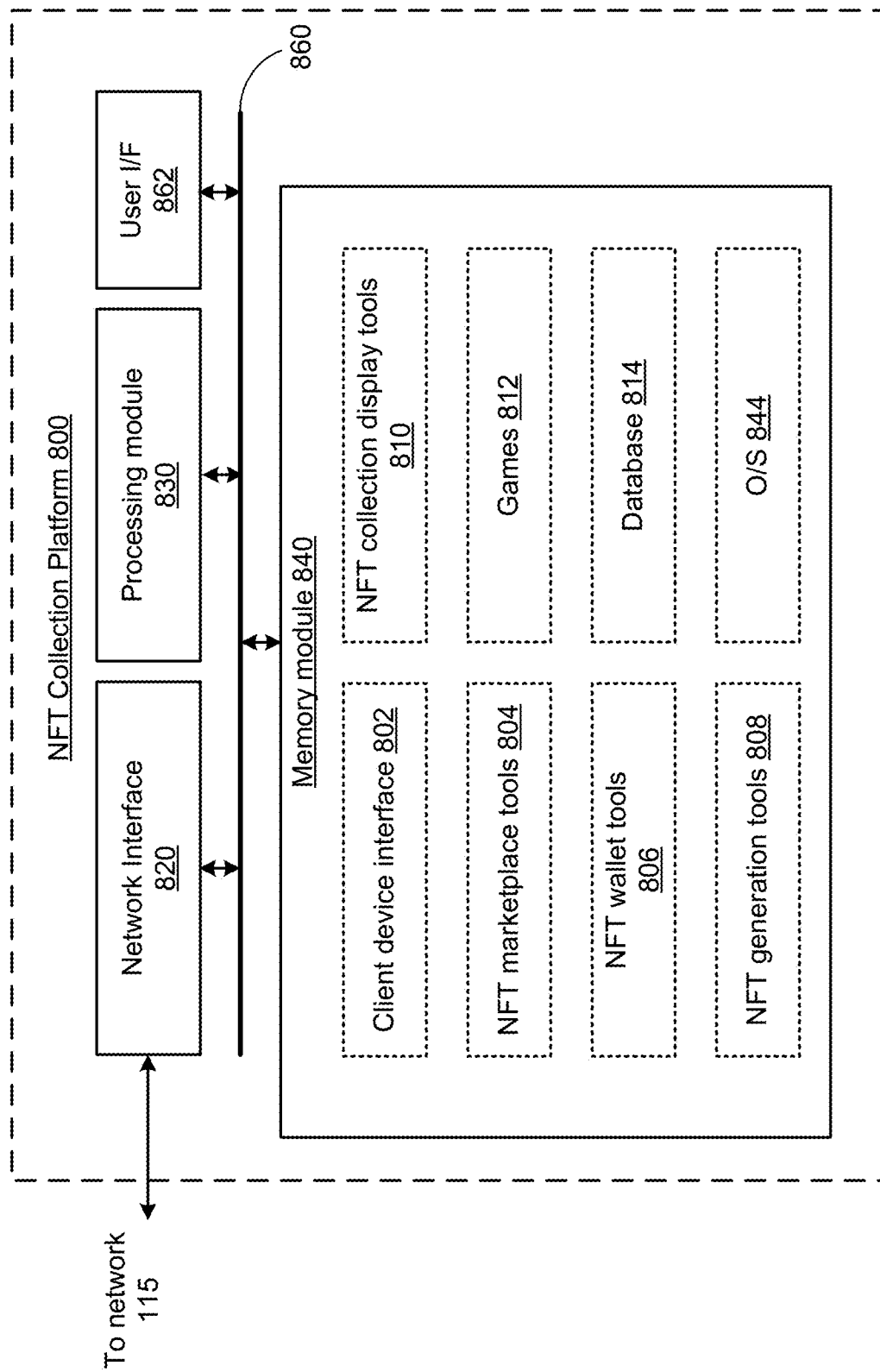
FIG. 1B presents a block diagram representation of an example non-fungible token (NFT) collection platform.

FIG. 1B presents a block diagram representation of an NFT collection platform 800 in accordance with various examples. In particular, the NFT collection platform 800 includes a network interface 820 such as a 3G, 4G, 5G or other cellular wireless transceiver, a Bluetooth transceiver, a WiFi transceiver, UltraWideBand transceiver, WIMAX transceiver, ZigBee transceiver or other wireless interface, a Universal Serial Bus (USB) interface, an IEEE 1394 Firewire interface, an Ethernet interface or other wired interface and/or other network card or modem for communicating for communicating via the network 115.

The NFT collection platform 800 also includes a processing module 830 and memory module 840 that stores an operating system (O/S) 844 such as an Apple, Unix, Linux or Microsoft operating system or other operating system, client device interface 802, NFT marketplace tools 804, NFT wallet tools 806, NFT generation tools 808, NFT collection display tools 810, games 812 and database 814. In particular, the O/S 844, the client device interface 802, NFT marketplace tools 804, NFT wallet tools 806, NFT generation tools 808, NFT collection display tools 810, and games 812 each include operational instructions that, when executed by the processing module 830, cooperate to configure the processing module 830 into a special purpose device to perform the particular functions of the NFT collection platform 800 described herein.

The NFT collection platform 800 may include a user interface (I/F) 862 such as a display device, touch screen, key pad, touch pad, joy stick, thumb wheel, a mouse, one or more buttons, a speaker, a microphone, an accelerometer, gyroscope or other motion or position sensor, video camera or other interface devices that provide information to an administrator of the NFT collection platform 800 and that generate data in response to the administrator's interaction with NFT collection platform 800.

The processing module 830 can be implemented via a single processing device or a plurality of processing devices. Such processing devices can include a microprocessor, micro-controller, digital signal processor, microcomputer, central processing unit, quantum computing device, field programmable gate array, programmable logic device, state machine, logic circuitry, analog circuitry, digital circuitry, and/or any device that manipulates signals (analog and/or digital) based on operational instructions that are stored in a memory, such as memory 840. The memory module 840 can include a hard disc drive or other disc drive, read-only memory, random access memory, volatile memory, non-volatile memory, static memory, dynamic memory, flash memory, cache memory, and/or any device that stores digital information. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is presented that includes a single bus 860, other architectures are possible including additional data buses and/or direct connectivity between one or more elements. Further, the NFT collection platform 800 can include one or more additional elements that are not specifically shown.

Figure 2:
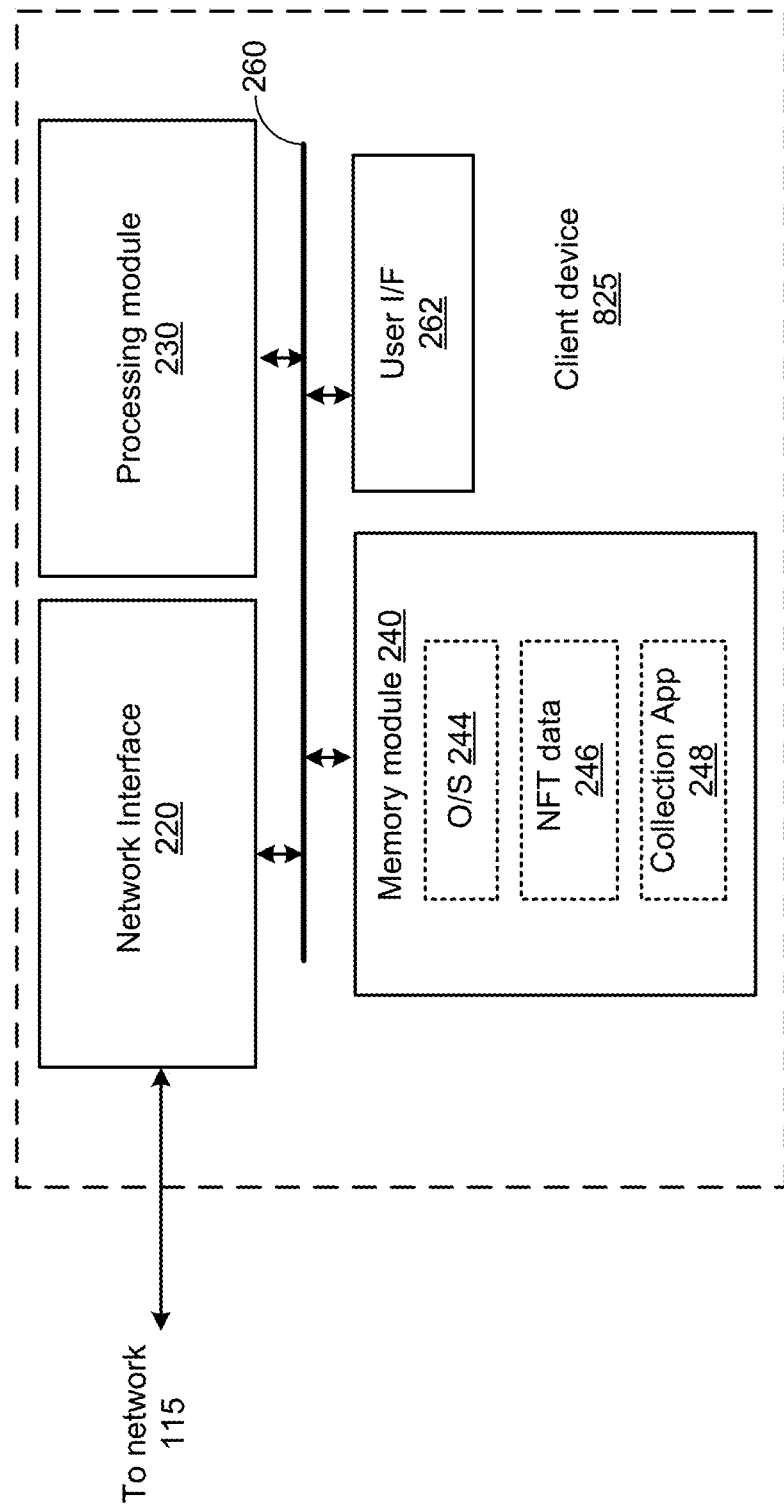
FIG. 2 presents a block diagram representation of an example client device.

FIG. 2 presents a block diagram representation of an example client device in accordance with various examples. In particular, a client device 825 is presented that includes a network interface 220 such as a 3G, 4G, 5G or other cellular wireless transceiver, a Bluetooth transceiver, a WiFi transceiver, UltraWideBand transceiver, WIMAX transceiver, ZigBee transceiver or other wireless interface, a Universal Serial Bus (USB) interface, an IEEE 1394 Firewire interface, an Ethernet interface or other wired interface and/or other network card or modem for communicating for communicating via network 115.

The client device 825 also includes a processing module 230 and memory module 240 that stores an operating system (O/S) 244 such as an Apple, Unix, Linux or Microsoft operating system or other operating system, NFT data 246 associated with one or more NFTs owned by the user, and/or a collection applications 248. In particular, the O/S 244 and collection application 248 each include operational instructions that, when executed by the processing module 230, cooperate to configure the processing module into a special purpose device to perform the particular functions of the client device 825 described herein.

The client device 825 also includes a user interface (I/F) 262 such as a display device, touch screen, key pad, touch pad, joy stick, thumb wheel, a mouse, one or more buttons, a speaker, a microphone, an accelerometer, gyroscope or other motion or position sensor, video camera or other interface devices that provide information to a user of the client device 825 and that generate data in response to the user's interaction with the client device 825.

The processing module 230 can be implemented via a single processing device or a plurality of processing devices. Such processing devices can include a microprocessor, micro-controller, digital signal processor, microcomputer, central processing unit, quantum computing device, field programmable gate array, programmable logic device, state machine, logic circuitry, analog circuitry, digital circuitry, and/or any device that manipulates signals (analog and/or digital) based on operational instructions that are stored in a memory, such as memory 240. The memory module 240 can include a hard disc drive or other disc drive, read-only memory, random access memory, volatile memory, non-volatile memory, static memory, dynamic memory, flash memory, cache memory, and/or any device that stores digital information. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is presented that includes a single bus 260, other architectures are possible including additional data buses and/or direct connectivity between one or more elements. Further, the client device 825 can include one or more additional elements that are not specifically shown.

The client device 825 operates, via network interface 220, network 115 and NFT collection platform 800. In various examples, the client device 825 operates to display a graphical user interface generated based on display data from the NFT collection platform 800, including corresponding screen displays. Furthermore, the graphical user interface can operate in response to interactions by a user to generate input data that is sent to the NFT collection platform 800 to control the operation of the NFT collection platform 800 and/or to provide other input.

It should be noted that while the client devices 825 and NFT collection platform 800 are shown as separate devices that communicate via the network 115, it should be noted that any and all of the functionality attributed to the NFT collection platform 800, including the NFT marketplace tools 804, NFT wallet tools 806, NFT generation tools 808, NFT collection display tools 810, games 812, and database 814, etc. can likewise be incorporated directly into the client device 825. In this fashion, a client device 825 through the application of its operating system 244 and one or more applications can provide a graphical user interface to operate via network 115 but independently from any NFT collection platform to perform any of the functions and features described herein. In particular, the client device 825 can perform the functions of both the client device and the NFT collection platform 800 without requiring communications to be sent to the client device 825 from a NFT collection platform and communications sent to a NFT collection platform from the client device 825.

FIG. 3A presents a flowchart representation of an example method in accordance with various examples. In particular, a method 300 for use in conjunction with any of the functions and features described herein for generating a collection NFT based on NFTs in a user's collection.

Step 302 includes importing, via a network interface, a plurality of NFTs associated with the user of the client device. Step 304 includes generating, via a processor and in response to user interactions with the graphical user interface, display data associated with a customized collection display that contains the plurality of NFTs. Step 306 includes sending, via the network interface, the display data associated with the customized collection display via the client device of the user. Step 308 includes facilitating creation of a collection NFT corresponding to the customized collection display that contains the plurality of NFTs.

FIGS. 3B-3F and 3H present pictorial representations of example screen displays. In particular, screen displays of a graphical user interface generated based on display data from the NFT collection platform 800 are shown. In the example below, three NFTs are used to design and create a new collection NFT based on a common theme, the 1999. Chicago Bulls team in the National Basketball association.

Figure 3B:
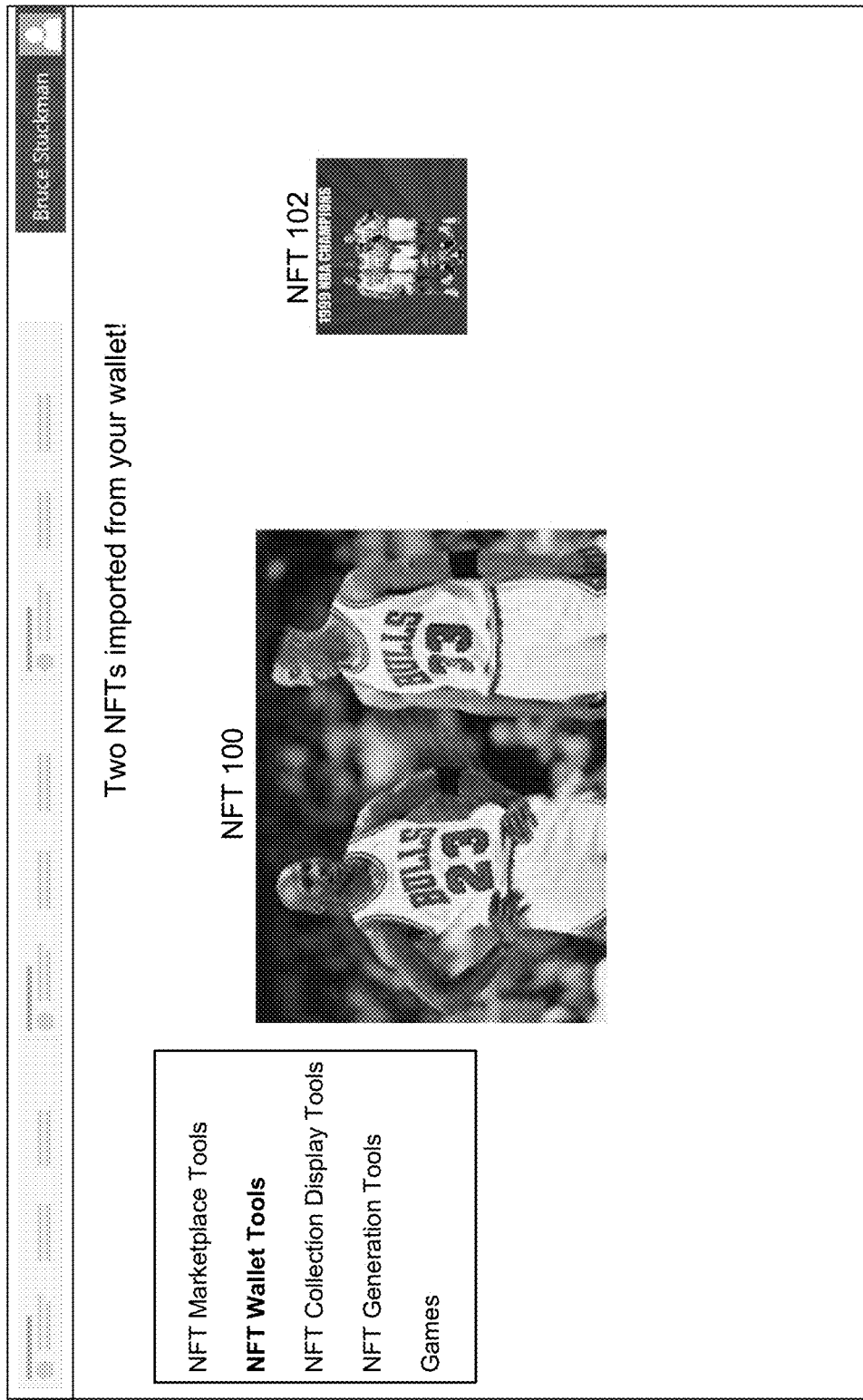
FIGS. 3B-3F and 3H present pictorial representations of example screen displays.

In FIG. 3B, the user "Bruce Stuckman" is logged into the NFT collection platform 800. The user has interacted with NFT wallet tools, such as NFT wallet tools 804, to import NFTs 100 and 102 from his wallet residing in NFT wallet system 820. In this example, the NFTs 100 and 102 are blockchain authenticated original photographs depicting two different images of the 1999. Chicago Bulls.

Figure 3C:
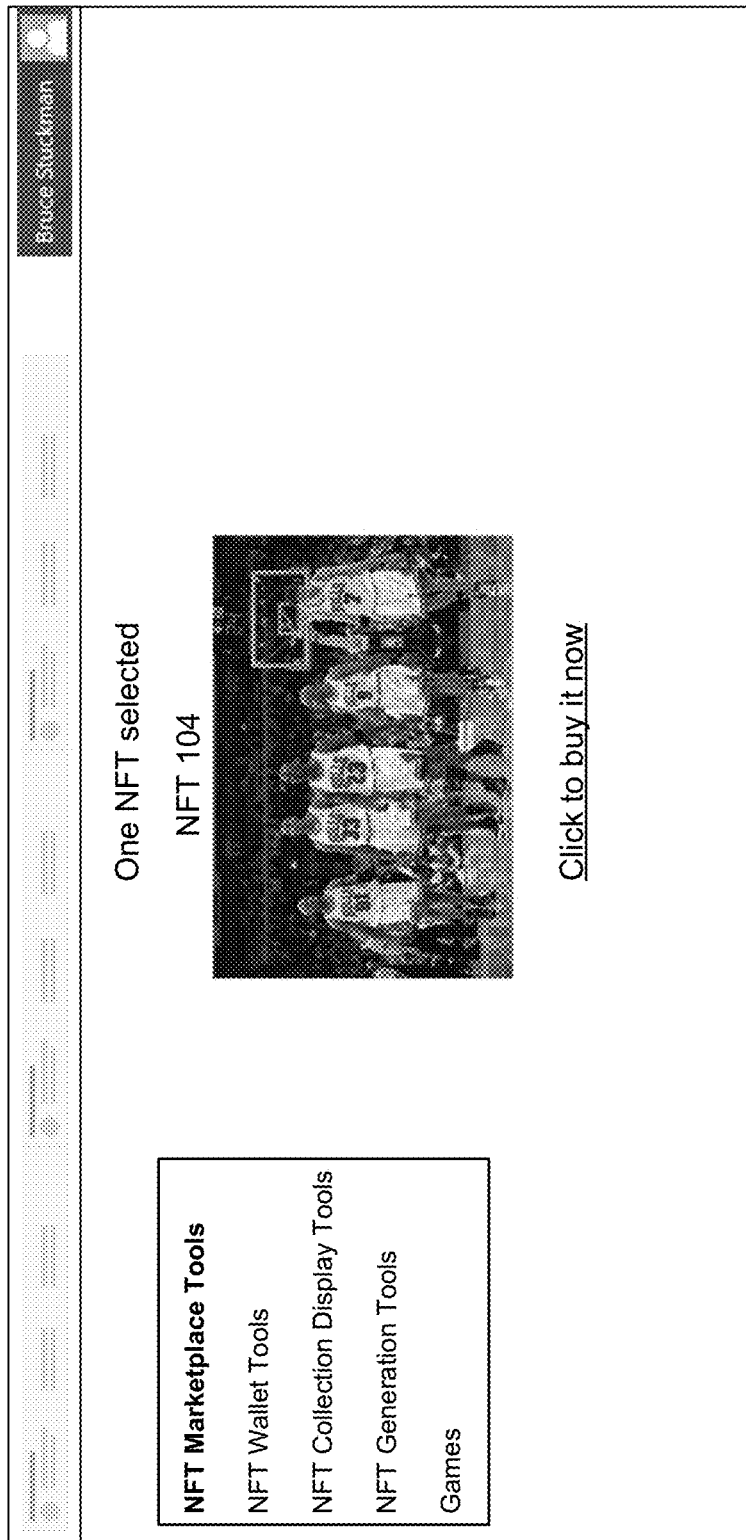
Figure 3D:
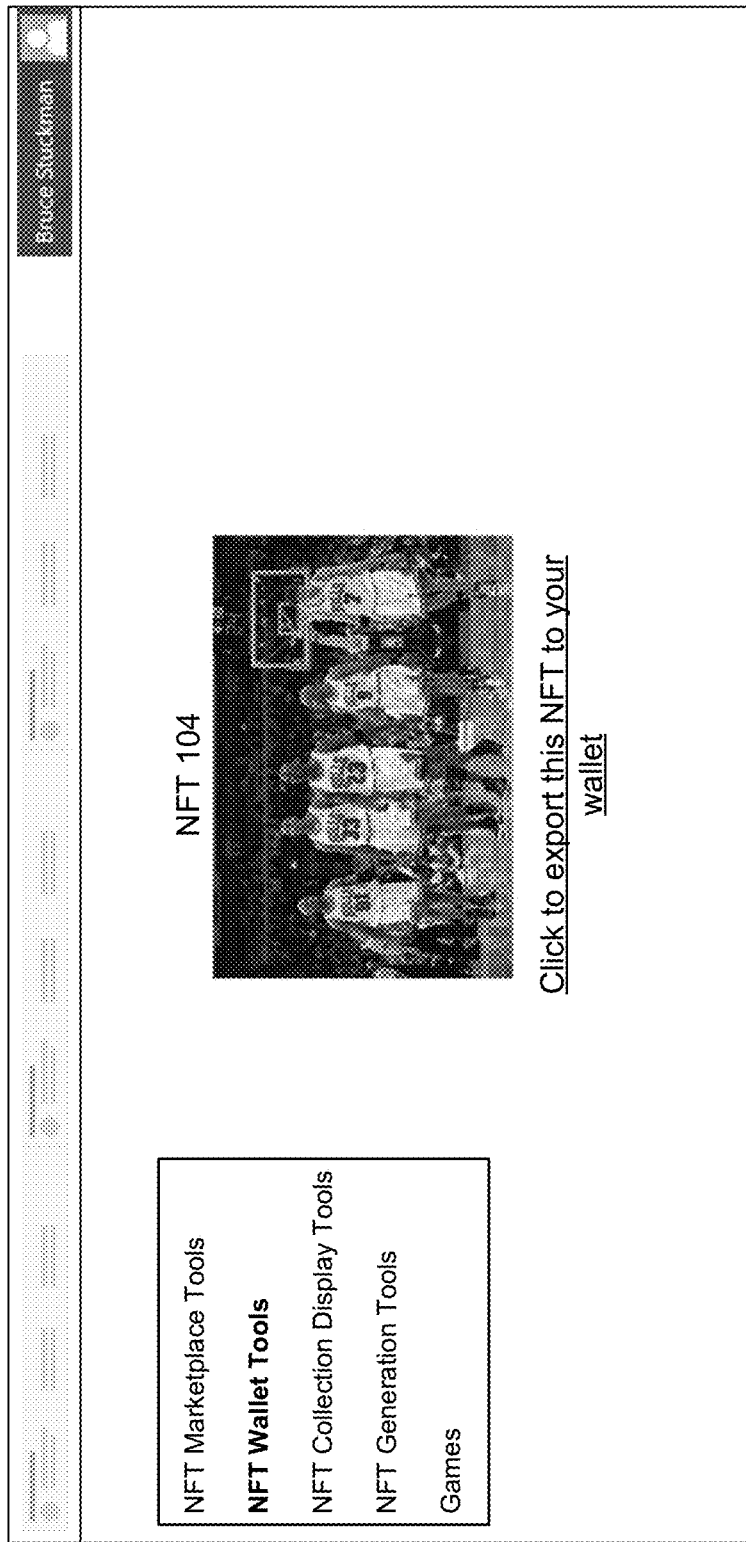
Figure 3E:
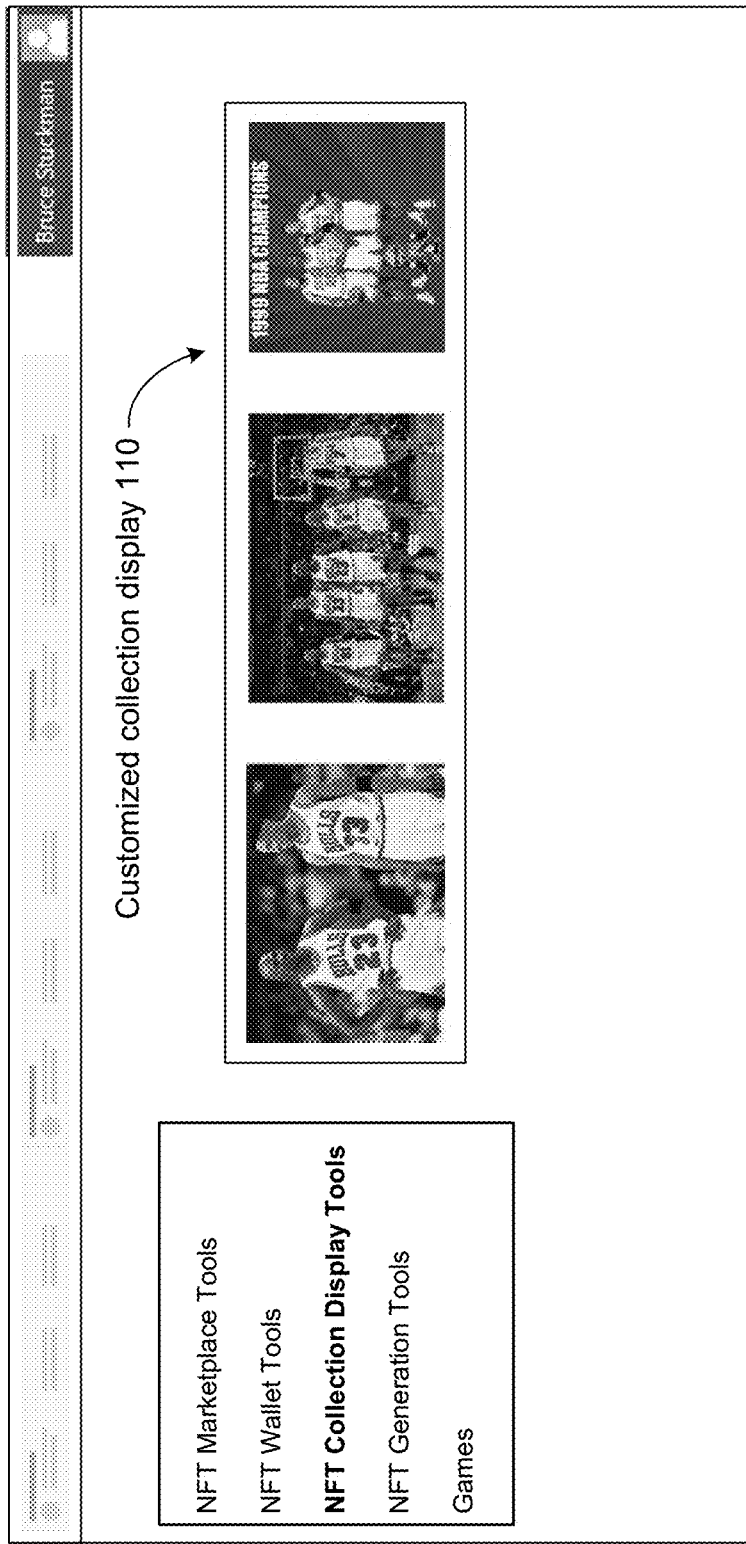

In FIG. 3C, the user has interacted with the NFT marketplace tools, such as NFT marketplace tools 804, to select a new NFT 104 for purchase via an NFT marketplace such as NFT marketplace 822. In FIG. 3D, the wallet tools are used again, this time to export the NFT 104 to the user's wallet. In FIG. 3E, the user has selected and used NFT collection display tools, such as NFT collection display tools 810, to create a customized collection display 110 contain all three 1999 Chicago Bulls-related NFTs he now owns. In the example shown, the user has "dragged and dropped" NFTs he owns in a custom display window and has sized and arranged them into the particular collage that is shown. In other examples, the NFT collection display tools 810 can operate, based on metadata associated with the NFTs of a user indicating content, theme, color themes, subject matter, dates of creation, authorship, ownership, prior ownership, number of prior owners, size, resolution, and other NFT information and metadata, to automatically generate arrangements of custom collection display 110 that may be accepted by the user and/or that may be further arranged by the user to create the final customized collection display 110.

Figure 3F:
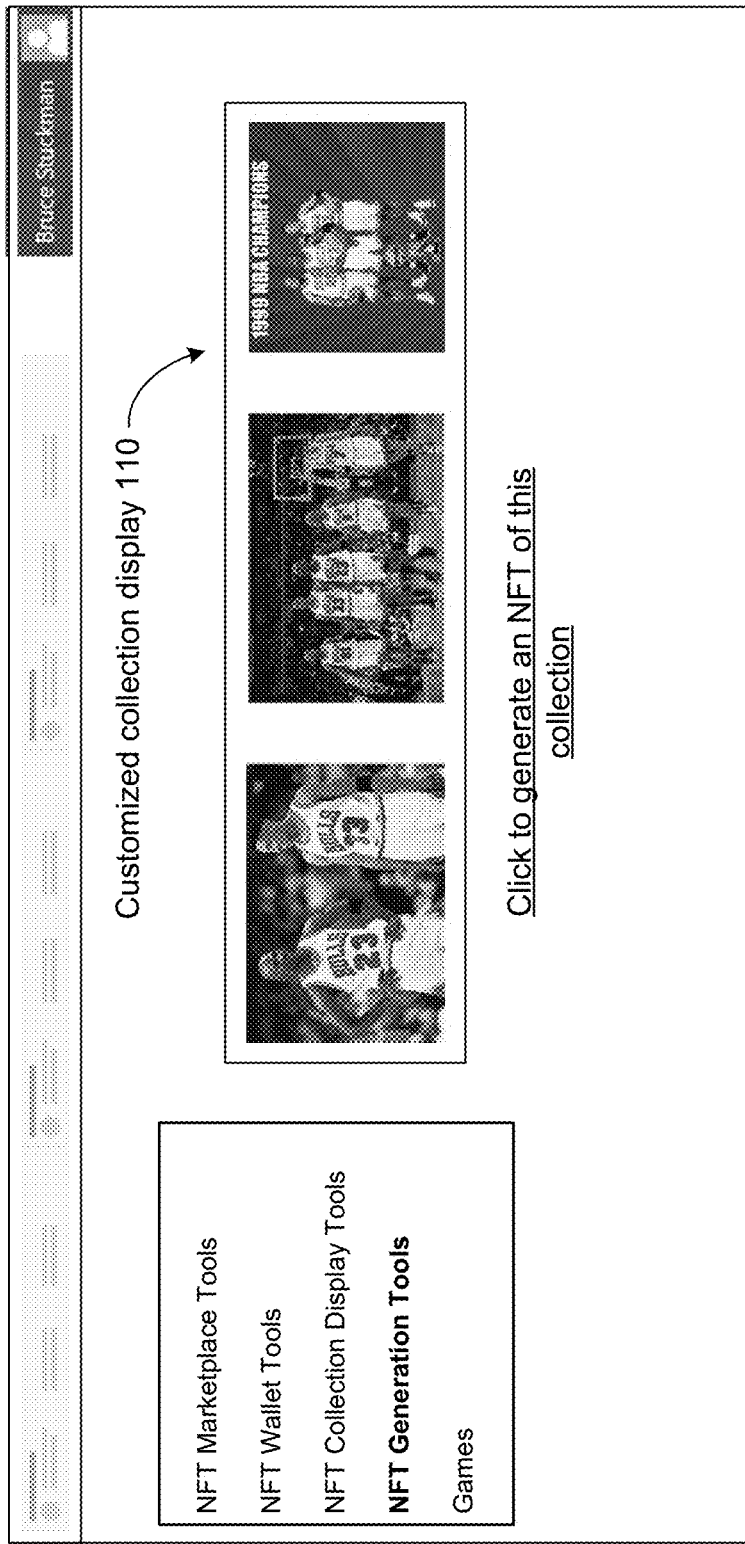

In FIG. 3F, the user has selected NFT generation tools, such as NFT generation tools 808, in order to facilitate, via NFT creation system 824 for example, the creation of a collection NFT from the customized collection display 110.

Figure 3G:
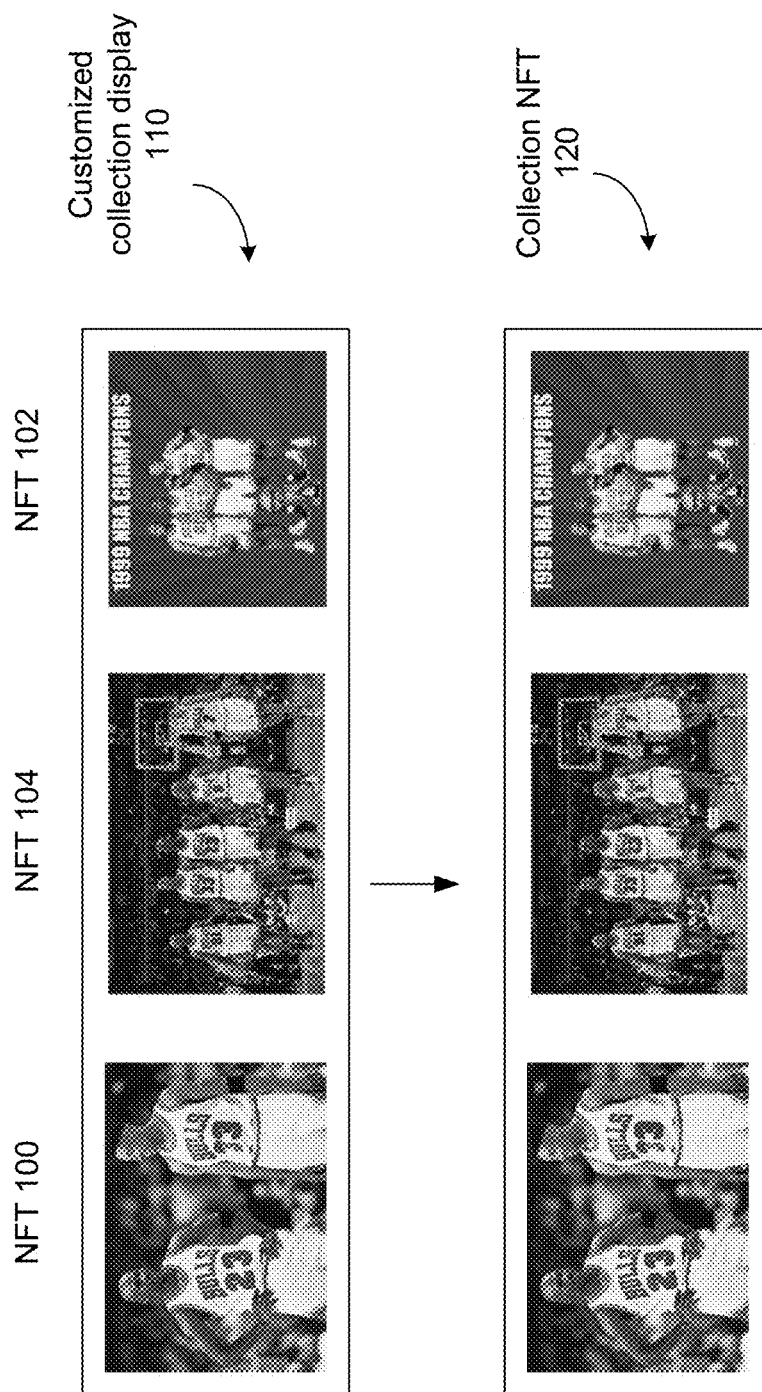
FIG. 3G presents a flow diagram representation of an example process.
Figure 3H:
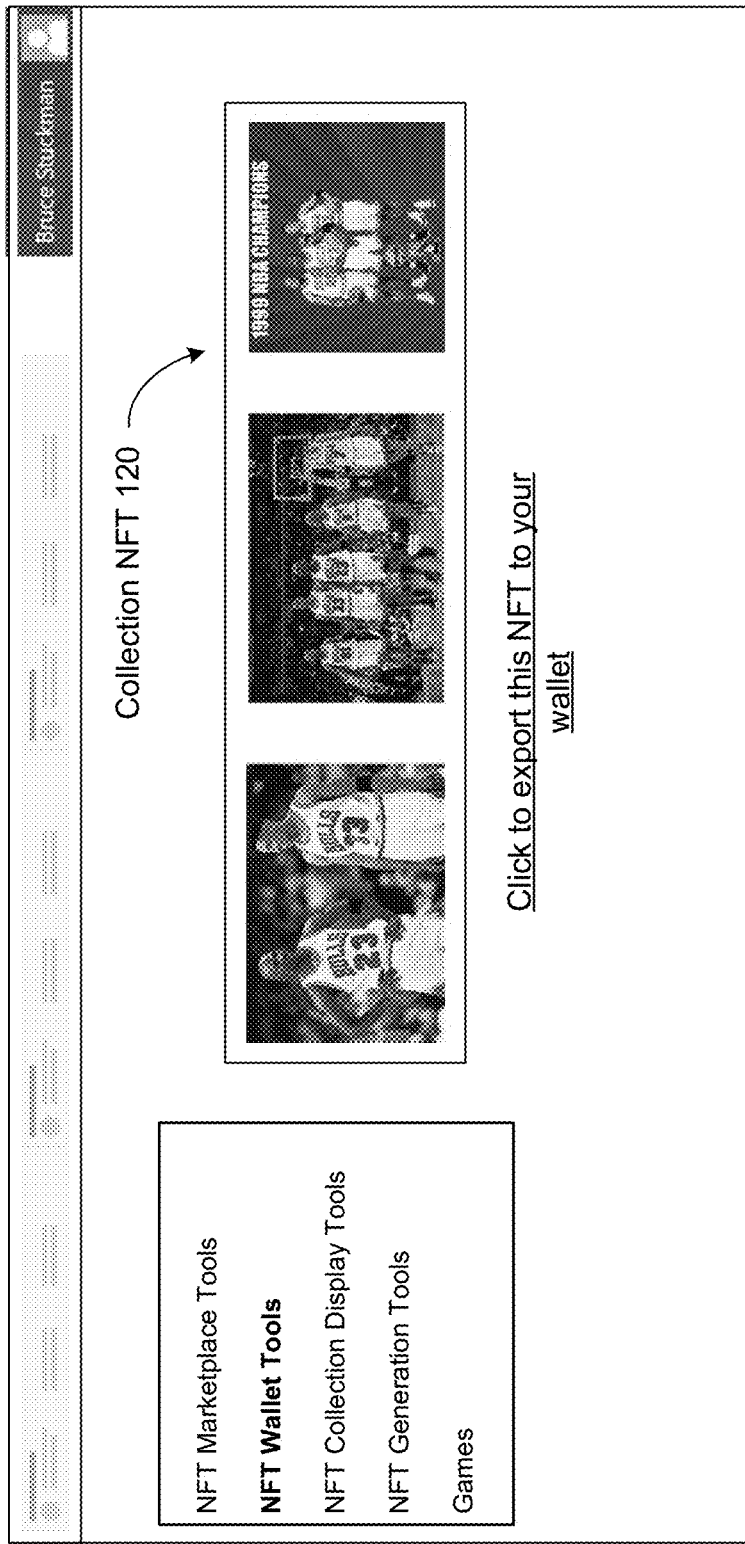

FIG. 3G presents a flow diagram representation of an example process. In the example shown, the collection NFT 120 is created from the customized collection display 110. As previously discussed, the NFT generation tools can operate by, for example, first authenticating the user's rights in the three NFTs and then creating, via NFT creation system 824, a new NFT of the unique customized image with its own blockchain authentication. In various examples, the collection NFT 120 can contain metadata indicating, for example attributions to the sources of the original NFTs in the collection, the creator of the collection NFT, a date of creation, promotion data and coupons related to offers, privileges and/or discounts, title data with respect to title to tangible or intangible real or personal property, warrant data with respect to tangible or intangible real or personal property, transaction data regarding one or more transactions, and/or other metadata. This metadata can be protected via the blockchain and/or other crypto-based NFT creation technology that is employed to create and protect the collection NFT itself—with or without associated image data. In FIG. 3H, the wallet tools are used again, this time to export the collection NFT 120 to the user's wallet.

FIG. 3I presents a flowchart representation of an example method in accordance with various examples. In particular, a method 310 is presented for use in conjunction with any of the functions and features described herein for generating a collection NFT based on NFTs in a user's collection.

Step 312 includes importing, via a network interface, a plurality of NFTs associated with the user of the client device. Step 314 includes generating, via a processor and in response to metadata associated with the plurality of NFTs, display data associated with a customized collection display that contains the plurality of NFTs. Step 316 includes sending, via the network interface, the display data associated with the customized collection display via the client device of the user. Step 318 includes facilitating creation of a collection NFT corresponding to the customized collection display that contains the plurality of NFTs.

FIG. 4A presents a flowchart representation of an example method. In particular, a method 400 for use in conjunction with any of the functions and features described herein in generating a collection NFT based on at least one NFT accessed via a temporary micro-loan.

Step 402 includes facilitating, via a processor and in response to user interactions with the graphical user interface, a temporary micro-loan of at least one NFT. Step 404 includes generating, via the processor and in response to user interactions with the graphical user interface, display data associated with a customized collection display that contains a plurality of NFTs including the at least one NFT. Step 406 includes sending, via the network interface, the display data associated with the customized collection display via the client device of the user. Step 408 includes facilitating creation of a collection NFT corresponding to the customized collection display that contains the plurality of NFTs including the at least one NFT.

Figure 4B:
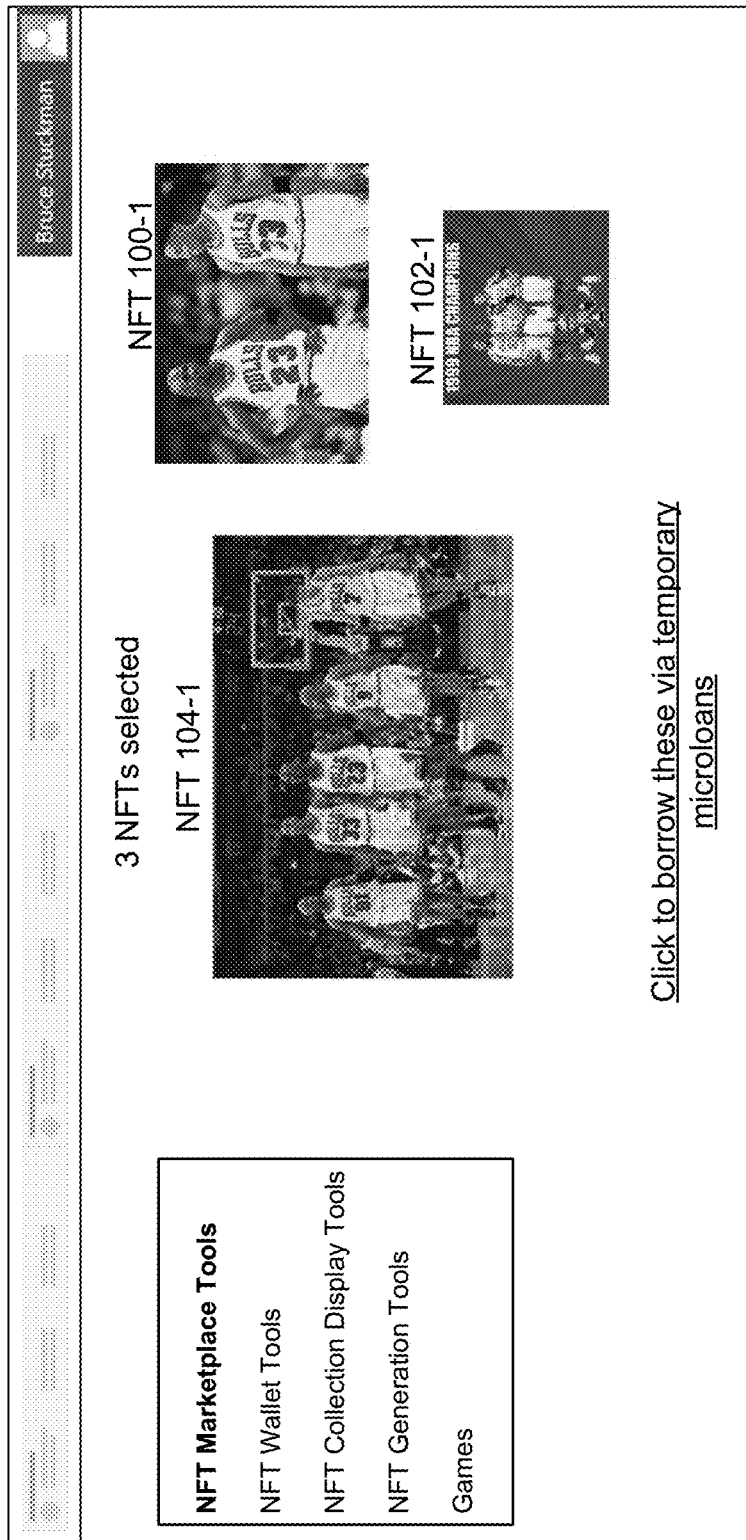
FIG. 4B presents a pictorial representation of an example screen display.

FIG. 4B presents a pictorial representation of an example screen display. In particular, the user has used the marketplace tools to select NFTs 100-1, 102-1, and 104-1. Instead of putting these NFTs up for purchase, the original owners have made them available for temporary micro-loan. This process allows the users can engage to, in exchange for a fee, "borrow" NFTs in order to create a collection NFT. After the Collection NFT is created, or upon the expiration of some predetermined time period (such as 15 minutes, 30 minutes, an hour, a day, etc.) the micro-loaned NFT(s) are returned, expire, deleted or destroyed. Transaction fees apply, a portion of which can be credited to the original NFT owner, the author, including an upfront cost, reward-based payment based on the use and/or performance of the micro-loaned NFT etc. In the alternative, a fixed fee could be charged to the user and credited to the original NFT owner. In various examples, the NFT collection platform 800 may be configured to operate with a single user and/or within a single wallet, and/or to otherwise prohibit the sale or borrowing of micro-loaned NFTs to avoid dilution of the value of the original itself. Furthermore, original and/or derivative NFTs can include restrictions on the total number of micro-loan transactions, the number of simultaneous/contemporaneous micro-loans, restrictions on types of microloan transactions such as normal use loans, staking loans, death match loans, loans less than a predetermined length of time, loans greater than a predetermined length of time, etc.

Consider the following example where an NFT is put up for loan. The proposed loan transaction can include restrictions including an expiration time and/or date, one or N time use in creating a collection NFT or in a game, tournament or challenge, etc. Once the loan is accepted by the borrower, an additional NFT, such as a derivative NFT of the original NFT being loaned, is created on a side chain, layer 1 or 2 blockchain (or "parachain") that can be different from (and/or independent from) the blockchain used to create the original NFT. This new NFT can be created and transferred to the wallet of the borrower via a smart contract that is based on the restrictions. A cryptocurrency market can be used to fund the transaction and/or to collateralize the micro-loan. The new NFT can then be set via the smart contract to automatically expire (e.g. be deleted from the wallet, destroyed or otherwise disabled), when the restrictions are met. In this fashion, if the purpose of the micro-loan is the creation of a collection NFT, the borrowed NFT can automatically expire once the collection NFT is created. It should be noted that the collection NFT can be created via the same blockchain platform (e.g. Ethereum) used to create the original NFT (e.g. not the parachain).

Figure 4C:
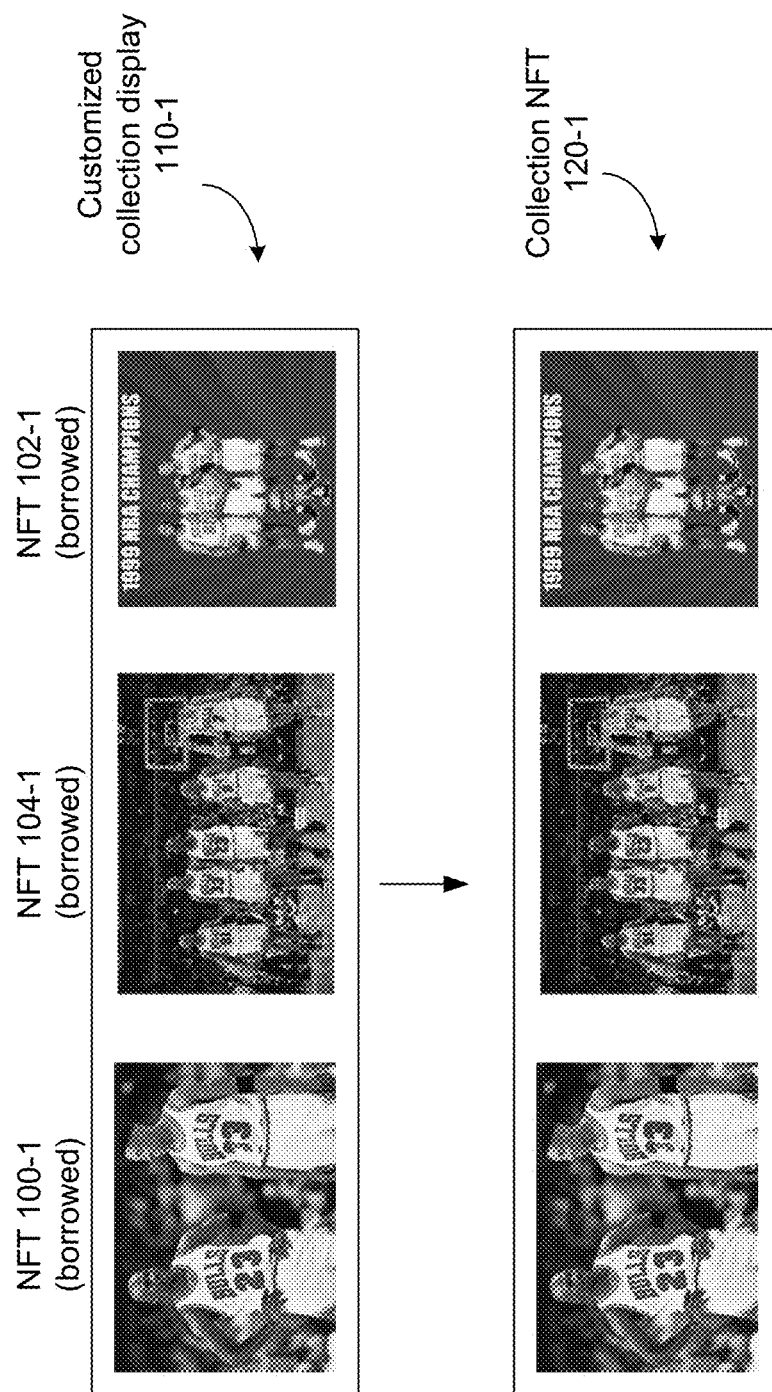
FIG. 4C presents a flow diagram representation of an example process.

FIG. 4C presents a flow diagram representation of an example process where a collection NFT 120-1 is generated based on a customized collection display 110-1 created by the user based on the borrowed NFTs 100-1, 102-1 and 104-1. In various examples, the collection NFT 120-1 metadata can also indicate the original sources of the micro-loans as well as the micro-loaned status of NFTs 100-1, 102-1 and 104-1. While not expressly shown, the collection NFTs based on one or more micro-loaned NFTs, can be created with a visual indication of the original vs. micro-loaned status of the NFTs as appropriate.

Figure 5A:
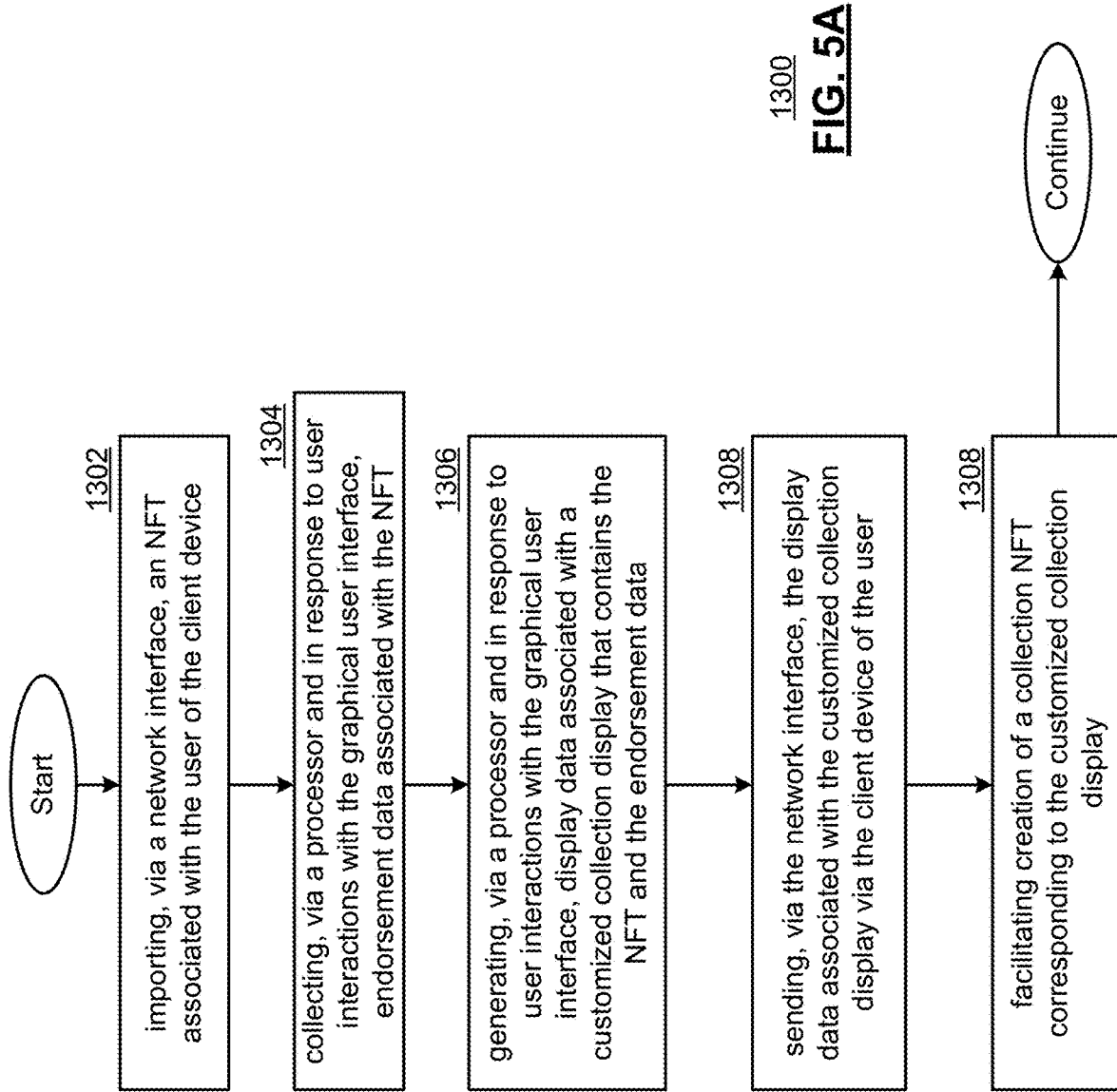
FIG. 5A presents a flowchart representation of an example method.

FIG. 5A presents a flowchart representation of an example method. In particular, a method 1300 for use in conjunction with any of the functions and features previously described facilitates the collection of endorsements associated with an NFT. Step 1302 includes importing, via a network interface, an NFT associated with the user of the client device. Step 1304 includes collecting, via a processor and in response to user interactions with the graphical user interface, endorsement data associated with the NFT. Step 1306 includes generating, via the processor and in response to user interactions with the graphical user interface, display data associated with a customized collection display that contains the NFT and the endorsement data. Step 1308 includes sending, via the network interface, the display data associated with the customized collection display via the client device of the user. Step 1310 includes facilitating creation of a collection NFT corresponding to the customized collection display.

Figure 5B:
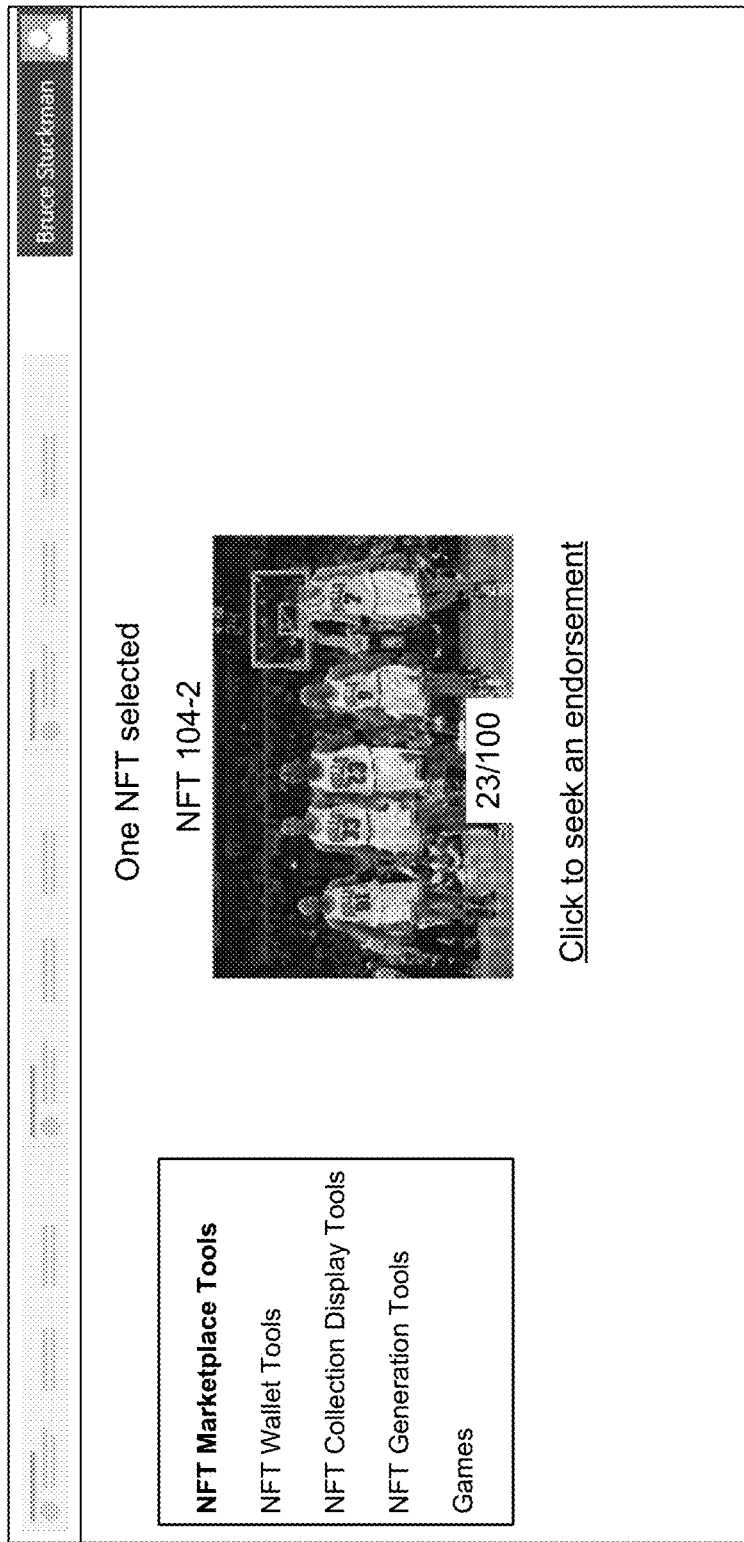
FIGS. 5B and 5C present pictorial representations of example screen displays.
Figure 5C:
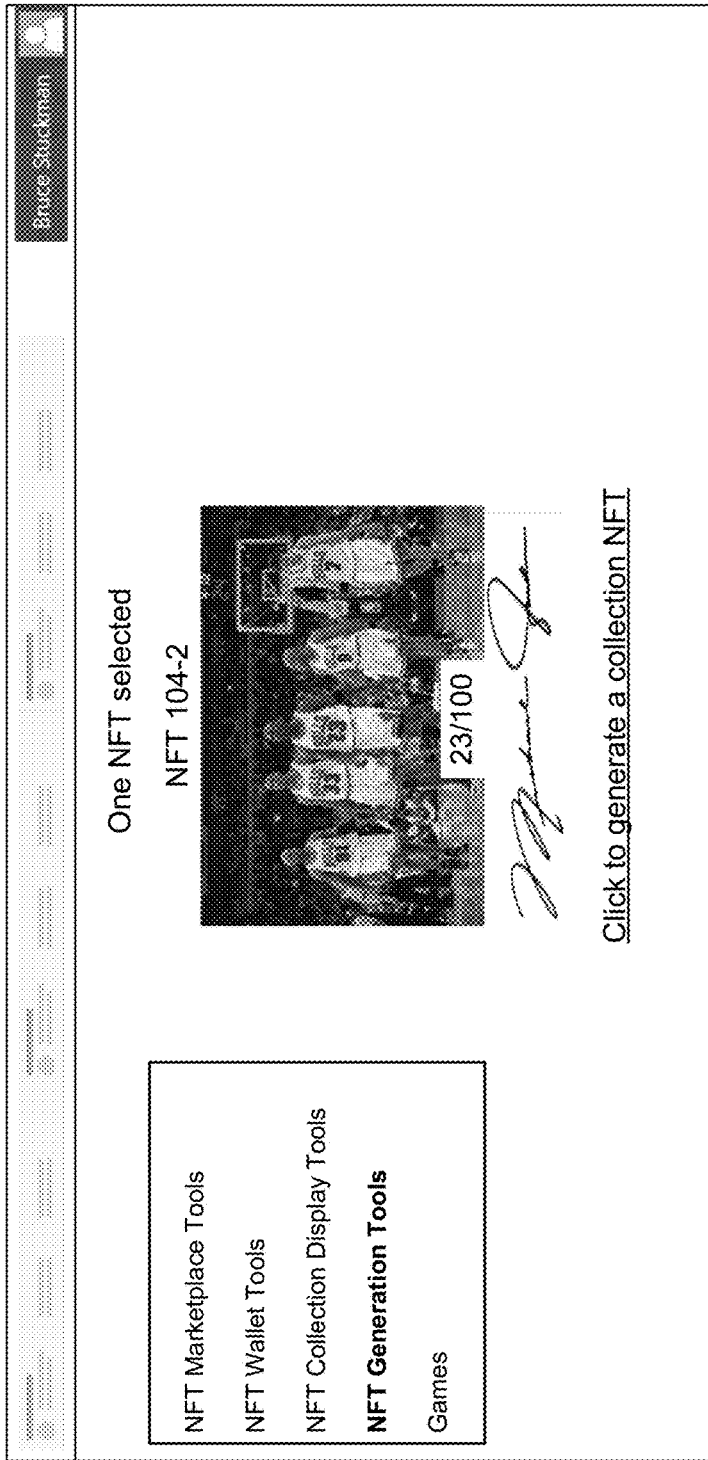

FIGS. 5B and 5C present pictorial representations of example screen displays. In FIG. 5B, the user is interacting with the graphical user interface to use the NFT marketplace tools to seek an endorsement for a selected NFT. After an endorsement in the form of a signature has been received it can be appended to the customized collection display of the NFT. In FIG. 5C, the user interacts with the NFT generation tools to generate a collection NFT that includes both the NFT and the signature. In various examples, this collection NFT 120-6 metadata can also indicate an attribution associated the endorsement itself. Furthermore, the endorsement itself can be an original NFT, a derivative NFT, a micro-loaned NFT or other NFT.

Figure 6:
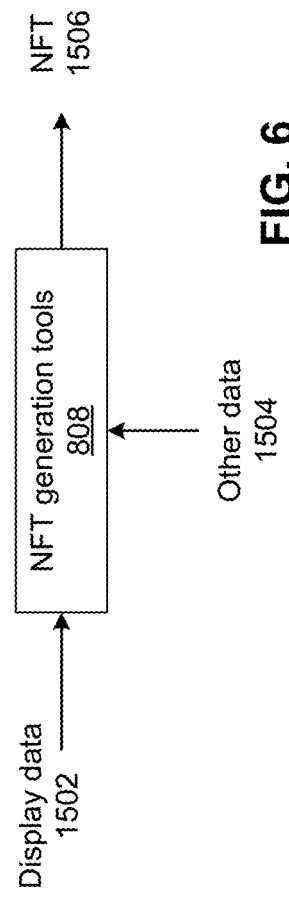
FIG. 6 presents a block diagram/flow representation of an example of NFT generation.

FIG. 6 presents a block diagram/flow representation of an example of NFT generation. In the example shown, NFT generation tools 808 operate to convert display data 1502 and other data 1504 into an NFT 1506. The display data 1502 can correspond to an original NFT, borrowed (e.g. temporary micro-loaned) NFT, a derivative NFT, a customized collection display 110, an original image, and/or other derivatives or micro-loans thereof or other display or image data. In various examples, the NFT generation tools 808 can operate to verify the credentials of any NFTs whose images are contained in the display data 1502, prior to creating the NFT 1506. In this fashion, derivative NFTs can only be created when the source NFT or NFTs are verified—preventing the creation of unauthorized or counterfeit NFTs.

The other data 1504, can be image data including signatures and other endorsement images, visual indications of derivative series, originality classification, attributions, or other image data, metadata of all kinds including metadata indicating one or more originality classifications, attributions, endorsement data, other derivative data indicating the series number and total number in a derivative series, restrictions on micro-loans or other derivatives, restrictions on derivatives with artistic effects, restrictions that derivatives must include attributions to the original source, restrictions on numbers of derivatives or micro-loans or the sizes of derivative series, restrictions on the creation of collection NFTs, the number of collection NFTs, the creation of collection NFTs including NFTs from other sources, from prohibited sources or with prohibited content, geographical restrictions, time restrictions (e.g., can be used to create derivatives or collection NFTs or can be temporarily micro-loaned for 1 month, one year, etc., other restrictions and/or other data associated with, or to be associated with, the display data 1502.

This other data 1504 can be used to generate an NFT and/or combined with the display data 1502 to create a dataset that includes both the display data 1502 and the other data 1504. This other data 1504 or combined dataset can be protected via the blockchain and/or other crypto-based NFT creation technology that is employed by the NFT generation tools 808 and via the NFT creation system 824 to create and protect the new NFT 1506 itself. It should be noted that the NFT 1506 can include a single derivative or a number of derivatives, including a limited series of derivatives. It should be noted further that some or all of the other data 1504, including restriction data and/or attribution data, can be derived from one or more original NFTs whose images are associated with the display data 1502. Furthermore, some or all of the other data 1504 can be generated in response to user interactions with a graphical user interface generated in conjunction with the NFT collection platform 800.

FIG. 7 presents a block diagram representation of an example system. In particular, a system 2850 is presented that includes an NFT distribution platform 2800 that communicates with client devices 825 via a network 115. The network 115 can be the Internet or other wide area or local area network, either public or private. The client devices 825 can be computing devices associated with users, for example, buyers, sellers, collectors, game players and/or other users of NFTs.

In the example shown, the NFT distribution platform 2800 includes a client device interface 2802 for interacting with the client devices 825, NFTs 2804 to be distributed, and an operating system 2844. One or more of the NFTs 2804 can have geographical restrictions as to distribution that are either part of the NFTs themselves or have restriction data that is stored separately.

The NFT distribution platform 2800 includes a network interface 2820 such as a 3G, 4G, 5G or another cellular wireless transceiver, a Bluetooth transceiver, a WiFi transceiver, UltraWideBand transceiver, WIMAX transceiver, ZigBee transceiver or other wireless interface, a Universal Serial Bus (USB) interface, an IEEE 1394 Firewire interface, an Ethernet interface or other wired interface and/or other network card or modem for communicating for communicating via the network 115.

The NFT distribution platform 2800 also includes a processing module 2830 and memory module 2840 that stores an operating system (O/S) 2844 such as an Apple, Unix, Linux or Microsoft operating system or another operating system, the client device interface 2802, and the NFTs 2804. The O/S 2844 and the client device interface 802 each include operational instructions that, when executed by the processing module 830, cooperate to configure the processing module 830 into a special purpose device to perform the particular functions of the NFT distribution platform 2800 described herein.

The NFT distribution platform 2800 may include a user interface (UF) 2862 such as a display device, touch screen, key pad, touch pad, joy stick, thumb wheel, a mouse, one or more buttons, a speaker, a microphone, an accelerometer, gyroscope or other motion or position sensor, video camera or other interface devices that provide information to an administrator of the NFT distribution platform 2800 and that generate data in response to the administrator's interaction with NFT distribution platform 2800.

The processing module 2830 can be implemented via a single processing device or a plurality of processing devices. Such processing devices can include a microprocessor, micro-controller, digital signal processor, microcomputer, central processing unit, quantum computing device, field programmable gate array, programmable logic device, state machine, logic circuitry, analog circuitry, digital circuitry, and/or any device that manipulates signals (analog and/or digital) based on operational instructions that are stored in a memory, such as memory 2840. The memory module 2840 can include a hard disc drive or other disc drive, read-only memory, random access memory, volatile memory, non-volatile memory, static memory, dynamic memory, flash memory, cache memory, and/or any device that stores digital information. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is presented that includes a single bus 2860, other architectures are possible including additional data buses and/or direct connectivity between one or more elements. Further, the NFT distribution platform 2800 can include one or more additional elements that are not specifically shown.

For example, the client device interface 2802 can operate in conjunction with each client device 825 and via network 115 to generate a graphical user interface. This graphical user interface is based on display data generated by the NFT distribution platform 2800 in a format for display on a display device associated with the client devices 825. This graphical user interface generates input data that is received by the NFT distribution platform 2800 from the client devices 825 in response to user interaction with the graphical user interface.

In various examples, the NFT distribution platform 2800 can operate to respond to input data from client devices in the form of read requests for NFTs and geolocation data such as GPS coordinates, connection to or proximity with a network element of network 115 or other location data indicating a location of the client device 825. The NFT distribution platform 2800 sends the requested NFT(s) to the requesting client device—only when the geolocation data conforms with restriction data—for example, when the geolocation data indicates a position of the requesting client device within a limited area or proximity indicated by the restriction data.

Figure 8:
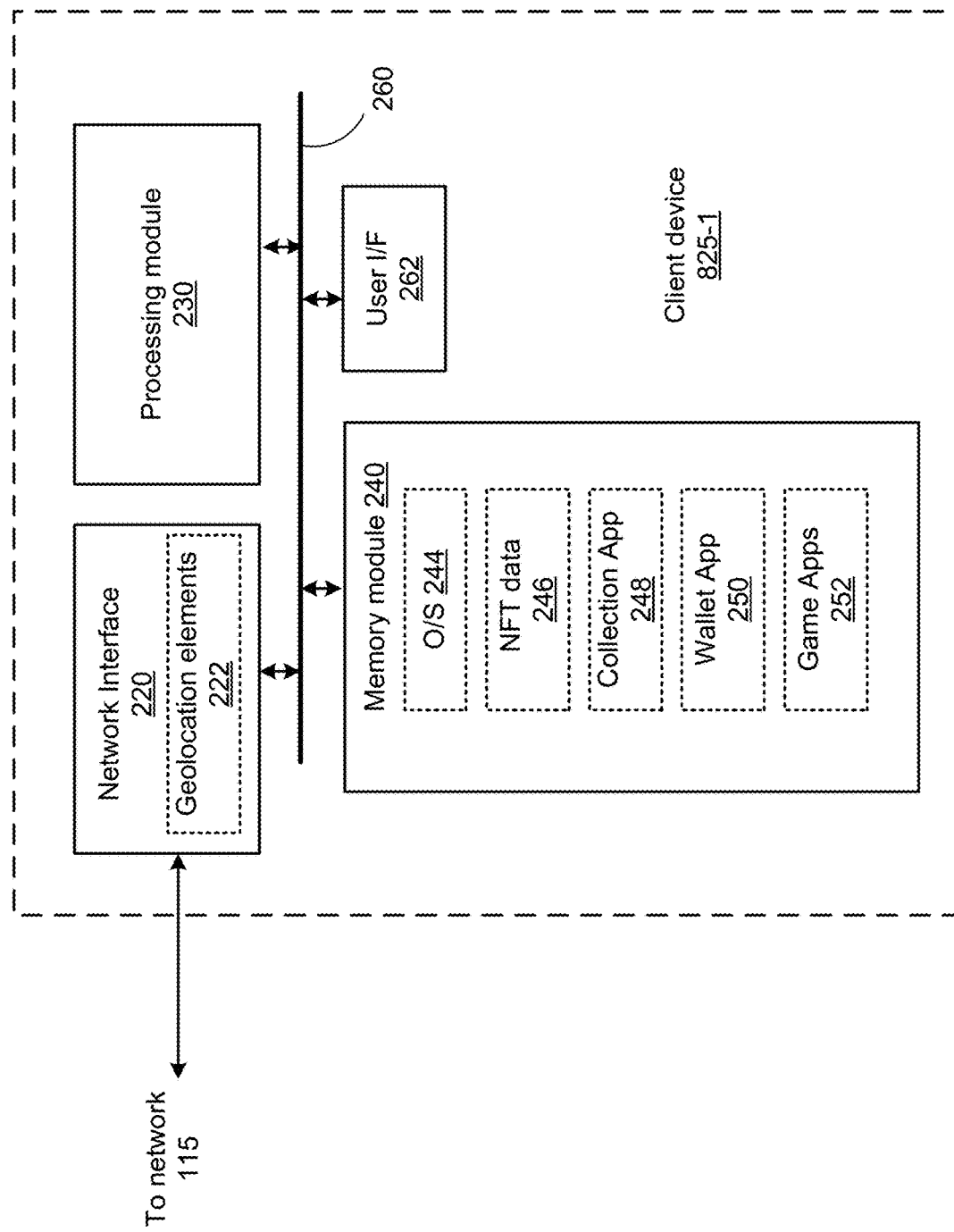
FIG. 8 presents a block diagram representation of an example client device.

FIG. 8 presents a block diagram representation of an example client device. In particular, a client device 825-1 is presented that functions similarly to client device 825, and includes several elements of client device 825 that are referred to by common reference numerals. The client device 825-1 is capable of operating to client device 825 described herein.

In addition, the memory module 240 includes a wallet application (app) 250 that is capable of engaging in financial transactions including credit card transactions and traditional digital payments, is capable of holding crypto-currency and engaging in crypto-currency transactions and is further capable of storing one or more NFTs that are either original NFTs, derivative NFTs, borrowed (temporarily micro-loaned) NFTs, collection NFTs and/or combinations thereof. In various examples, the wallet app 250 is capable of operating in conjunction with the NFT collection platform 800, the NFT distribution platform 2800, the NFT wallet system 820, the NFT marketplace 822, and/or the NFT creation system 824 via network 115.

As will be understood by one skilled in the art, unlike a normal wallet, which can physically hold cash, credit cards, etc., NFT wallets "store" NFTs by storing the NFT data necessary to access the NFT. So, even though a wallet can be said to store an NFT, technically the NFT content is stored on the blockchain, which can only be accessed via the NFT data in the wallet. This NFT data includes metadata, other off-chain data corresponding to the NFT and in particular, a private key. This private key can be considered an indicator of ownership of the NFT and is required to access the NFT via the blockchain. If the NFT data (including the private key) is lost, the NFT can no longer be accessed—and the NFT is itself "lost" for all intents and purposes, even though it remains immutably stored on the blockchain.

Also, the memory module 240 includes one or more game apps 252 that represent either stand alone games of the client device 825-1 or that operate in conjunction with the games 812 of the NFT collection platform 800 and/or interface with the NFT distribution platform 2800. This allows, for example, a user of client device 825-1 to engage in (e.g. play) games associated with NFT content, and engage in other activities that involve the acquisition, collection, display, distribution, and/or use of one or more NFTs that are either original NFTs, derivative NFTs, borrowed (temporarily micro-loaned) NFTs, collection NFTs and/or combinations thereof.

Furthermore, the network interface 220 includes one more geolocations elements 222 such as a GPS receiver, a ultra-wideband (UWB) transceiver, a Bluetooth transceiver and/or other component(s) that that facilitate the generation of geolocation data and/or facilitate other location-based services. Consider the case where the client device 825 is a smartphone or tablet and the wallet app 250 is an Apple or Android wallet or mobile wallet card that is in a Apple or Android wallet. Once the wallet app 250 is activated, NFTs can be easily added to the wallet. In addition, the wallet app 250 can access the location services of the device, and for example, generate push notifications regarding NFTs that are available near the current location.

In various examples, the geolocation data generating in such a fashion can facilitate the generation of geolocation data discussed in conjunction with the operation of NFT distribution platform 2800. In particular, the NFT distribution platform 2800 can automatically detect the presence of the user at a venue based on geolocation data received from the user's client device 825-1 and automatically prompted the user to click to send a read request. In this fashion, the user can be geo-authorized, before the request. In other examples, the NFT distribution platform 2800 can distribute NFTs to client devices 825 based on payments, authentication and/or other criteria that does not rely on geolocation data.

Furthermore, while the client device 825-1 and NFT collection platform 800 (or NFT distribution platform) are shown as separate devices that communicate via the network 115, it should be noted that any and all of the functionality attributed to the NFT collection platform 800 (or NFT distribution platform), including the NFT marketplace tools 804, NFT wallet tools 806, NFT generation tools 808, NFT collection display tools 810, games 812, and database 814, etc. can likewise be incorporate directly into the client device 825. In this fashion, a client device 825 through the application of its operating system 244 and one or more applications can provide a graphical user interface to operate via network 115 but independently from any NFT collection platform to perform any of the functions and features described herein. In particular, the client device 825 can perform the functions of both the client device and the NFT collection platform 800 without requiring communications to be sent to the client device 825 from a NFT collection platform (or NFT distribution platform) and communications sent to a NFT collection platform (or NFT distribution platform) from the client device 825.

In addition, NFT generation tools 808 can be used to protect, encrypt and/or authenticate any digital information that could be stored in the wallet app 250, including for example rewards cards, coupons, movie tickets, event tickets, boarding passes, public transit cards, student ID cards, credit cards, debit cards, prepaid cards, and loyalty cards. In addition, the functionality of the wallet app 250 can be further expanded to protect other information such as vehicle titles, warranty cards, driver's licenses and other IDs, vaccination records, prescriptions, and/or other medical records, social security cards, financial records, authentication tokens, insurance cards, passwords, user IDs and/or other images and information of a personal and/or sensitive nature. Any of these types of digital information can be protected via an NFT or other blockchain transaction in conjunction, with or without associated image or display data, and with or without metadata and/or "other data" as that term has been used herein in association with the NFT generation tools 808. FIG. 9A presents a block diagram/flow representation of an example of NFT generation.

In the example shown, an original metaverse real estate NFT 4820 corresponds to a portion/plot of real estate that is used in a game or metaverse application. An example is shown in FIG. 9B. The original metaverse real estate NFT 4820 can be purchased by the user, created or leveled-up via game play or otherwise acquired by the user of a metaverse application or game.

The NFT generation tools 808 are used to generate a derivative NFT 4824 or other metaverse real estate NFT that is based on the improvements 4822 shown in FIG. 9C. In the example shown the improvements 4822 correspond to a building or other structure, however, other real estate improvements can likewise be implemented. In various example, the derivative NFT 4824 with improvements shown in FIG. 9D can be created on a parachain or other sidechain that is different from the blockchain on which the original metaverse real estate NFT 4820 resides or the same blockchain on which the original metaverse real estate NFT 4820 resides.

FIG. 9E presents a flowchart representation of an example method. In particular, a method 4800 is presented for use in conjunction with any of the functions and features described herein. Step 4802 includes receiving, via the processor, a metaverse real estate NFT associated with metaverse real estate. Step 4804 includes receiving, via the processor, improvements data associated with the metaverse real estate. Step 4806 includes facilitating creation of a derivative NFT associated with the metaverse real estate and having improvements associated with metaverse real estate.

FIG. 10A presents a block diagram/flow representation of an example of NFT generation. In the example shown, document image data 4920 and other data corresponding to a document are used to generate an authenticated document NFT 4924 via the NFT generation tools 808. These authenticated document NFTs 4924 can be stored in an NFT wallet associated with the mobile phone or other client device associated with the user and can be used, for example, in place of coupons, cards, legal documents, medical documents, financial documents, IDs, credit cards, licenses and/or other important documents associated with a user that normally exist in non-digital, e.g. paper or plastic form. The authenticated document NFT 4924 can be used to prevent fraud and/or promote privacy in transactions via secure user and/or document authentication. In various examples, the authenticated document NFT 4924 can be presented and analyzed via secured blockchain or other crypto transactions at the time of a transaction in order to authenticate the identity of the user and/or to verify the accuracy and authentic nature of the other data 4922 and/or to facilitate the security of the transaction.

FIG. 10B presents a flowchart representation of an example method. In particular, a method 4900 is presented for use in conjunction with any of the functions and features described herein. Step 4902 includes receiving, via the processor, a document image associated with a document. Step 4904 includes receiving, via the processor, other data, wherein the other data is also associated with the document. Step 4906 includes facilitating creation of an authenticated document NFT corresponding to the document.

FIG. 11A presents a block diagram/flow representation of an example of NFT generation. The NFT generation tools 808 are used to generate a derivative NFT 5624 based on an original metaverse real estate NFT 5620 and based on the enhancement data 5622.

In the example shown in FIG. 11B, an original metaverse real estate NFT 5620 corresponds to real estate having an interior room that is used in a game or metaverse application. The original metaverse real estate NFT 5620 can be purchased by the user, created or leveled-up via game play or otherwise acquired by the user of a metaverse application or game.

The NFT generation tools 808 are used to generate a derivative NFT 5624 or other metaverse real estate NFT that is based on the enhancements data 5622 shown in FIG. 11C. In the example shown the enhancements 5622-1 and 5622-2 correspond to a Moet & Chandon vending machine and a Jackson Pollock painting that are acquired either as image data or as individual NFTs. While particular enhancements are shown, other real estate enhancements can likewise be implemented including statues and other art, rugs, lamps, furniture and other furnishings and accessories, outdoor objects, appliances, knick-knacks, machinery and other virtual objects for decorating or finishing an office, home, factory, venue or other real estate.

In the example shown in FIG. 11D, the user has placed the enhancements 5622-1 and 5622-2 as desired before creating the derivative NFT 5624. The derivative NFT 5624 with improvements shown can be created on a parachain or other sidechain that is different from the blockchain on which the original metaverse real estate NFT 5620 resides or the same blockchain on which the original metaverse real estate NFT 5620 resides.

FIG. 11E presents a flowchart representation of an example method. In particular, a method 5600 is presented for use in conjunction with any of the functions and features described herein. Step S602 includes receiving, via the processor, a metaverse real estate NFT associated with metaverse real estate. Step S604 includes receiving, via the processor, enhancement data associated with the metaverse real estate. Step S606 includes facilitating creation of a derivative NFT associated with the metaverse real estate and having enhancements associated with metaverse real estate.

Figure 12A:
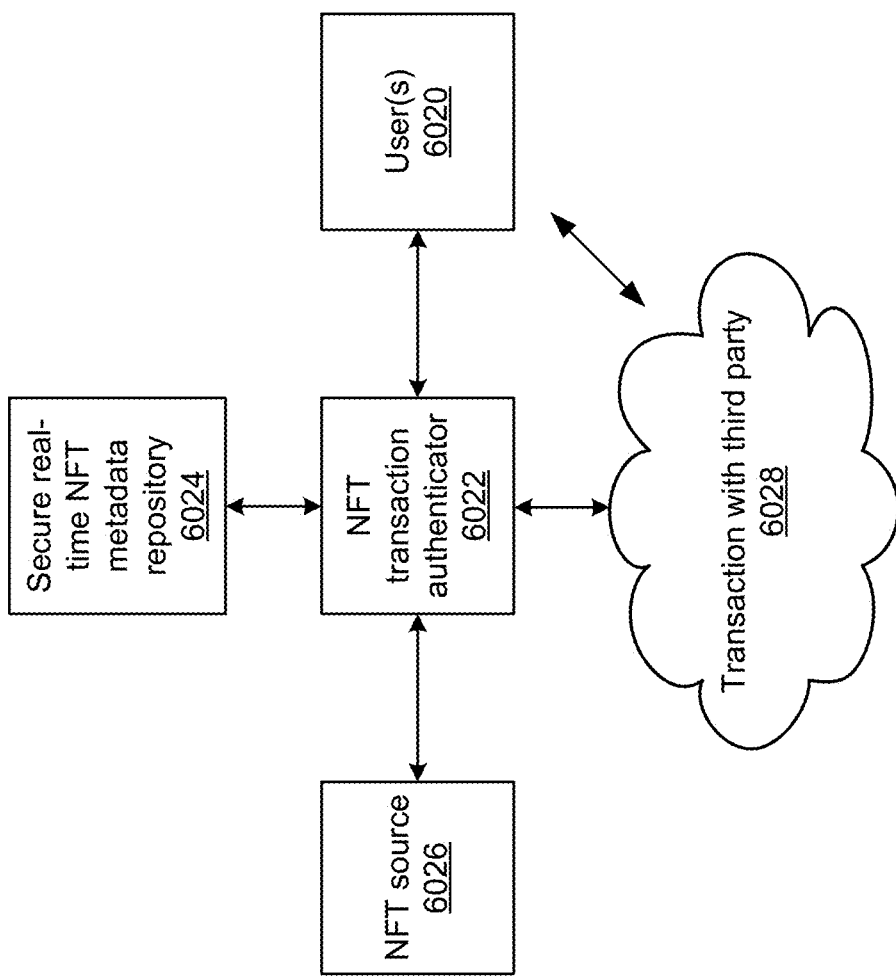
FIG. 12A presents a block diagram of an example system.

FIG. 12A presents a block diagram of an example system. In particular, a system is shown that can be implemented similarly to, or in conjunction with, NFT collection platform 800. The system includes an NFT transaction authenticator 6022 and a secure real-time NFT metadata repository 6024. In various examples, the NFT transaction authenticator 6022 and the secure real-time NFT metadata repository 6024 can be implemented via one or more modules that include a network interface, processing circuitry and memory. The secure real-time NFT metadata repository 6024 stores NFT metadata received in conjunction with NFTs created via metadata source 6026, such as one or more NFT creation systems 824. The NFTs are associated with one or more users 6020.

In operation, the NFT transaction authenticator 6022 responds to transaction requests from a user associated with an NFT to authenticate the NFT and the user and to otherwise determine the validity of the transaction that is requested. If the user and the NFT are both authenticated, and the requested transaction is otherwise permissible (e.g. not restricted by conditions on use or other transaction restrictions), then the NFT transaction authenticator 6022 responds by issuing credentials to facilitate the transaction with a third party 6028. As will be discussed herein, the maintenance and use of the secure real-time NFT metadata repository 6024 allows authentication of NFT related transactions in real-time—avoiding possible delays in performing, for example, complex blockchain transactions via an NFT source 6026 where the NFT was minted and/or otherwise maintained.

Consider the following example where an NFT is created via NFT source 6026. In addition to other NFT data, the NFT has metadata that uniquely identifies the NFT, a hash or other NFT authentication metadata that can be used to authenticate the NFT and/or transaction restriction metadata indicating possible restrictions on transactions/use conditions involving the NFT. Furthermore, when the NFT is created and/or acquired by a user, user-specific user authentication metadata is acquired or created and stored on the blockchain with the NFT with the other metadata. This user authentication metadata can include one or more passwords, answers to security questions, identifiers of recognized devices such as a device identifier of a personal cellphone, laptop, tablet, computer or other known and/or trusted device, one or more trusted networks of the user, other multifactor authentication data such as personal information, known answers to security questions, biometric data related to fingerprints, retinal scans, facial features or other biometrics of the user and/or other user authentication data that can be used to determine if a user is the owner of the NFT or otherwise an authorized user and in particular, whether or not the user is (or is not) who they claim to be.

The metadata associated with the NFT is indexed by NFT identifier and stored on the secure real-time NFT metadata repository 6024 for use by the NFT transaction authenticator 6022 in authenticating NFT-related transactions. This metadata is available from the repository on a real-time basis (e.g., is available with an acceptable amount of latency associated with a corresponding transaction). The metadata in the secure real-time NFT metadata repository 6024 is also synced periodically with the NFT via the NFT source 6026 to reflect any changes in the NFT itself. While some metadata, such as an NFT identifier, NFT authentication metadata and/or transaction restriction metadata may be made accessible to the user who holds the NFT, in various examples, the user authentication metadata in particular, can be encrypted in such a fashion that is decryptable by the secure real-time NFT metadata repository 6024—but not by the user. In various examples, the secure real-time NFT metadata repository 6024 lacks a general network connection and is connected to the NFT transaction authenticator 6022 via a dedicated and/or otherwise secured connection or is otherwise walled-off from other network connections of the NFT transaction authenticator 6022. This helps prevent unauthorized tampering with the sensitive data stored therein.

When a user 6020 proposes an NFT-related transaction, the NFT transaction authenticator 6022 collects from the user as part of the transaction request (a) an identifier of the NFT, and NFT authentication data corresponding to the NFT (b) user authentication data user, and (c) information on the proposed transaction. The NFT transaction authenticator 6022 determines whether or not the identifier corresponds to a valid NFT. If so, it retrieves the metadata associated with the NFT from secure real-time NFT metadata repository 6024. The NFT transaction authenticator 6022 authenticates the NFT by comparing the NFT authentication data to the NFT authentication metadata to determine if they match. The NFT transaction authenticator 6022 can also authenticate the user 6020 to the NFT by comparing the user authentication data to the user authentication metadata to determine if they match. If authentication succeeds, the NFT transaction authenticator 6022 facilitates the transaction with the third party 6028 by authorizing completion of the transaction, e.g. by issuing a credential to the third party

6028. The credential can include any message, object, or data structure that vouches for the identity of the user, the authenticity of the NFT and/or the validity of the transaction, through some method of security, trust and/or authentication.

In this fashion, the NFT transaction authenticator 6022 can authenticate transactions such as access to a flight via a driver's license or passport NFT, sale of a vehicle, real estate via a title NFT, a credit, debit or gift card transaction via a credit, debit or gift card NFT, the sale of a stock or bond via a stock or bond certificate NFT, warranty transactions via a warranty card NFT, access to events via venue ticket NFTs and/or vaccination card NFTs, coupon redemption via a coupon NFT, access to a vehicle, dwelling or office via a key NFT, etc. Furthermore, the NFT transaction authenticator 6022 can authenticate transactions such as sales and/or micro-loans of NFTs itself.

It should be noted that some NFTs are conditional, e.g. that have restrictions on their use and/or the transactions that are permitted. Depending on the type of transaction, the NFT transaction authenticator 6022 can also operate to compare transaction data received from the user to transaction restrictions metadata to determine if a transaction is permitted—before it is authorized. In this fashion, a credit, debit or gift card transaction can be halted if an expiration date or transaction limit has been exceeded. A warranty transaction can be halted if the warranty has expired. A key access for a pool, gym or office can be halted based on date, day of week or time of day restrictions, etc.

Furthermore, in sales transactions and/or micro-loans that have been authorized, the NFT transaction authenticator 6022 can also operate to note the pending sale or micro-loan in the secure real-time NFT metadata repository 6024 or otherwise place a hold on the NFT to prevent another sales or micro-loan until the repository is updated in a future sync with the NFT source 6026. Furthermore, in some cases the NFT corresponds to an expendable asset such as a venue ticket, gift card, coupon, etc. The NFT transaction authenticator 6022 can also operate to determine that the NFT is expended, based on the transaction restrictions metadata and the transaction data. In response to such a determination, NFT transaction authenticator 6022 can then update the secure real-time NFT metadata repository to indicate the NFT is expended. In any of these cases above, the secure real-time NFT metadata repository may facilitate updating of the NFT source 6026 to reflect an authorized transaction via notifications and/or that an NFT has been expended.

FIG. 12B presents a flowchart representation of an example method. In particular, a method 6000-4 is presented for use in conjunction with any of the functions and features described herein. Step 6002-4 includes receiving, at the processor, a transaction request from a user associated with an NFT minted via a blockchain, wherein the transaction request includes NFT identification data identifying the NFT, NFT authentication data, user identification data and transaction data associated with the transaction. Step 6004-4 includes receiving, from a secure real-time NFT metadata repository and in response to the NFT identification data, NFT authentication metadata for authenticating the NFT, user authentication metadata for authenticating an authorized user of the NFT, and transaction restrictions data associated with the NFT, wherein the secure real-time NFT metadata repository is separate from the blockchain. Step 6006-4 includes determining, via the processor, that the NFT is authenticated when the NFT authentication data compares favorably to the NFT authentication metadata. Step 6008-4 includes determining, via the processor, that the user is authenticated when the user authentication metadata compares favorably to the user identification data. Step 6010-4 includes determining, via the processor, that the transaction is authorized when the transaction restrictions metadata compares favorably to the transaction data. Step 6012-4 includes generating credentials data to facilitate the transaction when the NFT is authenticated, the user is authenticated and the transaction is authorized.

Figure 12C:
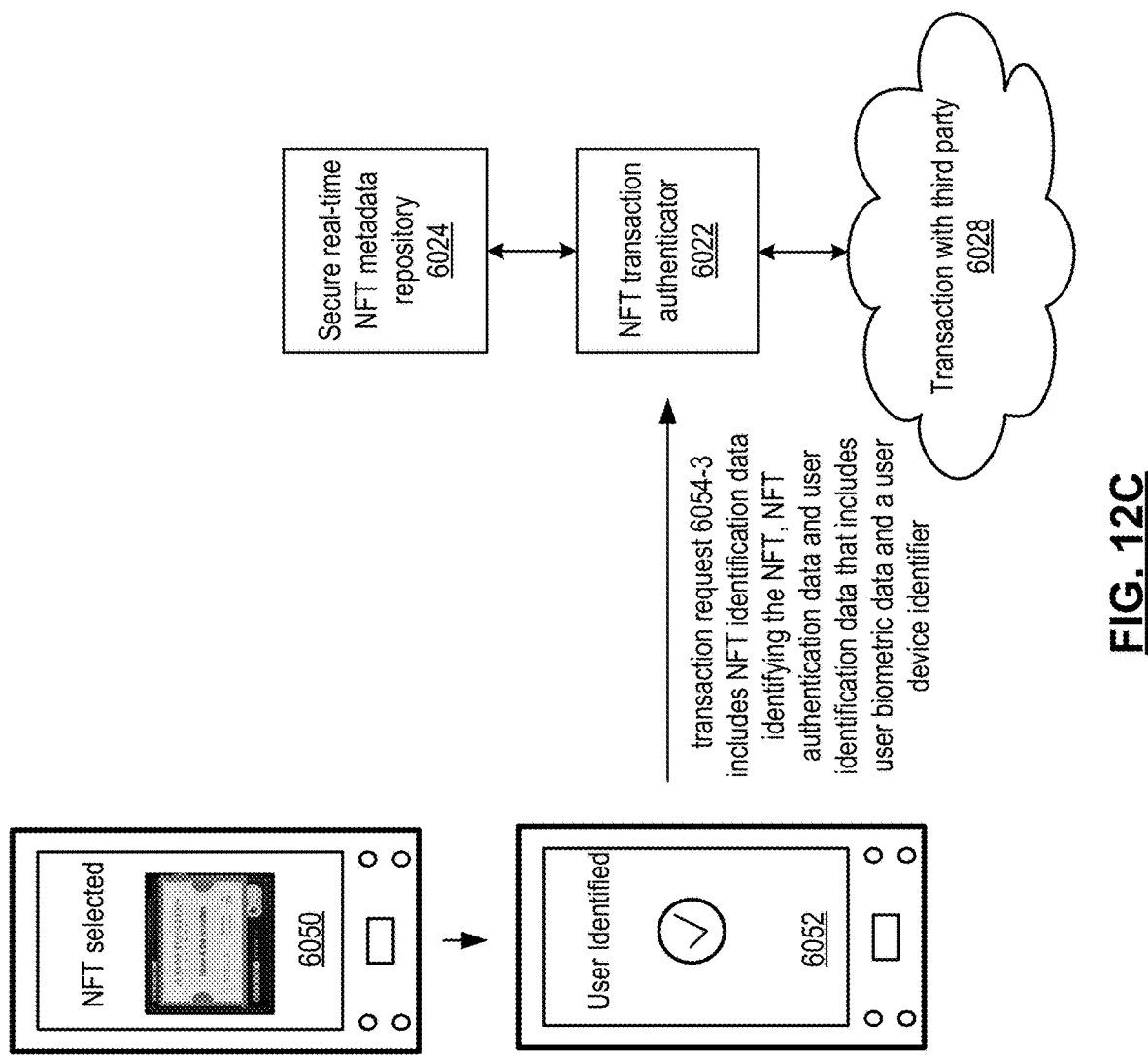
FIG. 12C presents a pictorial block diagram/flow representation of an example of transaction authentication.

FIG. 12C presents a pictorial block diagram/flow representation of a further example of transaction authentication. In this case, the transaction request 6054-1 includes NFT identification data identifying the NFT, NFT authentication data, and also user identification data that includes both a user device identifier and user biometric data that was collected via the client device 825 as part of its own user authentication process.

Again, the NFT transaction authenticator 6022 can in operate in conjunction with the secure real-time NFT metadata repository 6024 for example, to authenticate the transaction with the third party 6028. In this additional case, the user authentication mechanisms of the client device are used in the transaction of the authentication process. Once the user is identified by a trusted device, the device identifier of the trusted device can be in combination with the user biometrics collected by that device to provide further security for the proposed transaction.

FIG. 12D presents a flowchart representation of an example method. In particular, a method 6000-10 is presented for use in conjunction with any of the functions and features described herein. Step 6002-10 includes receiving, at the processor, a transaction request from a user associated with an NFT minted via a blockchain, wherein the transaction request includes NFT identification data identifying the NFT, NFT authentication data and user identification data that includes a user device identifier. Step 6004-10 includes receiving, from a secure real-time NFT metadata repository and in response to the NFT identification data, NFT authentication metadata for authenticating the NFT and user authentication metadata for authenticating an authorized user of the NFT, wherein the secure real-time NFT metadata repository is separate from the blockchain.

Step 6006-10 includes determining, via the processor, that the NFT is authenticated when the NFT authentication data compares favorably to the NFT authentication metadata. Step 6008-10 includes determining, via the processor, that the user is authenticated when the user authentication metadata compares favorably to the user identification data. Step 6010-10 includes generating credentials data to facilitate the transaction when the NFT is authenticated and the user is authenticated.

Figure 13A:
FIG. 13A presents a pictorial representation of an example NFT.

In FIG. 13A, an NFT includes (e.g. that has associated content stored on-chain or off-chain) corresponding to a playable version (e.g. a game application, game binary, game data, etc.) of an electronic game (or more simply, a "game"), such as an online game, cloud-based game, a game application for a mobile device, a video game playable on a game console or personal computer and this is rendered on a streaming platform, in the cloud, or locally at the client device itself. The electronic game can be a metaverse game or other metaverse experience, a single player game, a multiplayer game, an action/adventure game, a real-time strategy game, a shooter game, a multiplayer online battle arena, a role-playing game, simulation or sports game, a puzzle, party game and/or other game.

In various examples, the NFT includes (e.g. that has associated content stored on-chain or off-chain) corresponding to a game application having playable game data such as graphics files, game status information, executable code or other instructions that operate in conjunction with a platform and/or a client device to execute the play of the game itself. Furthermore, the NFT may include authentication data with respect to a user that "owns" the game NFT and this particular copy of the game and entitles the user or other holder of the NFT to play the game and other metadata and other data as discussed herein. In the example shown, the game NFT includes metadata that indicates that this copy corresponds to a special collector's edition of the game and, in particular, one of a limited series release of NFTs corresponding to one of the first 10,000 copies of the game and/or game NFT.

While described above as a "game NFT", such an NFT can have any of the metadata, other data, and/or operate similarly to any of the other types of NFTs corresponding to videos, images, documents, game pieces, game characters, metaverse features, and/or other objects, etc. that are described herein.

Figure 13B:
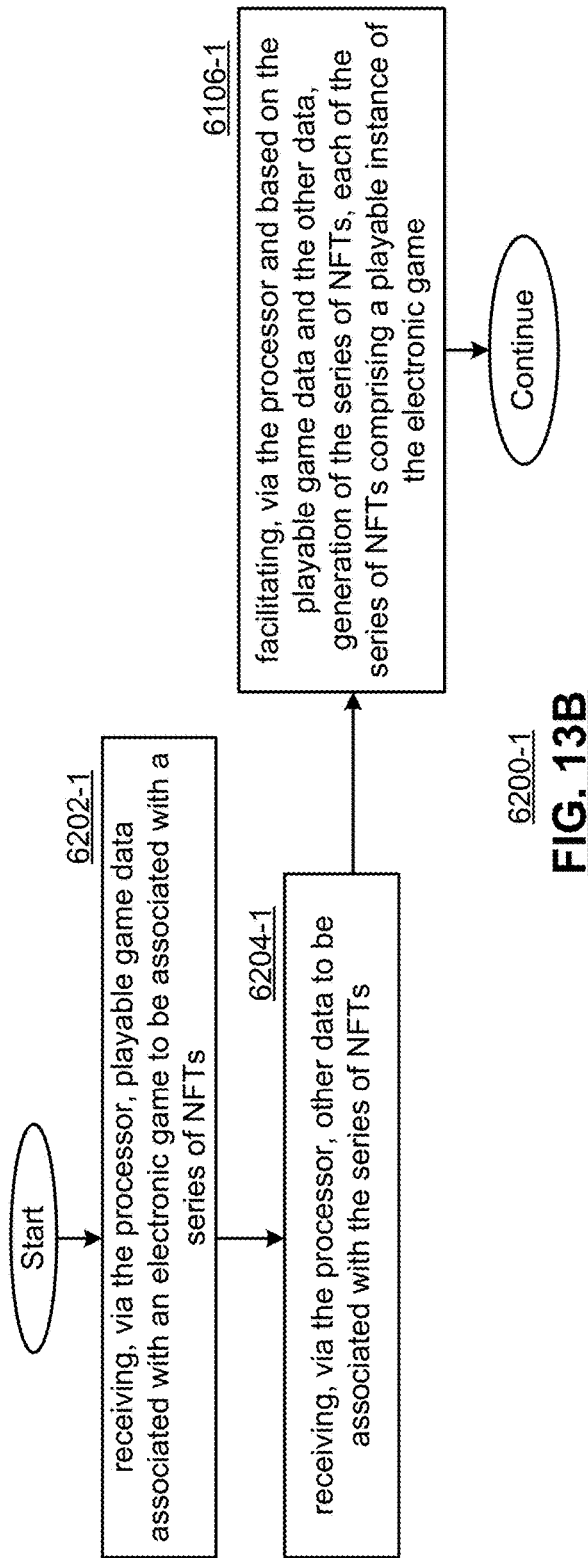
FIG. 13B presents a flowchart representation of an example method.

FIG. 13B presents a flowchart representation of an example method. In particular, a method 6200-1 is presented for use in conjunction with any of the functions and features described herein. Step 6202-1 includes receiving, via the processor, playable game data associated with an electronic game to be associated with a series of NFTs. Step 6204-1 includes receiving, via the processor, other data to be associated with the series of NFTs. Step 6206-1 includes facilitating, via the processor and based on the playable game data and the other data, generation of the series of NFTs, each of the series of NFTs comprising a playable instance of the electronic game.

Figure 13C:
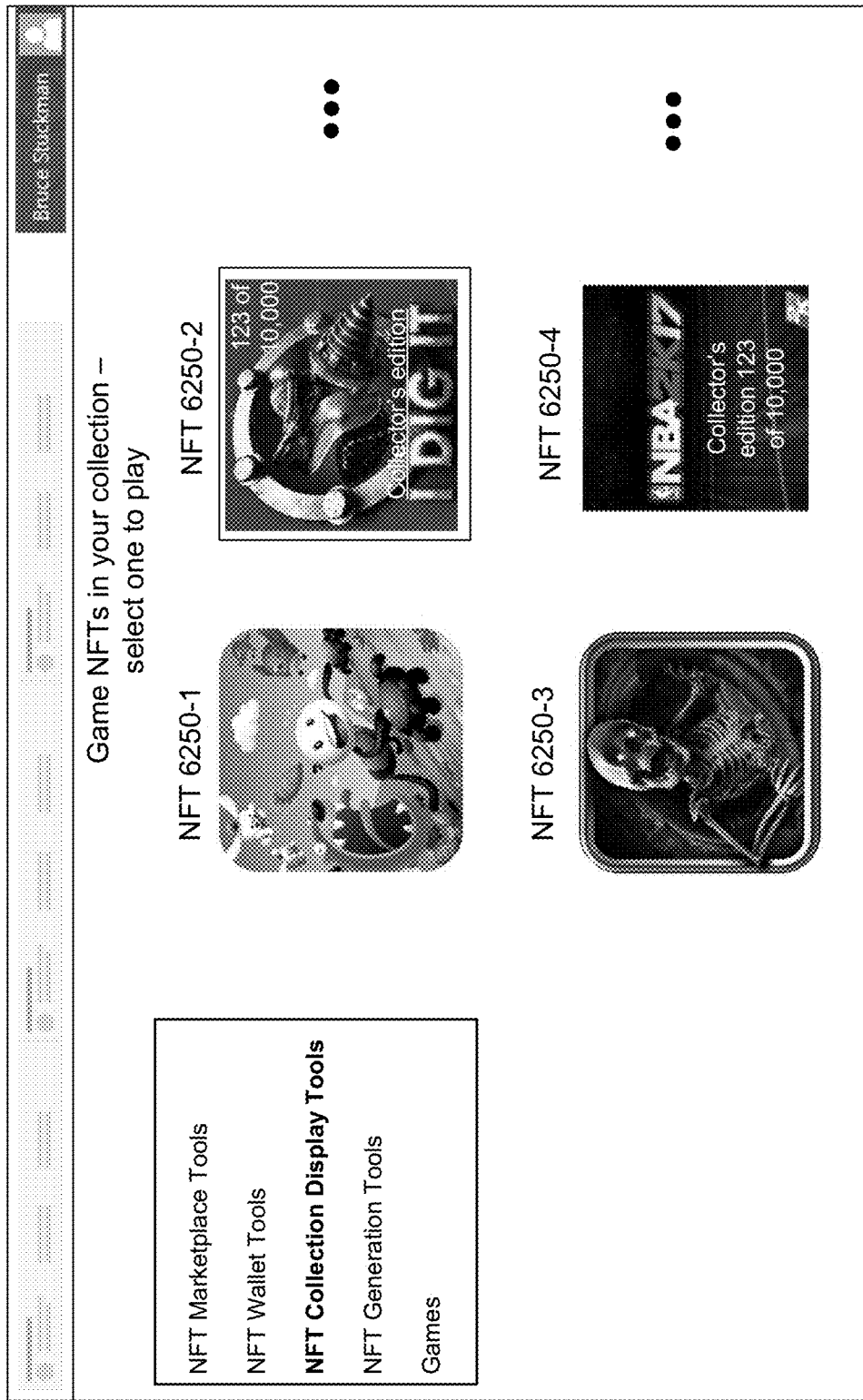
FIG. 13C presents a pictorial representation of an example screen display.

FIG. 13C presents a pictorial representation of an example screen display. In the example shown, a user of an NFT game platform has accessed, via a client device associated with the user such as client device 825, a plurality of game NFTs associated with the user. The NFT game platform can be implemented via NFT collection platform 800, NFT distribution platform 2800, and/or other NFT platform that can include or operate in conjunction with NFT transaction authenticator 6022, NFT source 6026, secure real-time NFT metadata repository 6024, NFT wallet system 820, NFT marketplace 822, NFT creation system 824, and/or other tools, devices and systems described herein.

In this case, the user's collection of game NFTs includes NFTs 4150-1, 4150-2, 4150-3, and 4150-4, etc. In various embodiments the collection display can be arranged by the user or automatically sorted into categories such as genre's or other groupings based on metadata associated with each of the NFTs.

Figure 13D:
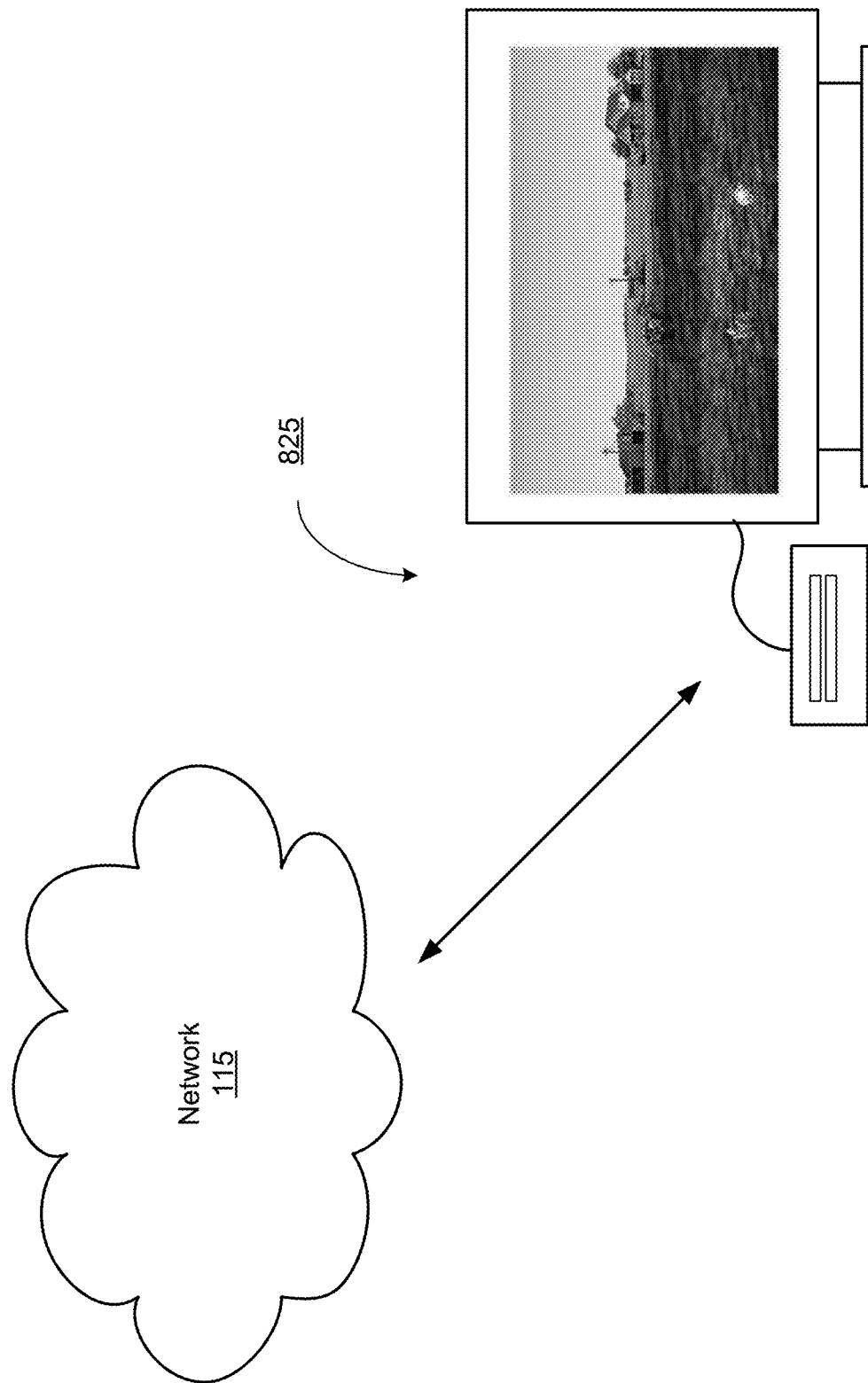
FIG. 13D presents a pictorial/block diagram representation of an example system with screen display.

In the screen display shown, the platform has generated display data associated with a customized collection display that contains the plurality of game NFTs for display via a graphical user interface associated with the client device. Furthermore, the user has interacted with the graphical user interface and indicated a selection of one the plurality of game NFTs for play—in this case, the game "I Dig It". The selection is received by the platform which responds by interacting, via the network 115, with a client device 825 to support play of the selected game by the user—as shown in FIG. 13D. This support can include streaming game video to, and receiving game input from, the client device 625 via the network 115.

The NFT collection platform 800 and/or associated client device improves the technology of NFT systems and existing gaming platforms by allowing the user to generate, store, collect, display and use game NFTs that include playable content. The use of NFTs in association with playable game content allows users to "own" playable versions of games that can be streamed to a user's client device, to own and trade collectable limited game edition NFTs, to loan authenticated versions of games for the play of others, and/or to authenticate the user's ownership in the game and the game NFT.

Figure 13E:
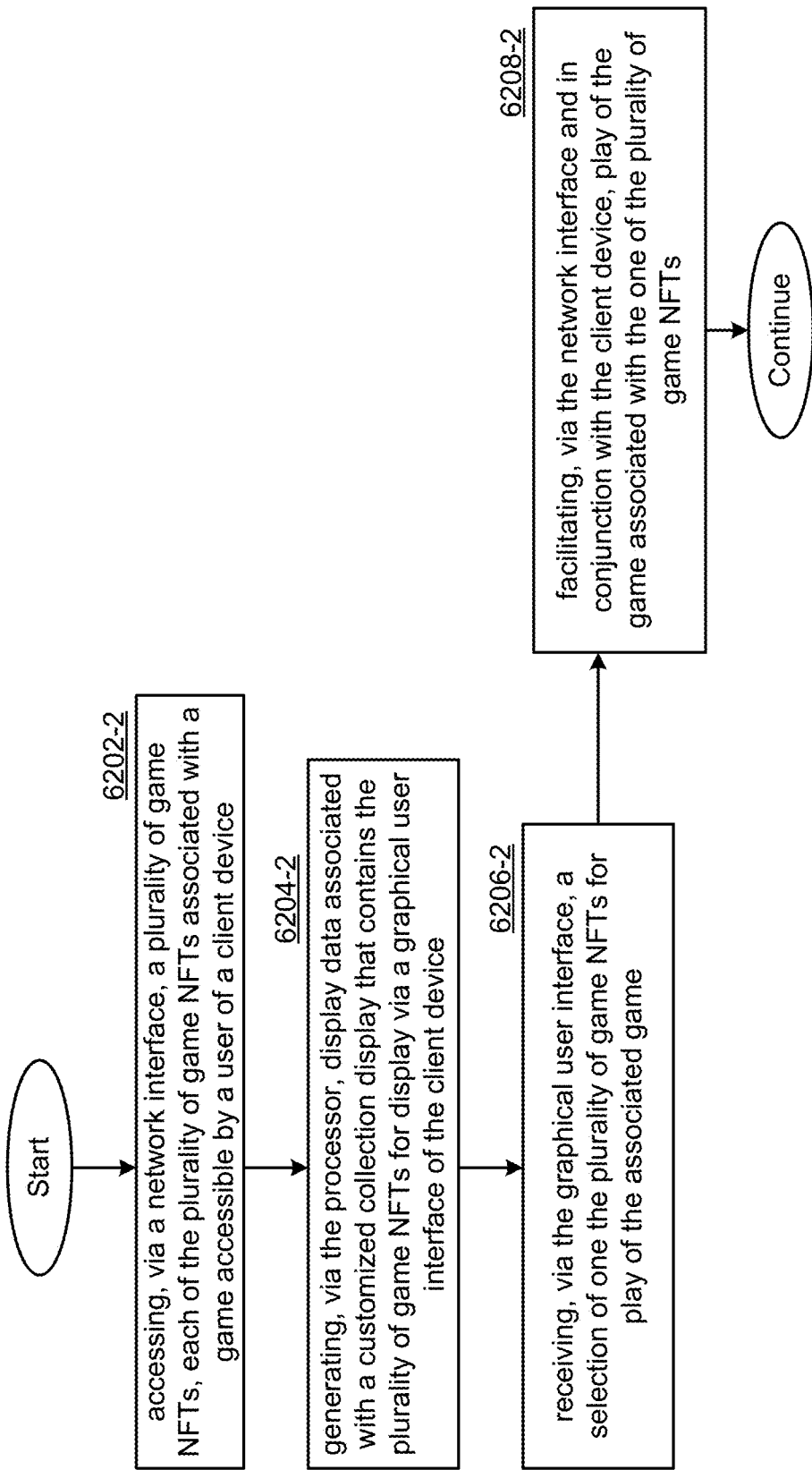
FIG. 13E presents a flowchart representation of an example method.

FIG. 13E presents a flowchart representation of an example method. In particular, a method 6200-2 is presented for use in conjunction with any of the functions and features described herein. Step 6202-2 includes accessing, via a network interface, a plurality of game NFTs, each of the plurality of game NFTs associated with a game accessible by a user of a client device. Step 6204-2 includes generating, via the processor, display data associated with a customized collection display that contains the plurality of game NFTs for display via a graphical user interface.

Step 6206-2 receiving, via the graphical user interface, a selection of one the plurality of game NFTs for play of the associated game. Step 6208-2 includes facilitating, via the network interface and in conjunction with the client device, play of the game associated with the one of the plurality of game NFTs.

FIG. 13F presents a block diagram/flow representation of an example of NFT generation. In particular, game data 6226 has been collected in association with the user's (player's) play of a game corresponding to game NFT 6220. At some time, such as the end of a game, when a player reaches certain goals or achievements in the game, upon expiration of a predetermined time period, upon accumulation of a predetermined amount of game play (e.g. a number of games played, an amount of play time, etc.) or other criteria, the game data 6226 is used to generate an update to the game NFT 6220 as the updated game NFT 6220-1. In this fashion, the player's game play and/or performance and achievements can be used to update the game NFT so that a player can pick up where he/she left off, have a mechanism to display some of the performance/achievements in conjunction with the game NFT itself.

As used herein, the term "updated" NFT can be used to represent changes that are made to an original NFT—i.e. the NFT that is the subject of the update. In addition, an "updated" NFT can be a new NFT, such as a derivative NFT, an all new NFT or other NFT that is minted based on the content, images, metadata and/or other data or based merely on the existence of the original NFT. This new NFT can be minted on the original blockchain used to mint the original NFT or via a parachain/side chain that is different from the original blockchain.

In FIG. 13G, an example of Game NFT 6220 corresponding to an NBA game is presented. In FIG. 13H, game data 6226 is generated based on the player's play of the game and used to generate an updated game NFT 6220-1. In the example shown, updated game NFT 6220-1 visually reflects that the player has reached the "one-star" level.

Figure 13I:
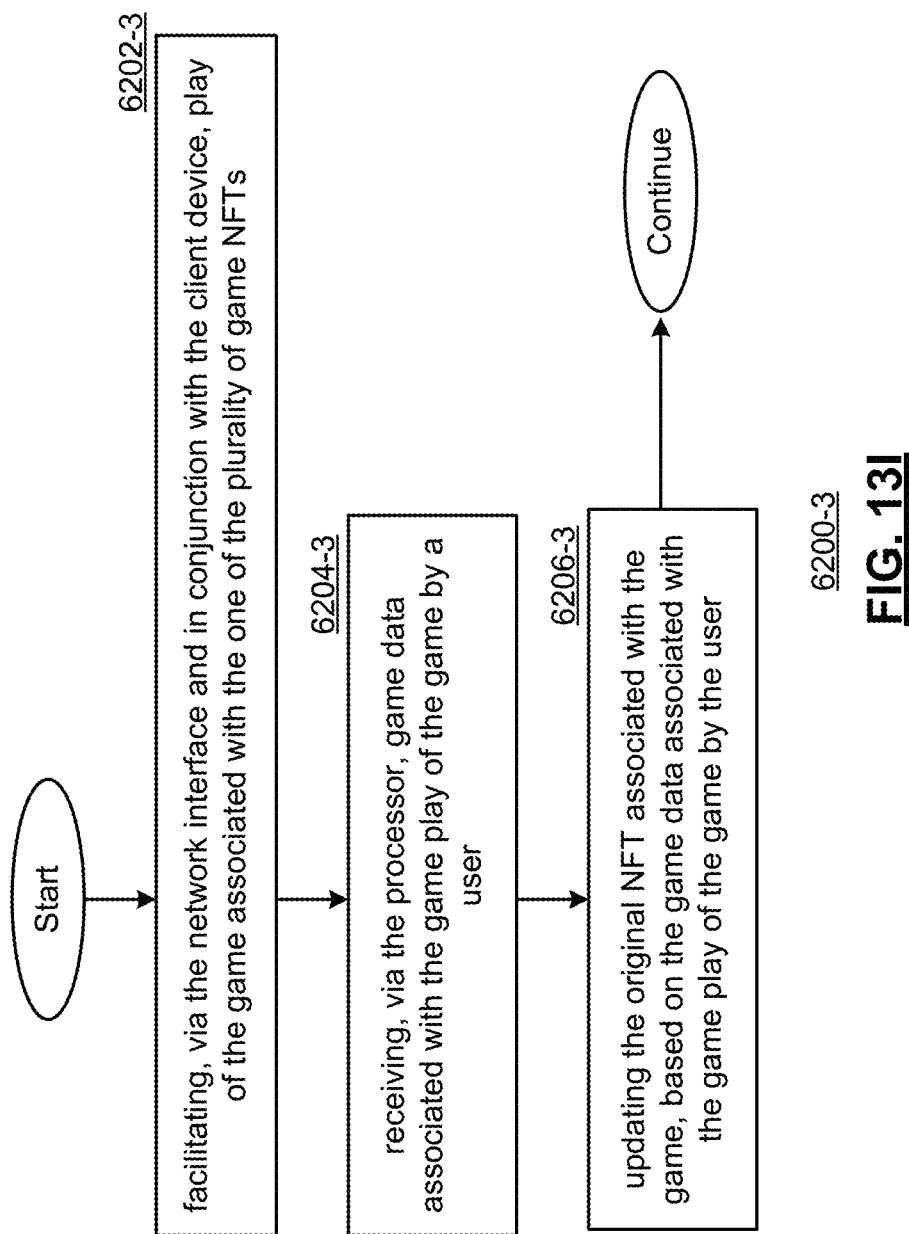
FIG. 13I presents a flowchart representation of an example method.

FIG. 13I presents a flowchart representation of an example method. In particular, a method 6200-3 is presented for use in conjunction with any of the functions and features described herein. Step 6202-3 includes facilitating, via the network interface and in conjunction with the client device, play of the game associated with the one of the plurality of game NFTs. Step 6204-3 includes receiving, via the processor, game data associated with the game play of the game by a user. Step 6206-3 includes updating the original NFT associated with the game piece, based on the game data associated with the game play of the game by the user.

Figure 13K:
FIG. 13K presents a pictorial representation of an example derivative NFT.
Figure 13M:
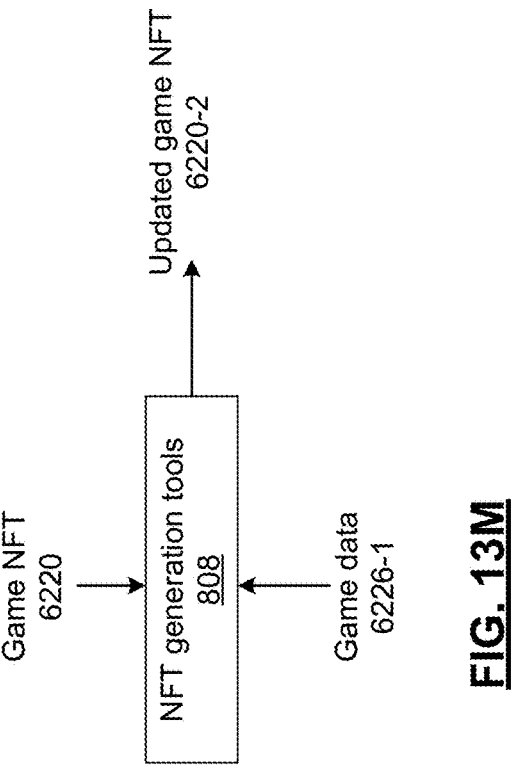
FIG. 13M presents a block diagram/flow representation of an example of NFT generation.
Figure 13J:
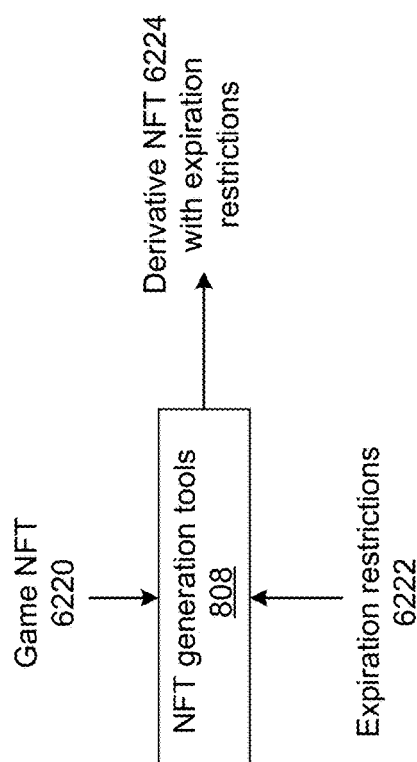
FIG. 13J presents a block diagram/flow representation of an example of NFT generation.

FIG. 13J presents a block diagram/flow representation of an example of NFT generation. In the example shown, NFT generation tools 808 are used to generate a derivative NFT 6224 based on the expiration restrictions 6222 that is shown in FIG. 13K. The expiration restrictions can correspond to, for example, an expiration time and/or date, one or N time use in a game, tournament or challenge, etc. This derivative NFT 6224 can be created on a parachain or other sidechain that is different from the blockchain on which the original game NFT 6220 resides. Furthermore, this derivative NFT 6224 can be micro-loaned or otherwise leased or loaned to another user for game play—subject to the expiration restrictions. In this fashion, for example, other users can play the game in exchange for a price (payment, bounty, experience, etc.).

Figure 13L:
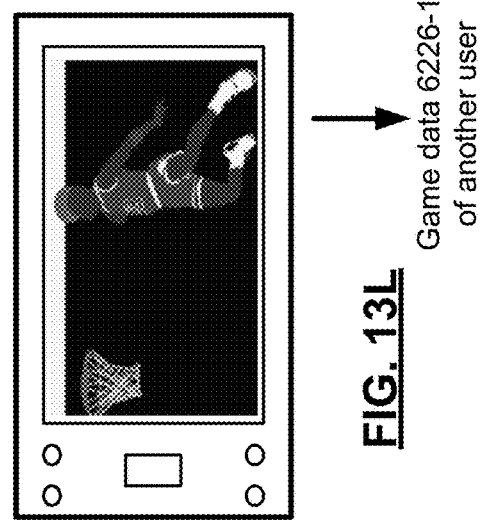
FIG. 13L presents a pictorial representation of an example client device.

In FIG. 13L, the derivative NFT 6224 has been temporarily loaned to another user who plays the game. At the end of the loan (e.g. when the expiration restrictions are met) the loaned game is automatically deleted, destroyed, disabled or otherwise "burned" and game data 6226 indicating the end of the escrow, stats and experience or other game performance metrics earned by the other user via the game are retrieved and can be stored by the user on the blockchain or other decentralized computer network with the original NFT 6220 to generate updated NFT 6220', as shown in FIG. 13M.

FIG. 13N presents a flowchart representation of an example method. In particular, a method 6200-4 is presented for use in conjunction with any of the functions and features described herein. Step 6202-4 includes facilitating, via the processor, creation of a derivative NFT corresponding to an original NFT associated with a game the derivative NFT having expiration restrictions limiting game play of the game. Step 6204-4 includes facilitating, via the processor, a micro-loan transaction of the derivative NFT to another user to facilitate the game play of the game by the other user, wherein the derivative NFT expires when the expiration restrictions are met.

Figure 13O:
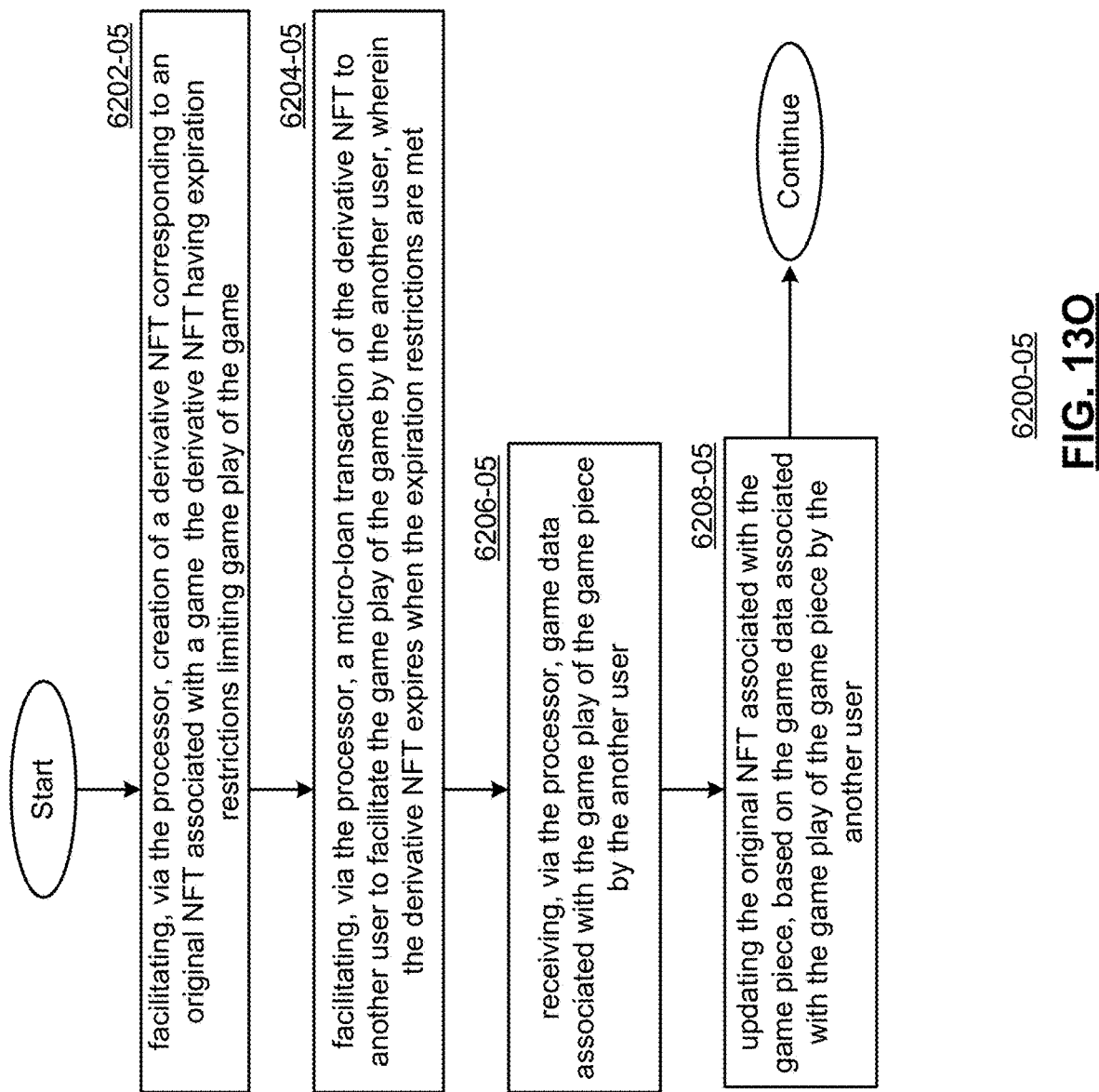
FIG. 13O presents a flowchart representation of an example method.

FIG. 13O presents a flowchart representation of an example method. In particular, a method 6200-5 is presented for use in conjunction with any of the functions and features described herein. Step 6202-5 includes facilitating, via the processor, creation of a derivative NFT corresponding to an original NFT associated with a game the derivative NFT having expiration restrictions limiting game play of the game. Step 6204-5 includes facilitating, via the processor, a micro-loan transaction of the derivative NFT to another user to facilitate the game play of the game by the another user, wherein the derivative NFT expires when the expiration restrictions are met. Step 6206-5 includes receiving, via the processor, game data associated with the game play of the game piece by the another user. Step 6208-5 includes updating the original NFT associated with the game piece, based on the game data associated with the game play of the game piece by the other user.

Figure 13P:
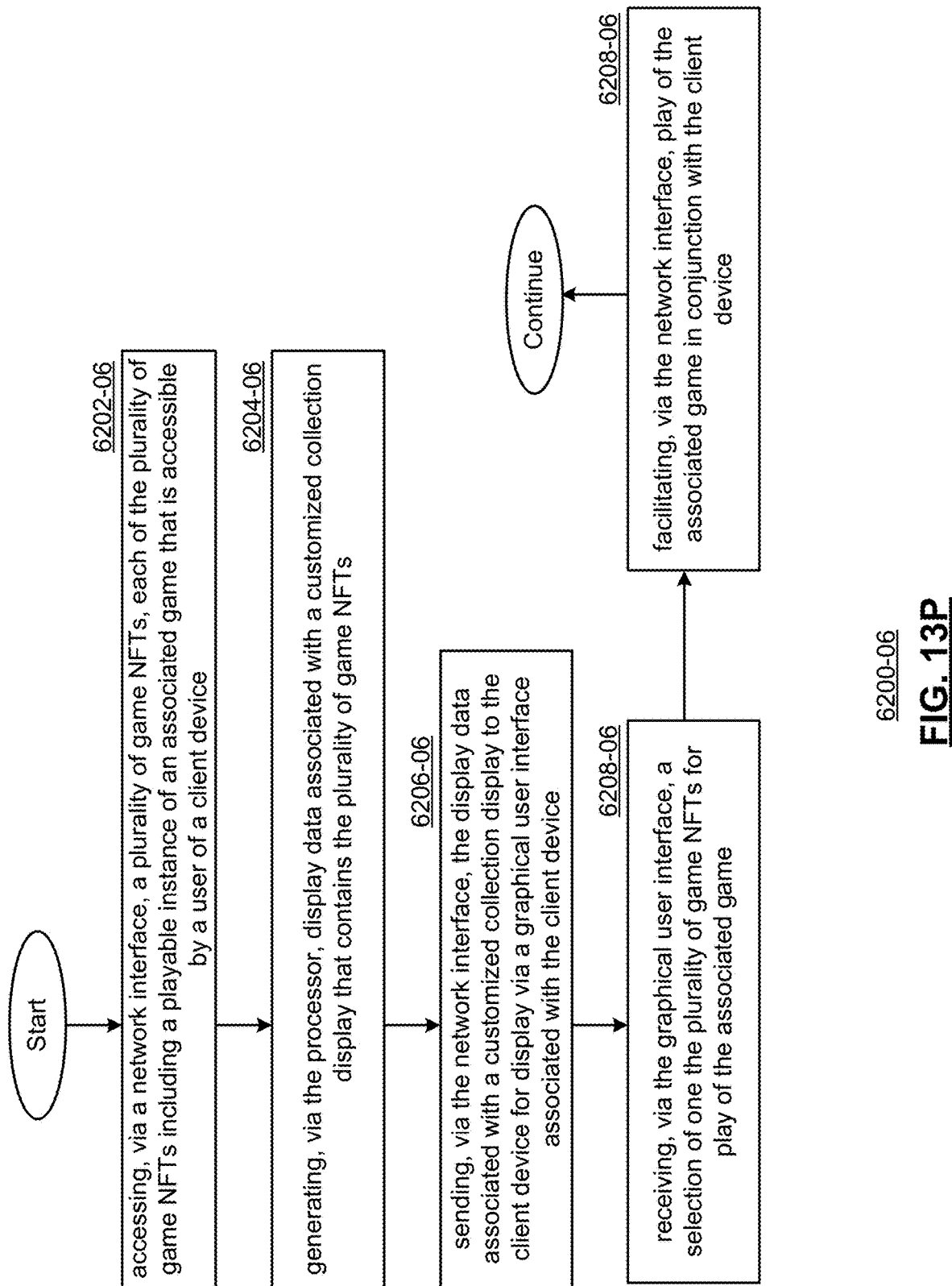
FIG. 13P presents a flowchart representation of an example method.

FIG. 13P presents a flowchart representation of an example method. In particular, a method 6200-6 is presented for use in conjunction with any of the functions and features described herein. Step 6202-6 includes accessing, via a network interface, a plurality of game NFTs, each of the plurality of game NFTs including a playable instance of an associated game that is accessible by a user of a client device. Step 6204-06 includes generating, via the processor, display data associated with a customized collection display that contains the plurality of game NFTs. Step 6206-06 includes sending, via the network interface, the display data associated with a customized collection display to the client device for display via a graphical user interface associated with the client device.

Step 6208-06 includes receiving, via the graphical user interface, a selection of one the plurality of game NFTs for play of the associated game. Step 62010-06 includes facilitating, via the network interface, play of the associated game in conjunction with the client device.

In various examples, facilitating the play of the associated game includes streaming, via the network interface, game video associated with the one of the plurality of game NFTs to the client device and receiving from the client device, via the network interface, game data associated with the game play of the game by the user. The customized collection display that presents the plurality of game NFTs can be configured in response to user interactions with the graphical user interface, configured based on metadata associated with the plurality of game NFTs and/or example, be configured based on genres associated with the plurality of game NFTs or other categories or customized arrangements, either automatically or by selection from the user.

In various examples, the method can further includes updating the game NFT based on the game play of the associated game by the user, for example, by minting an updated game NFT that may be minted on via parachain that can be different from the blockchain that minted the game NFT. The method can further include: facilitating creation of a derivative NFT corresponding to a game NFT of the plurality of game NFTs, the derivative NFT having expiration restrictions limiting game play of the associated game; and facilitating a micro-loan transaction of the derivative NFT to another user to facilitate the game play of the associated game by the another user, wherein the derivative NFT expires when the expiration restrictions are met. These facilitating steps can be accomplished via NFT marketplace tools 804 and NFT generation tools 808 in conjunction with, for example, one or more NFT wallet systems 820, one or more NFT marketplaces 822 and one or more NFT creation systems 824.

FIG. 13Q presents a flowchart representation of an example method. In particular, a method 6200-7 is presented for use in conjunction with any of the functions and features described herein. Step 6202-7 includes receiving, via the network interface and from a non-fungible token (NFT) game platform, display data associated with a customized collection display that presents a plurality of game NFTs, each of the plurality of game NFTs including a playable instance of an associated game that is accessible by a user of the client device. Step 6204-07 includes displaying the display data via a graphical user interface and a display device associated with the client device.

Step 6206-07 includes receiving, via the processor in response to user interactions with the graphical user interface, a selection of one the plurality of game NFTs for play of the associated game. Step 6208-7 includes sending, to the NFT game platform via the network interface, selection data indicating the selection of the one the plurality of game NFTs. Step 6210-07 includes facilitating, via the network interface and in conjunction with NFT game platform, play of the associated game.

The NFT game platform can be implemented via NFT collection platform 800, NFT distribution platform 2800, and/or other NFT platform that can include or operate in conjunction with NFT transaction authenticator 6022, NFT source 6026, secure real-time NFT metadata repository 6024, NFT wallet system 820, NFT marketplace 822, NFT creation system 824, and/or other tools, devices and systems described herein.

In various examples, facilitating the play of the associated game includes receiving, via the network interface, game video associated with the one of the plurality of game NFTs that is streamed from the NFT game platform and/or sending to the NFT game platform, via the network interface, game data associated with the game play of the game by the user that is generated by the client device.

Figure 14A:
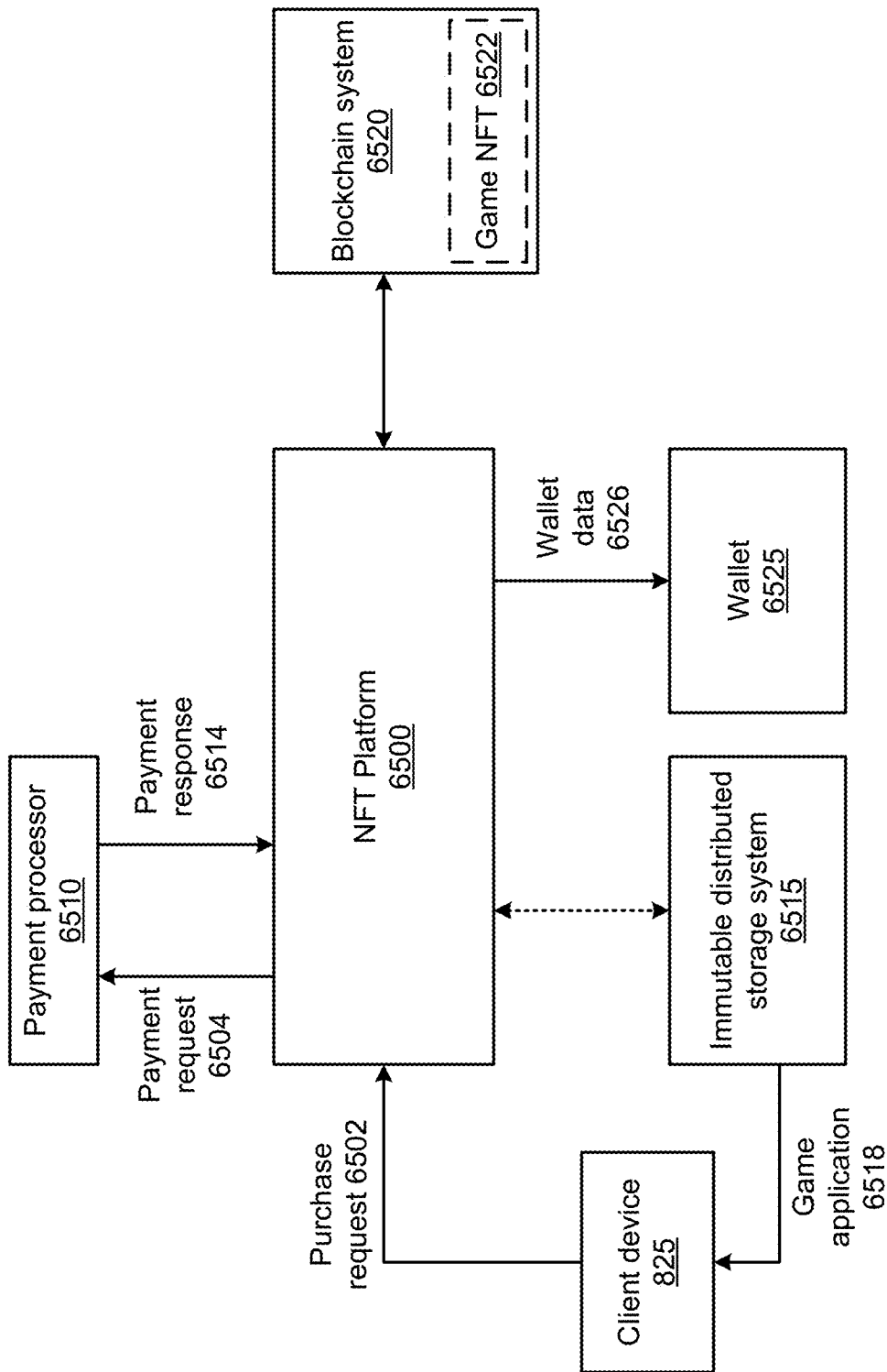
FIG. 14A presents a block diagram representation of an example system.

FIG. 14A presents a block diagram representation of an example system. The system includes a NFT platform 6500, such as NFT collection platform 800, NFT distribution platform 2800 or other NFT platform that operates to facilitate the creation of new NFTs such as game NFTs or other NFTs associated with games or other media and/or the play of games associated with one or more game NFTs that have been purchased or acquired by a player, collector or other user. The system further includes an immutable distributed storage system 6515, a client device 825, a payment processor 6510 or other marketplace or marketplace tool, a blockchain system 6520, such as NFT creation system 824 or other decentralized computer system and a wallet 6526, such as NFT wallet system 820 or other wallet.

In operation, the immutable distributed storage system 6515, such as an interplanetary file system (IPFS) or other decentralized computer system/network stores a game application 6518 (e.g. playable game data) such as application binary and data corresponding to an electronic game, such as a game 812 or other electronic game. This form of storage promotes an incorruptibility and perpetual storage of the game. When a client device generates a purchase request 6502 for a game application associated with an electronic game that is received by the NFT platform 6500. The NFT platform 6500 responds by generating a payment request 6504 and receives a payment response 6514 indicating whether or not the payment request is verified. In various examples, in response to the payment response verifying the payment request, the platform system 6500 facilitates the minting of a game NFT 6522 associated with the electronic game. In addition, or in alternative, one or more game NFTs can be minted prior to sale. In this fashion, for example, a limited and/or numbered series of game NFTs can be minted and offered for sale to collectors. Furthermore, pre-minting a number of NFTs for sale can help expedite the sales because the minting of the game NFTs does not need to occur in real-time.

In various examples, minting of the game NFT 6522 includes generation of a private key associated with the game NFT that is stored with NFT metadata and/or other wallet data 6526 in the wallet 6526. In other examples, an existing private key can be retrieved and used for the same purpose. The game NFT 6522 serves to authenticate the purchase of the game application 6518 by the user of the client device 825 and can be used to enable play of the electronic game via the client device 825, for example, by verification of the NFT authorization via the application binary of the game application 6518, before the game is fully launched for game play via the client device 825. This improves the technology of game systems by providing a secure and incorruptible methodology for authenticating ownership of a game and/or authenticating the user to the game as the actual game owner.

While the immutable distributed storage system 6515 and the blockchain system 6520 are shown as separate elements, these two systems can be combined, for example, when the game NFT 6522 and the game application 6518 are stored via the same blockchain. Furthermore, while the game application 6518 is shown as being sent to client device 825, in other examples, the immutable distributed storage system 6515 and the NFT platform 6500 can be in direct or network communication and the game application 6518 can be executed by the NFT platform 6500 for game play via the client device 825. Other configurations, combinations and connections are likewise possible.

Figure 14B:
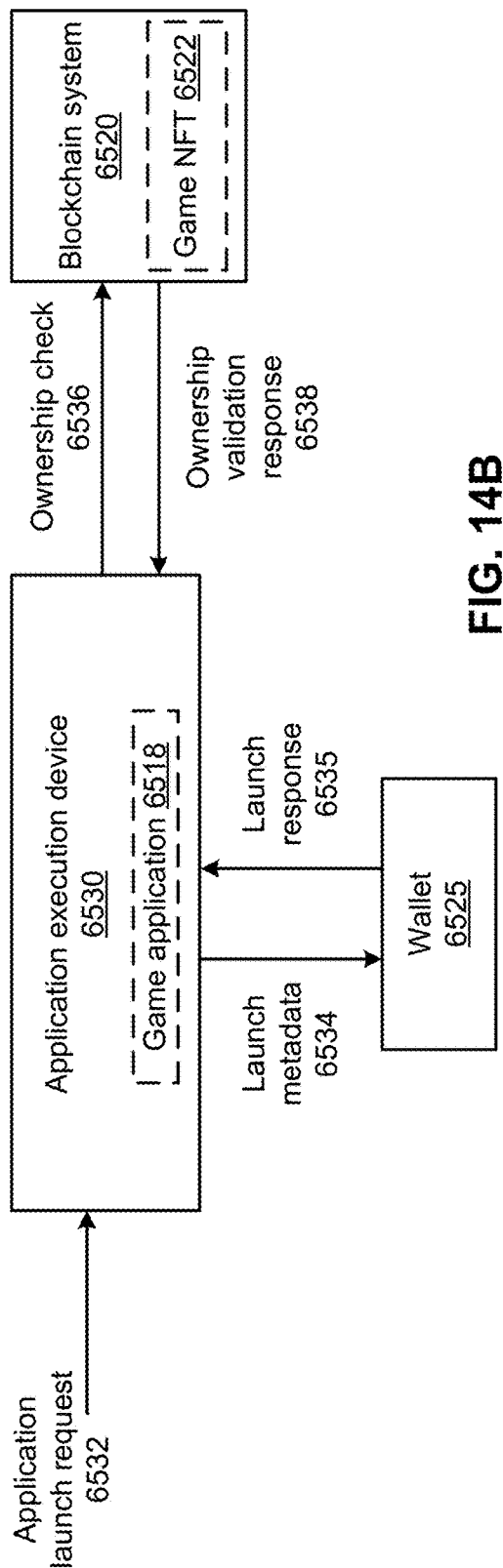
FIG. 14B presents a block diagram representation of an example system.

FIG. 14B presents a block diagram representation of an example system. In the example shown, an application execution device 6530 stores the game application 6518 for execution having a game NFT 6522 associated therewith. Similar devices shown in FIG. 14A are represented by similar reference numerals. The application execution device can be a client device 825, an NFT platform 800 or other NFT platform or other device for executing the game application 6518 to facilitate play of the game.

In operation, the application execution device 6530 operates in response to application launch request 6532 for the game application 6518. This application launch request 6532 can be received (internally) from a user interface associated with the application execution device 6530 (e.g. a client device or NFT platform) and/or received from an external device such as a client device, when for example, the application execution device 6530 corresponds to an NFT platform in communication with a client device. Once execution of the gaming application is initiated in response to the application launch request 6532, launch metadata 6534 is generated, for example, to determine if the launch request can be validated. The launch metadata 6534 is sent to the wallet 6525 containing a private key associated with the game NFT 6522 associated with a user, such as a user of the application execution device and/or the application execution device 6530. The application execution device 6530 receives from the wallet 6526, a launch response 6535 that is generated based on the private key. The game application generates, based on the launch response 6536, an ownership check 6536 that is sent to the blockchain system 6520 that stores the game NFT 6522. An ownership validation response 6538 is received from the blockchain system 6520 that enables play of the game via the game application 6518 when the ownership validation response 6538 indicates ownership of the game NFT is verified and prevents play of the game via the game application 6518 when the ownership validation response 6538 indicates ownership of the game NFT is not verified. When not verified, the game application 6518 can, for example, shut itself down. In this fashion, the game application 6518 can self-validate on launch to verify ownership using game NFT data in a user's wallet which holds the private key to the game NFT 6522.

In various examples, the launch metadata 6534 can include a current date and time, expiration information (if any) and a version number of the game application 6518, a counter that indicates a number of times the application has been executed, and/or other data corresponding to the game NFT 6522, the game application 6518 and/or the launch. The launch response 6535 can include a public key associated with the game NFT 6522, a signed hash that is based on the private key, the launch metadata 6534, and/or other data/metadata to be used to validate the NFT data from the wallet 6525 to the game NFT 6522. In this fashion, the private key is not shared directly with the application binary—and instead is merely used by the wallet 6525 in a secure fashion.

The ownership check 6536 can include information from the launch response 6535, additional owner/user information, such as user authentication data, associated with the user and/or owner of the game NFT 6522 and or other and/or other data/metadata to be used to validate the NFT data from the wallet 6525 to the game NFT 6522. In various examples, the blockchain system 6520 can include a an NFT transaction authenticator 6022, a secure real-time NFT metadata repository 6024 and an NFT source 6026 that actually stores the game NFT 6522 on a blockchain or other decentralized computer system/network and user authentication/NFT validation can take place, for example as described in conjunction with FIGS. 12A-12D.

Figure 14C:
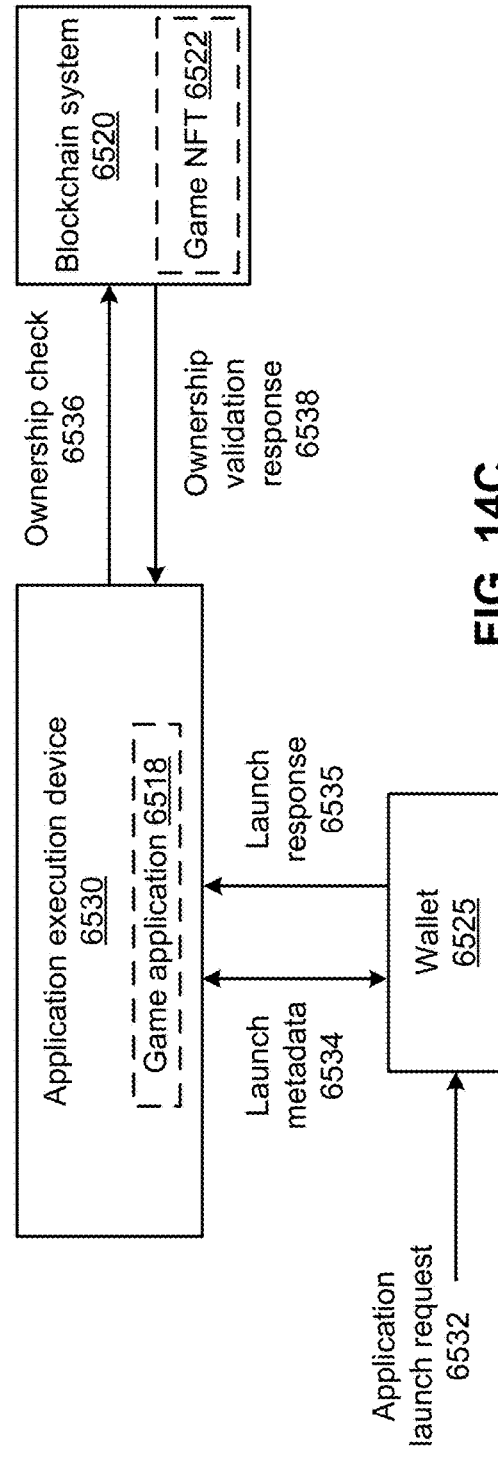
FIG. 14C presents a block diagram representation of an example system.

FIG. 14C presents a block diagram representation of an example system. This system operates similarly to the system of FIG. 14B, however, the application launch request 6532 is received directly from the wallet 6525.

Figure 14D:
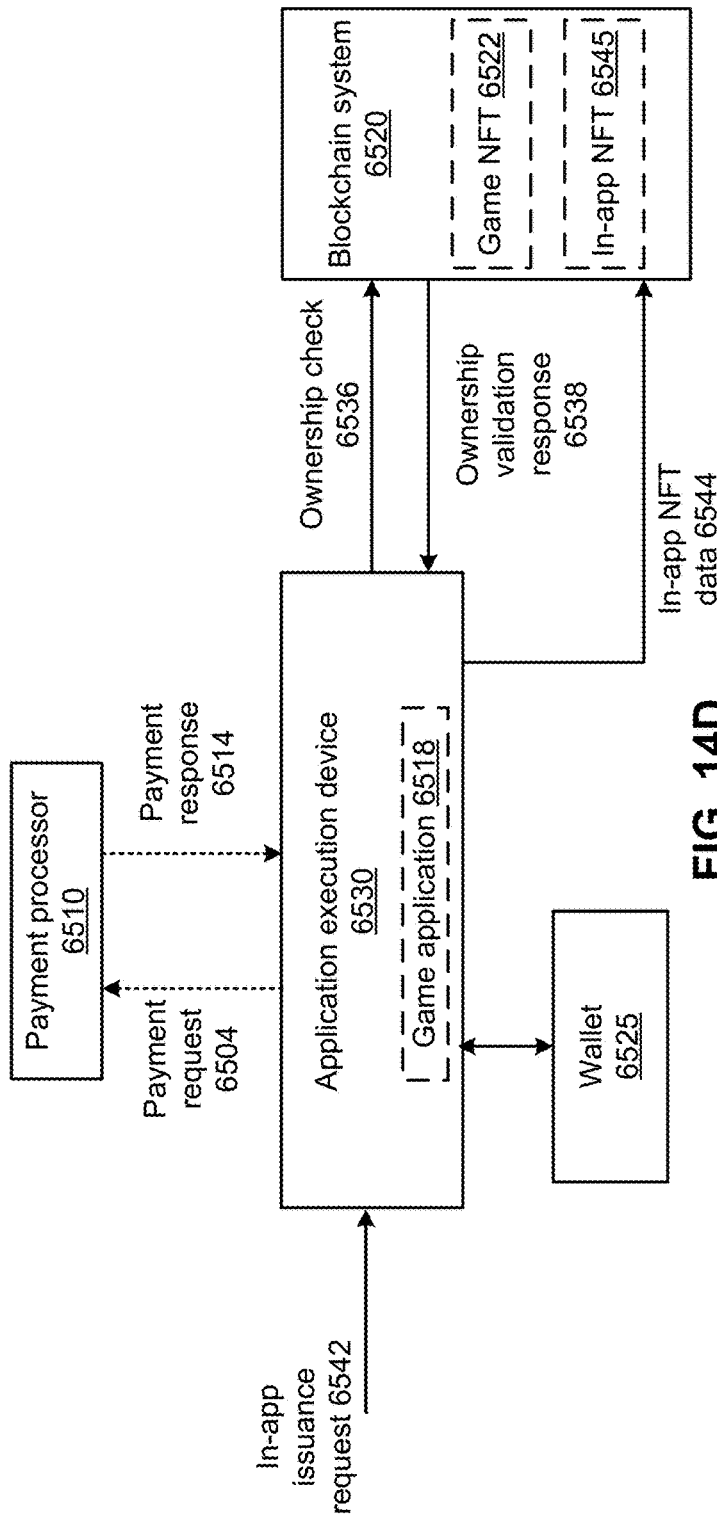
FIG. 14D presents a block diagram representation of an example system.

FIG. 14D presents a block diagram representation of an example system. These examples address a scenario where NFT's can be issued in-application (in-app NFTs). These in-app NFTs can correspond to collected or collectable items, achievements, purchased items, and or other NFTs that can be purchased or collected in-app. For example, first launch for a new user can issue an unsealing/open box NFT that is the digital equivalent of opening the box of a physical good and collecting a prize. These in-app NFT's can be tied to the user/owner of the game NFT 6522 and/or tied to a particular instance of the game application 6518. This allows some NFTs to be transferred when ownership of the game application is transferred via sale or micro-loan of the game NFT 6518. In other examples, the in-app NFTs can be independently sold and disassociated with the game NFT 6522.

In various examples, the application execution device 6530 receives an in-app issuance request 6542 from a gaming application 6518 that was generated either automatically or in response to user interaction with the game. The application execution device 6530 responds by facilitating, based on in-app NFT data 6544, the minting of an in-game NFT 6545 associated with the electronic game based on an authentication of the ownership of the game application 6518 via ownership of the associated game NFT 6522 by the user/owner that is playing the game.

In various examples, the system operates by: generating, via the application execution device 6530, an ownership check 6536; sending the ownership check 6536 to a blockchain system 6520 that stores a game NFT 6522 associated with the electronic game and the user; receiving, from the blockchain system 6520, an ownership validation response 6538; and facilitating, via the game application 6518, a minting of the in-app NFT 6545 when the ownership validation response 6538 indicates ownership of the game NFT 6518 is verified.

In this example shown, an ownership check 6536 is initiated not only on launch of the game application 6518, but also when an in-app issuance request 6542 is initiated to generate a in-app NFT. The in-app NFT 6546 is only minted when a favorable ownership validation response 6538 is received indicating validated ownership and/or user authentication. Furthermore, a favorable payment response 6514 may be required when the in-app issuance request 6542 has an associated a cost. Otherwise, if payment is denied or ownership validation fails, the requested in-app NFT 6542 is not minted.

Figure 14E:
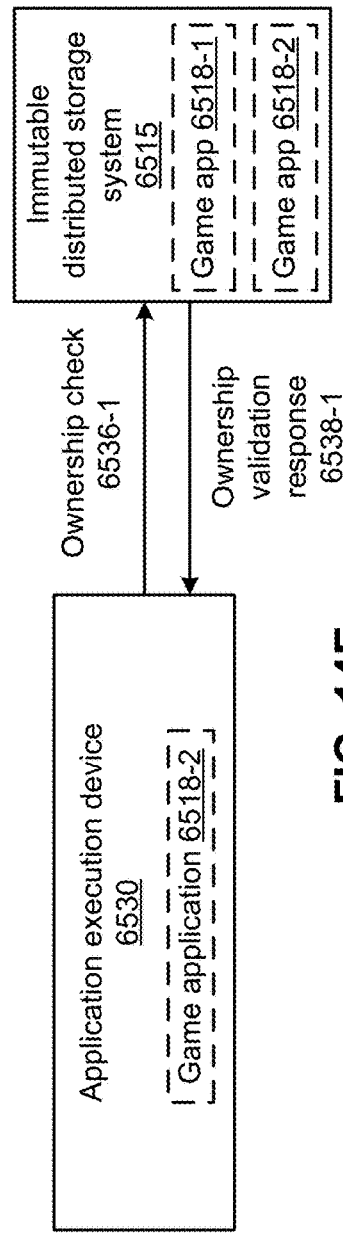
FIG. 14E presents a block diagram representation of an example system.

FIG. 14E presents a block diagram representation of an example system. In various examples, game application 6518 starts with a root version that can be designed as 6518-1. As bugs are fixed and new updates are released, new versions of the game application (6518-2, 8518-3 . . . ) can be created Consider the following example, where the immutable storage system 6515 includes an IPFS file system. The game application 6518-1 can be uploaded and an IPFS hash of the content (a "CID," or content address) is generated that is used to make an IPFS URL (ipfs://<cid>). This IPFS URL can be included in the NFT data of the game NFT to refer to off-chain data (e.g., the metadata field in game NFT, the field in your metadata corresponding to the content—in this case the game application) as a pointer to the content itself. When there is a request to retrieve the game application 6518-1, the NFT data can be accessed from the decentralized IPFS network from any peer that has the content. CIDs reference immutable content stored via a blockchain so that the game application that is accessed is the content referenced in the game NFT. The game application 6518-1 can be fetched directly, via a public IPFS gateway, or by using an IPFS Desktop application or via an IPFS command line.

When a new version of the game application, designated as 6518-2 is released, a new blockchain can be created with each block in the chain superseding the corresponding blocks from the previous chain. A game NFT for the prior version of the game application 6518-1 can used to check the blockchain to validate the newer version of the game application 6518-2. For example, when a blockchain for a new version of the game application is created, its metadata can include links/references to one (or all) prior versions that are stored in the immutable storage system 6515. In this fashion, an ownership check associated with a newer version can determine that a prior version has been superseded when the newer version includes references to that prior version. While a direct ownership check based on older NFT may initially fail because the corresponding older version has been superseded, the immutable storage system 6515 can then attempt ownership checks associated with one or more prior versions until either ownership is validated for one of the prior versions or there are no remaining prior versions to check.

Considering the example shown, the immutable storage system 6515 stores versions 6518-1 and 6518-2 of the game application via a blockchain or other decentralized computer network. When the game application 6518-2 is launched by an application execution device 6530, an ownership check 6536-1 is generated in accordance with a game NFT generated based on a prior game version of the game application 6518-1. The immutable distributed storage system 6515 operates by determining when the ownership check 6536-1 is validated to the prior game version 6518-1 and furthermore determining when the prior game version 6518-1 has been superseded by the current game version 6518-2. The ownership validation response 6538-1 is generated to indicate ownership validation only when both the ownership check 6536-1 is validated to the prior game version 6518-1 and when the prior game version 6518-2 has been superseded by the current game version. These two steps can be performed via the one process described above or via separate processes.

Figure 14F:
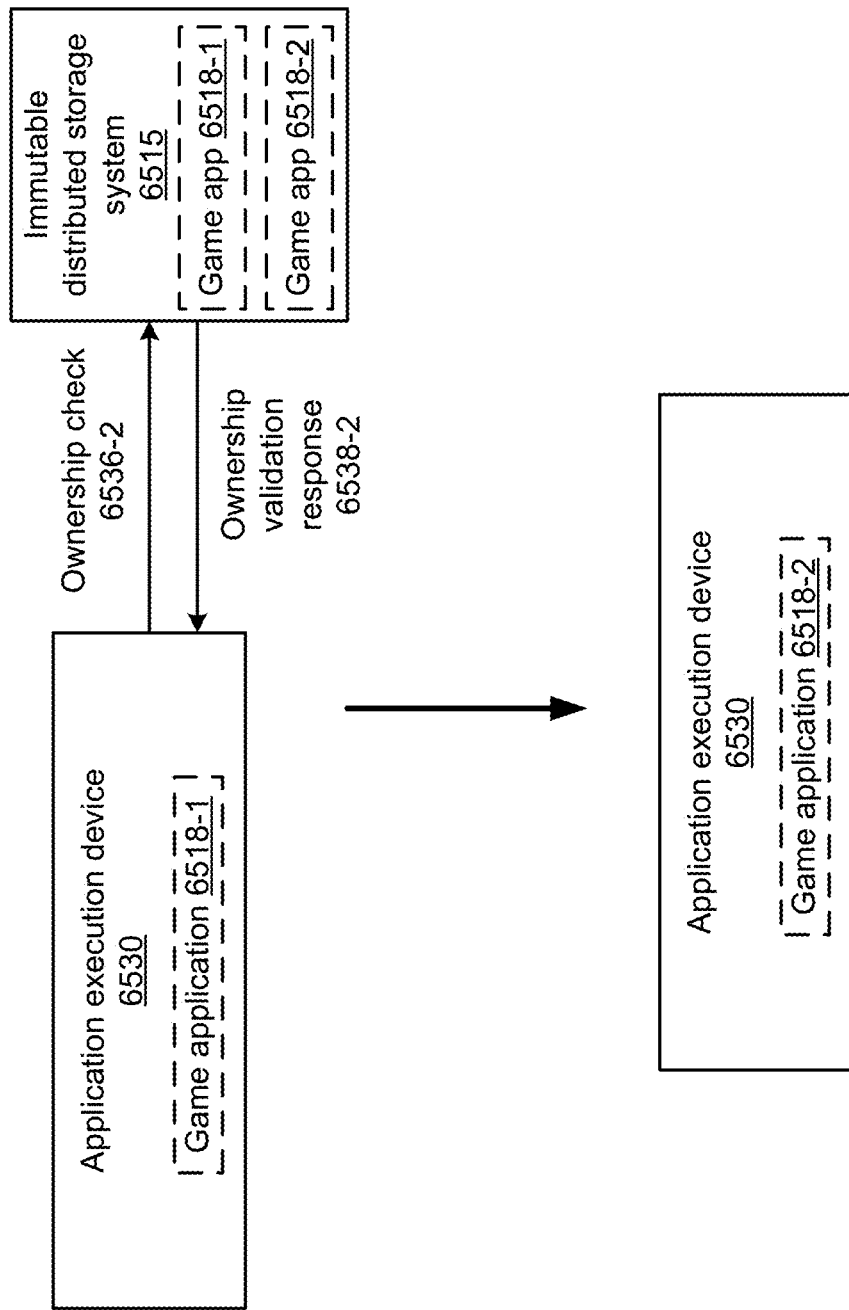
FIG. 14F presents a block/flow diagram representation of an example system.

FIG. 14F presents a block/flow diagram representation of an example system. In various examples the immutable distributed storage system 6515 can also determine when updates of a game application are available and facilitate the download of such updates.

Consider the following example. When the game application 6518-1 is launched by an application execution device 6530, an ownership check 6536-2 is generated in accordance with a game NFT generated based on the (original) game version of the game application 6518-1. The immutable distributed storage system 6515 operates by determining when the ownership check 6536-2 is validated to the game version 6518-1 and furthermore determining when the game version 6518-1 has been superseded by the current game version 6518-2. In this case, the ownership check can be validated on the first instance since the launch metadata/response data corresponds to the version of the game application that is being launched. The immutable distributed storage system 6515 can, for example, also search the metadata, a version list associated with the game application or other data structure, to determine and identify another version of the game that supersedes the version being launched. If both conditions are met, the ownership validation response 6538-2 is generated to indicate that the updated game application 6518-2 is available. Furthermore, the immutable distributed storage system 6515 can facilitate access, by the application execution device 6530, to the updated gaming application 6518-2. This facilitation can be performed by coordinating with the application execution device 6530 to download the game application 6518-2 as shown. The updated gaming application 6518-2 can then be launched and validated as previously described in conjunction with FIG. 14E.

FIG. 14G presents a flowchart representation of an example method. In particular, a method 6550-1 is presented for use in conjunction with any of the functions and features described herein. Step 6552-1 includes receiving, at the NFT platform and from a client device, a purchase request for a game application associated with an electronic game. Step 6554-1 includes generating a payment request in response to the purchase request. Step 6556-1 includes receiving a payment response verifying the payment request. Step 6558-1 includes facilitating, in response to the payment response verifying the payment request, via the processor, a minting of a game NFT associated with the electronic game authenticating the purchase of the game application.

In various examples, the application data associated with the game application is stored via an immutable distributed storage system. The game NFT can operate to enable play of the electronic game via the client device. Minting of the game NFT can include generation or retrieval of a private key to be associated with the game NFT and the method can further include facilitating storage, via a wallet associated with a user of the client device, of the private key associated with the game NFT.

FIG. 14H presents a flowchart representation of an example method. In particular, a method 6550-2 is presented for use in conjunction with any of the functions and features described herein. Step 6552-2 includes receiving, from a client device, an application launch request for a game application having a game NFT associated therewith. Step 6554-2 includes generating, via the game application and in response to the application launch request, launch metadata. Step 6556-2 includes sending the launch metadata to a wallet associated with a user of the client device, the wallet containing a private key associated with the game NFT.

Step 6558-2 includes receiving, from the wallet, a launch response that is generated based on the private key. Step 6560-2 includes generating, via the game application and based on the launch response, an ownership check. Step 6562-2 includes sending the ownership check to a blockchain system that stores the game NFT. Step 6564-2 includes receiving, from the blockchain system, an ownership validation response. Step 6566-2 includes enabling, via the game application, play of the game when the ownership validation response indicates ownership of the game NFT is verified. Step 6568-2 includes preventing, via the game application, play of the game when the ownership validation response indicates the ownership of the game NFT is not verified.

In various examples, the application data associated with the game application is stored via an immutable distributed storage system. The game NFT can enable play of the electronic game via the client device. The game NFT can include generation of a private key associated with the game NFT and the method can further include facilitating storage, via a wallet associated with a user of the client device, of the private key associated with the game NFT.

FIG. 14I presents a flowchart representation of an example method. In particular, a method 6550-3 is presented for use in conjunction with any of the functions and features described herein. Step 6552-3 includes receiving, at the client device, an application launch request for a game application having a game NFT associated therewith. Step 6554-3 includes generating, via the game application and in response to the application launch request, launch metadata. Step 6556-3 includes sending the launch metadata to a wallet associated with a user of the client device, the wallet containing a private key associated with the game NFT. Step 6558-3 includes receiving, from the wallet, a launch response that is generated based on the private key.

Step 6560-3 includes generating, via the game application and based on the launch response, an ownership check. Step 6562-3 includes sending the ownership check to a blockchain system that stores the game NFT. Step 6564-3 includes receiving, from the blockchain system, an ownership validation response. Step 6566-3 includes enabling, via the game application, play of the game when the ownership validation response indicates ownership of the game NFT is verified. Step 6568-3 includes preventing, via the game application, play of the game when the ownership validation response indicates the ownership of the game NFT is not verified.

Figure 14J:
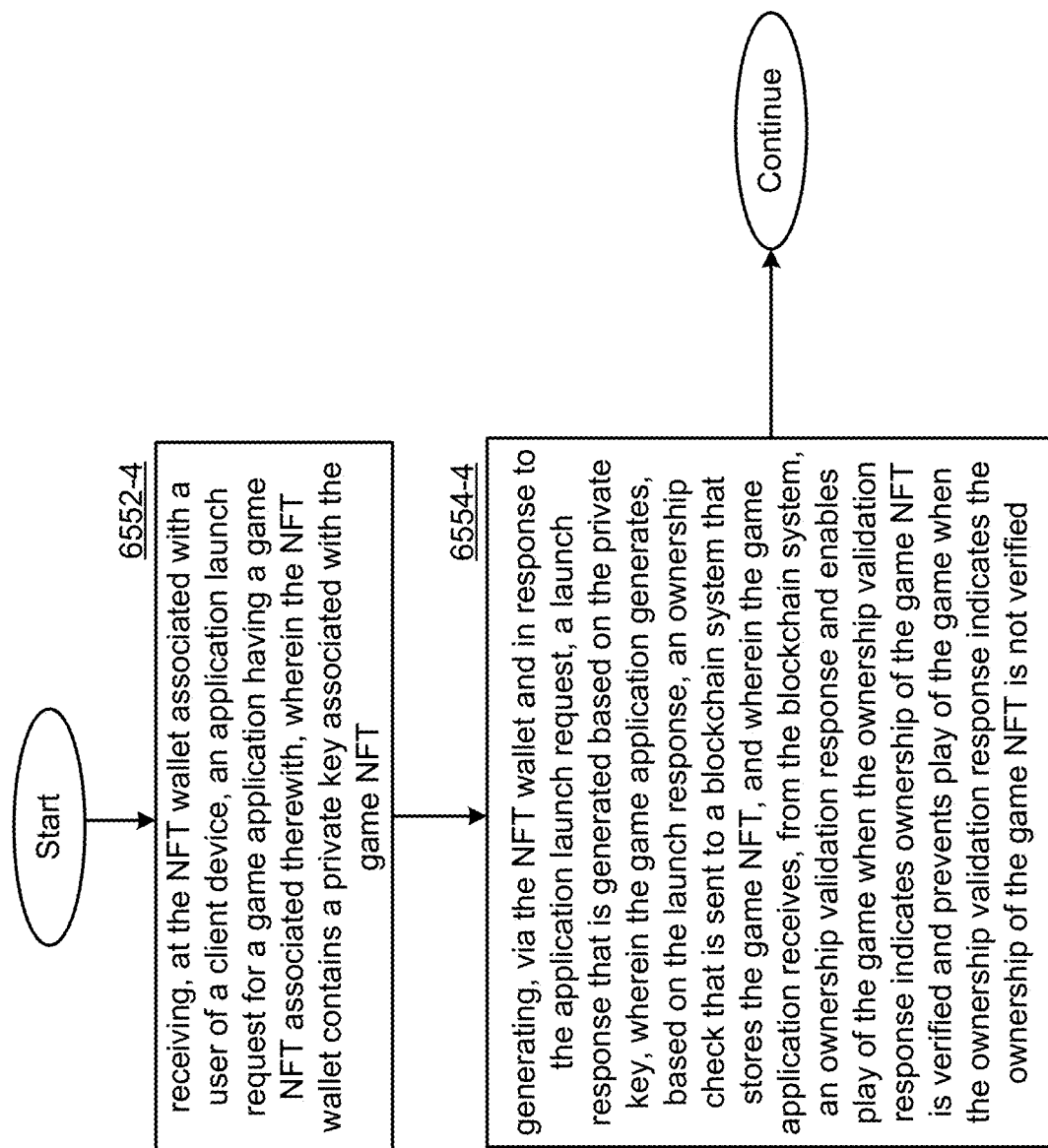
FIG. 14J presents a flowchart representation of an example method.

FIG. 14J presents a flowchart representation of an example method. In particular, a method 6550-4 is presented for use in conjunction with any of the functions and features described herein. Step 6552-4 includes receiving, at the NFT wallet associated with a user of a client device, an application launch request for a game application having a game NFT associated therewith, wherein the NFT wallet contains a private key associated with the game NFT. Step 6554-4 includes generating, via the NFT wallet and in response to the application launch request, a launch response that is generated based on the private key, wherein the game application generates, based on the launch response, an ownership check that is sent to a blockchain system that stores the game NFT, and wherein the game application receives, from the blockchain system, an ownership validation response and enables play of the game when the ownership validation response indicates ownership of the game NFT is verified and prevents play of the game when the ownership validation response indicates the ownership of the game NFT is not verified.

FIG. 14K presents a flowchart representation of an example method. In particular, a method 6550-5 is presented for use in conjunction with any of the functions and features described herein. Step 6552-5 includes receiving, at the NFT platform and from a game application associated with an electronic game played by a user, an in-app issuance request for an in-app NFT. Step 6554-5 includes generating, via the NFT platform, an ownership check. Step 6556-5 includes sending the ownership check to a blockchain system that stores a game NFT associated with the electronic game and the user. Step 6558-5 includes receiving, from the blockchain system, an ownership validation response. Step 6560-5 includes facilitating, via the game application, a minting of the in-app NFT when the ownership validation response indicates ownership of the game NFT is verified.

In various examples, the method further includes: generating a payment request in response to the purchase request; and receiving a payment response verifying the payment request; wherein the ownership check is generated in response to the payment response. The in-app NFT can have in-app NFT metadata associated therewith, wherein the in-app NFT metadata includes one or more of: an achievement data associated with the electronic game and the user, an application identifier associated with the electronic game, a user identifier associated with the user or an instance identifier indicating an instance of the electronic game associated with the user.

FIG. 14L presents a flowchart representation of an example method. In particular, a method 6550-6 is presented for use in conjunction with any of the functions and features described herein. Step 6552-6 includes receiving, at the blockchain system and from a game application associated with an electronic game, an ownership check generated in accordance with a game non-fungible token (NFT), wherein the game application is associated with a current game version of the game application and the game NFT was generated based on a prior game version of the game application. Step 6554-6 includes determining, via the blockchain system, when the ownership check is validated to the prior game version. Step 6556-6 includes determining, via the blockchain system, when the prior game version has been superseded by the current game version. Step 6558-6 includes generating an ownership validation response indicating ownership validation when the ownership check is validated to the prior game version and when the prior game version has been superseded by the current game version.

Figure 14M:
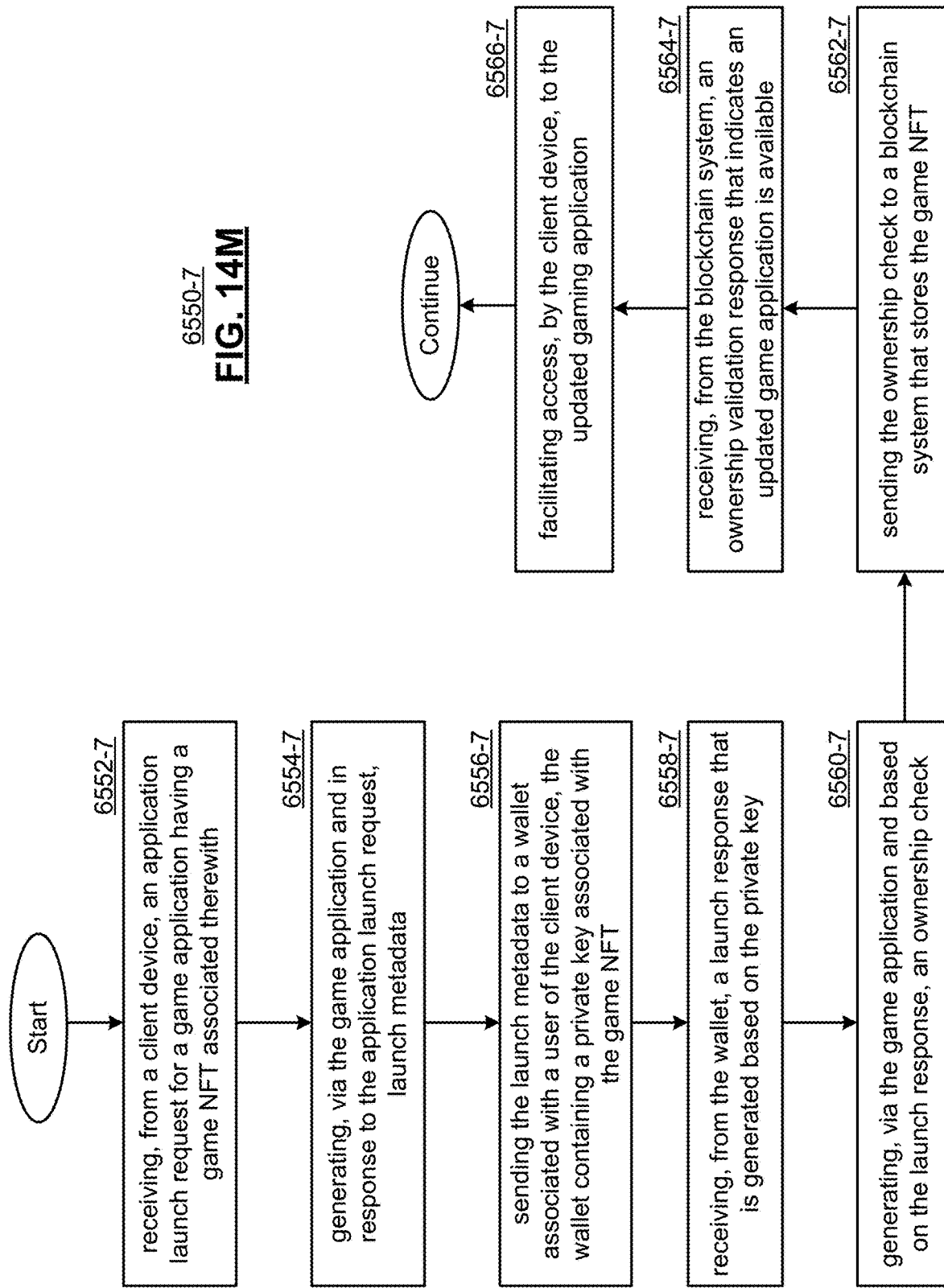
FIG. 14M presents a flowchart representation of an example method.

FIG. 14M presents a flowchart representation of an example method. In particular, a method 6550-7 is presented for use in conjunction with any of the functions and features described herein. Step 6552-7 includes receiving, from a client device, an application launch request for a game application having a game NFT associated therewith. Step 6554-7 includes generating, via the game application and in response to the application launch request, launch metadata. Step 6556-7 includes sending the launch metadata to a wallet associated with a user of the client device, the wallet containing a private key associated with the game NFT. Step 6558-7 includes receiving, from the wallet, a launch response that is generated based on the private key. Step 6560-7 includes generating, via the game application and based on the launch response, an ownership check.

Step 6562-7 includes sending the ownership check to a blockchain system that stores the game NFT. Step 6564-7 includes receiving, from the blockchain system, an ownership validation response that indicates an updated game application is available. Step 6566-7 includes facilitating access, by the client device, to the updated gaming application.

FIG. 14N presents a flowchart representation of an example method. In particular, a method 6550-8 is presented for use in conjunction with any of the functions and features described herein. Step 6552-8 includes receiving an application launch request for a game application having a game non-fungible token (NFT) associated therewith. Step 6554-8 includes generating, via the game application and in response to the application launch request, launch metadata. Step 6556-8 includes sending the launch metadata to an NFT wallet, the NFT wallet containing a private key associated with the game NFT. Step 6568-8 includes receiving, from the NFT wallet, a launch response that is generated based on the private key.

Step 6560-8 includes generating, via the game application and based on the launch response, an ownership check. Step 6562-8 includes sending the ownership check to a blockchain system that stores the game NFT. Step 6564-8 includes receiving, from the blockchain system, an ownership validation response. Step 6566-8 includes enabling, via the game application, play of the game when the ownership validation response indicates ownership of the game NFT is verified.

In various examples, the method includes preventing, via the game application, play of the game when the ownership validation response indicates the ownership of the game NFT is not verified. The application data associated with the game application can be stored via an immutable distributed storage system and be downloaded to a client device or NFT platform for execution of the game application. The application launch request can be generated by a client device, and wherein the game application is executed via the client device or via an NFT platform in communication with the client device.

In various examples, the ownership validation response indicates when an updated game application is available and the method further includes: facilitating access to the updated gaming application when the updated game application is available. The application launch request can be generated by a client device, wherein the gaming application is executed by the client device, and wherein facilitating access to the updated gaming application includes downloading the updated gaming application to the client device for execution via the client device. The application launch request can be generated by a client device, wherein the gaming application is executed by an NFT platform in communication with the client device, and wherein facilitating access to the updated gaming application includes downloading the updated gaming application to the NFT platform for execution via the NFT platform.

While the forgoing systems and methods of FIGS. 14A-14N have focused on game NFTs, these systems and methods could likewise be applied to NFTs associated with other applications, other media and/or other types of NFTs. Furthermore, the applications and techniques associated with NFTs previously described in this application, and in copending U.S. application Ser. No. 17/656,084 entitled, FACILITATING PLAY OF GAME NFTS VIA A CLIENT DEVICE, can likewise be applied to game NFTs as well.

FIG. 15A presents a block diagram representation of an example system. In the example shown, a user of an NFT game platform 6625 has accessed, via a client device associated with the user such as client device 825, a multiplayer game playable by the user in conjunction with users of other client devices 825. The NFT game platform can be implemented via NFT game platform 6500, NFT collection platform 800, NFT distribution platform 2800, and/or other NFT platform that can include or operate in conjunction with NFT transaction authenticator 6022, NFT source 6026, secure real-time NFT metadata repository 6024, NFT wallet system 820, NFT marketplace 822, NFT creation system 824, and/or other tools, devices and systems described herein.

The NFT game platform 6625 and/or associated client device 825 improves the technology of NFT systems and existing gaming platforms by allowing the user to generate, store, collect, display and use NFTs that enable game play of the associated multiplayer games. These NFTs may be game NFTs as previously discussed that allow a user to access game applications that are stored via blockchain or other immutable storage via the game NFT. These NFTs may also be "game token" NFTs that, while not associated with storage and/or authentication of the game application itself, nevertheless are associated with a user's ownership of and/or access to a particular game and can be used by a game application, client device 825 and/or game platform 6625 to provide authenticated access by the user to a game that, for example can be executed and/or streamed to a user's client device. Like the game NFT's previously discussed, the game token NFTs can be collected, traded, sold or loaned for play of the game by others.

Figure 15B:
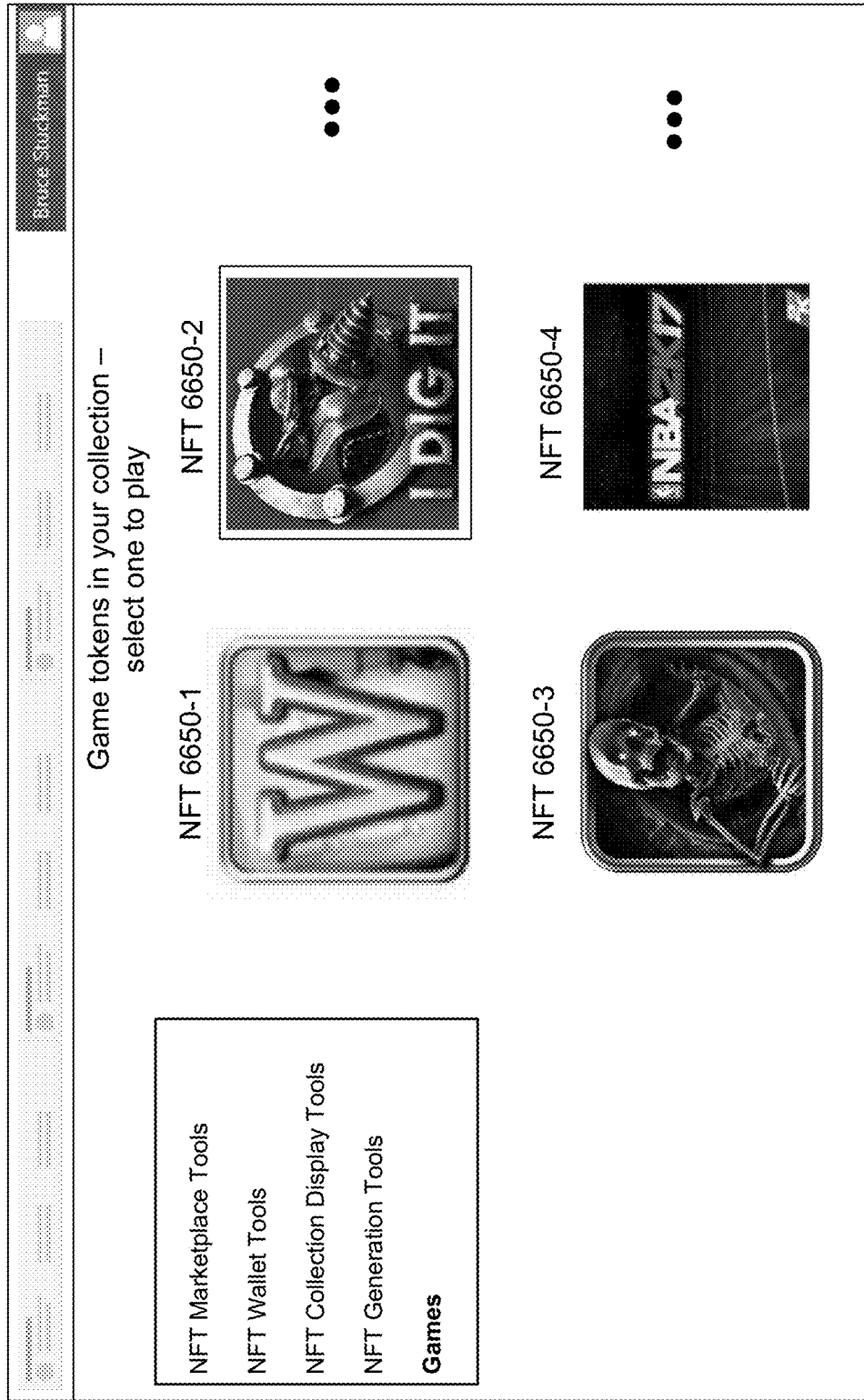
FIGS. 15B-15J present pictorial representations of example screen displays.

FIGS. 15B-15J present pictorial representations of example screen displays. In FIG. 15B, the user's collection of game token NFTs includes NFTs 6650-1, 6650-2, 6650-3, and 6650-4, etc. In various embodiments the collection display can be arranged by the user or automatically sorted into categories such as genre's or other groupings based on metadata associated with each of the NFTs.

Figure 15C:
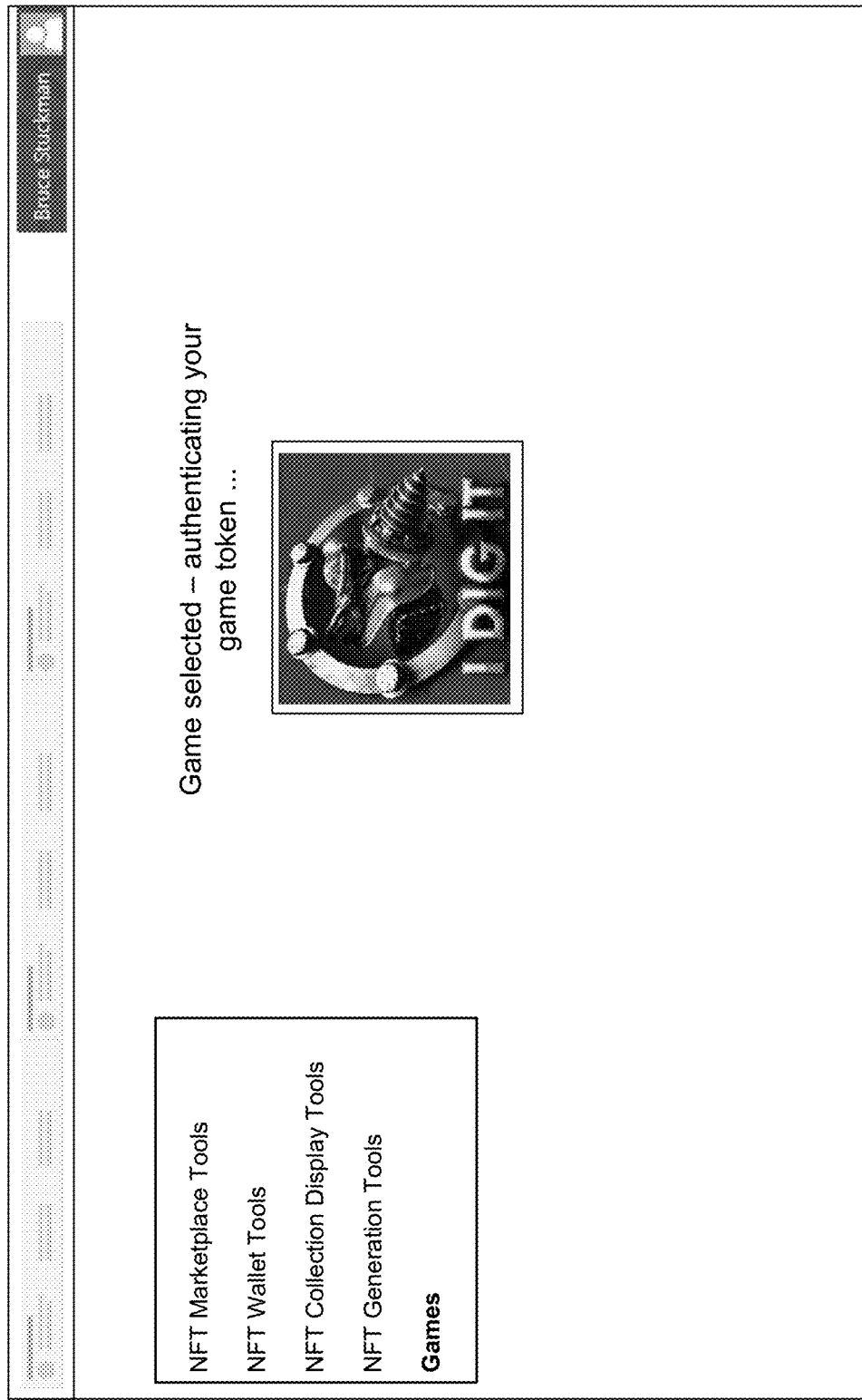
Figure 15D:
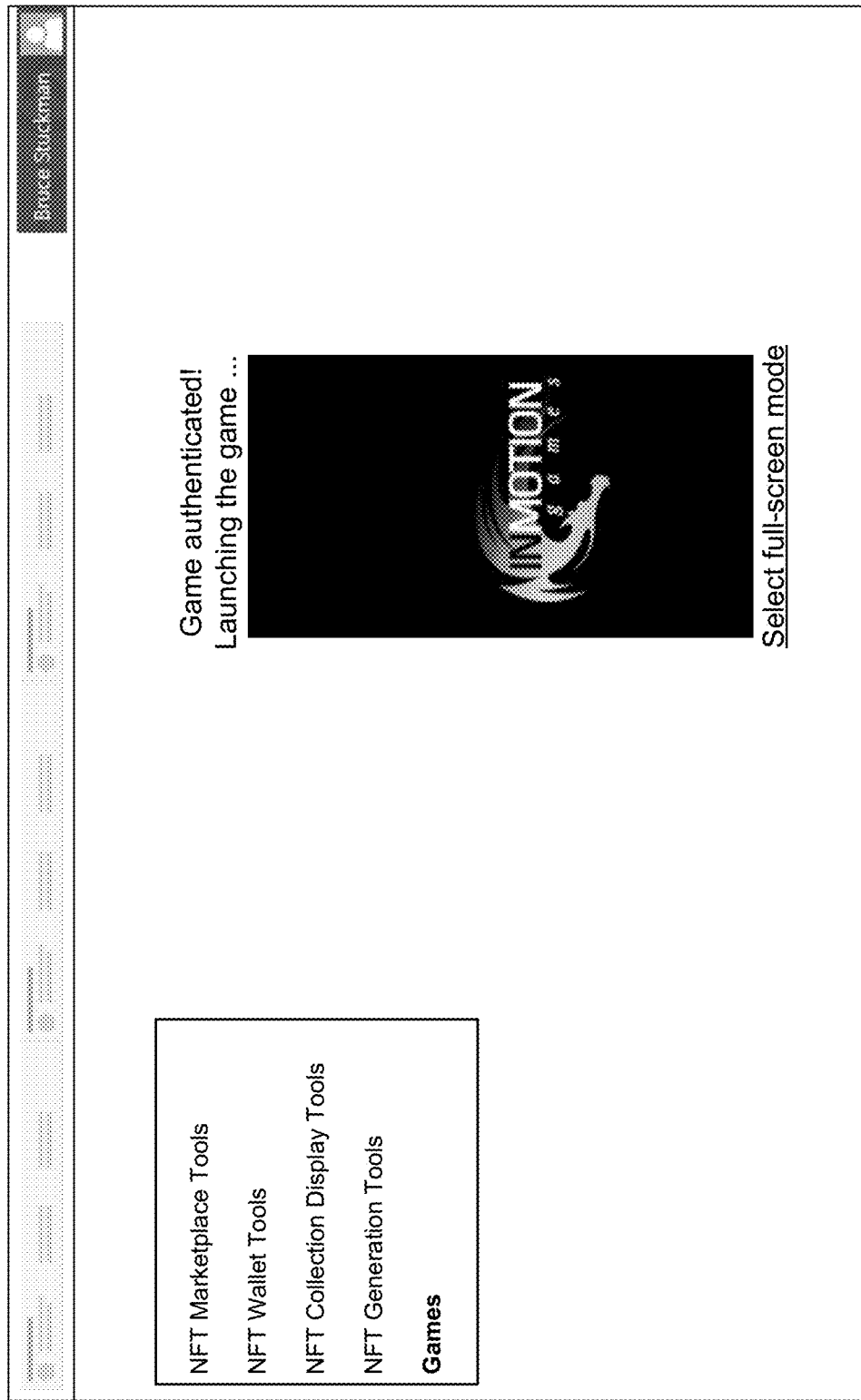

In the example shown, the platform has generated display data associated with a customized collection display that contains the plurality of game token NFTs for display via a graphical user interface associated with the client device. Furthermore, the user has interacted with the graphical user interface and indicated a selection of one the plurality of game token NFTs for play—in this case, the game "I Dig It". The selection is received by the platform which responds by interacting, via the network 115, with a client device 825 to authenticate the user's access to the game via validation of the game token NFT as shown in FIG. 15C. In this fashion, the play of the selected game can be enabled for the user and/or other user's also having their own valid game token NFTs corresponding to the game as shown in FIG. 15D. Conversely, a user attempting to play without an associated game token NFT can be prevented access to the game.

NFT game platform 6625 can support other use of NFTs in conjunction with games, such as multiplayer games. Consider a multiplayer game that allows players to mine for or otherwise collect NFTs that are dropped in the game at various times, included in game levels, dropped in the game for tournaments and/or otherwise placed in a game to be issued to the first player that is able to find or otherwise earn the NFT. In various examples, the types of NFTs that are collected can fall within three different categories that are described below.

Non-Utilitarian Game NFT

This is a game-related NFT (that is specific to the game) that is collected or earned via game play of a game and that provides no benefit (direct or indirect) to the player in the game—but rather may derive value as a as a symbol of the player's prowess and/or as collector's item that may be bartered or sold apart from the game. An example is a winner's trophy or badge NFT that represents an accomplishment but that does not provide any tangible benefit in terms of player abilities, to the player (or the player's character) within the game itself—other than, optionally, as a symbol of the player's status. A further example is a NFT associated with a sponsor that may or may not provide subsidiary benefits with respect to a sponsor's products and/or services—but no benefits to the user's play of the game.

Direct-Beneficial Game NFT

This is a game-related NFT (that is specific to the game) that is purchased, collected or earned via game play of a game and that provides a direct benefit to the player in the game by enabling and/or automatically providing player access to player abilities, advantages, enhanced skills, unlocking additional features, and/or automatically providing player access to other enhancements to the player's character that are nonfungible, unique or of a limited nature, and associated with the NFT. Examples include an NFT associated with a unique or one of a limited set of weapons, armor or other game artifacts, a unique plot of metaverse game real estate, access to a new and/or hidden level of the game, a player token associated with the player's character or new character to be used by the player or other direct benefit to the player or player's character within the game.

Indirect-Beneficial Game NFT

This is a game-related NFT that is purchased, collected or earned via game play of a game and that provides an indirect benefit to the player in the game, by providing one or more tokens, points or game currency that are fungible and not unique to the NFT (i.e. could be gathered or earned in different ways), but which a player may choose to convert to direct benefits such as advantages, enhanced skills, unlocking additional features, and/or access to other enhancements to the player's character. Examples include a game token that allows a player to play again, an NFT which entitles a player to certain benefits only after other NFTs have been collected (i.e. having a contingent benefit), a level-up benefit which could be achieved in other ways, and/or points or game currency that can be achieved in other ways and that can be converted, at the player's discretion, into a direct benefit to the player or player's character within the game.

Figure 15G:
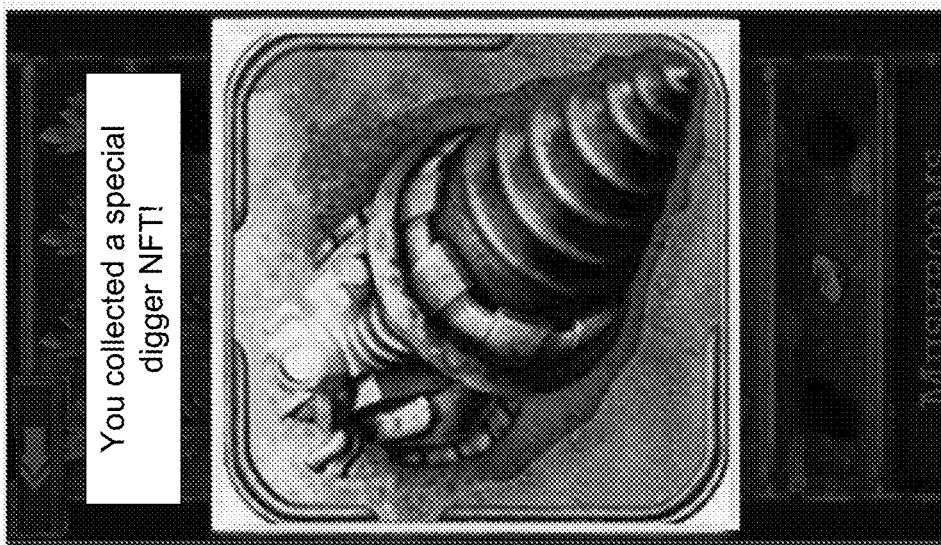
Figure 15F:
Figure 15E:
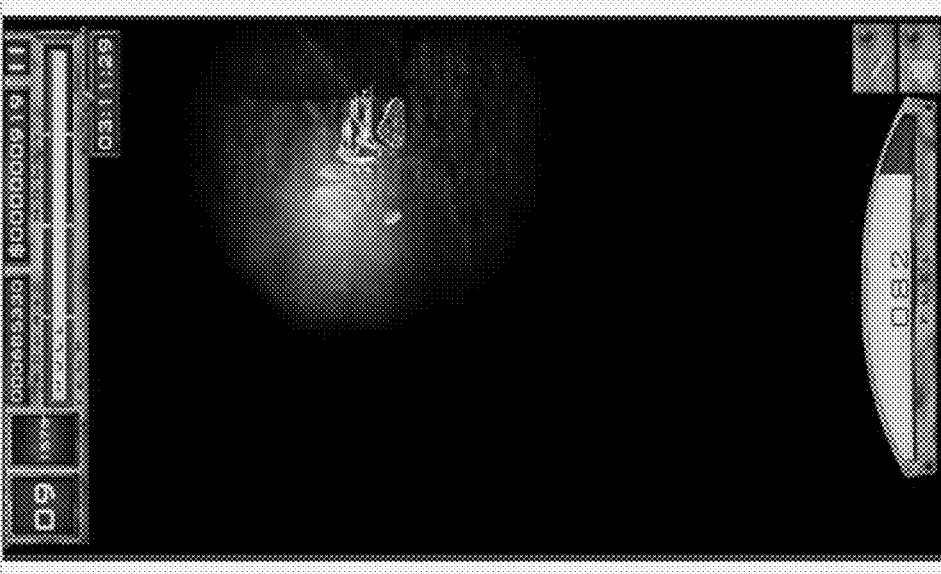

Consider the screen shown in FIG. 15E of a multiplayer I Dig It game. The player's character is a digger that is digging/mining to collect dig up stuff ("diggins") that can be collected by the player that first finds them and sold in the game in exchange for game currency that can be used to fuel and/or upgrade the player's digger. One or more of these diggins can be NFTs including one or more Non-Utilitarian Game NFTs, one or more Direct-Beneficial Game NFTs and/or one or more Indirect-Beneficial Game NFTs.

In various examples, either during regular game play or during a limited time tournaments, multiplayer games are populated with players in groups of N (say 6, 10, 25, 100, etc.), so that the number of competitors are limited and the processing resources required for each game can be capped to a maximum level. In this fashion, multiple games/tournaments can be formed serially and/or contemporaneously as each new game/tournament is filled until a maximum number of games/tournaments is reached. This improves the technology of multiplayer gaming by allowing processing resources to be predicted and allocated more efficiently to support multiple games.

For each game/tournament, a fixed number of NFTs are created and virtually buried in the I Dig It world for each tournament (X NFTs per tournament). These NFTs could be, for example, one or more Non-Utilitarian Game NFTs, one or more Direct-Beneficial Game NFTs and/or one or more Indirect-Beneficial Game NFTs that are each either original NFTs or derivative NFTs in a limited series. The players can play normally and look for resources and regular prizes but also could find an NFT. The first to find an NFT can collect the NFT (a game-collected NFT) which is then issued to the player. The game display can include a score board of player scores that also indicates NFTs found—how many are left etc. Players not finding NFTs can access information indicating others who won NFTs and where they were found in the virtual world.

In various examples, the game platform 6625 further operates via individual instances of the game application being executed for each player that operate independently in most circumstances with only a limit the number of server interactions that are each triggered by special circumstances within the game. This allows the game platform 6625 to support more players in each game/tournament and/or more contemporaneous games/tournaments with fewer processing resources. In various examples, each game application includes a player dashboard that includes game clock that presents a display of time left in the particular game/tournament that is synchronized when a player starts the game/tournament. To collect NFTs and/or to add to their score, players must enter and drop off their loot/diggins at a particular check-in location in the game (i.e., a verification site). This triggers a server interaction which updates the player's score. During this exchange, the player can view a tournament scoreboard that includes scores for other players that have only been updated from the last time each player visited the check-in location.

In various examples, NFTs that were collected by a player can only be officially earned (and issued to the player) if the player is the first to show up with the NFT at the check-in location in the game. Consider the following example process:

A player collects an NFT and the game checks to see if it has already been cashed in/earned by another player;

If not yet collected—the player can pick it up and game provides a warning that the player must successful exit and cash it in at the check-in location in order to earn it.

Once the player arrives at the check-in location with the NFT, the game checks again to see if it previously was cashed in by a previous player. If not, it is awarded (issued) to the player. If so, the player is not awarded the NFT.

In FIG. 15F, a player has collected an example of an Indirect-Beneficial NFT that by itself does not provide additional player abilities, but can be collected at the check-in location (if the player was the first to check-in with this particular NFT). If the NFT was successfully collected (or in other examples, whether the NFT was earned or not), the player also receives a certain amount of game currency that itself can be used as a basis of game score for the player, and/or further can be exchanged to enhance the player's abilities.

Figure 15J:
Figure 15I:
Figure 15H:
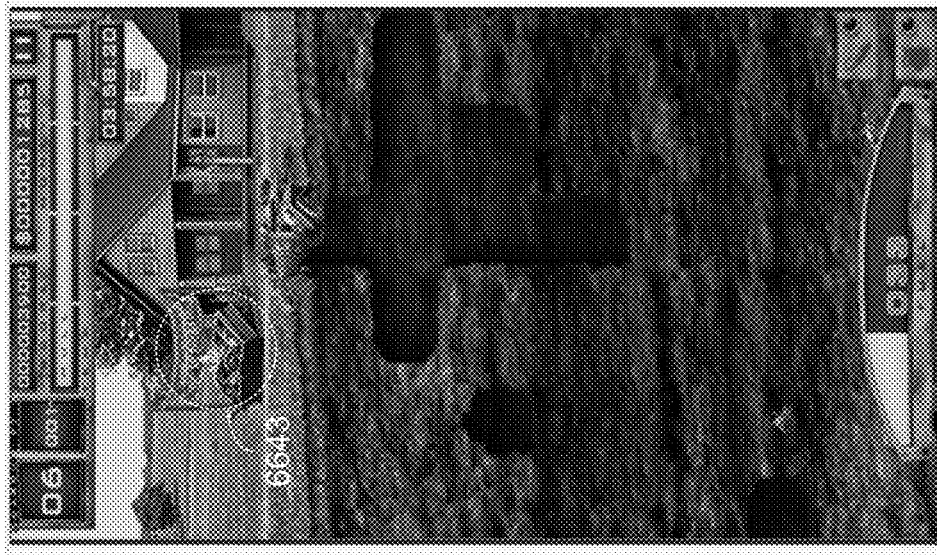

In FIG. 15G, a player has collected an example of a Direct-Beneficial NFT that if successfully collected, not only includes the NFT, but also provides a special enhanced digger to the player. In FIG. 15H, the player's character is approaching a check-in location 6643 in the game. In FIG. 15I, a player has earned an example of a Non-Utilitarian NFT, for winning a particular tournament. This particular Non-Utilitarian NFT can automatically be earned by winning the associated game/tournament without the collection process through the check-in location. In other examples however, other Non-Utilitarian NFTs could be earned through the collection process previously described.

While the prior examples have been focused on the collection of NFTs, similar procedures can be used to earn crypto-currency that has been dropped in a game for possible player collection. In FIG. 15J. a player has collected an Amp Coin.

In various examples, the game platform 6625 can support three different currencies:

A game currency that can only be used in-game, e.g. a game-dependent currency (e.g. game dollars, coins, etc.) that only exists in (or is only relevant to) the game and can be used to purchase resources used in the game. Game currency is earned based on achievements associated with game play either in tournaments and/or regular game play.

A non-game standard (non-crypto) currency—a game-independent currency that exists outside of the game, can also be used to purchase resources used in the game (including the game currency via in-app purchases), but can also be bought/sold by others without relation to the game (e.g. the US dollar).

A non-game crypto-currency, a crypto currency, e.g. a game-independent crypto-currency (e.g. Amp coins, Bit coins, Doge coins, etc.) that exists outside of the game, may or may not be used to purchase resources used in the game, but can be bought/sold by others without relation to the game.

A game crypto-currency, a crypto currency, e.g. a game-based crypto-currency that is unique to the game, and may be used to purchase resources used in the game, but also can be bought/sold by others without relation to the game as collectables or use by other players in the game.

In various example, non-game crypto-currency can be earned in different ways:

Non-game crypto-currency can be earned based on locating crypto-currency coins during games/tournaments. The first player to successfully collect a coin, earns the coins.

Non-game crypto-currency can also be earned based on game/tournament results. In various examples, amounts of crypto-currency can be awarded to first place, second place, third place, etc. In addition or in the alternative, at the end of the tournament, the first place player takes a percentage of any undiscovered crypto-currency coins (in addition to whatever they found themselves). The second place player takes a lower percentage of undiscovered crypto-currency coins (in addition to whatever they found themselves), etc.

It should be noted that game crypto-currency can be earned in any of the ways described above with respect to non-game crypto-currency.

FIG. 15K presents a block/flow diagram representation of an example system of an example of NFT generation. In the example shown, NFT generation tools 808 operate to convert image data 6620-1 and other data 6622-1 into one or more non-utilitarian NFTs 6624-1. The image data 6620-1 can correspond to an original NFT, borrowed (e.g. temporary micro-loaned) NFT, a derivative NFT, an original image, and/or other derivatives or micro-loans thereof or other display or image data. In various examples, the NFT generation tools 808 can operate to verify the credentials of any NFTs whose images are contained in the image data 6620-1, prior to creating the non-utilitarian NFT 6624-1. In this fashion, one or more non-utilitarian NFT 6624-1 can only be created (e.g. on a derivative basis) when the source NFT or NFTs are verified—preventing the creation of unauthorized or counterfeit NFTs.

The other data 6622-1, can be image data including signatures and other endorsement images, visual indications of derivative series, originality classification, attributions, or other image data, metadata of all kinds including metadata indicating one or more originality classifications, attributions, endorsement data, other derivative data indicating the series number and total number in a derivative series, restrictions on micro-loans or other derivatives, restrictions on derivatives with artistic effects, restrictions that derivatives must include attributions to the original source, restrictions on numbers of derivatives or micro-loans or the sizes of derivative series, restrictions on the creation of collection NFTs, the number of collection NFTs, the creation of collection NFTs including NFTs from other sources, from prohibited sources or with prohibited content, geographical restrictions, time restrictions (e.g., can be used to create derivatives or collection NFTs or can be temporarily micro-loaned for 1 month, one year, etc., other restrictions and/or other data associated with, or to be associated with, the image data 6620-1.

This other data 6622-1 can be used to generate an NFT and/or combined with the image data 6620-1 to create a dataset that includes both the image data 6620-1 and the other data 6622-1. This other data 6622-1 or combined dataset can be protected via the blockchain decentralized computer network and/or other crypto-based NFT creation technology that is employed by the NFT generation tools 808 and via the NFT creation system 824 to create and protect the new non-utilitarian NFT 6624-1 itself. It should be noted that the non-utilitarian NFT 6624-1 can include a single derivative or a number of derivatives, including a limited series of derivatives. It should be noted further that some or all of the other data 6622-1, including restriction data and/or attribution data, can be derived from one or more original NFTs whose images are associated with the image data 6620-1.

FIG. 15L presents a flowchart representation 6600-1 of an example method. In particular, a method is presented for use in conjunction with one or more functions or features described herein. Step 6602-1 includes receiving, via the processor, an image to be associated with a series of non-utilitarian NFTs corresponding to a multiplayer game. Step 6604-1 includes receiving, via the processor, other data, wherein the other data is also associated with the series of non-utilitarian NFTs. Step 6604-1 includes facilitating creation of the series of non-utilitarian NFTs.

FIG. 15M presents a block/flow diagram representation of an example system of an example of NFT generation. In the example shown, NFT generation tools 808 operate to convert image data 6620-2 and other data 6622-2 into a series of derivative NFTs 6624-2. The image data 6620-2 can correspond to an original NFT, borrowed (e.g. temporary micro-loaned) NFT, a derivative NFT, an original image, and/or other derivatives or micro-loans thereof or other display or image data. In various examples, the NFT generation tools 808 can operate to verify the credentials of any NFTs whose images are contained in the image data 6620-2, prior to creating the non-utilitarian NFT 6624-2. In this fashion, one or more non-utilitarian NFT 6624-2 can only be created (e.g. on a derivative basis) when the source NFT or NFTs are verified—preventing the creation of unauthorized or counterfeit NFTs.

The other data 6622-2 can be any of the other data 6622-1. This other data 6622-2 an image data 6620-2 can be protected via the blockchain and/or other crypto-based NFT creation technology that is employed by the NFT generation tools 808 and via the NFT creation system 824 to create and protect the series of derivative NFTs 6624-2. It should be noted that the series of derivative NFTs 6624-2 can include a number of derivatives, including a limited series of derivatives. It should be noted further that some or all of the other data 6622-2, including restriction data and/or attribution data, can be derived from one or more original NFTs whose images are associated with the image data 6620-2.

FIG. 15N presents a flowchart representation 6600-2 of an example method. In particular, a method is presented for use in conjunction with one or more functions or features described herein. Step 6602-2 includes receiving, via the processor, an image to be associated with a series of derivative NFTs corresponding to a multiplayer tournament. Step 6604-2 includes receiving, via the processor, other data, wherein the other data is also associated with the series of derivative NFTs. Step 6602-2 include facilitating creation of the series of derivative NFTs.

FIG. 15O presents a flowchart representation 6600-3 of an example method. In particular, a method is presented for use in conjunction with one or more functions or features described herein. Step 6602-3 includes accessing, via a network interface, a plurality of game token NFTs, each of the plurality of game token NFTs associated with a multiplayer game accessible by a user of a client device. Step 6604-3 includes generating, via the processor, display data associated that the plurality of game token NFTs for display via a graphical user interface of the client device. Step 6606-3 includes receiving, via the graphical user interface, a selection of one the plurality of game token NFTs for play of the associated multiplayer game. Step 6608-3 includes facilitating, via the network interface and in conjunction with the client device, play of the multiplayer game associated with the one of the plurality of game NFTs, when the one of the plurality of game token NFTs is selected.

FIG. 15P presents a flowchart representation 6600-4 of an example method. In particular, a method is presented for use in conjunction with one or more functions or features described herein. Step 6602-4 includes facilitating, via a network interface and in conjunction with a client device, play of a multiplayer game by a player of a plurality of players, wherein the player is associated with the client device. Step 6604-4 includes updating, via the processor, the multiplayer game to reflect that the player has collected an NFT from the multiplayer game when the player is determined to be a first player of a plurality of players to deposit the NFT at a collection verification site in the multiplayer game. Step 6606-4 includes issuing the NFT from the multiplayer game to the player when the player is determined to be the first player of a plurality of players to deposit the NFT at a collection verification site in the multiplayer game.

FIG. 15Q presents a flowchart representation 6600-5 of an example method. In particular, a method is presented for use in conjunction with one or more functions or features described herein. Step 6602-5 includes facilitating, via a network interface and in conjunction with a client device, play of a multiplayer game by a player of a plurality of players, wherein the player is associated with the client device. Step 6604-5 includes updating, via the processor, the multiplayer game to reflect that the player has collected crypto-currency from the multiplayer game when the player is determined to be a first player of a plurality of players to deposit the crypto-currency at a collection verification site in the multiplayer game. Step 6606-5 includes issuing the crypto-currency from the multiplayer game to the player when the player is determined to be the first player of a plurality of players to deposit the crypto-currency at a collection verification site in the multiplayer game.

Figure 15R:
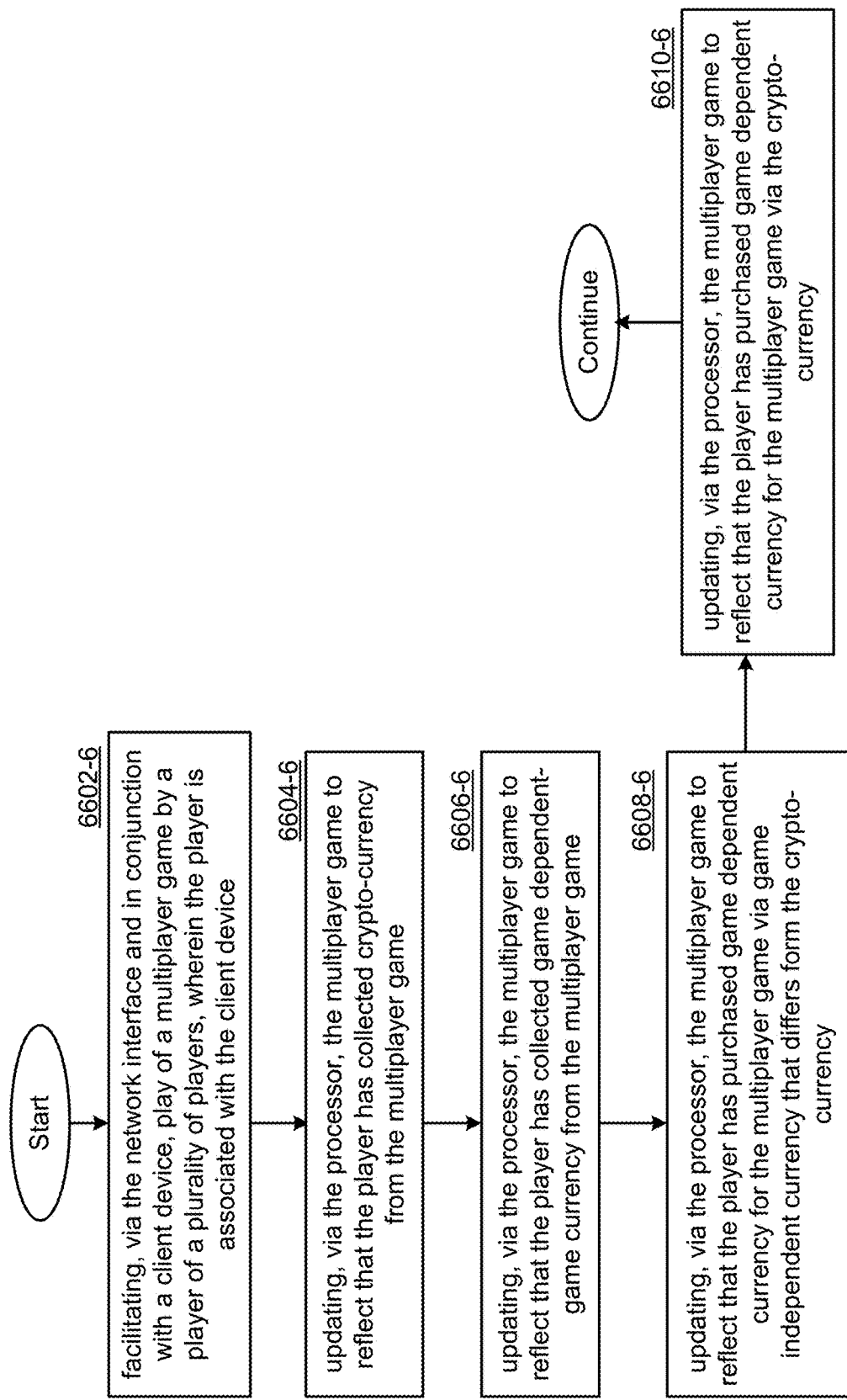
FIG. 15R presents a flowchart representation of an example method.

FIG. 15R presents a flowchart representation 6600-6 of an example method. In particular, a method is presented for use in conjunction with one or more functions or features described herein. Step 6602-6 includes facilitating, via a network interface and in conjunction with a client device, play of a multiplayer game by a player of a plurality of players, wherein the player is associated with the client device. Step 6604-6 includes updating, via the processor, the multiplayer game to reflect that the player has collected crypto-currency from the multiplayer game. Step 6606-6 includes updating, via the processor, the multiplayer game to reflect that the player has collected game dependent-game currency from the multiplayer game. Step 6608-6 includes updating, via the processor, the multiplayer game to reflect that the player has purchased game dependent currency for the multiplayer game via game independent currency that differs form the crypto-currency. Step 6610-6 includes updating, via the processor, the multiplayer game to reflect that the player has purchased game dependent currency for the multiplayer game via the crypto-currency.

Figure 16A:
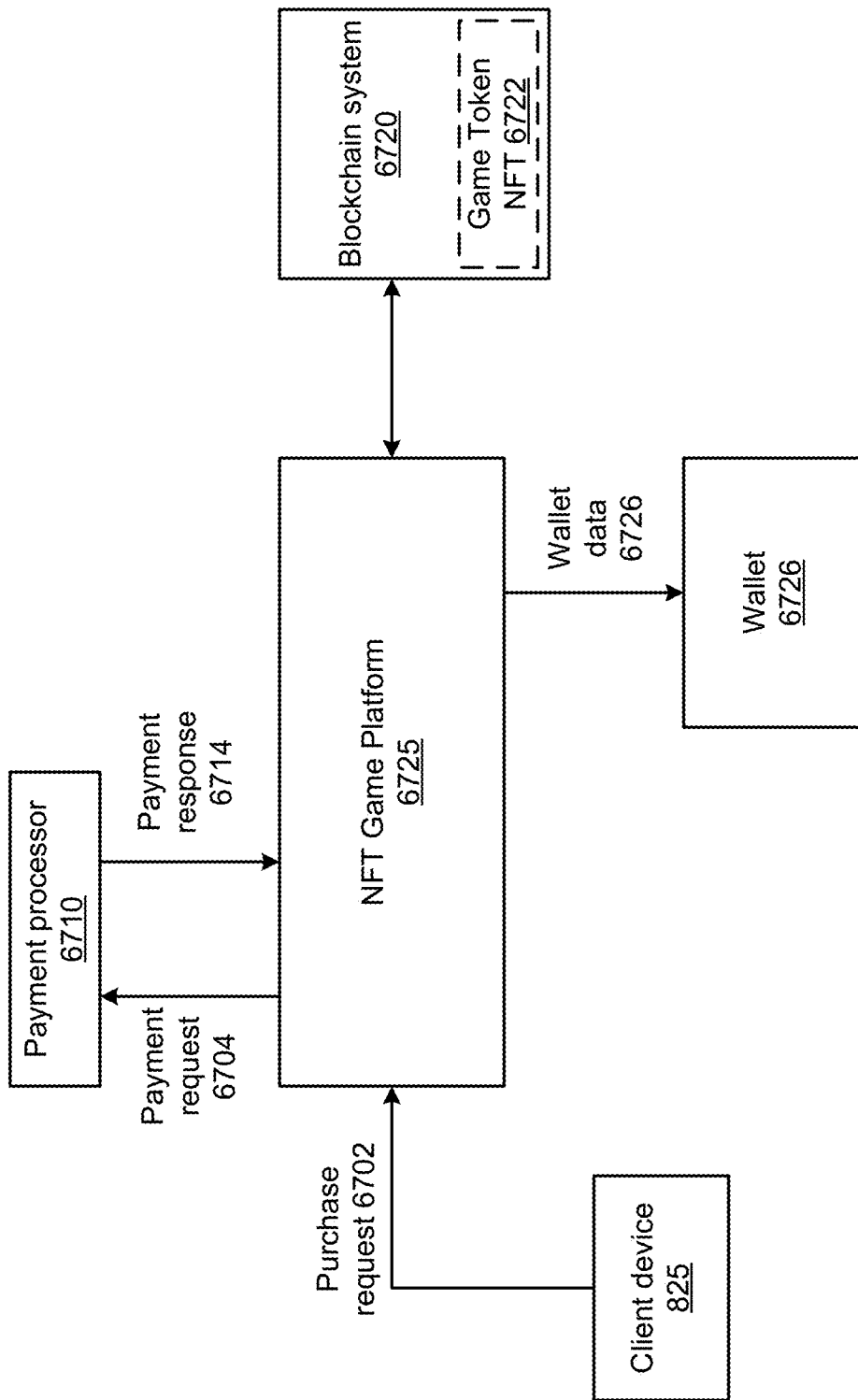
FIG. 16A presents a block diagram representation of an example system.

FIG. 16A presents a block diagram representation of an example system. In the system shown, a game token NFT 6722 is purchased and issued to a particular user of a client device 825. The game token NFT 6722, as previously discussed, while not associated with storage of the game application, nevertheless are associated with a user's ownership of and/or access to a particular game and can be used by a game application, client device 825 and/or game platform 6625 to provide authenticated access by the user to a game that, for example can be executed and/or streamed to a user's client device in order for the user to play the game.

The system includes a NFT platform 6725, such as NFT collection platform 800, NFT game platform 6500, NFT distribution platform 2800 or other NFT platform that operates to facilitate the creation of new NFTs such as game NFTs or other NFTs associated with games or other media and/or the play of games associated with one or more game NFTs that have been purchased or acquired by a player, collector or other user. The system further includes a client device 825, a payment processor 6710 or other marketplace or marketplace tool, a blockchain system 6720, such as NFT creation system 824 or other decentralized computer network and a wallet 6726, such as NFT wallet system 820 or other wallet.

A client device generates a purchase request 6702 for a game token NFT 6722 associated with an electronic game that is received by the NFT game platform 6725. The NFT game platform 6725 responds by generating a payment request 6704 and receives a payment response 6714 indicating whether or not the payment request is verified. In various examples, in response to the payment response verifying the payment request, the NFT game platform system 6725 facilitates the minting of a game token NFT 6722 associated with the electronic game. In addition, or in alternative, one or more game token NFTs can be minted prior to sale. In this fashion, for example, a limited and/or numbered series of game token NFTs can be minted and offered for sale to collectors. Furthermore, pre-minting a number of NFTs for sale can help expedite the sales because the minting of the game token NFTs does not need to occur in real-time.

In various examples, minting of the game token NFT 6722 includes generation of a private key associated with the game token NFT that is stored with NFT metadata and/or other wallet data 6726 in the wallet 6726. In other examples, an existing private key can be retrieved and used for the same purpose. The game token NFT 6722 serves to authenticate the purchase of the game or access to a game/tournament or game application by the user of the client device 825 and can be used to enable play of the electronic game via the client device 825, for example, by verification of the NFT authorization before the game is fully launched for game play via the client device 825. This improves the technology of game systems by providing a secure and incorruptible methodology for authenticating game/tournament access and/or authenticating the user to the game as the actual game owner or other authorized user/player. While a particular architecture is shown, other configurations, combinations and connections are likewise possible. Furthermore, other authentication systems & methodologies described herein, including any of the techniques described in conjunction with FIGS. 12A-12D, could likewise be employed.

FIG. 16B presents a flowchart representation 6700-1 of an example method. In particular, a method is presented for use in conjunction with one or more functions or features described herein. Step 6702-1 includes receiving, at the NFT platform and from a client device, a purchase request for a game token NFT associated with an electronic game. Step 6704-1 includes generating a payment request in response to the purchase request. Step 6706-1 includes receiving a payment response verifying the payment request. Step 6708-1 includes facilitating, in response to the payment response verifying the payment request, via the processor, issuance of a game token NFT associated with the electronic game for enabling play of the electronic game.

Figures 16C, 16D, 16E:
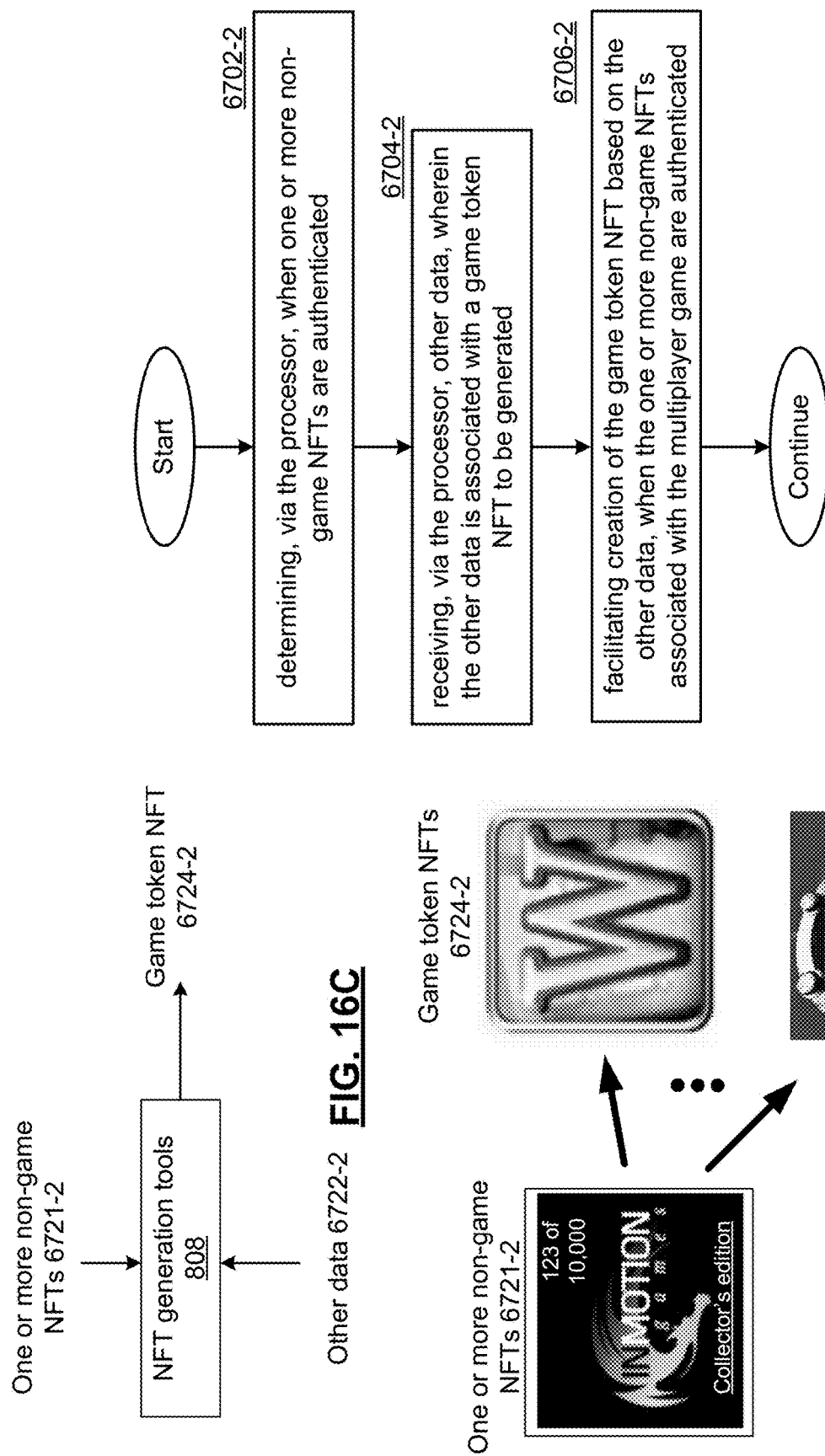
FIG. 16C presents a block/flow diagram representation of an example system.
FIG. 16D presents a pictorial/flow diagram representation of an example process.
FIG. 16E presents a flowchart representation of an example method.

FIG. 16C presents a block/flow diagram representation of an example system. In this example, ownership (e.g. authenticated ownership) by a user of one or more non-game NFTs 6721-2 is used to automatically trigger the generation of a game token NFT 6724-2 based on other data 6722-2. As used herein, a non-game NFT is an NFT that, even though it may provide benefits to a particular game and have value to collectors independent of a particular, it is not specific to a particular game. In this fashion, a game studio may issue NFTs that provide subsidiary benefits to a number of different games as opposed to one specific game. For example, one or more non-game NFTs 6721-2 associated with InMotion Games, may provide benefits to a number of different games produced by InMotion, as opposed to any one specific game.

In the example shown in FIG. 16D, after a non-game NFTs 6721-2 associated with InMotion Games is authenticated to the user, game token NFTs 6724-2 are generated as a result. While ownership/collection of a single NFT triggers generation of multiple game token NFTs, in other examples, ownership collection of multiple non-game NFTs may be required to generate either a single game token NFT or a series of game token NFTs associated with a single game or different games.

In this fashion, a non-game NFT associated with a film or series of films, may provide benefits to a particular game that is based on characters from the film(s), even though it is primarily associated with the film(s) themselves. For example, a non-game NFT associated with Harry Potter series of films may provide subsidiary benefits to a particular game that is based on characters from the Harry Potter film(s), even though the NFT is primarily associated with the film(s) themselves. In this fashion, a non-game NFT associated with an unrelated product, may provide subsidiary benefits to a particular game that is sponsored by the producer of this product. For example, a Fritos NFT may provide benefits to a particular game that is sponsored by Frito-Lay.

In this context, the other data 6722-2 can include the particular image to be associated with the game token NFT 6724-2 along with other data used in NFT generation as previously described herein.

FIG. 16E presents a flowchart representation 6700-2 of an example method. In particular, a method is presented for use in conjunction with one or more functions or features described herein. Step 6702-2 includes determining, via the processor, when one or more non-game NFTs are authenticated. Step 6704-2 includes receiving, via the processor, other data, wherein the other data is associated with a game token NFT to be generated. Step 6706-2 includes facilitating creation of the game token NFT based on the other data, when the one or more non-game NFTs associated with the multiplayer game are authenticated.

FIG. 16F presents a block/flow diagram representation of an example system. In this example, ownership (e.g. authenticated ownership) by a user of one or more game-collected NFTs 6721-3 is used to automatically trigger the generation of a game token NFT 6724-3 based on other data 6722-3. As used herein, a game collected NFT is an NFT that was collected via play/use of a game to be associated with the game token. In the example shown in FIG. 16G, after a user/player has collected NFTs 6721-3 via play of I Dig It, and these NFTs are authenticated to the user, game token NFT 6724-2 is generated as a result. In this fashion, a user can collect new game tokens to a game that can be used in future play if older game tokens to that game expire after a time or due to the loss of the game by a player. These new game tokens can also be bartered or sold.

FIG. 16H presents a flowchart representation 6700-3 of an example method. In particular, a method is presented for use in conjunction with one or more functions or features described herein. Step 6702-3 includes determining, via the processor, when one or more game-collected NFTs associated with a multiplayer game are authenticated. Step 6704-3 includes receiving, via the processor, other data, wherein the other data is associated with a game token NFT to be generated. Step 6706-3 includes facilitating creation (e.g., issuance) of the game token NFT based on the other data, when the one or more game-collected NFTs associated with the multiplayer game are authenticated.

Figure 16I:
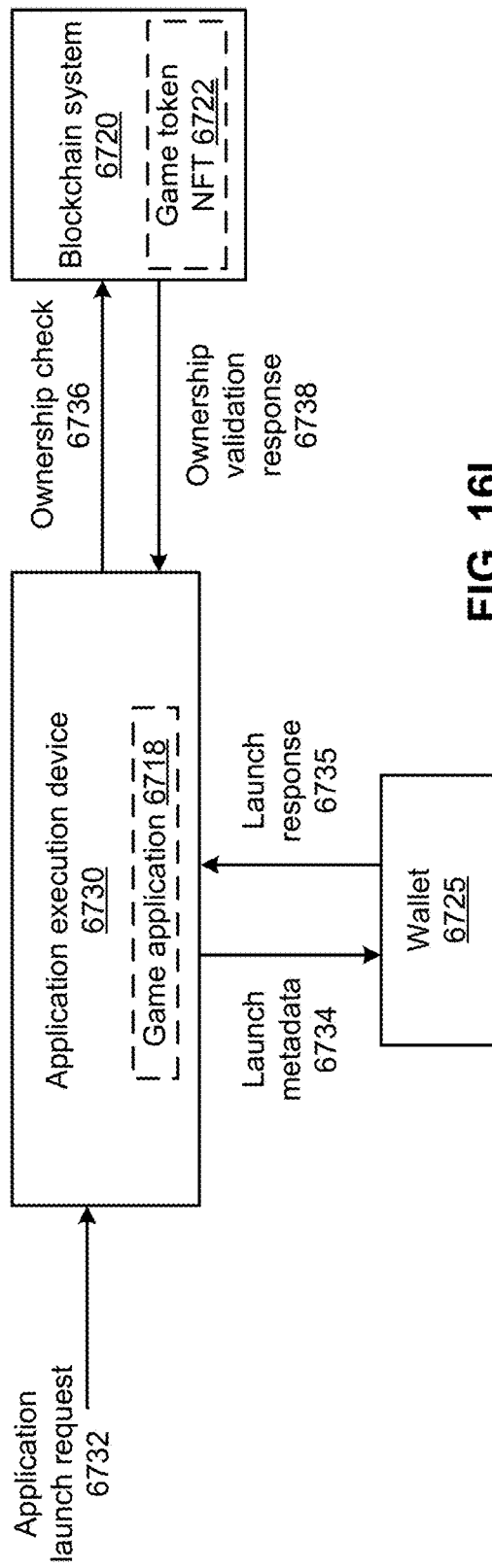
FIGS. 16I-16J present a block/flow diagram representations of example systems.
Figure 16J:
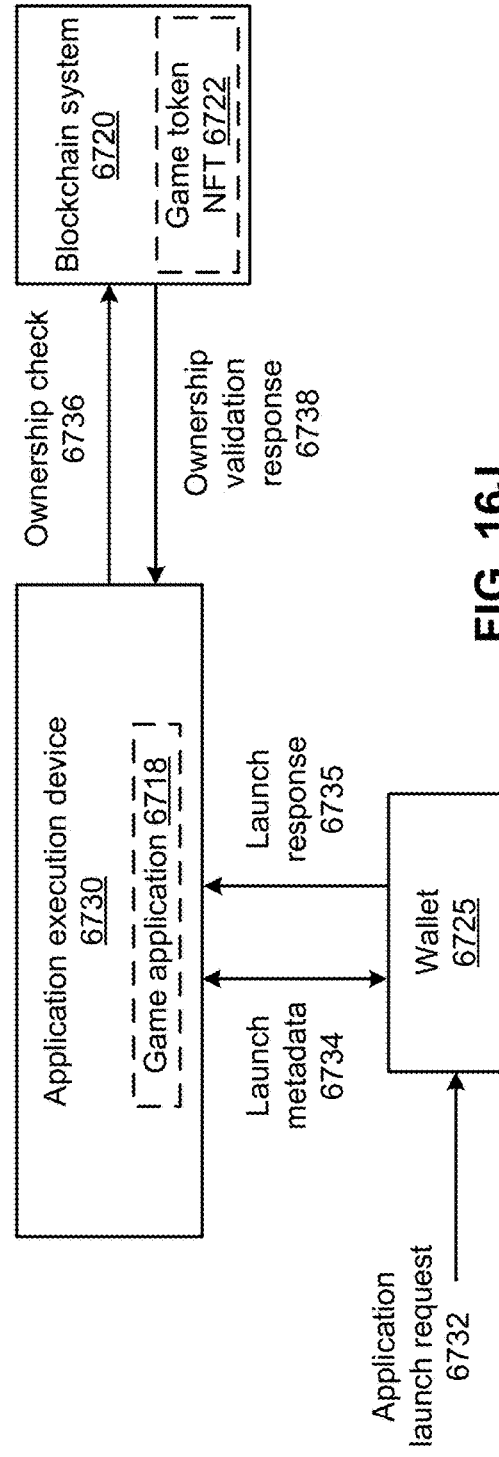

FIGS. 16I-16J present a block/flow diagram representations of example systems. In the example shown in FIG. 16I, an application execution device 6730 stores the game application 6718 for execution having a game token NFT 6722 associated therewith. Similar devices shown in FIG. 16A are represented by similar reference numerals. The application execution device can be a client device 825, an NFT platform 800, NFT game platform 6625, NFT game platform 6500 or other NFT platform or other device for executing the game application 6718 to facilitate play of the game.

In operation, the application execution device 6730 operates in response to an application launch request 6732 for the game application 6718. This application launch request 6732 can be received (internally) from a user interface associated with the application execution device 6730 (e.g. a client device or NFT platform) and/or received from an external device such as a client device, when for example, the application execution device 6730 corresponds to an NFT platform in communication with a client device. Once execution of the gaming application is initiated in response to the application launch request 6732, launch metadata 6734 is generated, for example, to determine if the launch request can be validated. The launch metadata 6734 is sent to the wallet 6725 containing a private key associated with the game token NFT 6722 associated with a user, such as a user of the application execution device and/or the application execution device 6730. The application execution device 6730 receives from the wallet 6726, a launch response 6735 that is generated based on the private key. The game application generates, based on the launch response 6736, an ownership check 6736 that is sent to the blockchain system 6720 that stores the game token NFT 6722. An ownership validation response 6738 is received from the blockchain system 6720 that enables play of the game via the game application 6718 when the ownership validation response 6738 indicates ownership of the game token NFT 6722 is verified and prevents play of the game via the game application 6718 when the ownership validation response 6738 indicates ownership of the game token NFT 6722 is not verified. When not verified, the game application 6718 can, for example, shut itself down. In this fashion, the game application 6718 can self-validate on launch to verify ownership/authorized use by the user using game token NFT data in a user's wallet which holds the private key to the game token NFT 6722.

In various examples, the launch metadata 6734 can include a current date and time, expiration information (if any) and a version number of the game application 6718, a counter that indicates a number of times the application has been executed, and/or other data corresponding to the game token NFT 6722, the game application 6718 and/or the launch. The launch response 6735 can include a public key associated with the game token NFT 6722, a signed hash that is based on the private key, the launch metadata 6734, and/or other data/metadata to be used to validate the NFT data from the wallet 6725 to the game token NFT 6722. In this fashion, the private key is not shared directly with the application binary—and instead is merely used by the wallet 6725 in a secure fashion.

The ownership check 6736 can include information from the launch response 6735, additional owner/user information, such as user authentication data, associated with the user and/or owner of the game token NFT 6722 and or other and/or other data/metadata to be used to validate the NFT data from the wallet 6725 to the game token NFT 6722. In various examples, the blockchain system 6720 can include an NFT transaction authenticator 6022, a secure real-time NFT metadata repository 6024 and an NFT source 6026 that actually stores the game token NFT 6722 on a blockchain or other decentralized computer system/network and user authentication/NFT validation can take place, for example as described in conjunction with FIGS. 12A-12D.

FIG. 16J presents a block diagram representation of an example system. This system operates similarly to the system of FIG. 16I, however, the application launch request 6732 is received directly from the wallet 6725.

FIG. 16K presents a flowchart representation 6700-4 of an example method. In particular, a method is presented for use in conjunction with one or more functions or features described herein. Step 6702-4 includes receiving an application launch request for a game application having a game token NFT associated therewith. Step 6704-4 includes generating, in response to the application launch request, launch metadata. Step 6706-4 includes sending the launch metadata to a wallet associated with a user of the client device, the wallet containing a private key associated with the game token NFT. Step 6708-4 includes receiving, from the wallet, a launch response that is generated based on the private key. Step 6710-4 includes generating, based on the launch response, an ownership check. Step 6712-4 includes sending the ownership check to a blockchain system that stores the game token NFT. Step 6714-4 includes receiving, from the blockchain system, an ownership validation response. Step 6716-4 includes enabling, via the game application, play of the game when the ownership validation response indicates ownership of the game token NFT is verified. Step 6718-4 includes preventing, via the game application, play of the game when the ownership validation response indicates the ownership of the game token NFT is not verified.

Figure 16L:
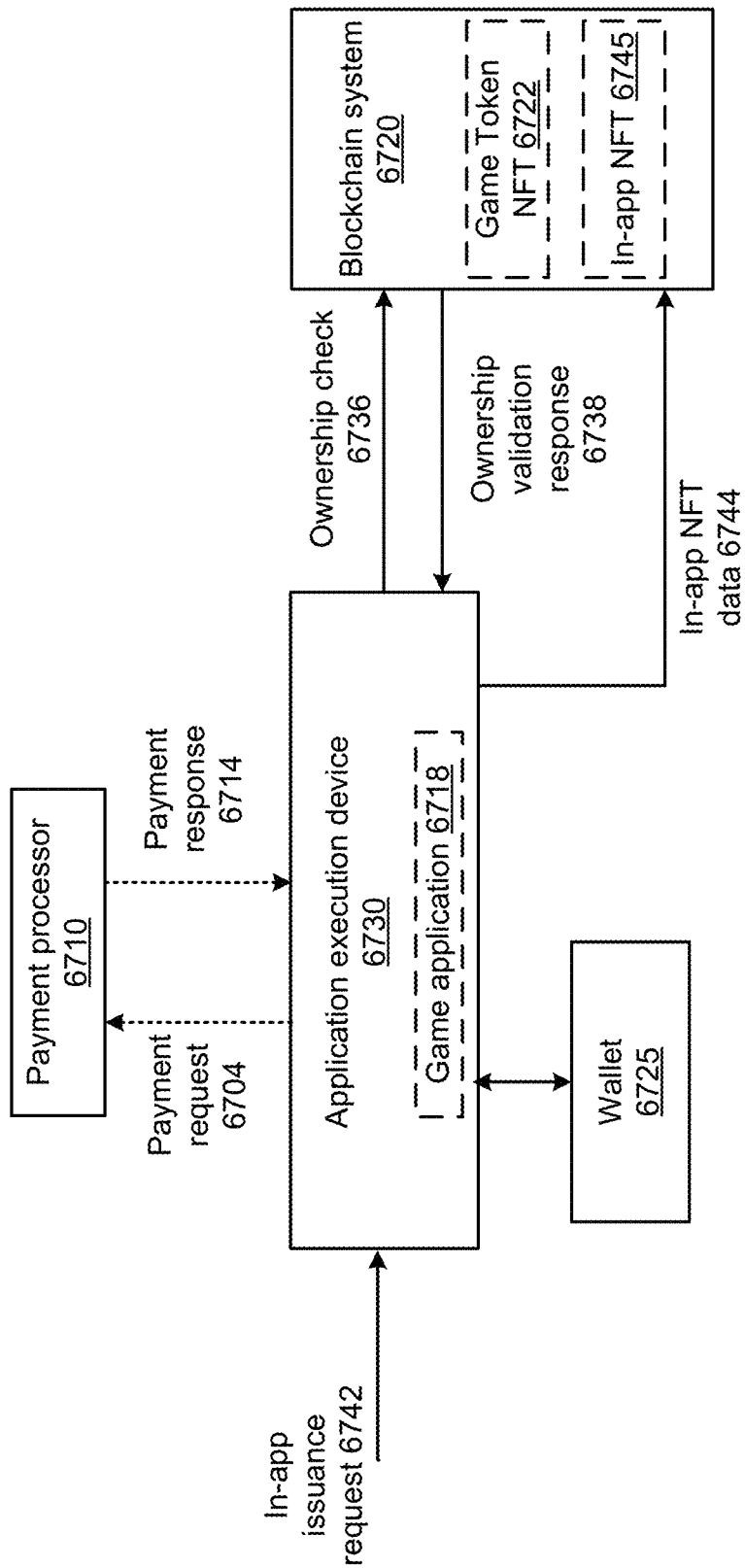
FIG. 16L presents a block/flow diagram representation of an example system.

FIG. 16L presents a block/flow diagram representation of an example system. This example addresses a scenario where NFT's can be issued in-application (in-app NFTs). These in-app NFTs can correspond to any of the game-collected NFTs and/or other collected or collectable items, achievements, purchased items, and or other NFTs that can be purchased, earned and/or collected in-app. For example, first launch for a new user can issue an unsealing/open box NFT that is the digital equivalent of opening the box of a physical good and collecting a prize. These in-app NFT's can be tied to the user/owner of the game token NFT 6722 and/or tied to a particular instance of the game application 6718. This allows some NFTs to be transferred when ownership of the game application is transferred via sale or micro-loan of the game token NFT 6718. In other examples, the in-app NFTs can be independently sold and disassociated with the game token NFT 6722.

In various examples, the application execution device 6730 receives an in-app issuance request 6742 from a gaming application 6718 that was generated either automatically or in response to user interaction with the game. The application execution device 6730 responds by facilitating, based on in-app NFT data 6744, the minting of an in-game NFT 6745 associated with the electronic game based on an authentication of the ownership of the game application 6718 via ownership of the associated game token NFT 6722 by the user/owner that is playing the game.

In various examples, the system operates by: generating, via the application execution device 6730, an ownership check 6736; sending the ownership check 6736 to a blockchain system 6720 that stores a game token NFT 6722 associated with the electronic game and the user; receiving, from the blockchain system 6720, an ownership validation response 6738; and facilitating, via the game application 6718, a minting/issuance of the in-app NFT 6745 when the ownership validation response 6738 indicates ownership of the game token NFT 6722 is verified.

In this example shown, an ownership check 6736 is initiated not only on launch of the game application 6718, but also when an in-app issuance request 6742 is initiated to generate a in-app NFT. The in-app NFT 6745 is only minted when a favorable ownership validation response 6738 is received indicating validated ownership and/or user authentication of the game token NFT 6722. Furthermore, a favorable payment response 6714 may be required when the in-app issuance request 6742 has an associated a cost. Otherwise, if payment is denied or ownership validation fails, the requested in-app NFT 6745 is not minted.

FIG. 16M presents a flowchart representation 6700-5 of an example method. In particular, a method is presented for use in conjunction with one or more functions or features described herein. Step 6702-5 includes receiving, at the NFT platform and from a game application associated with an electronic game played by a user, an in-app issuance request for an in-app NFT. Step 6704-5 includes generating, via the NFT platform, an ownership check. Step 6706-5 includes sending the ownership check to a blockchain system that stores a game token NFT associated with the electronic game and the user. Step 6708-5 includes receiving, from the blockchain system, an ownership validation response. Step 6710-5 includes facilitating, via the game application, issuance of the in-app NFT when the ownership validation response indicates ownership of the game token NFT is verified.

Figure 17A:
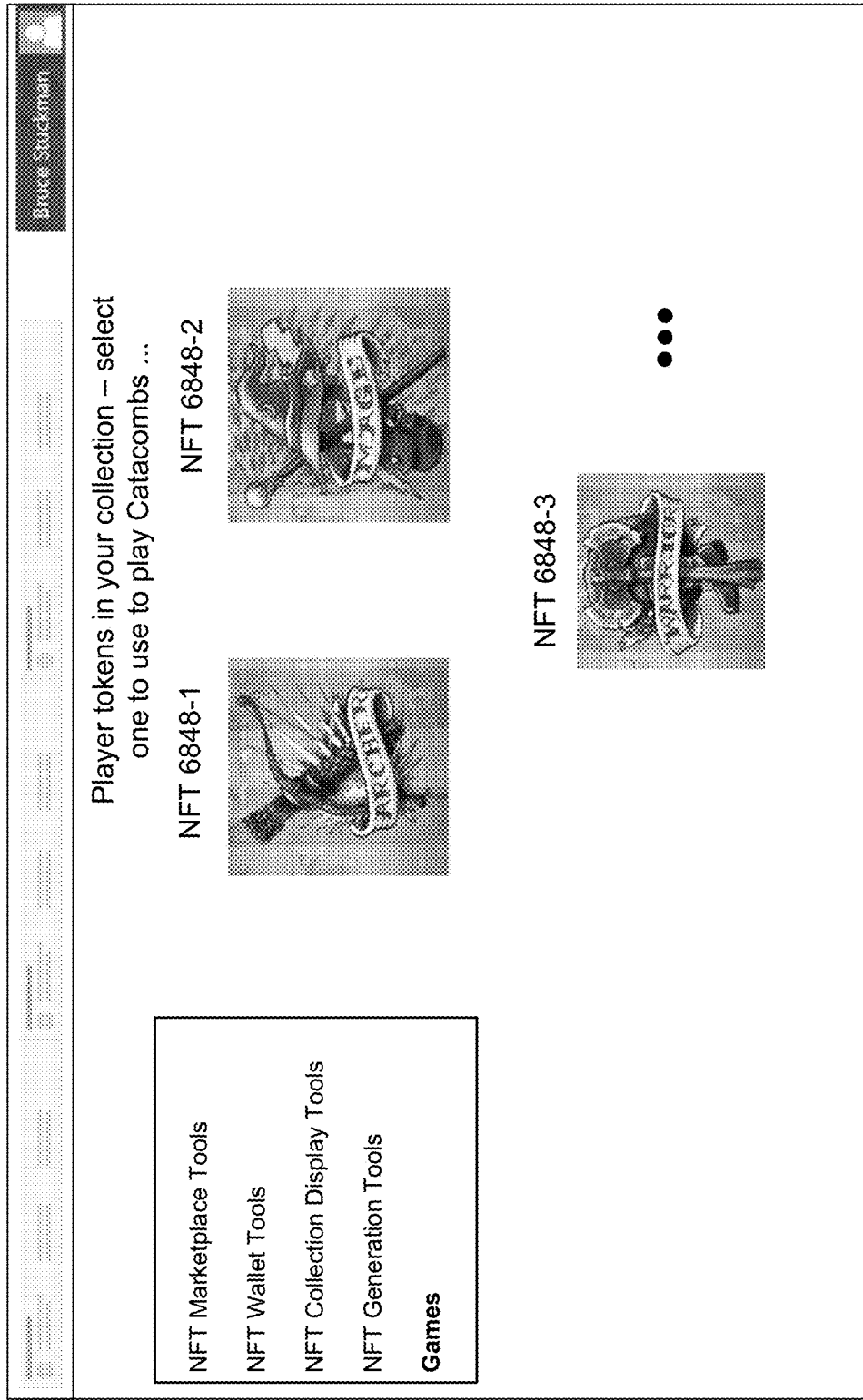
FIG. 17A presents a pictorial representation of an example screen display.

FIG. 17A presents a pictorial representation of an example screen display. In various examples, one or more player token NFTs 6848 can be purchased, collected or otherwise issued to a particular user of a client device 825. The player token NFTs 6848, are specific examples of game token NFTs and can be used to provide authenticated access by the user to a game that, for example can be executed and/or streamed to a user's client device in order for the user to play a particular game. In addition, player token NFTs are associated with a particular player and/or the associated player/character used in the game. In this fashion, a player token NFT 6848, while not associated with storage of the game application, nevertheless are associated with a user's ownership and/or control of and/or access to a particular player/character of game and can be used by a game application, client device 825 and/or game platform 6625 to provide authenticated access by the user to play the game— with the associated player/character.

In the example shown, the player token NFTs 6848-1, 6848-2, 6848-3 . . . are each associated with a different players associated with the game Catacombs.

Figure 17B:
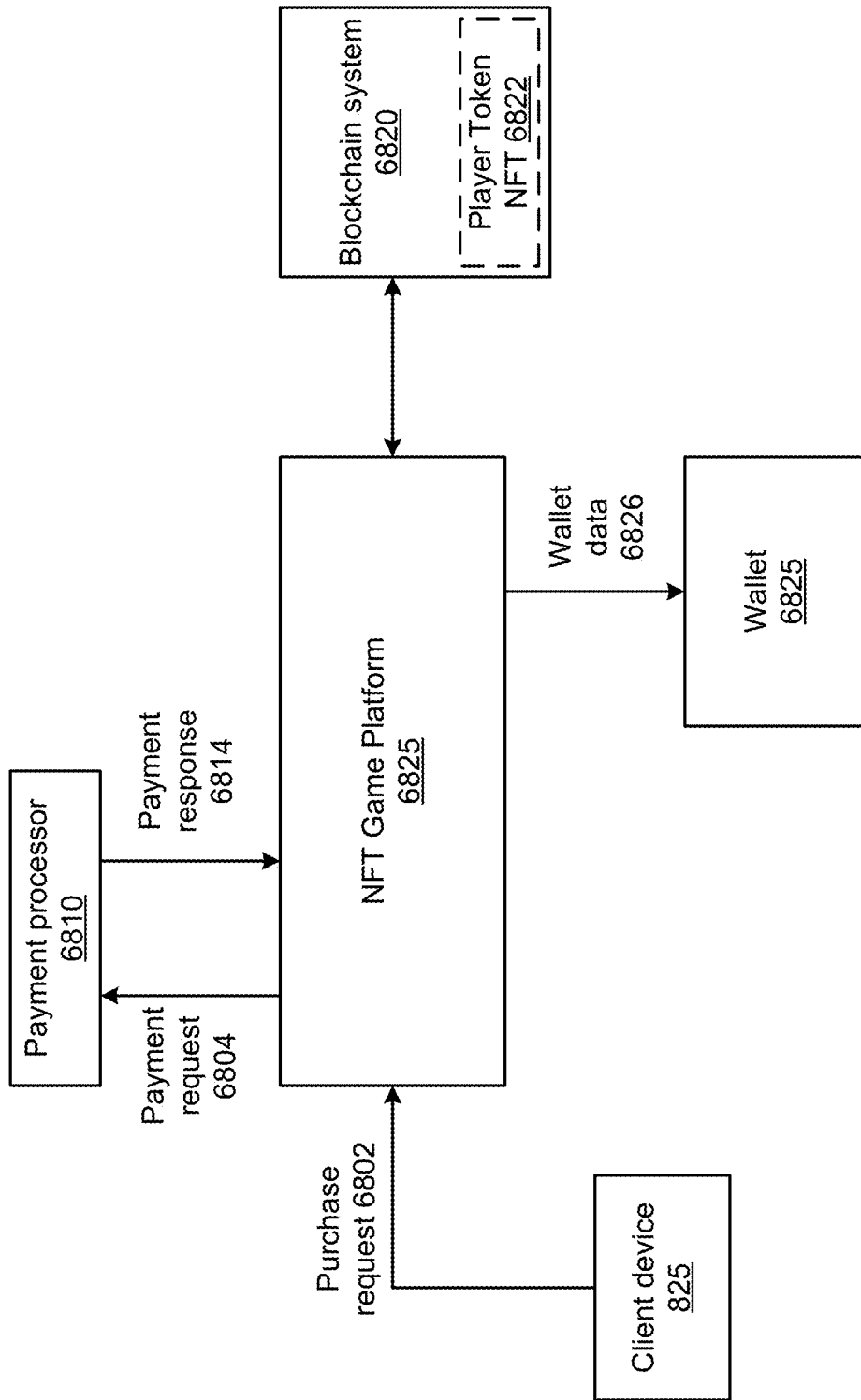
FIG. 17B presents a block diagram representation of an example system.

FIG. 17B presents a block diagram representation of an example system. The system includes a NFT platform 6825, such as NFT collection platform 800, NFT game platform 6500, NFT distribution platform 2800 or other NFT platform that operates to facilitate the creation of new NFTs such as game NFTs or other NFTs associated with games or other media and/or the play of games associated with one or more game NFTs that have been purchased or acquired by a player, collector or other user. The system further includes a client device 825, a payment processor 6810 or other marketplace or marketplace tool, a blockchain system 6820, such as NFT creation system 824 or other decentralized computer system and a wallet 6826, such as NFT wallet system 820 or other wallet.

A client device generates a purchase request 6802 for a player token NFT 6822 associated with an electronic game that is received by the NFT game platform 6825. The NFT game platform 6825 responds by generating a payment request 6804 and receives a payment response 6814 indicating whether or not the payment request is verified. In various examples, in response to the payment response verifying the payment request, the NFT game platform system 6825 facilitates the minting of a player token NFT 6822 associated with the electronic game. In addition, or in alternative, one or more player token NFTs can be minted prior to sale. In this fashion, for example, a limited and/or numbered series of player token NFTs can be minted and offered for sale to collectors. Furthermore, pre-minting a number of NFTs for sale can help expedite the sales because the minting of the player token NFTs does not need to occur in real-time.

In various examples, minting of the player token NFT 6822 includes generation of a private key associated with the player token NFT that is stored with NFT metadata and/or other wallet data 6826 in the wallet 6826. In other examples, an existing private key can be retrieved and used for the same purpose. The player token NFT 6822 serves to authenticate the purchase of the game or access to a game/tournament or game application by the user of the client device 825 and can be used to enable play of the electronic game via the client device 825, for example, by verification of the NFT authorization before the game is fully launched for game play via the client device 825. This improves the technology of game systems by providing a secure and incorruptible methodology for authenticating game/tournament access and/or authenticating the user to the game as the actual game owner or other authorized user/player and/or associated character. While a particular architecture is shown, other configurations, combinations and connections are likewise possible. Furthermore, other authentication systems & methodologies described herein, including any of the techniques described in conjunction with FIGS. 12A-12D, could likewise be employed.

FIG. 17C presents a flowchart representation 6800-1 of an example method. In particular, a method is presented for use in conjunction with one or more functions or features described herein. Step 6802-1 includes receiving, at the NFT platform and from a client device, a purchase request for a player token NFT associated with an electronic game. Step 6804-1 includes generating a payment request in response to the purchase request. Step 6806-1 includes receiving a payment response verifying the payment request. Step 6808-1 includes facilitating, in response to the payment response verifying the payment request, via the processor, issuance of a player token NFT associated with the electronic game for enabling play of the electronic game.

FIG. 17D presents a block/flow diagram representation of an example system. In this example, ownership (e.g. authenticated ownership) by a user of one or more non-game NFTs 6821-2 is used to automatically trigger the generation of a player token NFT 6824-2 based on other data 6822-2. As used herein, a non-game NFT is an NFT that, even though it may provide benefits to a particular game and have value to collectors independent of a particular, it is not specific to a particular game. In this fashion, a game studio may issue NFTs that provide subsidiary benefits to a number of different games as opposed to one specific game. For example, one or more non-game NFTs 6821-2 associated with InMotion Games, may provide benefits to a number of different games produced by InMotion, as opposed to any one specific game.

In the example shown in FIG. 17E, after a non-game NFTs 6821-2 associated with InMotion Games is authenticated to the user, player token NFTs 6824-2 are generated as a result. While ownership/collection of a single NFT triggers generation of multiple player token NFTs, in other examples, ownership collection of multiple non-game NFTs may be required to generate either a single player token NFT or a series of player token NFTs associated with a single game or different games.

In this fashion, a non-game NFT associated with a film or series of films, may provide benefits to a particular game that is based on characters from the film(s), even though it is primarily associated with the film(s) themselves. For example, a non-game NFT associated with Harry Potter series of films may provide benefits to a particular game that is based on characters from the Harry Potter film(s), even though the NFT is primarily associated with the film(s) themselves. In this fashion, a non-game NFT associated with an unrelated product, may provide benefits to a particular game that is sponsored by the producer of this product. For example, a Fritos NFT may provide benefits to a particular game that is sponsored by Frito-Lay.

In this context, the other data 6822-2 can include the particular image to be associated with the player token NFT 6824-2 along with other data used in NFT generation as previously described herein.

FIG. 17F presents a flowchart representation 6800-2 of an example method. In particular, a method is presented for use in conjunction with one or more functions or features described herein. Step 6802-2 includes determining, via the processor, when one or more non-game NFTs are authenticated. Step 6804-2 includes receiving, via the processor, other data, wherein the other data is associated with a player token NFT to be generated. Step 6806-2 includes facilitating creation of the player token NFT based on the other data, when the one or more non-game NFTs associated with the multiplayer game are authenticated.

FIG. 17G presents a block/flow diagram representation of an example system. In this example, ownership (e.g. authenticated ownership) by a user of one or more game-collected NFTs 6821-3 is used to automatically trigger the generation of a player token NFT 6824-3 based on other data 6822-3. As used herein, a game collected NFT is an NFT that was collected via play/use of a game to be associated with the player token. In the example shown in FIG. 17H, after a user/player has collected NFTs 6821-3 via play of Catacombs, and these NFTs are authenticated to the user, player token NFT 6824-2 is generated as a result. In this fashion, a user can collect new player tokens to a game that can be used in future play if older player tokens to that game expire after a time or due to the loss of the game by a player.

FIG. 17I presents a flowchart representation 6800-3 of an example method. In particular, a method is presented for use in conjunction with one or more functions or features described herein. Step 6802-3 includes determining, via the processor, when one or more game-collected NFTs associated with a multiplayer game are authenticated. Step 6804-3 includes receiving, via the processor, other data, wherein the other data is associated with a player token NFT to be generated. Step 6806-3 includes facilitating creation (e.g., issuance) of the player token NFT based on the other data, when the one or more game-collected NFTs associated with the multiplayer game are authenticated.

Figure 17J:
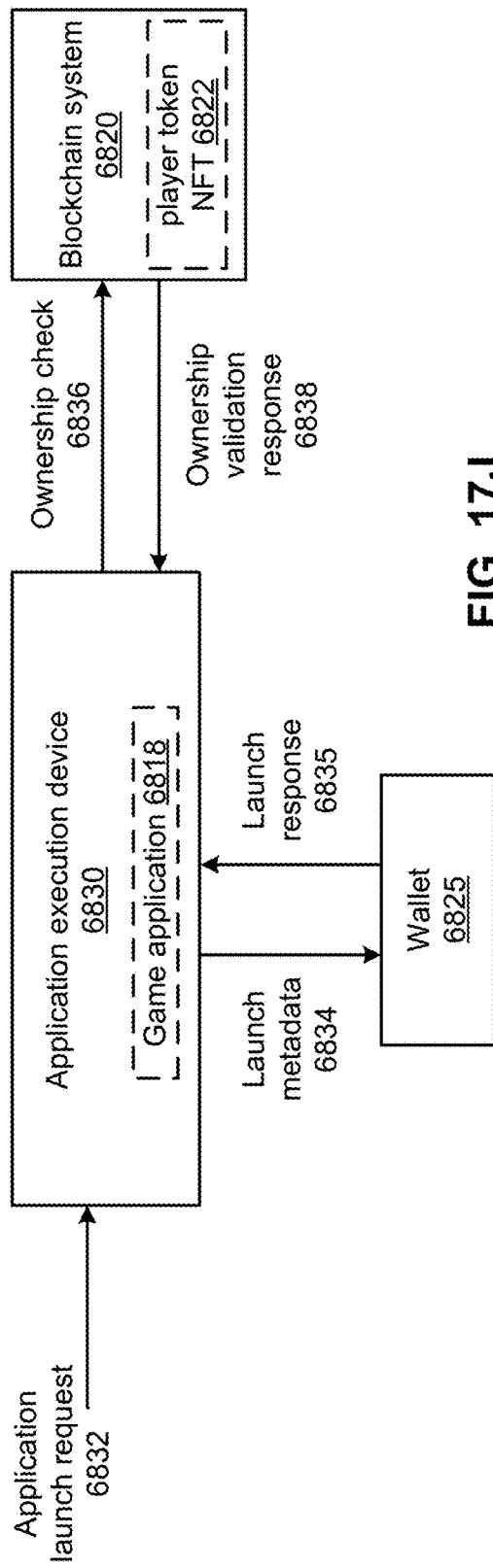
FIGS. 17J-17K present a block/flow diagram representations of example systems.
Figure 17K:
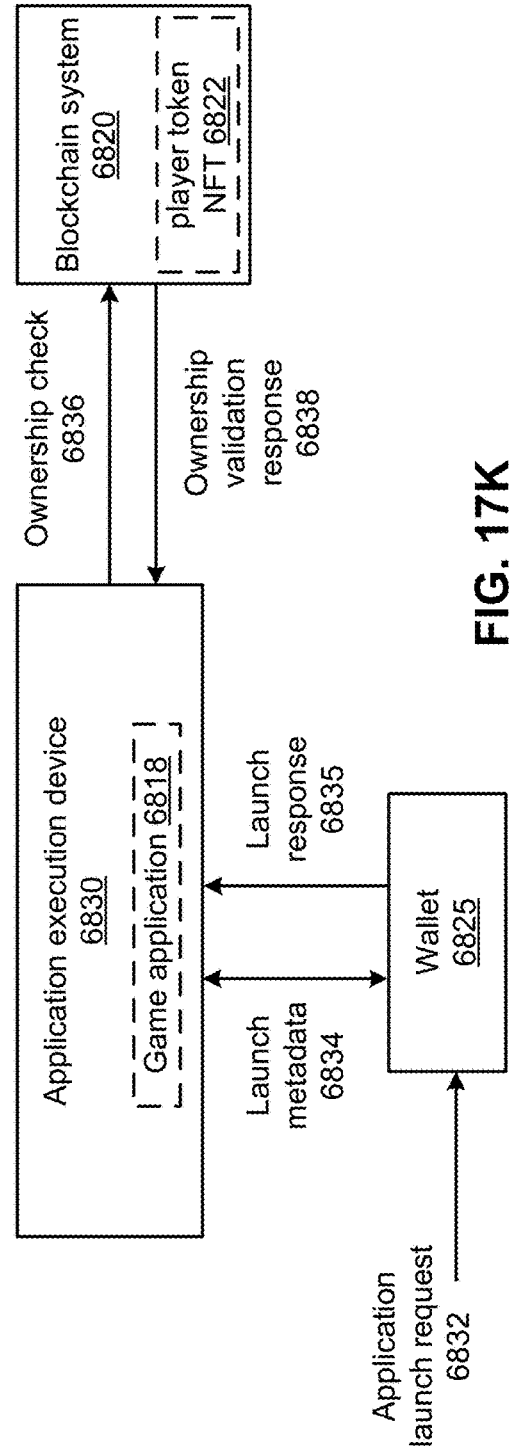

FIGS. 17J-17K present a block/flow diagram representations of example systems. In the example shown in FIG. 17J, an application execution device 6830 stores the game application 6818 for execution having a player token NFT 6822 associated therewith. Similar devices shown in FIG. 17B are represented by similar reference numerals. The application execution device can be a client device 825, an NFT platform 800, NFT game platform 6625 or other NFT platform or other device for executing the game application 6818 to facilitate play of the game.

In operation, the application execution device 6830 operates in response to application launch request 6832 for the game application 6818. This application launch request 6832 can be received (internally) from a user interface associated with the application execution device 6830 (e.g. a client device or NFT platform) and/or received from an external device such as a client device, when for example, the application execution device 6830 corresponds to an NFT platform in communication with a client device. Once execution of the gaming application is initiated in response to the application launch request 6832, launch metadata 6834 is generated, for example, to determine if the launch request can be validated. The launch metadata 6834 is sent to the wallet 6825 containing a private key associated with the player token NFT 6822 associated with a user, such as a user of the application execution device and/or the application execution device 6830. The application execution device 6830 receives from the wallet 6826, a launch response 6835 that is generated based on the private key. The game application generates, based on the launch response 6836, an ownership check 6836 that is sent to the blockchain system 6820 that stores the player token NFT 6822. An ownership validation response 6838 is received from the blockchain system 6820 that enables play of the game via the game application 6818 when the ownership validation response 6838 indicates ownership of the player token NFT is verified and prevents play of the game via the game application 6818 when the ownership validation response 6838 indicates ownership of the player token NFT is not verified. When not verified, the game application 6818 can, for example, shut itself down. In this fashion, the game application 6818 can self-validate on launch to verify ownership/authorized use by the user using player token NFT data in a user's wallet which holds the private key to the player token NFT 6822.

In various examples, the launch metadata 6834 can include a current date and time, expiration information (if any) and a version number of the game application 6818, a counter that indicates a number of times the application has been executed, and/or other data corresponding to the player token NFT 6822, the game application 6818 and/or the launch. The launch response 6835 can include a public key associated with the player token NFT 6822, a signed hash that is based on the private key, the launch metadata 6834, and/or other data/metadata to be used to validate the NFT data from the wallet 6825 to the player token NFT 6822. In this fashion, the private key is not shared directly with the application binary—and instead is merely used by the wallet 6825 in a secure fashion.

The ownership check 6836 can include information from the launch response 6835, additional owner/user information, such as user authentication data, associated with the user and/or owner of the player token NFT 6822 and or other and/or other data/metadata to be used to validate the NFT data from the wallet 6825 to the player token NFT 6822. In various examples, the blockchain system 6820 can include an NFT transaction authenticator 6022, a secure real-time NFT metadata repository 6024 and an NFT source 6026 that actually stores the player token NFT 6822 on a blockchain or other decentralized computer system/network and user authentication/NFT validation can take place, for example as described in conjunction with FIGS. 12A-12D.

FIG. 17K presents a block diagram representation of an example system. This system operates similarly to the system of FIG. 17I, however, the application launch request 6832 is received directly from the wallet 6825.

FIG. 17L presents a flowchart representation 6800-4 of an example method. In particular, a method is presented for use in conjunction with one or more functions or features described herein. Step 6802-4 includes receiving an application launch request for a game application having a player token NFT associated therewith. Step 6804-4 includes generating, in response to the application launch request, launch metadata. Step 6806-4 includes sending the launch metadata to a wallet associated with a user of the client device, the wallet containing a private key associated with the player token NFT. Step 6808-4 includes receiving, from the wallet, a launch response that is generated based on the private key. Step 6810-4 includes generating, based on the launch response, an ownership check. Step 6812-4 includes sending the ownership check to a blockchain system that stores the player token NFT. Step 6814-4 includes receiving, from the blockchain system, an ownership validation response. Step 6816-4 includes enabling, via the game application, play of the game when the ownership validation response indicates ownership of the player token NFT is verified. Step 6818-4 includes preventing, via the game application, play of the game when the ownership validation response indicates the ownership of the player token NFT is not verified.

Figure 17M:
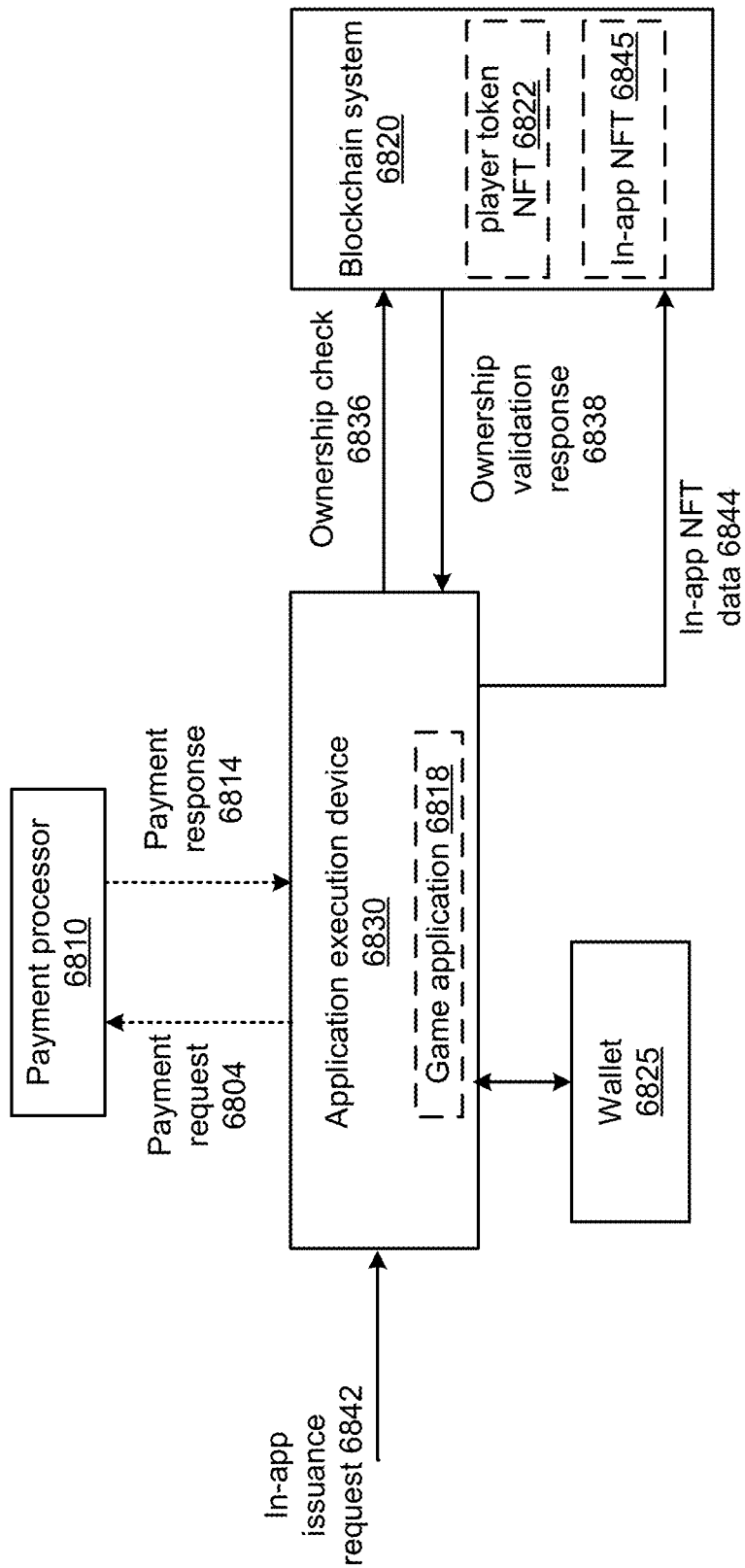
FIG. 17M presents a block/flow diagram representation of an example system.

FIG. 17M presents a block/flow diagram representation of an example system. This example addresses a scenario where NFT's can be issued in-application (in-app NFTs). These in-app NFTs can correspond to game-collected NFTs and/or other collected or collectable items, achievements, purchased items, and or other NFTs that can be purchased or collected in-app. For example, first launch for a new user can issue an unsealing/open box NFT that is the digital equivalent of opening the box of a physical good and collecting a prize. These in-app NFT's can be tied to the user/owner of the player token NFT 6822 and/or tied to a particular instance of the game application 6818. This allows some NFTs to be transferred when ownership of the game application is transferred via sale or micro-loan of the player token NFT 6818. In other examples, the in-app NFTs can be independently sold and disassociated with the player token NFT 6822.

In various examples, the application execution device 6830 receives an in-app issuance request 6842 from a gaming application 6818 that was generated either automatically or in response to user interaction with the game. The application execution device 6830 responds by facilitating, based on in-app NFT data 6844, the minting of an in-game NFT 6845 associated with the electronic game based on an authentication of the ownership of the game application 6818 via ownership of the associated player token NFT 6822 by the user/owner that is playing the game.

In various examples, the system operates by: generating, via the application execution device 6830, an ownership check 6836; sending the ownership check 6836 to a blockchain system 6820 that stores a player token NFT 6822 associated with the electronic game and the user; receiving, from the blockchain system 6820, an ownership validation response 6838; and facilitating, via the game application 6818, a minting/issuance of the in-app NFT 6845 when the ownership validation response 6838 indicates ownership of the player token NFT 6822 is verified.

In this example shown, an ownership check 6836 is initiated not only on launch of the game application 6818, but also when an in-app issuance request 6842 is initiated to generate a in-app NFT. The in-app NFT 6845 is only minted when a favorable ownership validation response 6838 is received indicating validated ownership and/or user authentication of the player token NFT 6822. Furthermore, a favorable payment response 6814 may be required when the in-app issuance request 6842 has an associated a cost. Otherwise, if payment is denied or ownership validation fails, the requested in-app NFT 6845 is not minted.

Figure 17N:
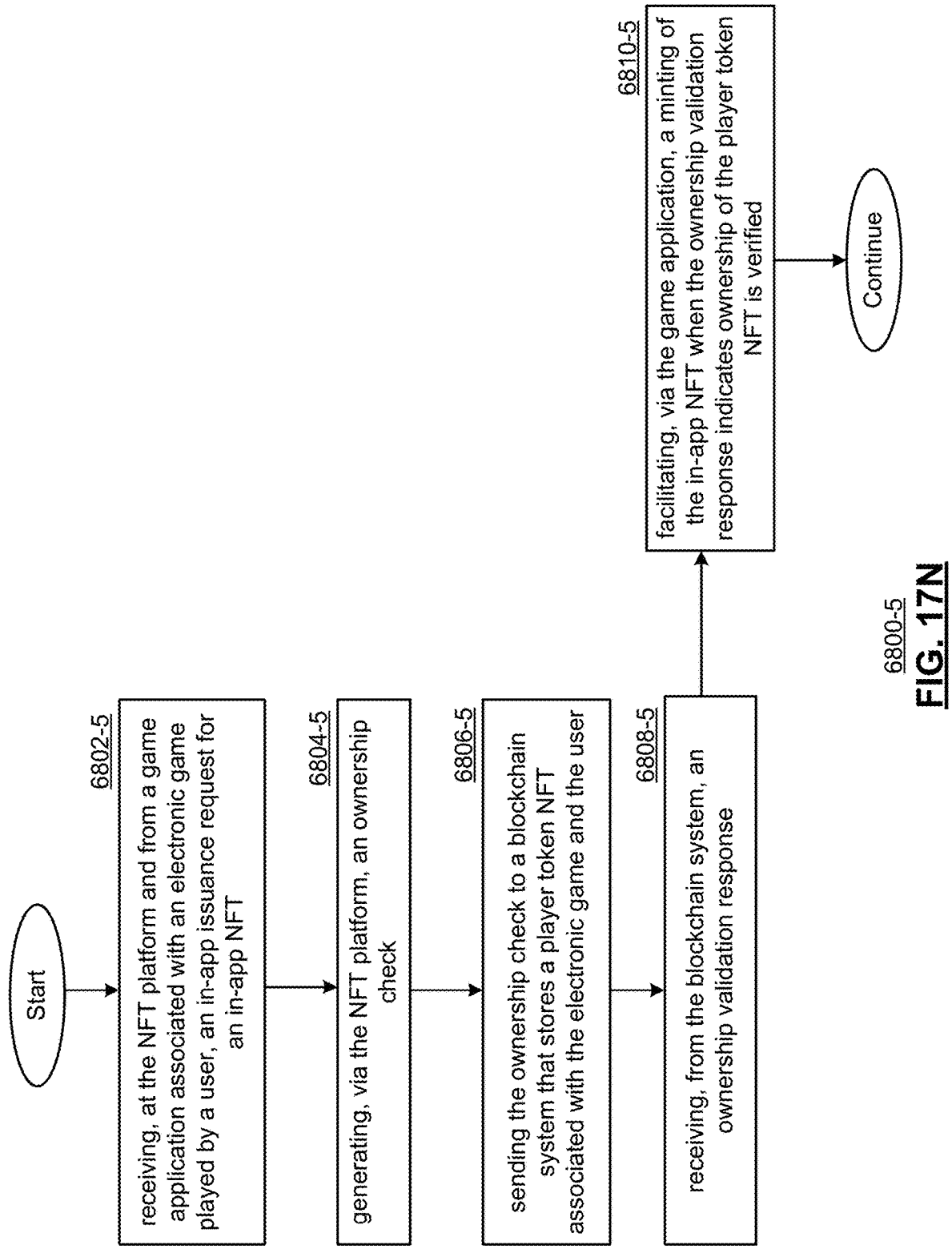
FIG. 17N presents a flowchart representation of an example method.

FIG. 17N presents a flowchart representation 6800-5 of an example method. In particular, a method is presented for use in conjunction with one or more functions or features described herein. Step 6802-5 includes receiving, at the NFT platform and from a game application associated with an electronic game played by a user, an in-app issuance request for an in-app NFT. Step 6804-5 includes generating, via the NFT platform, an ownership check. Step 6806-5 includes sending the ownership check to a blockchain system that stores a player token NFT associated with the electronic game and the user. Step 6808-5 includes receiving, from the blockchain system, an ownership validation response. Step 6810-5 includes facilitating, via the game application, issuance of the in-app NFT when the ownership validation response indicates ownership of the player token NFT is verified.

FIG. 18A presents a block/flow diagram representation of an example system of an example of NFT generation. In the example shown, NFT generation tools 808 operate to convert image data 6920-1 and other data 6922-1 (including persona data) into one or more player token NFTs 6924-1. The image data 6920-1 can correspond to an original NFT, borrowed (e.g. temporary micro-loaned) NFT, a derivative NFT, an original image, and/or other derivatives or microloans thereof or other display or image data. In various examples, the NFT generation tools 808 can operate to verify the credentials of any NFTs whose images are contained in the image data 6920-1, prior to creating the player token NFT 6924-1. In this fashion, one or more player token NFTs 6924-1 can only be created (e.g. on a derivative basis) when the source NFT or NFTs are verified—preventing the creation of unauthorized or counterfeit NFTs.

The other data 6922-1, can include a set of persona data corresponding to a set of players having differing personas with, for example, differing attributes, abilities, strengths, weaknesses and/or other properties in a game. These properties can include personas with differ goals including some personas having a goal to win, some personas having a goal to sabotage and/or spoil the victory for other players, other personas having a goal to extend the game as long as possible, etc. The other data 6922-1 can further include image data including signatures and other endorsement images, visual indications of derivative series, originality classification, attributions, or other image data, metadata of all kinds including metadata indicating one or more originality classifications, attributions, endorsement data, other derivative data indicating the series number and total number in a derivative series, restrictions on micro-loans or other derivatives, restrictions on derivatives with artistic effects, restrictions that derivatives must include attributions to the original source, restrictions on numbers of derivatives or micro-loans or the sizes of derivative series, restrictions on the creation of collection NFTs, the number of collection NFTs, the creation of collection NFTs including NFTs from other sources, from prohibited sources or with prohibited content, geographical restrictions, time restrictions (e.g., can be used to create derivatives or collection NFTs or can be temporarily micro-loaned for 1 month, one year, etc., other restrictions and/or other data associated with, or to be associated with, the image data 6920-1.

This other data 6922-1 can be used to generate an NFT and/or combined with the image data 6920-1 to create a dataset that includes both the image data 6920-1 and the other data 6922-1. This other data 6922-1 or combined dataset can be protected via the blockchain and/or other crypto-based NFT creation technology that is employed by the NFT generation tools 808 and via the NFT creation system 824 to create and protect each new player token NFT 6924-1 itself. It should be noted that the player token NFTs 6924-1 can include a single derivative or a number of derivatives, including a limited series of derivatives. It should be noted further that some or all of the other data 6922-1, including restriction data and/or attribution data, can be derived from one or more original NFTs whose images are associated with the image data 6920-1.

In various embodiments, the player token NFTs can be selected by a user, or assigned randomly, at time of purchase or at the time the player token NFT is first used. Player token NFTs can be collected by user via prior game play, earned via collection of one or more required non-game or game-collected NFTs, or other wise bought, sold traded, collected, etc.

FIG. 18B presents a flowchart representation 6900-1 of an example method. In particular, a method is presented for use in conjunction with one or more functions or features described herein. Step 6902-1 includes receiving, via the processor, an image to be associated with a series of player token NFTs corresponding to a multiplayer game. Step 6904-1 includes receiving, via the processor, other data, wherein the other data including persona data is also associated with the series of player token NFTs. Step 6906-1 includes facilitating creation of the series of player token NFTs.

Figure 18C:
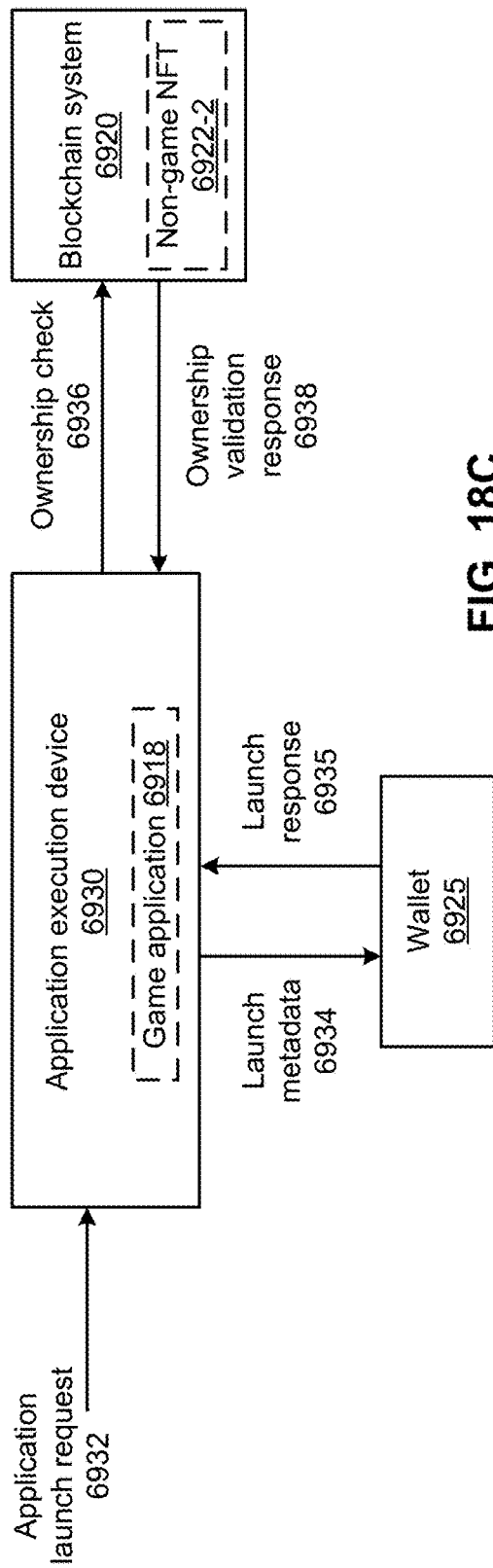
FIGS. 18C-18D present a block/flow diagram representations of example systems.
Figure 18D:
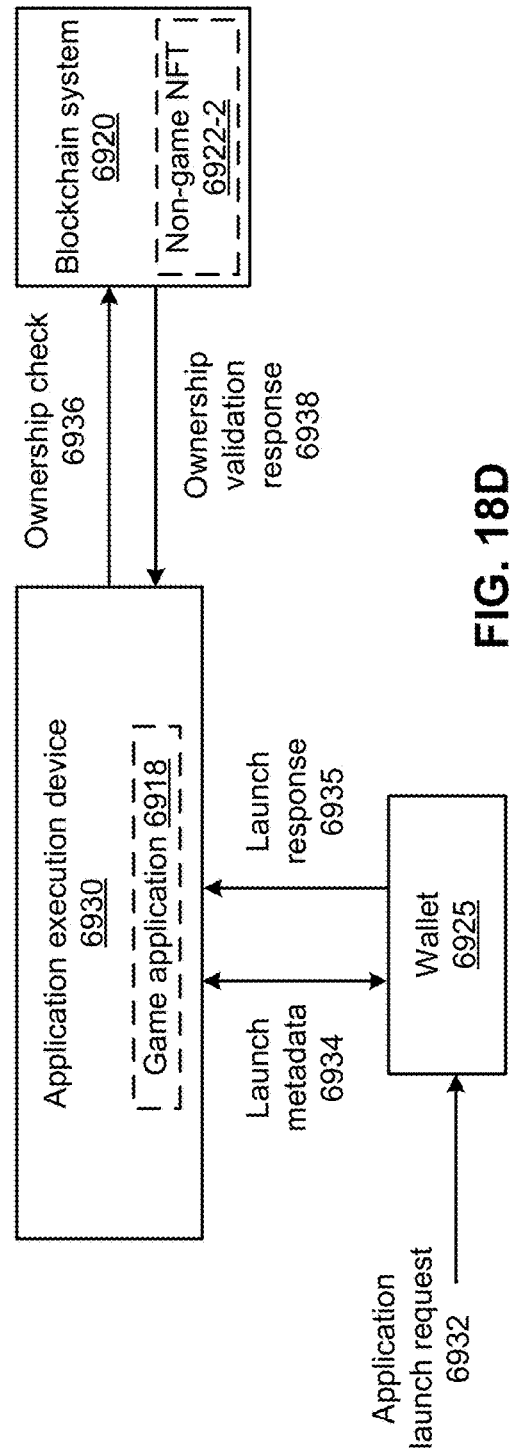

FIGS. 18C-18D present a block/flow diagram representations of example systems. As previously discussed, ownership and/or authentication non-game NFTs can be used to trigger the generation of game token NFTs, player token NFTs and/or with other NFTs that are related to a game/tournament and/or game application. In addition, ownership and/or authentication can be non-game NFTs can, in addition or in the alternative, be used to trigger the augmentation of a particular player/character in a game with special attributes, abilities, strengths, weaknesses and/or other properties in a game.

In the example shown in FIG. 18C, an application execution device 6930 stores the game application 6918 for execution having a player token NFT 6922 associated therewith. The application execution device can be a client device 825, an NFT platform 800, NFT game platform 6625 or other NFT platform or other device for executing the game application 6918 to facilitate play of the game.

In operation, the application execution device 6930 operates in response to an application launch request 6932 for the game application 6918. This application launch request 6932 can be received (internally) from a user interface associated with the application execution device 6930 (e.g. a client device or NFT platform) and/or received from an external device such as a client device, when for example, the application execution device 6930 corresponds to an NFT platform in communication with a client device. Once execution of the gaming application is initiated in response to the application launch request 6932, launch metadata 6934 is generated, for example, to determine if the launch request is associated with a valid non-game NFT. The launch metadata 6934 is sent to the wallet 6925 containing a private key associated with the non-game NFT 6922-1 associated with a user, such as a user of the application execution device and/or the application execution device 6930. The application execution device 6930 receives from the wallet 6926, a launch response 6935 that is generated based on the private key. The game application generates, based on the launch response 6936, an ownership check 6936 that is sent to the blockchain system 6920 that stores the non-game NFT 6922-1. An ownership validation response 6938 is received from the blockchain system 6920 that augments a player/character via the game application 6918 when the ownership validation response 6938 indicates ownership of the non-game NFT 6922-1 is verified and does not augment the player/character via the game application 6918 when the ownership validation response 6938 indicates ownership of the player token NFT is not verified.

In various examples, the launch metadata 6934 can include a current date and time, expiration information (if any) and a version number of the game application 6918, a counter that indicates a number of times the application has been executed, and/or other data corresponding to the non-game NFT 6922-1, the game application 6918 and/or the launch. The launch response 6935 can include a public key associated with the non-game NFT 6922-1, a signed hash that is based on the private key, the launch metadata 6934, and/or other data/metadata to be used to validate the NFT data from the wallet 6925 to the non-game NFT 6922-1. In this fashion, the private key is not shared directly with the application binary—and instead is merely used by the wallet 6925 in a secure fashion.

The ownership check 6936 can include information from the launch response 6935, additional owner/user information, such as user authentication data, associated with the user and/or owner of the non-game NFT 6922-1 and or other and/or other data/metadata to be used to validate the NFT data from the wallet 6925 to the non-game NFT 6922-1. In various examples, the blockchain system 6920 can include an NFT transaction authenticator 6022, a secure real-time NFT metadata repository 6024 and an NFT source 6026 that actually stores the player token NFT 6922 on a blockchain or other decentralized computer system/network and user authentication/NFT validation can take place, for example as described in conjunction with FIGS. 12A-12D. Furthermore, while not expressly shown, the process described above can also include validation of a game token NFT and/or player token NFT as a requirement to successfully launch the game application.

FIG. 18D presents a block diagram representation of an example system. This system operates similarly to the system of FIG. 18C, however, the application launch request 6932 is received directly from the wallet 6925.

FIG. 18E presents a flowchart representation 6900-2 of an example method. In particular, a method is presented for use in conjunction with one or more functions or features described herein. Step 6902-2 includes receiving an application launch request for a game application having a non-game NFT associated therewith. Step 6904-2 includes generating, in response to the application launch request, launch metadata. Step 6906-2 includes sending the launch metadata to a wallet associated with a user of the client device, the wallet containing a private key associated with the non-game NFT. Step 6908-2 includes receiving, from the wallet, a launch response that is generated based on the private key. Step 6910-2 includes generating, based on the launch response, an ownership check. Step 6912-2 includes sending the ownership check to a blockchain system that stores the non-game NFT. Step 6914-2 includes receiving, from the blockchain system, an ownership validation response. Step 6916-2 includes augmenting, via the game application, a game player's game abilities when the ownership validation response indicates ownership of the non-game NFT is verified.

Figures 18F, 18G:
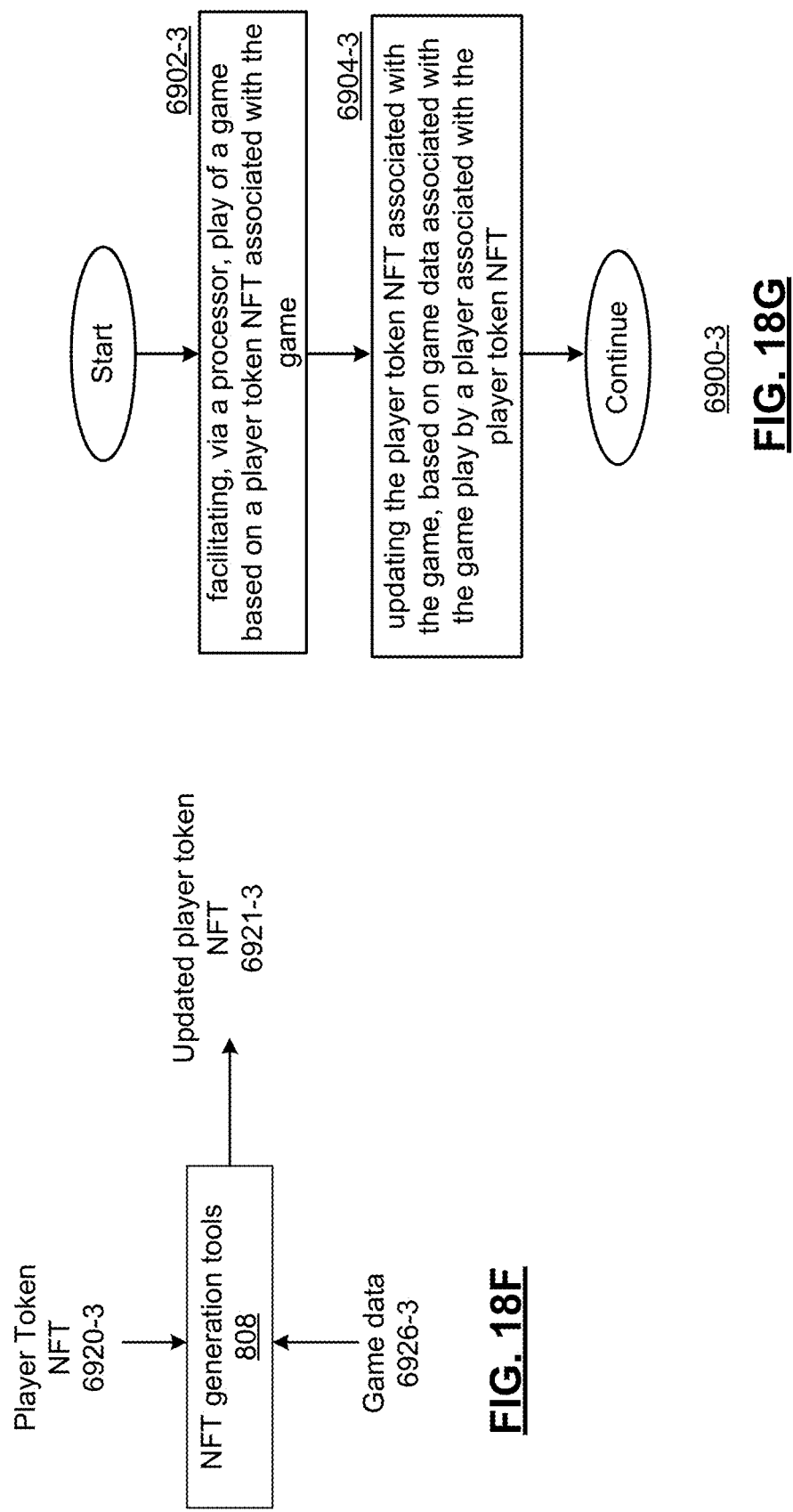
FIG. 18F presents a block/flow diagram representation of an example system.
FIG. 18G presents a flowchart representation of an example method.

FIG. 18F presents a block/flow diagram representation of an example system. In the example shown, NFT generation tools can be used to generate an updated player token NFT 6921-3 that is based on a player token NFT 6920-3 and game data 6926-3 generated via play of the game via the player/character associated with the player token NFT 6920-3. In this fashion, game data 6926 indicating new abilities, enhancements, achievements, stats, experience, level-ups, level-downs, scores, status or other game performance metrics earned and/or otherwise occurring via the game can be stored on the blockchain or other decentralized computer network with the original player token NFT 6920-3 to generate an updated player token NFT 6221-3 as a derivative NFT or entirely new NFT that supersedes the prior NFT.

FIG. 18G presents a flowchart representation 6900-3 of an example method. In particular, a method is presented for use in conjunction with one or more functions or features described herein. Step 6902-3 includes facilitating, via a processor, play of a game based on a player token NFT associated with the game. Step 6904-3 includes updating the player token NFT associated with the game, based on game data associated with the game play by a player associated with the player token NFT.

FIG. 18H presents a block/flow diagram representation of an example system. In the example shown, NFT generation tools can be used to generate an updated game token NFT 6921-4 that is based on a game token NFT 6920-4 and game data 6926-4 generated via play of the game via the player/character associated with the game token NFT 6920-4. In this fashion, game data 6926 indicating new abilities, enhancements, achievements, stats, experience, level-ups, level-downs, scores, status or other game performance metrics earned and/or otherwise occurring via the game can be stored on the blockchain or other decentralized computer network with the original game token NFT 6920-4 to generate an updated game token NFT 6221-4 as a derivative NFT or entirely new NFT that supersedes the prior NFT.

FIG. 18I presents a flowchart representation 6900-4 of an example method. In particular, a method is presented for use in conjunction with one or more functions or features described herein. Step 6902-4 includes facilitating, via a processor, play of a game based on a game token NFT associated with the game. Step 6904-4 includes updating the game token NFT associated with the game, based on game data associated with the game play by a player associated with the game token NFT.

Figure 18K:
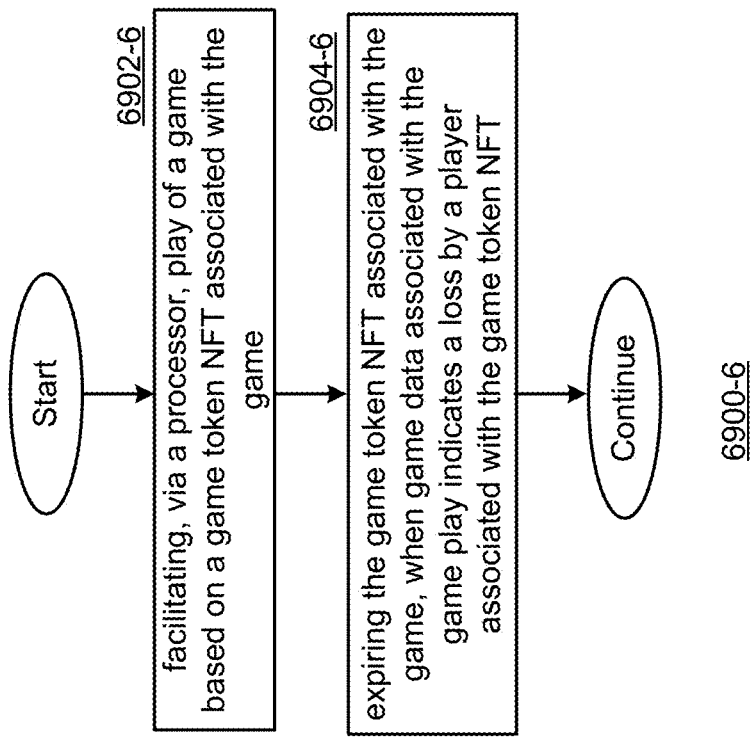
FIG. 18K presents a flowchart representation of an example method.
Figure 18J:
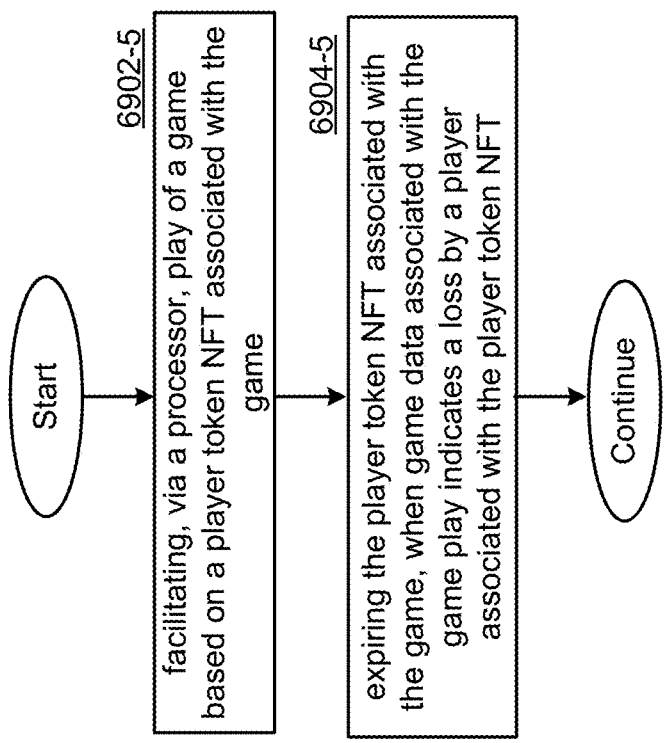
FIG. 18J presents a flowchart representation of an example method.

FIG. 18J presents a flowchart representation 6900-5 of an example method. In particular, a method is presented for use in conjunction with one or more functions or features described herein. As a supplemental case of the system of FIG. 18F, game data 6926-3 may indicate that a player has lost a game/tournament or "died" in the game. In the response to this condition, instead of issuing an updated player token NFT, the player token NFT 6920-3 may, based for example on the restrictions associated with the NFT, be terminated, expired or otherwise burned—optionally maintaining, for example, the NFT for collection purposes, while preventing the future use of the player token NFT 6920-3 for enabling game play.

Step 6902-5 includes facilitating, via a processor, play of a game based on a player token NFT associated with the game. Step 6904-5 includes expiring the player token NFT associated with the game, when game data associated with the game play indicates a loss by a player associated with the player token NFT.

FIG. 18K presents a flowchart representation 6900-6 of an example method. In particular, a method is presented for use in conjunction with one or more functions or features described herein. As a supplemental case of the system of FIG. 18H, game data 6926-4 may indicate that a player has lost a game/tournament or "died" in the game. In the response to this condition, instead of issuing an updated game token NFT, the game token NFT 6920-3 may, based for example on the restrictions associated with the NFT, be terminated, expired or otherwise burned—optionally maintaining, for example, the NFT for collection purposes, while preventing the future use of the game token NFT 6920-3 for enabling game play.

Step 6902-6 includes facilitating, via a processor, play of a game based on a game token NFT associated with the game. Step 6904-6 includes expiring the game token NFT associated with the game, when game data associated with the game play indicates a loss by a player associated with the game token NFT.

Figure 18L:
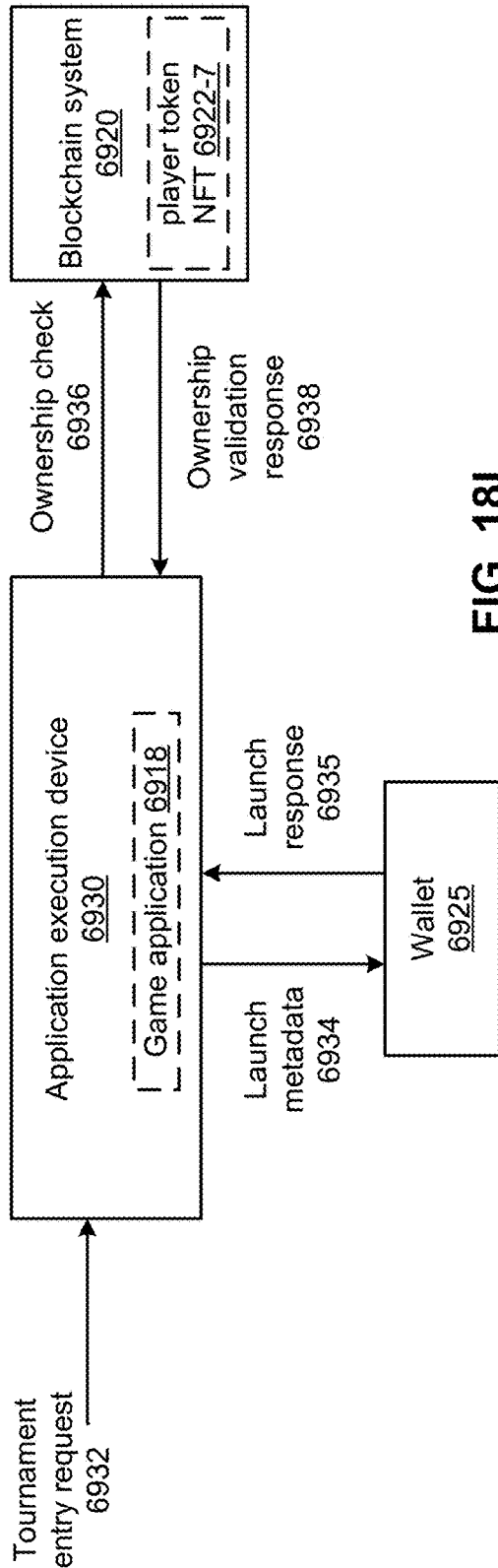
FIGS. 18L-18M present a block/flow diagram representations of example systems.
Figure 18M:
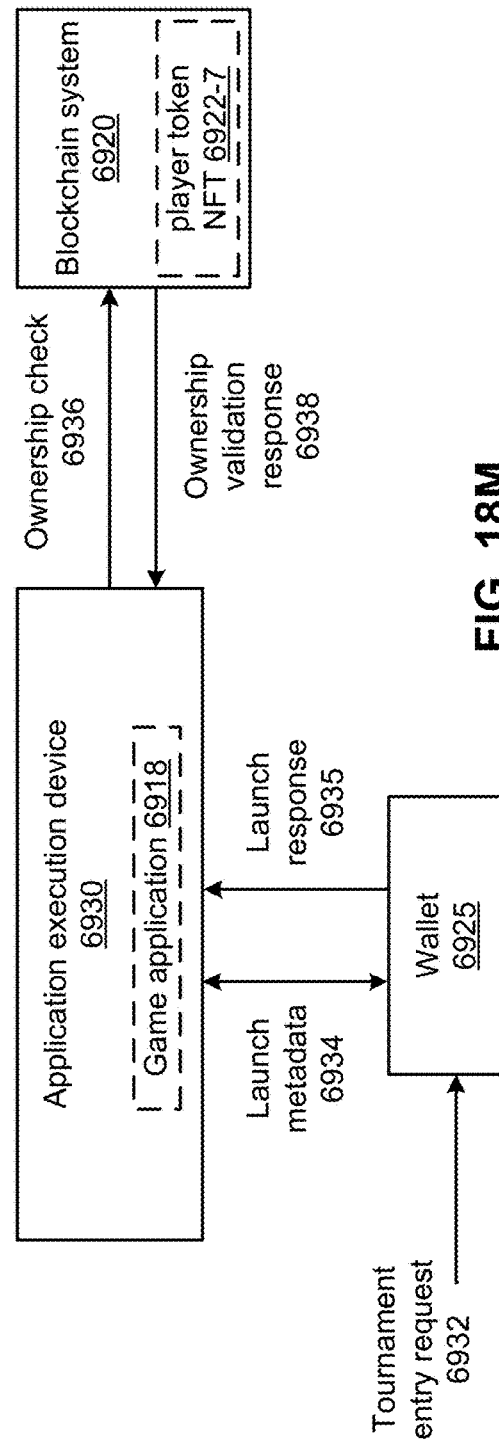

FIGS. 18L-18M present a block/flow diagram representations of example systems. In particular, these systems operate similarly to the systems of FIGS. 17J and 17K to enable tournament play, rather than normal game play via a player token 6922-7.

Figure 18N:
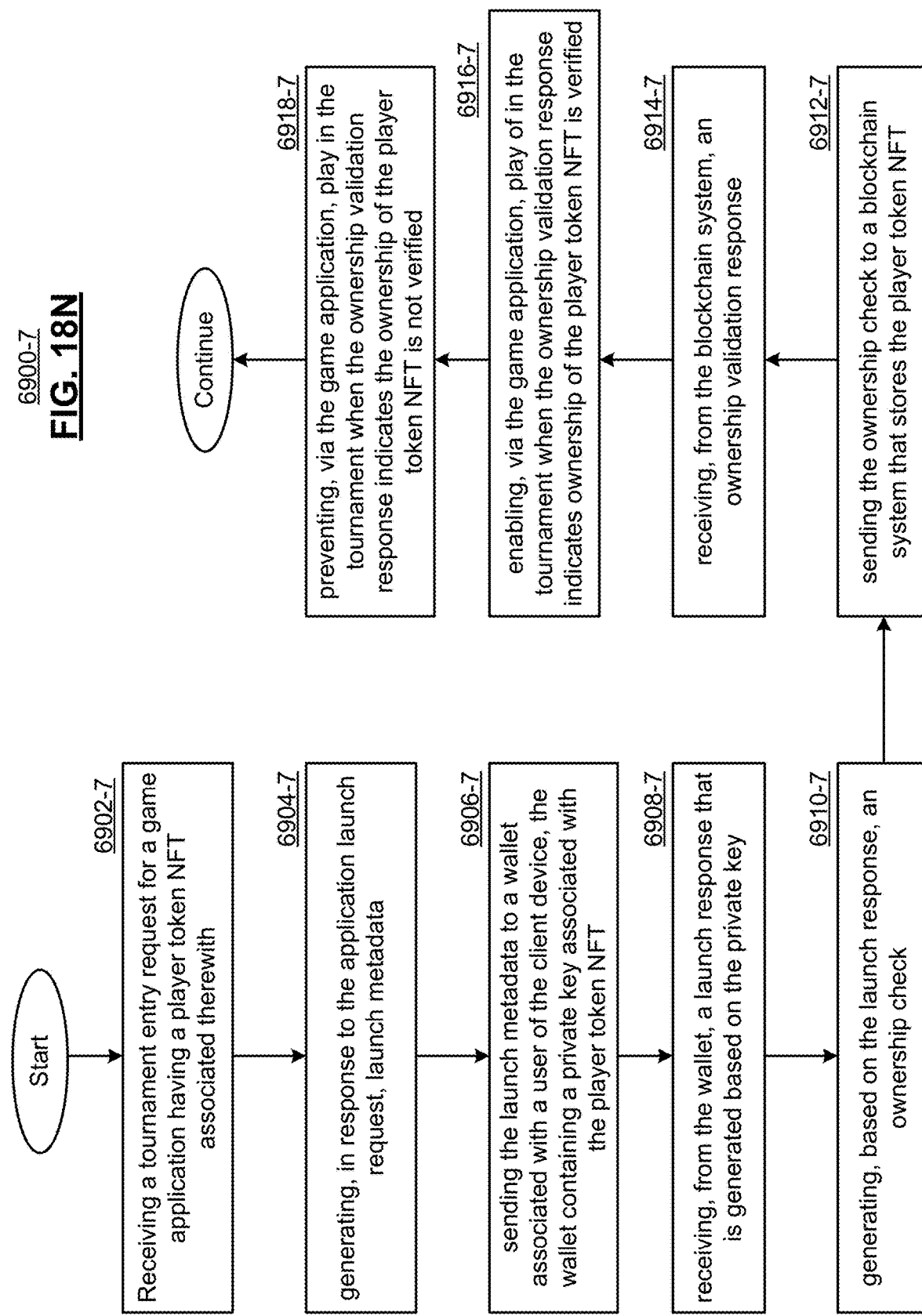
FIG. 18N presents a flowchart representation of an example method.

FIG. 18N presents a flowchart representation 6900-7 of an example method. In particular, a method is presented for use in conjunction with one or more functions or features described herein. Step 6902-7 includes receiving a tournament entry request for a game application having a player token NFT associated therewith. Step 6904-7 includes generating, in response to the application launch request, launch metadata. Step 6906-7 includes sending the launch metadata to a wallet associated with a user of the client device, the wallet containing a private key associated with the player token NFT. Step 6908-7 includes receiving, from the wallet, a launch response that is generated based on the private key. Step 6910-7 includes generating, based on the launch response, an ownership check. Step 6912-7 includes sending the ownership check to a blockchain system that stores the player token NFT. Step 6914-7 includes receiving, from the blockchain system, an ownership validation response. Step 6916-7 includes enabling, via the game application, play of in the tournament when the ownership validation response indicates ownership of the player token NFT is verified. Step 6918-7 includes preventing, via the game application, play in the tournament when the ownership validation response indicates the ownership of the player token NFT is not verified.

Figure 18O:
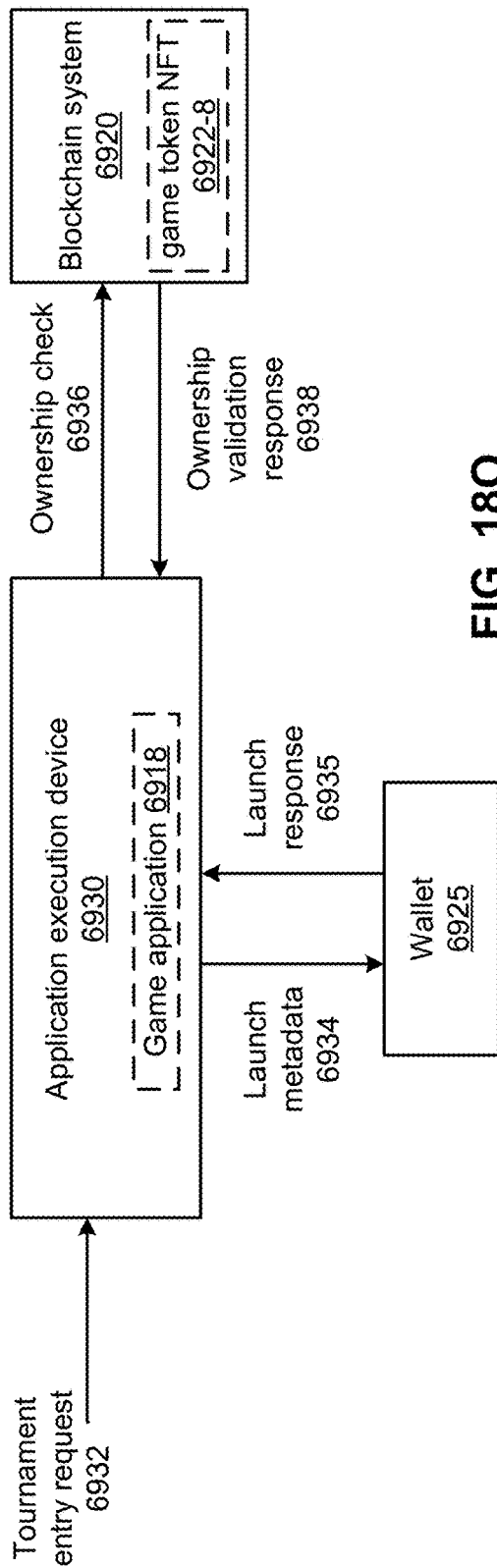
FIGS. 18O-18P present a block/flow diagram representations of example systems.
Figure 18P:
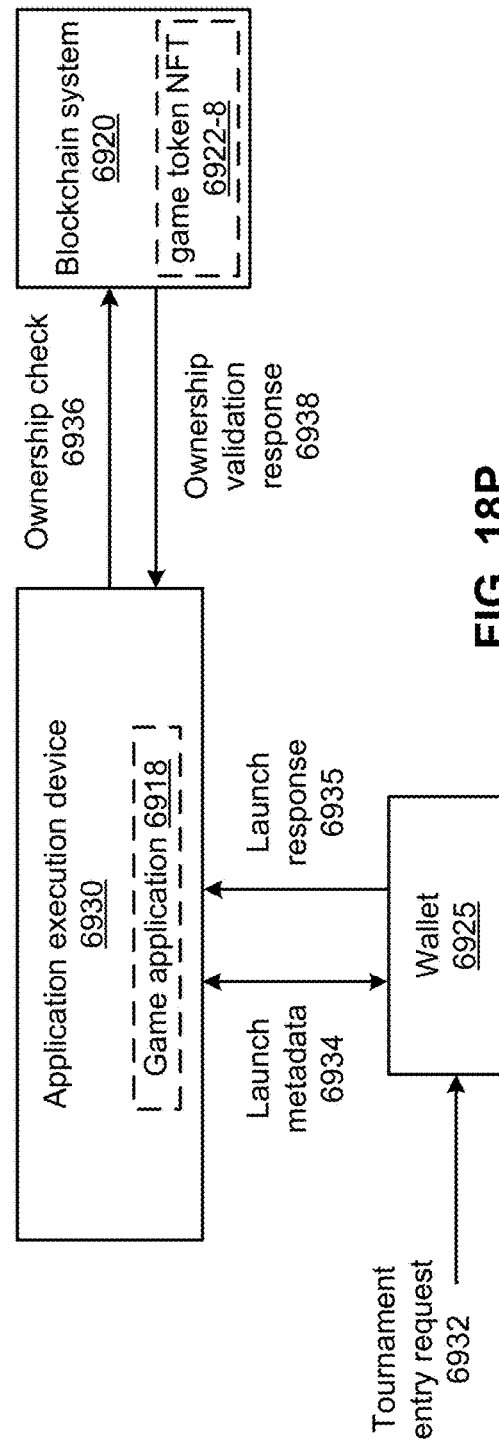

FIGS. 18O-18P present a block/flow diagram representations of example systems. In particular, these systems operate similarly to the systems of FIGS. 16I and IgJ to enable tournament play, rather than normal game play via a game token 6922-8.

Figure 18Q:
FIG. 18Q presents a flowchart representation of an example method.

FIG. 18Q presents a flowchart representation 6900-8 of an example method. In particular, a method is presented for use in conjunction with one or more functions or features described herein. Step 6902-8 includes receiving a tournament entry request for a game application having a game token NFT associated therewith. Step 6904-8 includes generating, in response to the application launch request, launch metadata. Step 6906-8 includes sending the launch metadata to a wallet associated with a user of the client device, the wallet containing a private key associated with the game token NFT. Step 6908-8 includes receiving, from the wallet, a launch response that is generated based on the private key. Step 6910-8 includes generating, based on the launch response, an ownership check. Step 6912-8 includes sending the ownership check to a blockchain system that stores the game token NFT. Step 6914-8 includes receiving, from the blockchain system, an ownership validation response. Step 6916-8 includes enabling, via the game application, play of in the tournament when the ownership validation response indicates ownership of the game token NFT is verified. Step 6918-8 includes preventing, via the game application, play in the tournament when the ownership validation response indicates the ownership of the game token NFT is not verified.

Figure 18R:
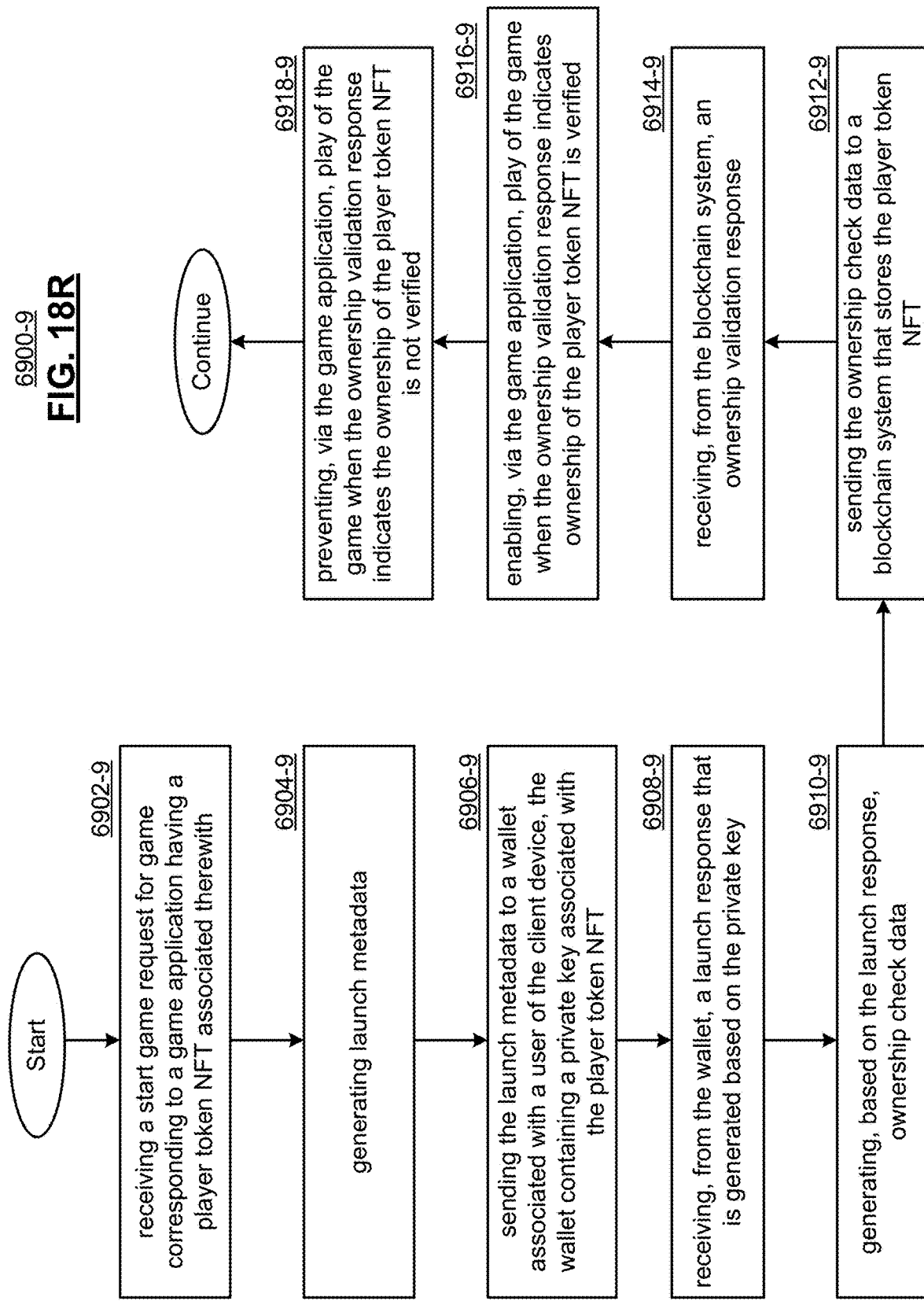
FIG. 18R presents a flowchart representation of an example method.

FIG. 18R presents a flowchart representation 6900-9 of an example method. In particular, a method is presented for use in conjunction with one or more functions or features described herein. Step 6902-9 includes receiving a start game request for game corresponding to a game application having a player token NFT associated therewith. Step 6904-9 includes generating launch metadata. Step 6906-9 includes sending the launch metadata to a wallet associated with a user of a client device, the wallet containing a private key associated with the player token NFT. Step 6908-9 includes receiving, from the wallet, a launch response that is generated based on the private key. Step 6910-9 includes generating, based on the launch response, ownership check data.

Step 6912-9 includes sending the ownership check data to a blockchain system that stores the player token NFT. Step 6914-9 includes receiving, from the blockchain system, an ownership validation response. Step 6916-9 includes enabling, via the game application, play of a game associated with the game application when the ownership validation response indicates ownership of the player token NFT is verified. Step 6918-9 includes preventing, via the game application, the play of the game when the ownership validation response indicates the ownership of the player token NFT is not verified.

In various examples, the ownership check data includes at least one of: NFT identification data associated with the player token NFT or NFT authentication data generated based on the private key. The ownership check data can further include user identification data associated with the user of the client device. The ownership validation response can indicate ownership of the player token NFT is verified when the player token NFT is authenticated based on the NFT authentication data and when the user of the client device is identified based on the user identification data. The user identification data associated with the user of the client device can include at least one of: a user device identifier associated with the client device or user biometric data generated via the client device.

In various examples, the player token NFT has an associated player persona of a plurality of player personas associated with the game. The ownership validation response can indicate whether or not ownership of the player token NFT is verified. The ownership validation response can include credentials data to enable the play of the game via a player token associated with the player token NFT when the ownership of the player token NFT is verified.

The start game request can includes an application launch request or a request to start or enter a game associated with a game application that has already been launched. The player token NFT can be expended (e.g. terminated, burned and/or deactivated) based on game play data associated with player token that indicates loss of the game.

Figure 19A:
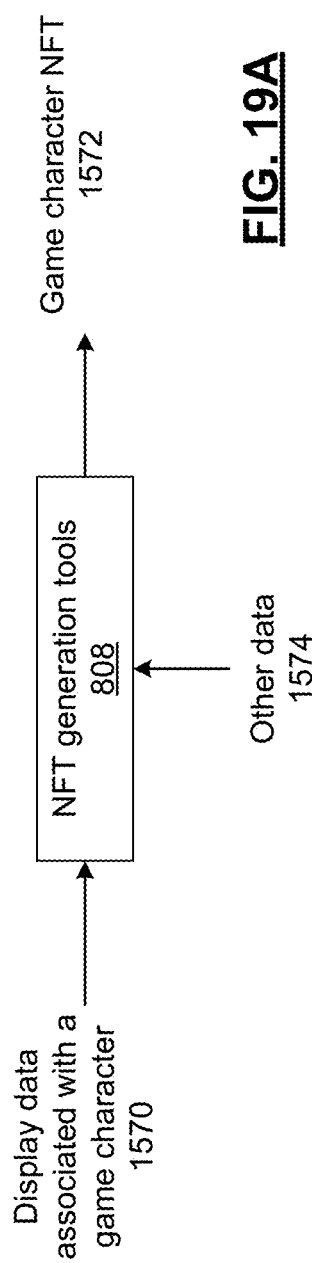
FIG. 19A presents a block diagram/flow representation of an example of NFT generation.

FIG. 19A presents a block diagram/flow representation of an example of NFT generation. In particular, the NFT collection platform 800 may be used to not only facilitate the generation, collection and display of NFT and the playing of collection and other NFT related game, the NFT collection platform 800 can also be used to generate game characters (e.g. player tokens) and game character NFTs (e.g. player token NFTs) that are used to play of any of the games 813 and/or other games and/or to enable game play via the corresponding player/character.

In the example shown, display data to be associated with a game character 1570, together with other data 1574, is used to generate a game character NFT 1572. In various examples, the other data 1574 can include performance data to be associated with the game character as well as other character parameters and/or attributes that are used in the game to dictate and/or guide the performance of the game character and/or their specific capabilities/skills. Furthermore, other data 1574 can include any of the other data 1504 discussed herein.

Figure 19E:
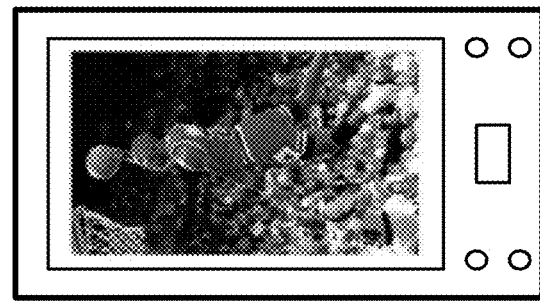
FIG. 19E presents a pictorial representation of an example client device with screen display.
Figure 19D:
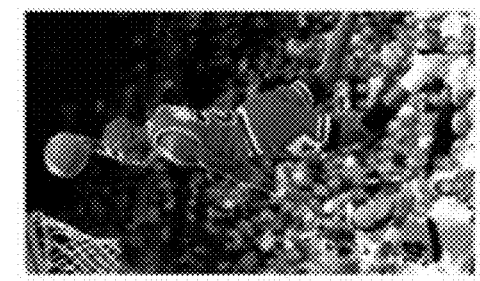
FIG. 19D presents a pictorial representation of an example game character NFT.
Figure 19C:
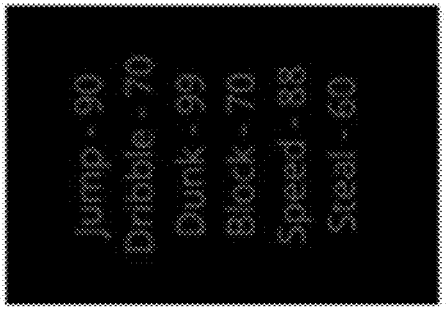
FIG. 19C presents a pictorial representation of example data.
Figure 19B:
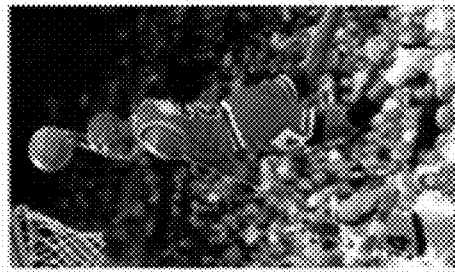
FIG. 19B presents a pictorial representation of example display data.

FIG. 19B presents a pictorial representation of example display data. In particular, display data to be associated with a game character 1570 corresponds to an image of Michael Jordon. FIG. 19C presents a pictorial representation of example of other data 1574 that corresponds to performance data including various parameters to be associated with the character in the game. FIG. 19D presents a pictorial representation of an example game character NFT 1572 generated in such a fashion and FIG. 19E presents a pictorial representation of an example client device with screen display of the game character used in a game.

FIG. 19F presents a flowchart representation of an example method. In particular, a method 3500 is presented for use in conjunction with any of the functions and features previously described. Step 3502 includes receiving, via the processor, display data to be associated with a game character and other data to be associated with performance of the game character. Step 3504 includes generating, via the processor and based on the display data and the other data, a game character NFT associated with the game character that includes the display data to be associated with the game character and that further includes the other data to be associated with performance of the game character. Step 3506 includes facilitating play of a game by the user in response to user interactions with the graphical user interface, wherein the game includes the game character and the performance of the game character in the game is in accordance with the other data.

FIG. 20A presents a block diagram/flow representation of an example of game character data generation. It should be noted that the prior methods, processes and systems used for generating game character NFTs could likewise be similarly applied to generating game character display data. This game character data 1575 could be directly used by a game without the additional step(s) required to generate a game character NFT itself.

In various examples, game character generation tools 4025 are included that can be implemented as part of the games 813 of NFT collection platform 800 or otherwise by the processing module 830 of the NFT collection platform 800 or the processing module 230 of the client device 825 or 825-1. In the example shown, character attribute selection data 4022 to be associated with a game character, together with other data including game accessory data 4026 and performance data 4024 can be used to generate display data 1570. The display data 1570 can be used in conjunction with other data 1574 to generate a game character NFT 1572 and/or game character data 1575 associated with a game character that can be used to play a game.

In this fashion, a customized game character/avatar can be generated with the desired appearance, attributes, performance and/or accessories of the player via selection in a character attribute selection database 4020. The game character NFT 1572 can be used to facilitate and/or enable game play of the game based on this customization. Furthermore, the specific subset of attributes selected by the player for the game character can be locked upon selection/use to prevent other players from using these unique selections to create matching players. Once a particular subset of attributes (and optionally performance data and/or accessories) are selected/used by one player, they cannot be used again. It should be noted, the play that originally selected these attributes, may or may not be able to reuse them, based on the rules of the game—such as whether the game was lost with the game character, rules preventing duplicate characters and/or other rules.

Consider the following example of operation of such a system. The system operates by: receiving character attribute selection data 4022 to be associated with a game character, wherein the character attribute selection data indicates a unique subset of a set of character attributes of a character attribute database 4020; generating, based on the character attribute selection data 4022, display data 1570 associated with the game character; facilitating, based on the display data 1570 associated with the game character, generation of a player token NFT (such as game character NFT 1572) associated with the game character; and preventing use of the unique subset of character attributes of the character attribute database in generating other game characters.

In various examples, the character attributes of a character attribute database 4020 include a plurality of options for each of a plurality of attributes. A player wishing to create a new game character generates the character attribute selection data 4022 by selecting from the character attribute database 4020, a choice for each of the attributes. Consider the example where the character attribute selection data 4022 includes different options for garments, garment colors, hair styles, hair colors, facial hair styles, facial hair colors, body styles, facial styles, shoe styles, shoe colors, jewelry, eye-ware, etc. In accordance with this example, the unique subset of character attributes of the character attribute database can include: a selection for each garment, a color selection for each garment, a hair style, a hair color, a facial hair style, a facial hair color, a body style, at least one facial style, a shoe style, a shoe color, a jewelry selection, and/or an eye-ware selection. While the character attribute database 4020 may permit selections from a combinatorially large number of possibilities, the unique subset of character attributes represents a single unique combination—representing a selection from the options for each of the of attributes. Once selected/used, this unique combination is prevented from being used again—except, for example, by the particular player, when permitted. While the above attributes are geared toward human or human-like avatars, other attributes and attribute options could be similarly used to create game characters associated with robots, animals or other non-human characters.

The system can further operate by generating game character data 1575 associated with the game character, based on the display data, wherein the game character data facilitates play of a game via the game character. Generating the game character data 1575 can be further based on performance data 4024 to be associated with actions of the game character in the game. The performance data 4024 can include a persona associated with the game character in the game and/or other performance factors/metrics. Generating the game character data 1575 can be further based on game accessory data 4026 associated with a game accessory associated with the game character such as an object or ancillary article that may or may not have special benefits to the player in the game. The display data 1570 associated with the game character can also include (e.g. show/indicate) the game accessory.

In various examples, the NFT platform can operate by receiving a start game request for game corresponding to a game application; and enabling, via the game application, play of a game associated with the game application when the player token NFT 1572 is validated. The game application can prevent play of the game when the player token NFT 1572 is not validated. In addition, the player token NFT 1572 may be expended based on the rules of the game and further based on game play data associated with player token that indicates loss of the game. In various examples, preventing use of the unique subset of character attributes of the character attribute database in generating other game characters includes: receiving other character attribute selection data to be associated with one of the other game characters; determining when the other character attribute selection data indicates the unique subset of character attributes; and preventing use of the unique subset of character attributes in generating the one of the other characters.

FIG. 20B presents an example of game character data 1575 that represents a customized character/avatar that can be used to play a game. Character attribution selection data 4022 has been used to select a unique subset of character attributes of the character attribute database that correspond to a particular gender, body and facial type, skin color, hair style and color, eye-ware and eye color, facial hair style and color, shirt, pants and shoes. A game ancillary object (a walking stick of wisdom that has been previously earned by the player—providing hints and unlocking certain challenges in the game) has also been selected via game accessory data 4026 for association with the game character. Furthermore, a player persona, in this case a nerdy engineering professor persona, has been selected via performance data 4024. The corresponding display data 1570 has been used to generate a game character NFT 1572 as shown in FIG. 20C. As discussed above, once this game character data 1575 has been selected (and optionally, is further accepted by the player and minted as an NFT)—no one else will be able to generate a character with this particular selection of attributes (with or without the selected performance/persona and/or accessories).

FIG. 20D presents a flowchart representation of an example method. In particular, a method 4000 is presented for use in conjunction with any of the functions and features previously described. Step 4002 includes receiving, at the processor, character attribute selection data to be associated with a game character, wherein the character attribute selection data indicates a unique subset of a set of character attributes of a character attribute database. Step 4004 includes generating, via the processor and based on the character attribute selection data, display data associated with the game character. Step 4006 includes facilitating, based on the display data associated with the game character, generation of a player token NFT associated with the game character. Step 4008 includes preventing, via processor, use of the unique subset of character attributes of the character attribute database in generating other game characters.

In various examples, the unique subset of character attributes of the character attribute database includes one or more of: at least one garment selection, at least one garment color, a hair style, a hair color, a facial hair style, a facial hair color, a body style, at least one facial style, a shoe style, a shoe color, a jewelry selection, or an eye-ware selection. The method can further include generating game character data 1575 associated with the game character, based on the display data, wherein the game character data facilitates play of a game via the game character. Generating the game character data 1575 can be further based on performance data 4024 to be associated with actions of the game character in the game. The performance data 4024 can include a persona associated with the game character in the game and/or other performance factors/metrics. Generating the game character data 1575 can be further based on game accessory data 4026 associated with a game accessory associated with the game character such as an object or ancillary article that may or may not have special benefits to the player in the game. The display data 1570 associated with the game character can also include (e.g. show/indicate) the game accessory.

In various examples, the method can include: receiving a start game request for game corresponding to a game application; and enabling, via the game application, play of a game associated with the game application when the player token NFT is validated. The game application can prevent play of the game when the player token NFT is not validated. In addition, the player token NFT can be expended based on game play data associated with player token that indicates loss of the game.

In various examples, preventing use of the unique subset of character attributes of the character attribute database in generating other game characters includes: receiving other character attribute selection data to be associated with one of the other game characters; and determining when the other character attribute selection data indicates the unique subset of character attributes; and preventing use of the unique subset of character attributes in generating the one of the other characters.

As used herein, the terms "game piece" and "game character" can be used interchangeably to refer to a game character, an avatar, an ancillary article or other article or object that is used in a game.

As used herein "blockchain" and "blockchain node" refer to traditional blockchain technology. However, other decentralized computer network technologies that, for example, maintain a secure and decentralized record of transactions and/or otherwise protect the security of digital information can likewise be employed. In various examples, a blockchain can operate to collect information together in groups, such as blocks, that hold sets of information. These blocks have certain storage capacities and, when filled, are closed and linked to the previously filled blocks, forming a chain of data. New information that follows that freshly added block is compiled into newly formed blocks that, once filled, can also be added to the chain.

As used herein the term "tool" corresponds to a utility, application and/or other software routine that performs one or more specific functions in conjunction with a computer.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., indicates an advantageous relationship that would be evident to one skilled in the art in light of the present disclosure, and based, for example, on the nature of the signals/items that are being compared. As may be used herein, the term "compares unfavorably", indicates that a comparison between two or more items, signals, etc., fails to provide such an advantageous relationship and/or that provides a disadvantageous relationship. Such an item/signal can correspond to one or more numeric values, one or more measurements, one or more counts and/or proportions, one or more types of data, and/or other information with attributes that can be compared to a threshold, to each other and/or to attributes of other information to determine whether a favorable or unfavorable comparison exists. Examples of such a advantageous relationship can include: one item/signal being greater than (or greater than or equal to) a threshold value, one item/signal being less than (or less than or equal to) a threshold value, one item/signal being greater than (or greater than or equal to) another item/signal, one item/signal being less than (or less than or equal to) another item/signal, one item/signal matching another item/signal, one item/signal substantially matching another item/signal within a predefined or industry accepted tolerance such as 1%, 5%, 10% or some other margin, etc. Furthermore, one skilled in the art will recognize that such a comparison between two items/signals can be performed in different ways. For example, when the advantageous relationship is that signal 1 has a greater magnitude than signal 2, a favorable comparison may be achieved when the magnitude of signal 1 is greater than that of signal 2 or when the magnitude of signal 2 is less than that of signal 1. Similarly, one skilled in the art will recognize that the comparison of the inverse or opposite of items/signals and/or other forms of mathematical or logical equivalence can likewise be used in an equivalent fashion. For example, the comparison to determine if a signal $X>5$ is equivalent to determining if $-X<-5$, and the comparison to determine if signal A matches signal B can likewise be performed by determining $-A$ matches $-B$ or not (A) matches not (B). As may be discussed herein, the determination that a particular relationship is present (either favorable or unfavorable) can be utilized to automatically trigger a particular action. Unless expressly stated to the contrary, the absence of that particular condition may be assumed to imply that the particular action will not automatically be triggered. In other examples, the determination that a particular relationship is present (either favorable or unfavorable) can be utilized as a basis or consideration to determine whether to perform one or more actions. Note that such a basis or consideration can be considered alone or in combination with one or more other bases or considerations to determine whether to perform the one or more actions. In one example where multiple bases or considerations are used to determine whether to perform one or more actions, the respective bases or considerations are given equal weight in such determination. In another example where multiple bases or considerations are used to determine whether to perform one or more actions, the respective bases or considerations are given unequal weight in such determination.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more examples have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more examples are used herein to illustrate one or more aspects, one or more features, one or more concepts, and/or one or more examples. A physical example of an apparatus, an article of manufacture, a machine, and/or of a process may include one or more of the aspects, features, concepts, examples, etc. described with reference to one or more of the examples discussed herein. Further, from figure to figure, the examples may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the examples. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

One or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition—requires "artificial" intelligence—i.e. machine/non-human intelligence.

One or more functions associated with the methods and/or processes described herein involve NFTs that are generated ("minted") and secured via blockchain or other decentralized computer network technology. The distributed nature of these technologies over different nodes, the contemporaneous nature of geographically distinct calculations, coupled with the extreme computational complexity of the required calculations means that these decentralized computer network technologies cannot practically be performed by the human mind.

One or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

One or more functions associated with the methods and/or processes described herein can be implemented in a system that is operable to electronically store digital data in a memory device. Such storage cannot practically be performed by the human mind because the human mind is not equipped to electronically store digital data.

One or more functions associated with the methods and/or processes described herein may operate to cause an action by a processing module directly in response to a triggering event—without any intervening human interaction between the triggering event and the action. Any such actions may be identified as being performed "automatically", "automatically based on" and/or "automatically in response to" such a triggering event. Furthermore, any such actions identified in such a fashion specifically preclude the operation of human activity with respect to these actions—even if the triggering event itself may be causally connected to a human activity of some kind.

While particular combinations of various functions and features of the one or more examples have been expressly described herein, other combinations of these features and functions are likewise possible. The present disclosure is not limited by the particular examples disclosed herein and expressly incorporates these other combinations.

What is claimed is:

1. A method for use with a non-fungible token (NFT) platform that includes a processor and a memory, the method comprising:
   receiving, at the processor, via a network interface and from a client device, character attribute selection data to be associated with a game character, wherein the character attribute selection data indicates a unique subset of a set of character attributes of a character attribute database;
   generating, via the processor and based on the character attribute selection data, display data associated with the game character;
   facilitating, based on the display data associated with the game character, generation of a player token NFT associated with the game character; and
   preventing, via processor, use of the unique subset of character attributes of the character attribute database in generating other game characters,
   receiving, via the processor, display data associated with a customized collection display that presents a plurality of game NFTs, each of the plurality of game NFTs including a playable instance of a game that is accessible by a user of the client device and corresponding to the game character;
   sending the display data for display via a graphical user interface and a display device associated with the client device;
   receiving, via the processor in response to user interactions with the graphical user interface, a selection of one the plurality of game NFTs for play of the game;
   sending, to the NFT game platform via the network interface, selection data indicating the selection of the one the plurality of game NFTs;
   determining when the player token NFT is validated; and
   facilitating, via the network interface and in conjunction with NFT game platform, play of the game when the player token NFT is validated.

2. The method of claim 1, wherein the unique subset of character attributes of the character attribute database include one or more of: at least one garment selection, at least one garment color, a hair style, a hair color, a facial hair style, a facial hair color, a body style, at least one facial style, a shoe style, a shoe color, a jewelry selection, or an eye-ware selection.

3. The method of claim 1, further comprising:
   generating game character data associated with the game character, based on the display data.

4. The method of claim 3, wherein the game character data facilitates play of the game via the game character.

5. The method of claim 4, wherein generating the game character data is further based on performance data to be associated with actions of the game character in the game.

6. The method of claim 5, wherein the performance data includes a persona associated with the game character in the game.

7. The method of claim 4, wherein generating the game character data is further based on game accessory data associated with a game accessory associated with the game character; and
   wherein the display data associated with the game character also includes the game accessory.

8. The method of claim 1, further comprising:
   enabling play of the game associated when the player token NFT is validated; and
   preventing the play of the game when the player token NFT is not validated.

9. The method of claim 8, wherein the player token NFT is expended based on game play data associated with player token that indicates loss of the game.

10. The method of claim 8, wherein preventing use of the unique subset of character attributes of the character attribute database in generating other game characters includes:
    receiving other character attribute selection data to be associated with one of the other game characters;
    determining when the other character attribute selection data indicates the unique subset of character attributes; and
    preventing use of the unique subset of character attributes in generating the one of the other characters.

11. A system for use with a non-fungible token (NFT) platform comprises:

a network interface configured to communicate via a network;

a processor;

a non-transitory machine-readable storage medium that stores operational instructions that, when executed by the processor, cause the processor to perform operations that include:

receiving, at the processor, via the network interface and from a client device, character attribute selection data to be associated with a game character, wherein the character attribute selection data indicates a unique subset of a set of character attributes of a character attribute database;

generating, via the processor and based on the character attribute selection data, display data associated with the game character;

facilitating, based on the display data associated with the game character, generation of a player token NFT associated with the game character; and preventing, via processor, use of the unique subset of character attributes of the character attribute database in generating other game characters, receiving, via the processor, display data associated with a customized collection display that presents a plurality of game NFTs, each of the plurality of game NFTs including a playable instance of a game that is accessible by a user of the client device and corresponding to the game character;

sending the display data for display via a graphical user interface and a display device associated with the client device;

receiving, via the processor in response to user interactions with the graphical user interface, a selection of one the plurality of game NFTs for play of the game;

sending, to the NFT game platform via the network interface, selection data indicating the selection of the one the plurality of game NFTs;

determining when the player token NFT is validated; and facilitating, via the network interface and in conjunction with NFT game platform, play of the game when the player token NFT is validated.

12. The system of claim 11, wherein the unique subset of character attributes of the character attribute database include one or more of: at least one garment selection, at least one garment color, a hair style, a hair color, a facial hair style, a facial hair color, a body style, at least one facial style, a shoe style, a shoe color, a jewelry selection, or an eye-ware selection.

13. The system of claim 11, further comprising:

generating game character data associated with the game character, based on the display data.

14. The system of claim 13, wherein the game character data facilitates play of a game via the game character.

15. The system of claim 14, wherein generating the game character data is further based on performance data to be associated with actions of the game character in the game.

16. The system of claim 15, wherein the performance data includes a persona associated with the game character in the game.

17. The system of claim 14, wherein generating the game character data is further based on game accessory data associated with a game accessory associated with the game character; and wherein the display data associated with the game character also includes the game accessory.

18. The system of claim 11, wherein the player token NFT is expended based on game play data associated with the game character that indicates loss of the game.

19. The system of claim 11, wherein preventing use of the unique subset of character attributes of the character attribute database in generating other game characters includes:

receiving other character attribute selection data to be associated with one of the other game characters; and determining when the other character attribute selection data indicates the unique subset of character attributes.

20. The system of claim 19, wherein preventing use of the unique subset of character attributes of the character attribute database in generating other game characters further includes preventing use of the unique subset of character attributes in generating the one of the other characters.

* * * * *